US012480782B2

(12) United States Patent
Hayat et al.

(10) Patent No.: US 12,480,782 B2
(45) Date of Patent: Nov. 25, 2025

(54) MACHINE LEARNING-BASED TRAFFIC LIGHT RELEVANCY MAPPING

(71) Applicant: Mobileye Vision Technologies Ltd., Jerusalem (IL)

(72) Inventors: Adi Hayat, Modiin (IL); Jonathan Barlev, Shoeva (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 343 days.

(21) Appl. No.: 18/116,084

(22) Filed: Mar. 1, 2023

(65) Prior Publication Data

US 2023/0280183 A1    Sep. 7, 2023

Related U.S. Application Data

(60) Provisional application No. 63/315,247, filed on Mar. 1, 2022.

(51) Int. Cl.
*G01C 21/00* (2006.01)

(52) U.S. Cl.
CPC ..... *G01C 21/3841* (2020.08); *G01C 21/3819* (2020.08)

(58) Field of Classification Search
CPC .......... G01C 21/3841; G01C 21/3819
USPC ........................................ 701/423
See application file for complete search history.

(56) References Cited

U.S. PATENT DOCUMENTS

| | | |
|---|---|---|
| 11,499,834 B2 | 11/2022 | Shapira et al. |
| 2019/0258251 A1 | 8/2019 | Ditty et al. |
| 2021/0088355 A1* | 3/2021 | Huberman ......... G01C 21/3658 |
| 2021/0101616 A1* | 4/2021 | Hayat ....................... G06T 7/20 |
| 2021/0103287 A1* | 4/2021 | Shapira .............. G01C 21/3407 |
| 2021/0122373 A1 | 4/2021 | Dax |
| 2021/0261152 A1 | 8/2021 | Meijburg et al. |
| 2022/0082403 A1* | 3/2022 | Shapira .................. G06V 20/58 |

(Continued)

FOREIGN PATENT DOCUMENTS

WO    WO 2021/231906    11/2021

OTHER PUBLICATIONS

International Search Report and Written Opinion issued in PCT International Application No. PCT/US2023/063475, dated Jul. 18, 2023 (15 pages).

*Primary Examiner* — Yazan A Soofi
(74) *Attorney, Agent, or Firm* — Finnegan, Henderson, Farabow, Garrett & Dunner, LLP

(57) ABSTRACT

Systems and methods are provided for generating a crowd-sourced map for use in vehicle navigation. In one implementation, a system may include at least one processor configured to receive drive information collected from vehicles that traversed a junction; aggregate the received drive information to determine positions of traffic lights and spline representations for drivable paths; input the determined positions and the spline representations to a trained model configured to generate a traffic light relevancy mapping indicating a traffic light relevancy for traffic light to drivable path pairs of the junction; input an observed vehicle behavior to the at least one trained model to generate an updated traffic light relevancy mapping; store in the crowd-sourced map the indicators of traffic light relevancy for the traffic light to drivable path pairs; and transmit the crowd-sourced map to a vehicle for use in navigating the road segment.

36 Claims, 78 Drawing Sheets

(56) References Cited

U.S. PATENT DOCUMENTS

| | | | |
|---|---|---|---|
| 2022/0383745 A1* | 12/2022 | Heilbron | G06V 20/582 |
| 2023/0211726 A1* | 7/2023 | Nehushtan | G08G 1/0129 |
| | | | 701/117 |
| 2023/0280183 A1* | 9/2023 | Hayat | G01C 21/3889 |
| | | | 701/423 |

* cited by examiner

2910

```
┌─────────────────────────────────────────────────────────────┐
│ RECEIVE ONE OR MORE IMAGES CAPTURED FROM AN ENVIRONMENT     │─ 2911
│                    OF THE HOST VEHICLE                      │
└─────────────────────────────────────────────────────────────┘
                              │
                              ▼
┌─────────────────────────────────────────────────────────────┐
│ ANALYZE THE ONE OR MORE IMAGES TO DETECT AN INDICATOR OF AN │─ 2912
│                        INTERSECTION                         │
└─────────────────────────────────────────────────────────────┘
                              │
                              ▼
┌─────────────────────────────────────────────────────────────┐
│ DETERMINE, BASED ON OUTPUT RECEIVED FROM AT LEAST ONE       │─ 2913
│ SENSOR OF THE HOST VEHICLE, A STOPPING LOCATION OF THE HOST │
│ VEHICLE RELATIVE TO THE DETECTED INTERSECTION               │
└─────────────────────────────────────────────────────────────┘
                              │
                              ▼
┌─────────────────────────────────────────────────────────────┐
│ ANALYZE THE ONE OR MORE IMAGES TO DETERMINE AN INDICATOR    │─ 2914
│ OF WHETHER ONE OR MORE OTHER VEHICLES ARE IN FRONT OF THE   │
│                        HOST VEHICLE                         │
└─────────────────────────────────────────────────────────────┘
                              │
                              ▼
┌─────────────────────────────────────────────────────────────┐
│ SEND THE STOPPING LOCATION OF THE HOST VEHICLE AND THE      │─ 2915
│ INDICATOR OF WHETHER ONE OR MORE OTHER VEHICLES ARE IN      │
│ FRONT OF THE HOST VEHICLE TO A SERVER FOR USE IN UPDATING A │
│                  ROAD NAVIGATION MODEL                      │
└─────────────────────────────────────────────────────────────┘
```

```
┌─────────────────────────────────────────────────────────────┐
│ RECEIVE DRIVE INFORMATION FROM EACH OF A PLURALITY OF       │─ 2921
│ VEHICLES, THE DRIVE INFORMATION INCLUDING A STOPPING        │
│ LOCATION AT WHICH A PARTICULAR VEHICLE STOPPED RELATIVE TO  │
│ AN INTERSECTION DURING A DRIVE ALONG A ROAD SEGMENT         │
└─────────────────────────────────────────────────────────────┘
                              │
                              ▼
┌─────────────────────────────────────────────────────────────┐
│ AGGREGATE THE STOPPING LOCATIONS IN THE DRIVE INFORMATION   │─ 2922
│         RECEIVED FROM THE PLURALITY OF VEHICLES             │
└─────────────────────────────────────────────────────────────┘
                              │
                              ▼
┌─────────────────────────────────────────────────────────────┐
│ DETERMINE, BASED ON THE AGGREGATED STOPPING LOCATIONS, A    │─ 2923
│       STOP LINE LOCATION RELATIVE TO THE INTERSECTION       │
└─────────────────────────────────────────────────────────────┘
                              │
                              ▼
┌─────────────────────────────────────────────────────────────┐
│ UPDATE THE ROAD NAVIGATION MODEL TO INCLUDE THE STOP LINE   │─ 2924
│                          LOCATION                           │
└─────────────────────────────────────────────────────────────┘
```

FIG. 29B

MACHINE LEARNING-BASED TRAFFIC LIGHT RELEVANCY MAPPING

CROSS REFERENCES TO RELATED APPLICATIONS

This application claims the benefit of priority of U.S. Provisional Application No. 63/315,247, filed Mar. 1, 2022. The foregoing application is incorporated herein by reference in its entirety.

BACKGROUND

Technical Field

The present disclosure relates generally to autonomous vehicle navigation, and more specifically, to systems and methods for mapping relevancy of traffic lights for vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from one road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras.

In an embodiment, a system for generating a crowd-sourced map for use in vehicle navigation may include at least one processor comprising circuitry and a memory. The memory may include instructions that when executed by the circuitry cause the at least one processor to receive drive information collected from a plurality of vehicles that traversed a road segment, wherein the road segment intersects a junction associated with a plurality of traffic lights; aggregate the received drive information to determine a position for each of the plurality of traffic lights and to determine a spline representation for each of one or more drivable paths associated with road segment; provide as input to at least one trained model the determined positions for each of the plurality of traffic lights and the spline representation for each of the one or more drivable paths, wherein the at least one trained model is configured to generate, based on the determined positions for each of the plurality of traffic lights and the spline representation for each of the one or more drivable paths, a traffic light relevancy mapping including an indicator of traffic light relevancy for each of a plurality of traffic light to drivable path pairs selected from among the plurality of traffic lights and the one or more drivable paths; provide as input to the at least one trained model an observed vehicle behavior represented by the received drive information, wherein the at least one trained model is configured to generate an updated traffic light relevancy mapping based on the traffic light relevancy mapping and the observed vehicle behavior, wherein generating the updated traffic light relevancy mapping includes modifying at least one indicator of traffic light relevancy for at least one traffic light to drivable path pair of the plurality of traffic light to drivable path pairs; store in the crowd-sourced map, based on the updated traffic light relevancy mapping, indicators of traffic light relevancy for each of the plurality of traffic light to drivable path pairs; and transmit the crowd-sourced map to at least one vehicle predicted to traverse the road segment for use in navigating the road segment relative to the stored indicators of traffic light relevancy for each of the plurality of traffic light to drivable path pairs.

In an embodiment, a method for generating a crowd-sourced map for use in vehicle navigation may include receiving drive information collected from a plurality of vehicles that traversed a road segment, wherein the road segment intersects a junction associated with a plurality of traffic lights; aggregating the received drive information to determine a position for each of the plurality of traffic lights and to determine a spline representation for each of one or more drivable paths associated with road segment; providing as input to at least one trained model the determined positions for each of the plurality of traffic lights and the spline representation for each of the one or more drivable paths, wherein the at least one trained model is configured to generate, based on the determined positions for each of the plurality of traffic lights and the spline representation for each of the one or more drivable paths, a traffic light relevancy mapping including an indicator of traffic light relevancy for each of a plurality of traffic light to drivable path pairs selected from among the plurality of traffic lights and the one or more drivable paths; providing as input to the at least one trained model an observed vehicle behavior represented by the received drive information, wherein the at least one trained model is configured to generate an updated traffic light relevancy mapping based on the traffic light relevancy mapping and the observed vehicle behavior, wherein generating the updated traffic light relevancy mapping includes modifying at least one indicator of traffic light relevancy for at least one traffic light to drivable path pair of the plurality of traffic light to drivable path pairs; storing in a crowd-sourced map, based on the updated traffic light relevancy mapping, indicators of traffic light relevancy for each of the plurality of traffic light to drivable path pairs; and transmitting the crowd-sourced map to at least one vehicle predicted to traverse the road segment for use in navigating the road segment relative to the stored indicators of traffic light relevancy for each of the plurality of traffic light to drivable path pairs.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 29A is a flowchart showing an exemplary process for vehicle navigation, consistent with the disclosed embodiments.

FIG. 29B is a flowchart showing an exemplary process for updating a road navigation model, consistent with the disclosed embodiments.

DETAILED DESCRIPTION

Figure 1:
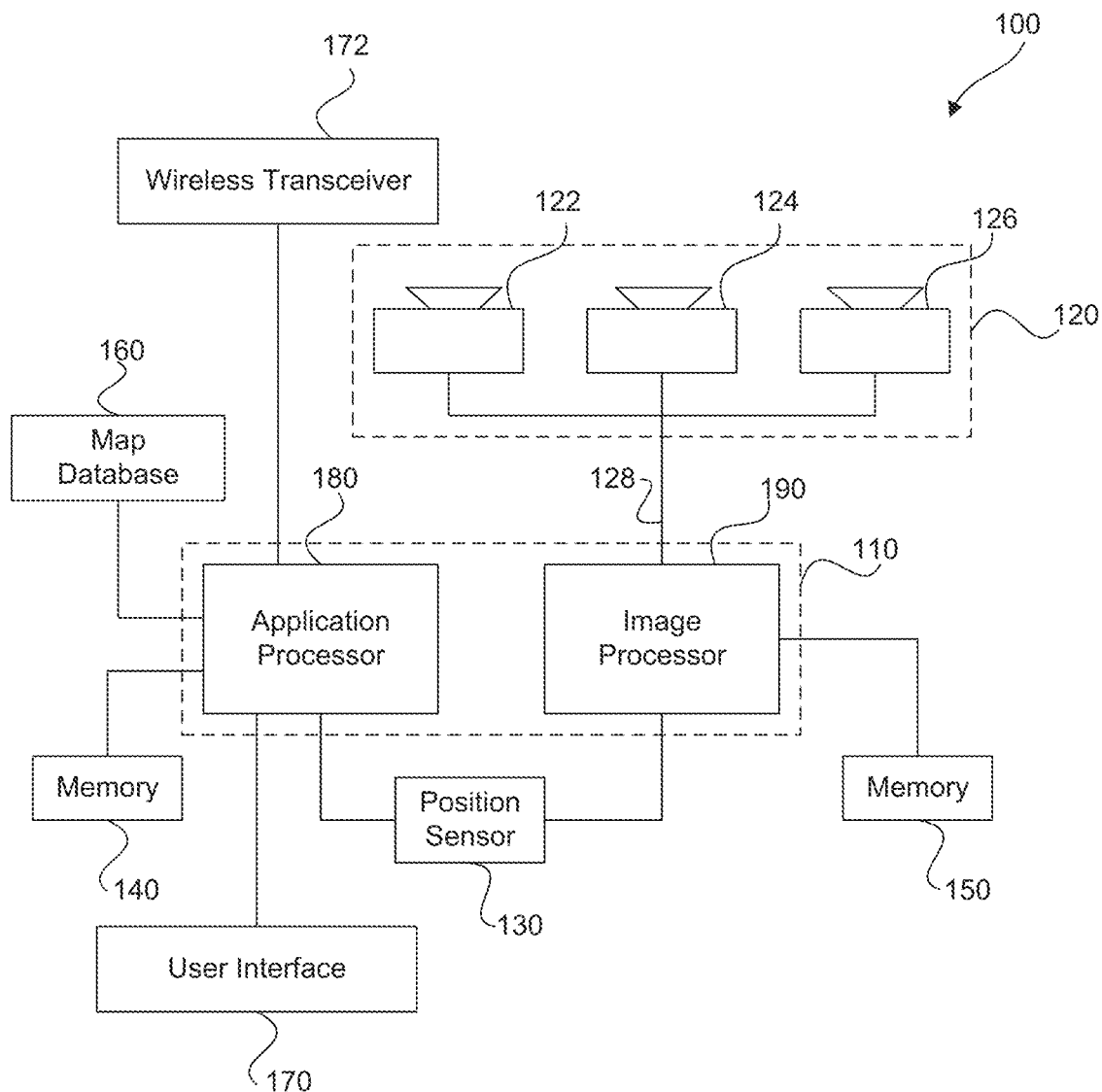
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, followed by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
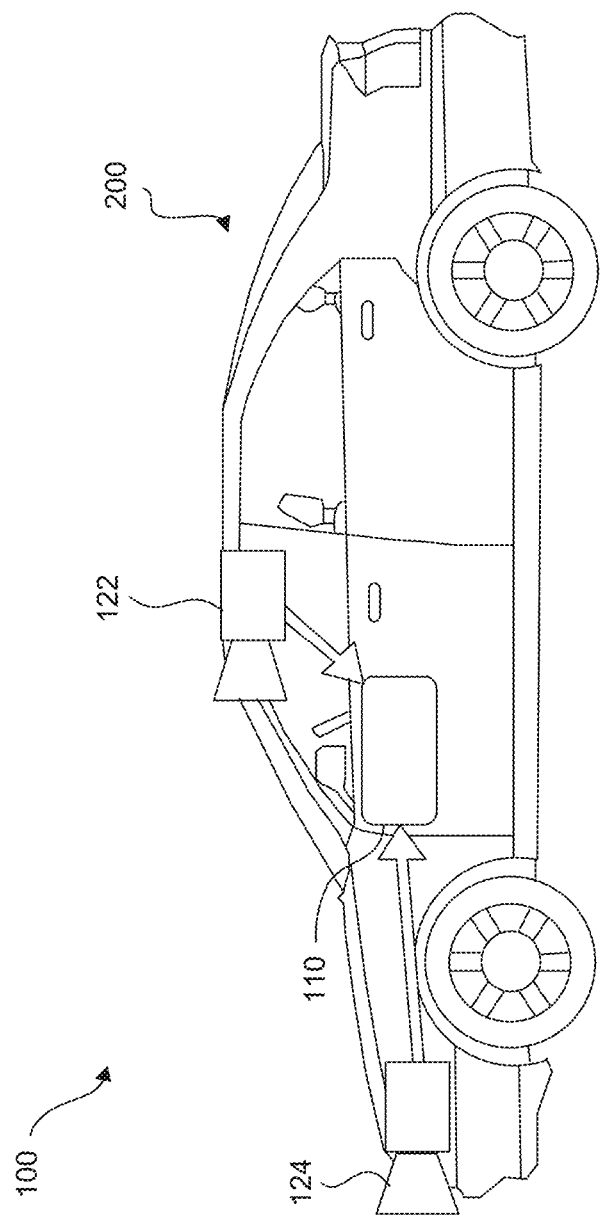
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
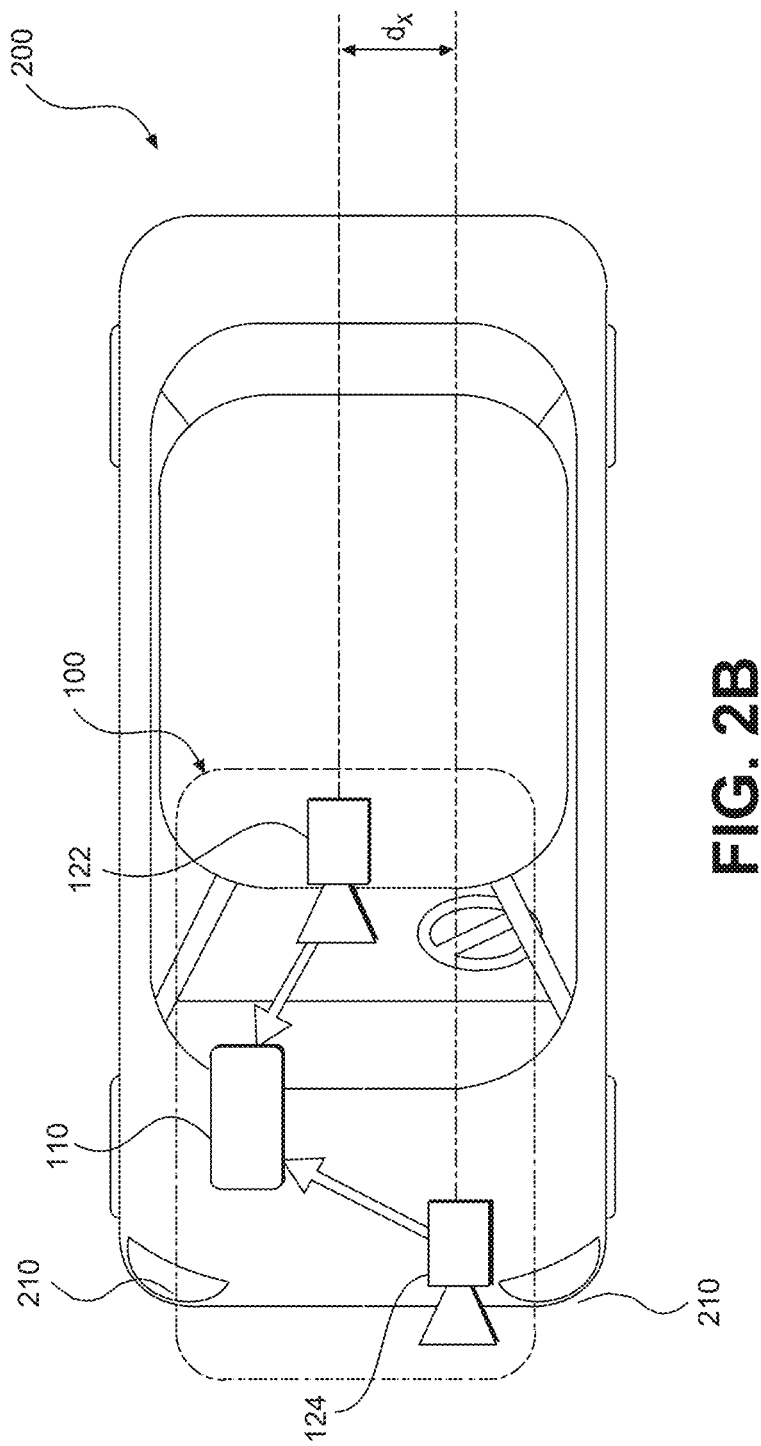
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
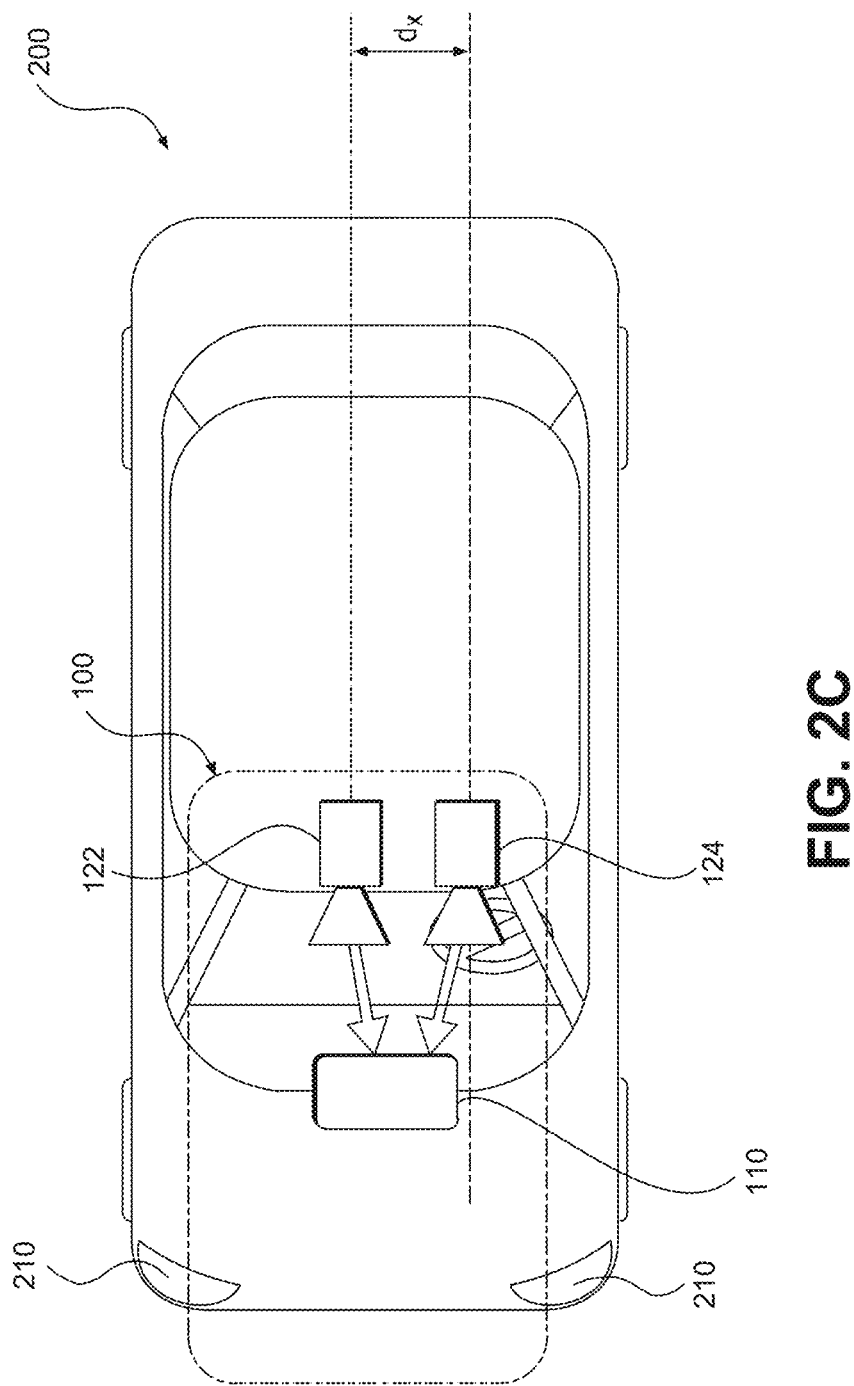
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
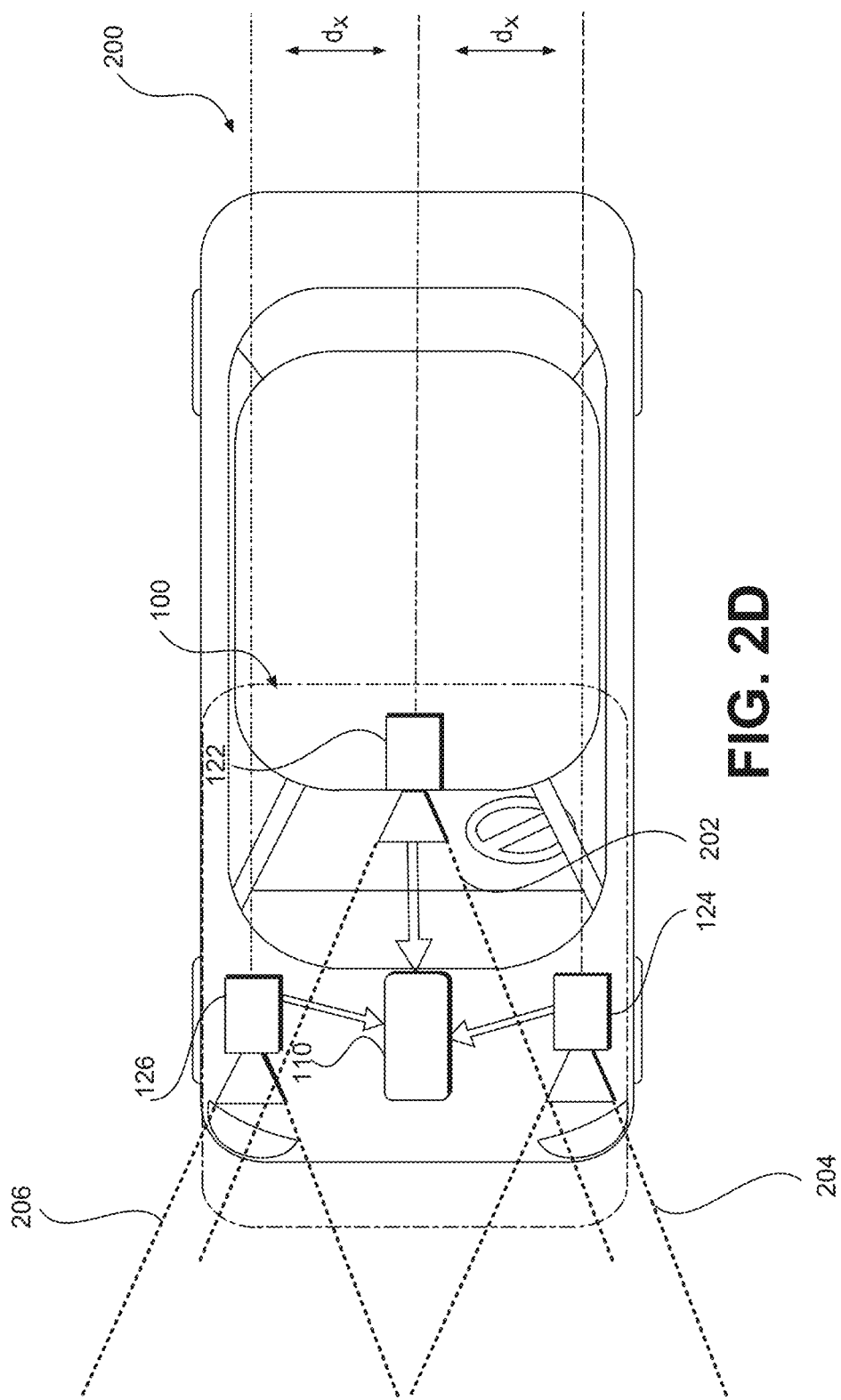
FIG. 2D is a diagrammatic top view representation of yet another embodiment of a vehicle including a system consistent with the disclosed embodiments.
Figure 2E:
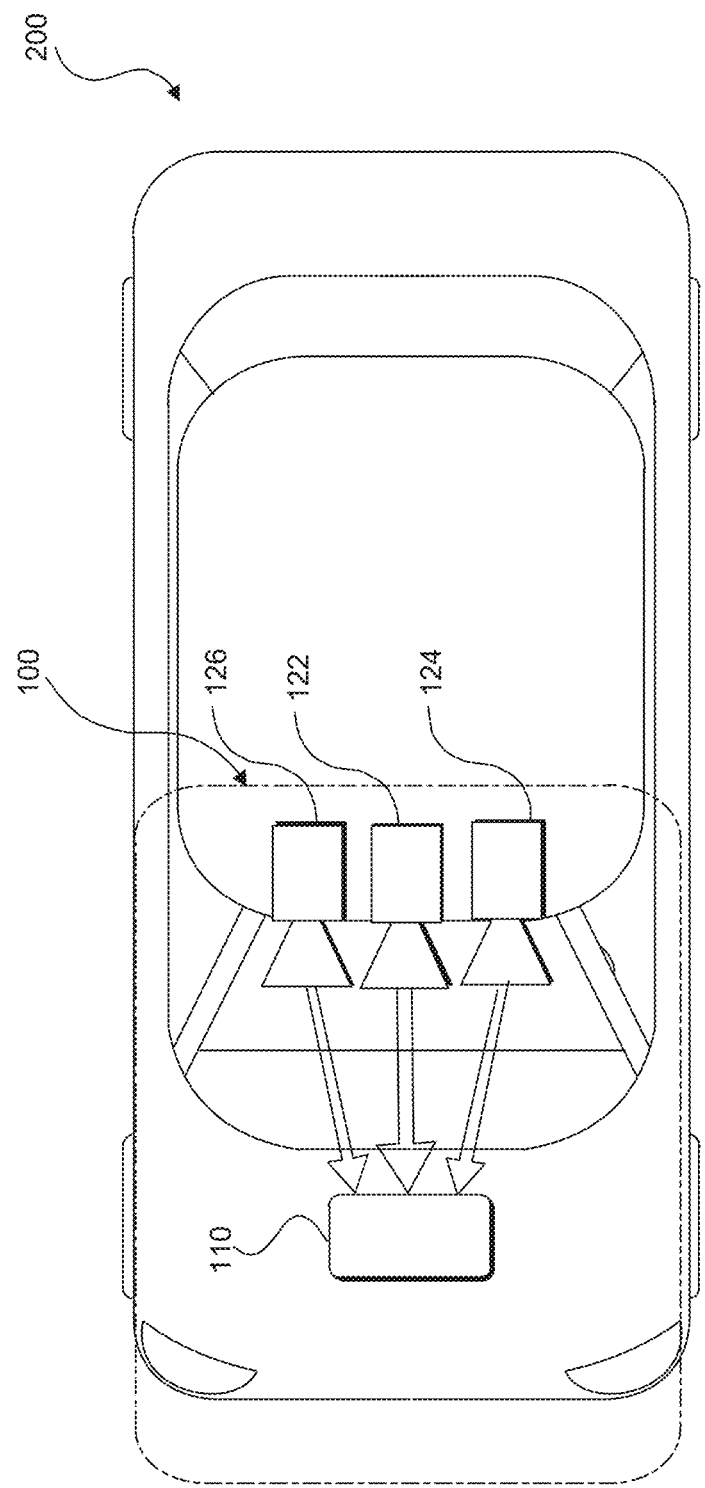
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
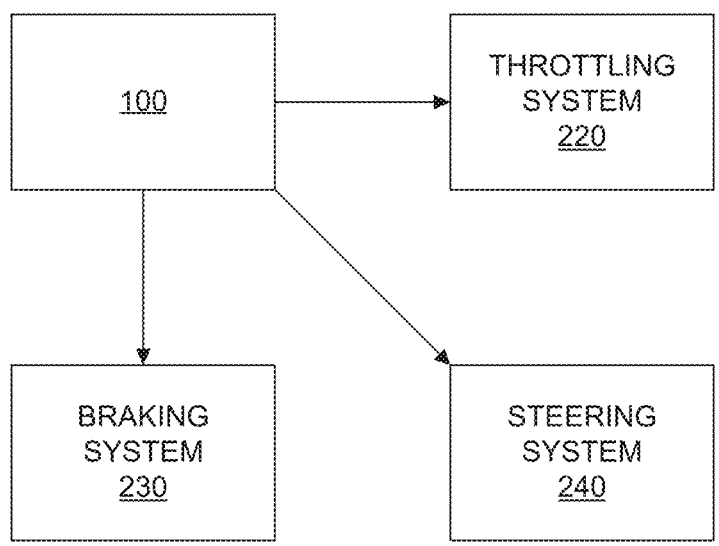
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
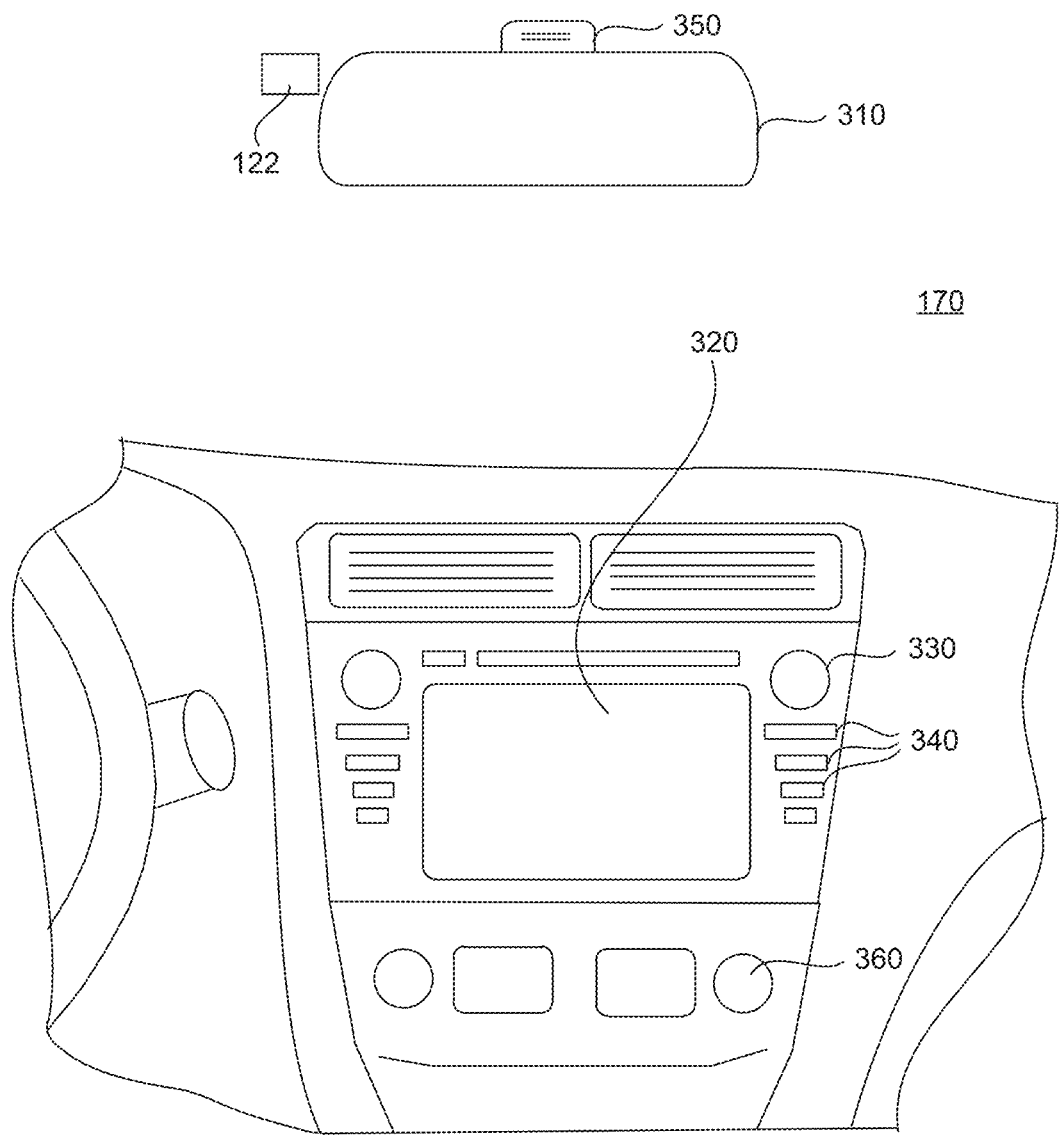
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
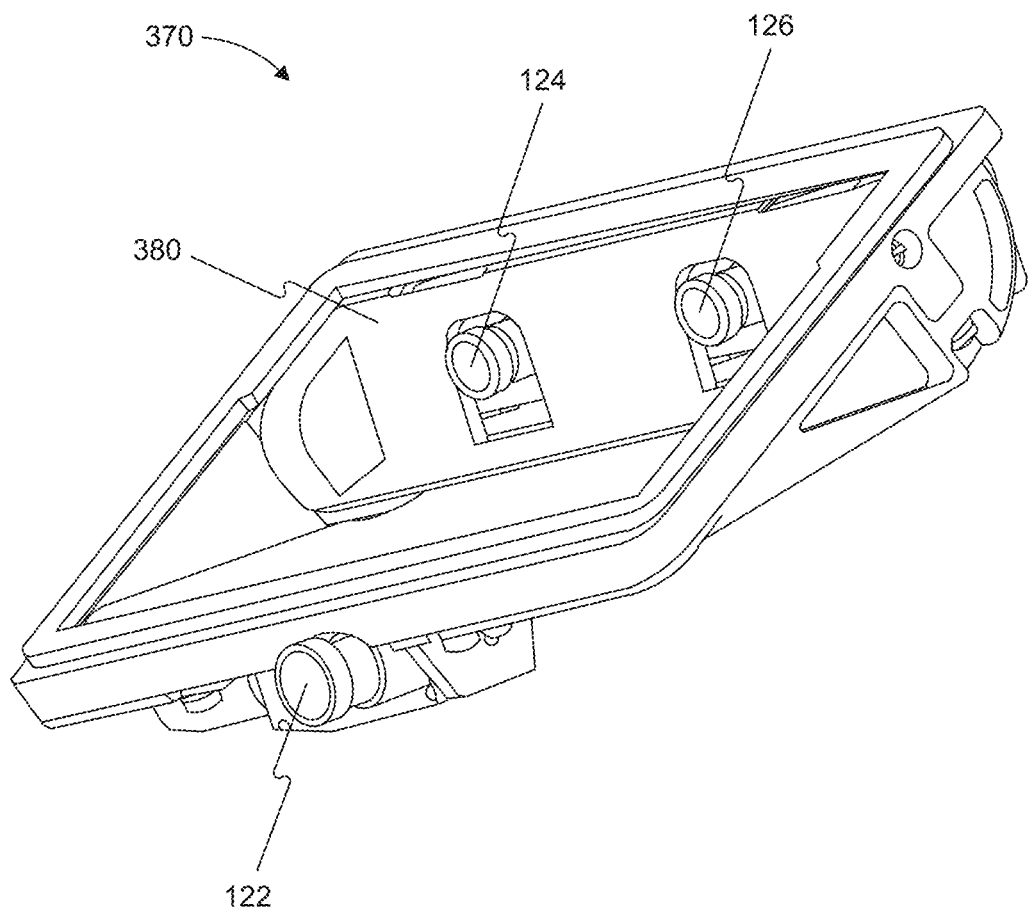
FIG. 3B is an illustration of an example of a camera mount that is configured to be positioned behind a rearview mirror and against a vehicle windshield consistent with the disclosed embodiments.
Figure 3C:
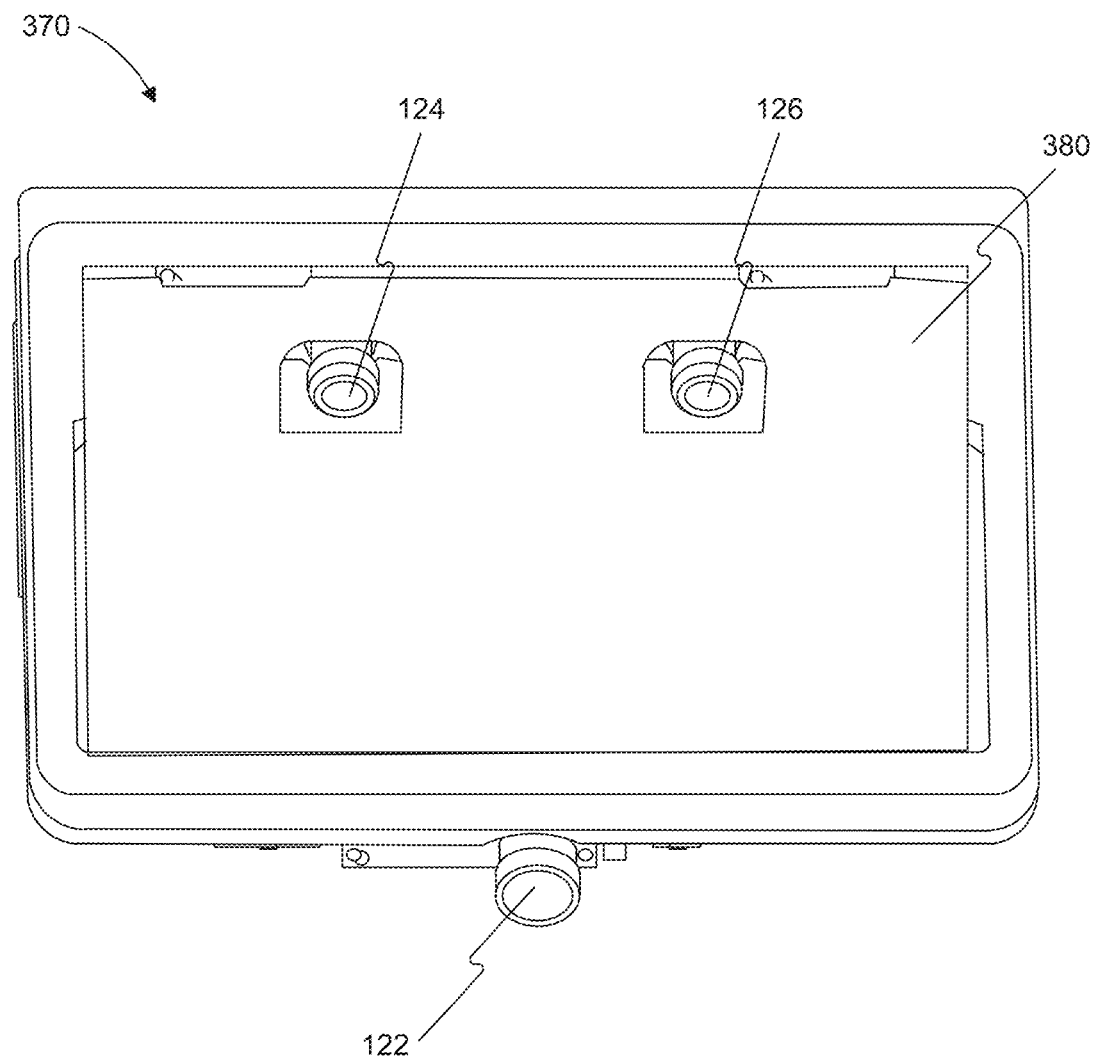
FIG. 3C is an illustration of the camera mount shown in FIG. 3B from a different perspective consistent with the disclosed embodiments.
Figure 3D:
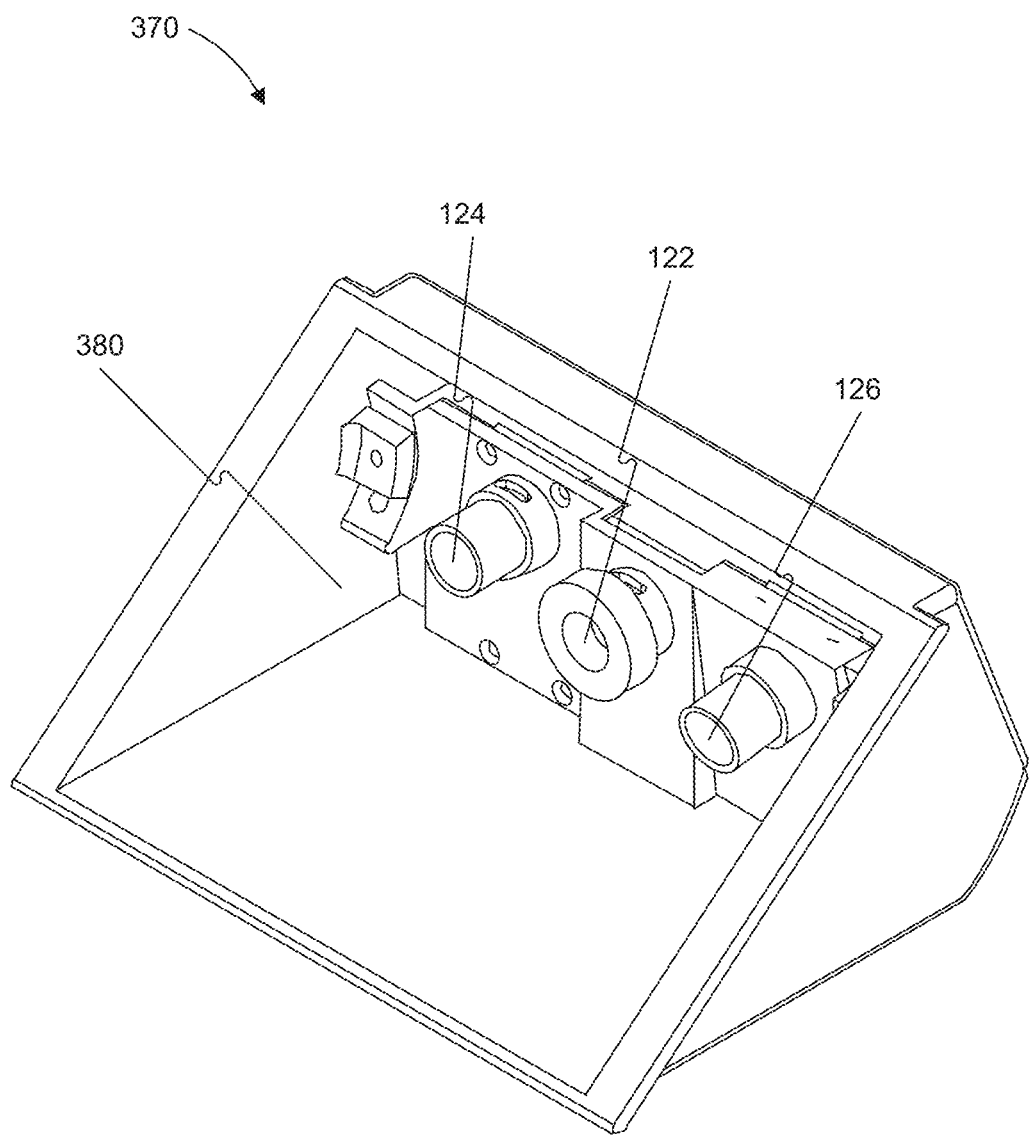
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
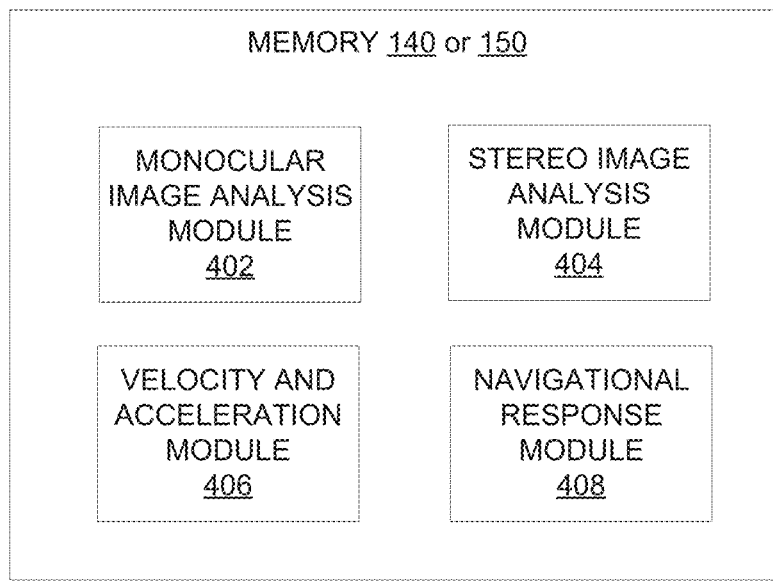
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
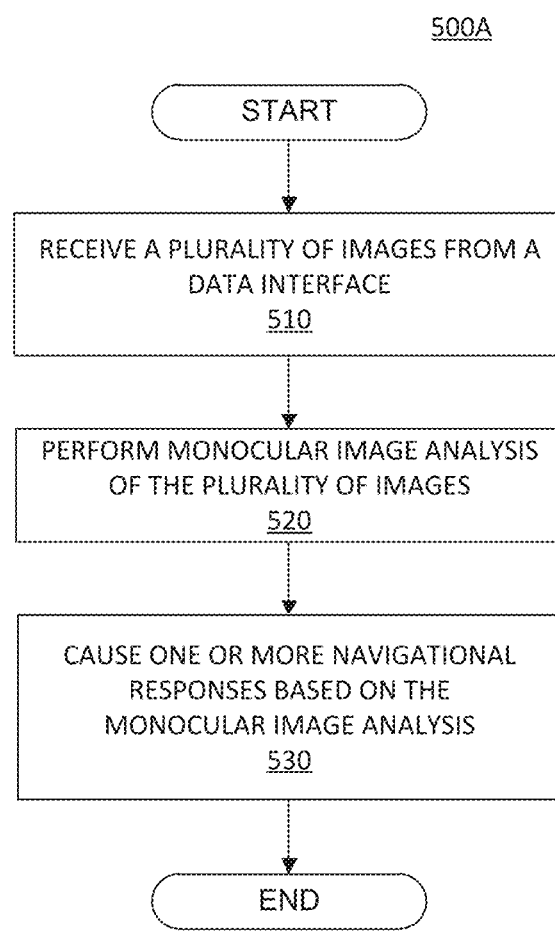
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
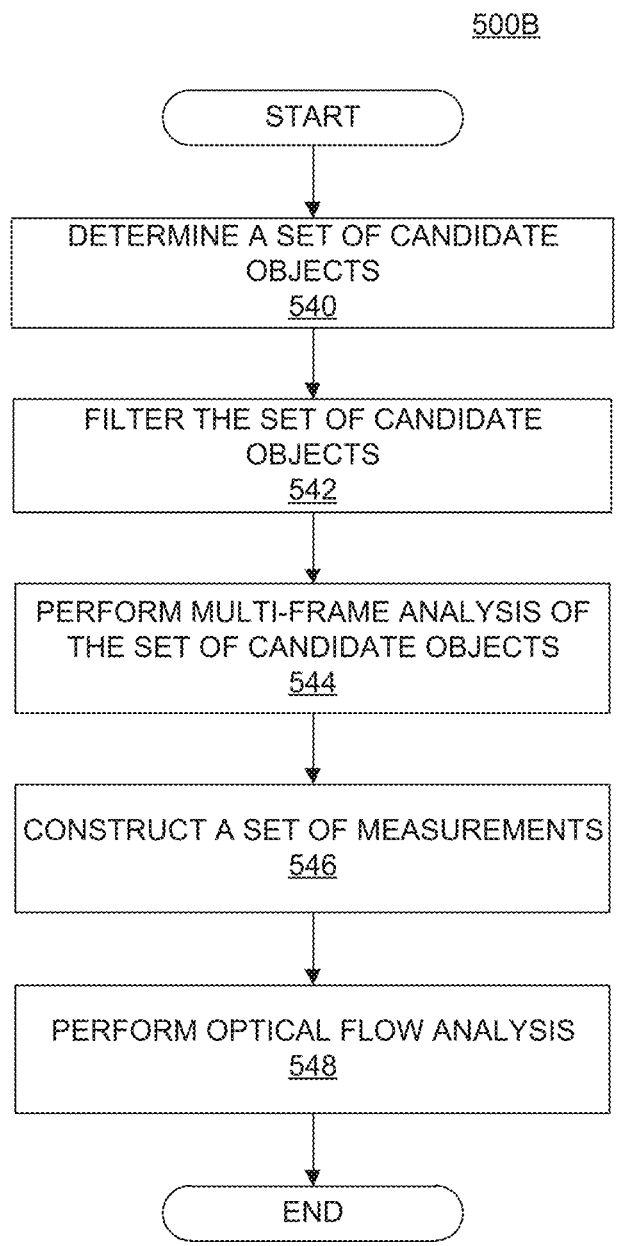
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
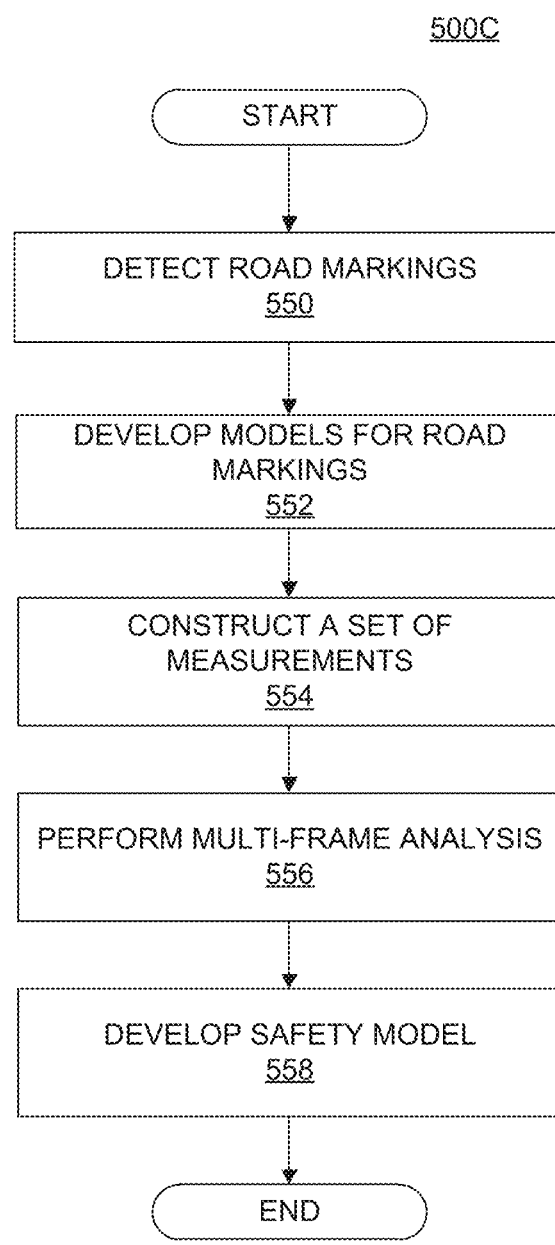
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
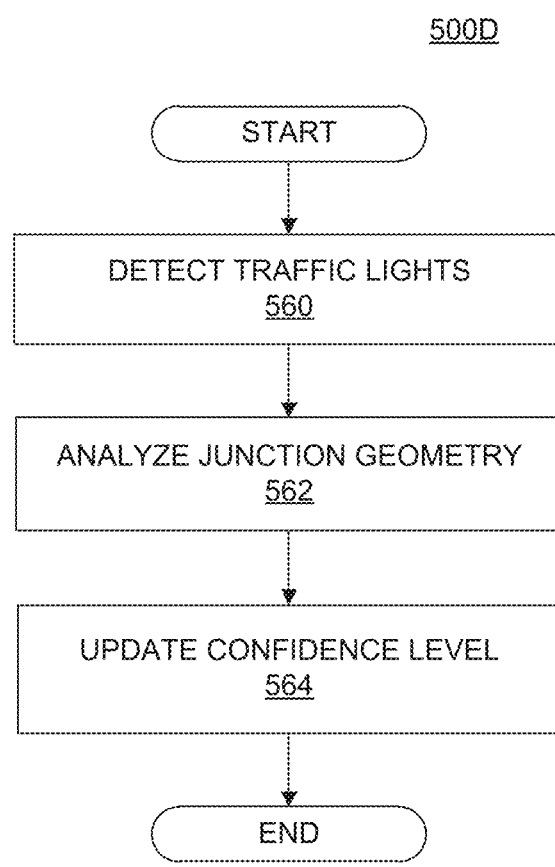
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
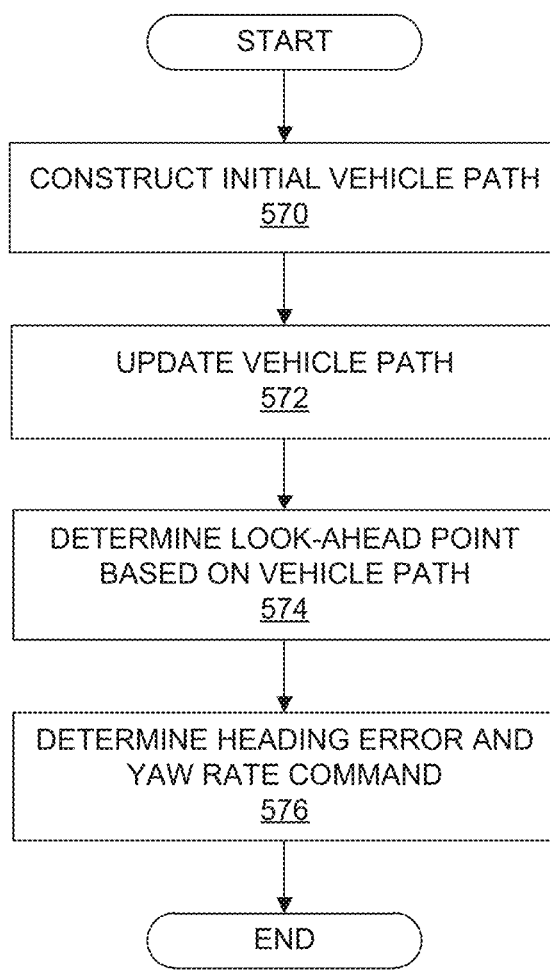
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
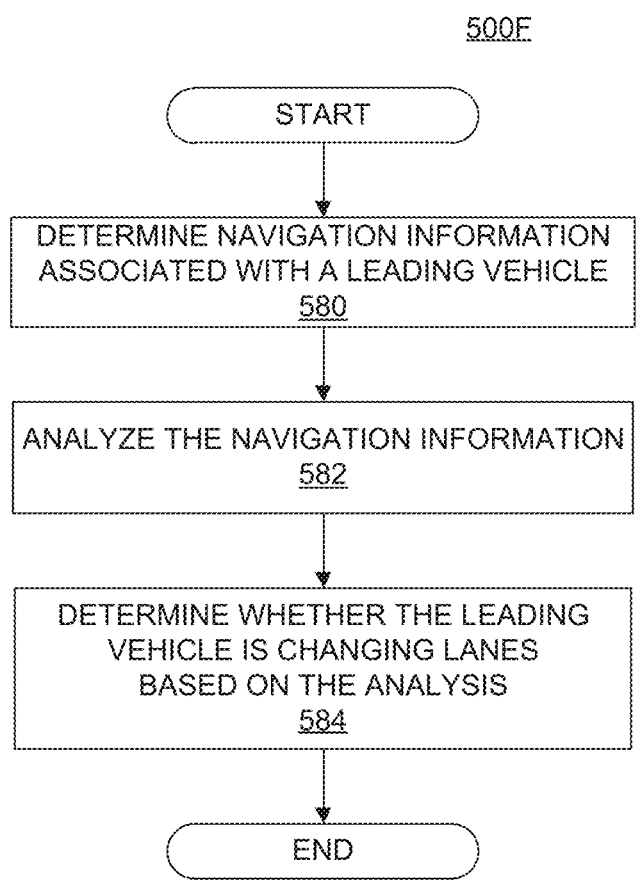
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
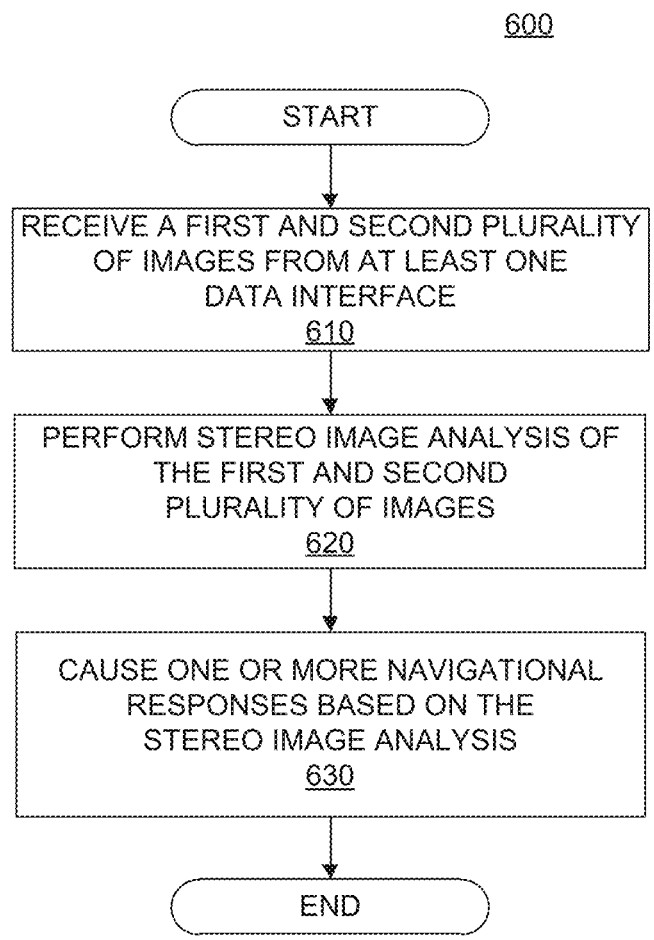
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
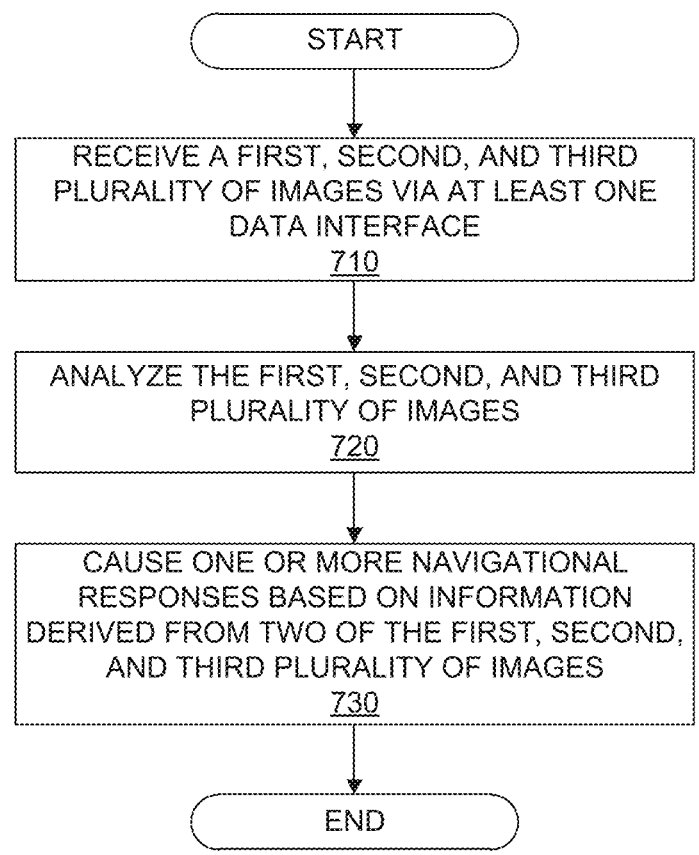
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline)

along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

The sparse map may include any suitable representation of objects identified along a road segment. In some cases, the objects may be referred to as semantic objects or non-semantic objects. Semantic objects may include, for example, objects associated with a predetermined type classification. This type classification may be useful in reducing the amount of data required to describe the semantic object recognized in an environment, which can be beneficial both in the harvesting phase (e.g., to reduce costs associated with bandwidth use for transferring drive information from a plurality of harvesting vehicles to a server) and during the navigation phase (e.g., reduction of map data can speed transfer of map tiles from a server to a navigating vehicle and can also reduce costs associated with bandwidth use for such transfers). Semantic object classification types may be assigned to any type of objects or features that are expected to be encountered along a roadway.

Semantic objects may further be divided into two or more logical groups. For example, in some cases, one group of semantic object types may be associated with predetermined dimensions. Such semantic objects may include certain speed limit signs, yield signs, merge signs, stop signs, traffic lights, directional arrows on a roadway, manhole covers, or any other type of object that may be associated with a standardized size. One benefit offered by such semantic objects is that very little data may be needed to represent/fully define the objects. For example, if a standardized size of a speed limit size is known, then a harvesting vehicle may need only identify (through analysis of a captured image) the presence of a speed limit sign (a recognized type) along with an indication of a position of the detected speed limit sign (e.g., a 2D position in the captured image (or, alternatively, a 3D position in real world coordinates) of a center of the sign or a certain corner of the sign) to provide sufficient information for map generation on the server side. Where 2D image positions are transmitted to the server, a position associated with the captured image where the sign was detected may also be transmitted so the server can determine a real-world position of the sign (e.g., through structure in motion techniques using multiple captured images from one or more harvesting vehicles). Even with this limited information (requiring just a few bytes to define each detected object), the server may construct the map including a fully represented speed limit sign based on the type classification (representative of a speed limit sign) received from one or more harvesting vehicles along with the position information for the detected sign.

Semantic objects may also include other recognized object or feature types that are not associated with certain standardized characteristics. Such objects or features may include potholes, tar seams, light poles, non-standardized signs, curbs, trees, tree branches, or any other type of recognized object type with one or more variable characteristics (e.g., variable dimensions). In such cases, in addition to transmitting to a server an indication of the detected object or feature type (e.g., pothole, pole, etc.) and position information for the detected object or feature, a harvesting vehicle may also transmit an indication of a size of the object or feature. The size may be expressed in 2D image dimensions (e.g., with a bounding box or one or more dimension values) or real-world dimensions (determined through structure in motion calculations, based on LIDAR or RADAR system outputs, based on trained neural network outputs, etc.).

Non-semantic objects or features may include any detectable objects or features that fall outside of a recognized category or type, but that still may provide valuable information in map generation. In some cases, such non-semantic features may include a detected corner of a building or a corner of a detected window of a building, a unique stone or object near a roadway, a concrete splatter in a roadway shoulder, or any other detectable object or feature. Upon detecting such an object or feature one or more harvesting vehicles may transmit to a map generation server a location of one or more points (2D image points or 3D real world points) associated with the detected object/feature. Additionally, a compressed or simplified image segment (e.g., an image hash) may be generated for a region of the captured image including the detected object or feature. This image hash may be calculated based on a predetermined image processing algorithm and may form an effective signature for the detected non-semantic object or feature. Such a signature may be useful for navigation relative to a sparse map including the non-semantic feature or object, as a vehicle traversing the roadway may apply an algorithm similar to the algorithm used to generate the image hash in order to confirm/verify the presence in a captured image of the mapped non-semantic feature or object. Using this technique, non-semantic features may add to the richness of the sparse maps (e.g., to enhance their usefulness in navigation) without adding significant data overhead.

As noted, target trajectories may be stored in the sparse map. These target trajectories (e.g., 3D splines) may represent the preferred or recommended paths for each available lane of a roadway, each valid pathway through a junction, for merges and exits, etc. In addition to target trajectories, other road feature may also be detected, harvested, and incorporated in the sparse maps in the form of representative splines. Such features may include, for example, road edges, lane markings, curbs, guardrails, or any other objects or features that extend along a roadway or road segment.

Generating a Sparse Map

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8:
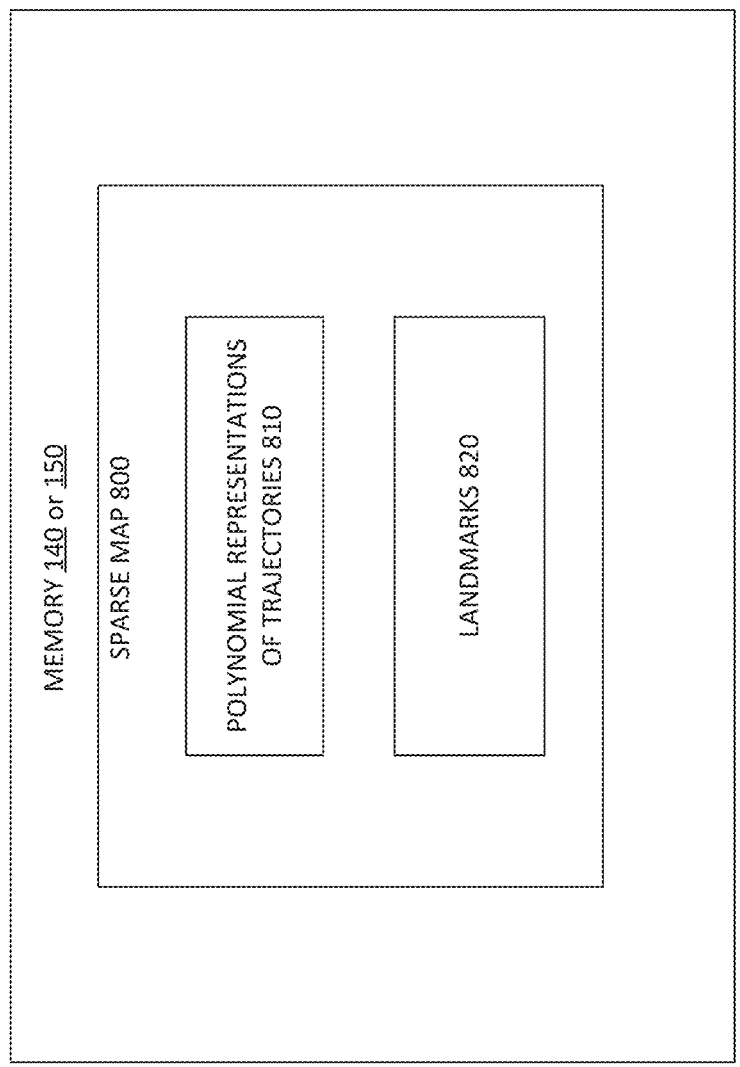
FIG. 8 shows a sparse map for providing autonomous vehicle navigation, consistent with the disclosed embodiments.

FIG. 8 shows a sparse map 800 that one or more vehicles, e.g., vehicle 200 (which may be an autonomous vehicle), may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as the vehicle traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remote server and may execute the data for guiding the autonomous driving of vehicle 200. In such embodiments, the remote server may store all of sparse map 800 or only a portion thereof. Accordingly, the storage device or computer-readable medium provided onboard vehicle 200 and/or onboard one or more additional vehicles may store the remaining portion(s) of sparse map 800.

Furthermore, in such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps (e.g., map tiles) that may be used in navigating a vehicle. Such sub-maps may be referred to as local maps or map tiles, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

In general, sparse map 800 may be generated based on data (e.g., drive information) collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, road conditions, etc. Using the collected information, sparse map 800 may be generated and distributed (e.g., for local storage or via on-the-fly data transmission) for use in navigating one or more autonomous vehicles. However, in some embodiments, map generation may not end upon initial generation of the map. As will be discussed in greater detail below, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations may be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

In a particular example, harvesting vehicles may traverse a particular road segment. Each harvesting vehicle captures images of their respective environments. The images may be collected at any suitable frame capture rate (e.g., 9 Hz, etc.). Image analysis processor(s) aboard each harvesting vehicle analyze the captured images to detect the presence of semantic and/or non-semantic features/objects. At a high level, the harvesting vehicles transmit to a mapping-server indications of detections of the semantic and/or non-semantic objects/features along with positions associated with those objects/features. In more detail, type indicators, dimension indicators, etc. may be transmitted together with the position information. The position information may include any suitable information for enabling the mapping server to aggregate the detected objects/features into a sparse map useful in navigation. In some cases, the position information may include one or more 2D image positions (e.g., X-Y pixel locations) in a captured image where the semantic or non-semantic features/objects were detected. Such image positions may correspond to a center of the feature/object, a corner, etc. In this scenario, to aid the mapping server in reconstructing the drive information and aligning the drive information from multiple harvesting vehicles, each harvesting vehicle may also provide the server with a location (e.g., a GPS location) where each image was captured.

In other cases, the harvesting vehicle may provide to the server one or more 3D real world points associated with the detected objects/features. Such 3D points may be relative to a predetermined origin (such as an origin of a drive segment) and may be determined through any suitable technique. In some cases, a structure in motion technique may be used to determine the 3D real world position of a detected object/feature. For example, a certain object such as a particular speed limit sign may be detected in two or more captured images. Using information such as the known ego motion (speed, trajectory, GPS position, etc.) of the harvesting vehicle between the captured images, along with observed changes of the speed limit sign in the captured images (change in X-Y pixel location, change in size, etc.), the real-world position of one or more points associated with the speed limit sign may be determined and passed along to the mapping server. Such an approach is optional, as it requires more computation on the part of the harvesting vehicle systems. The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 800 may be less than 10 kB per kilometer of roads or even less than 2 kB per kilometer of roads (e.g., 1.6 kB per kilometer), or no more than 10 kB per kilometer of roads, or no more than 20 kB per kilometer of roads. In some embodiments, most, if not all, of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment, for example. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in greater detail below, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart.

Between landmarks, and therefore between determinations of vehicle position relative to a target trajectory, the vehicle may navigate based on dead reckoning in which the vehicle uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Moreover, in some embodiments, lane markings may be used for localization of the vehicle during landmark spacings. By using lane markings during landmark spacings, the accumulation of errors during navigation by dead reckoning may be minimized.

Figure 9A:
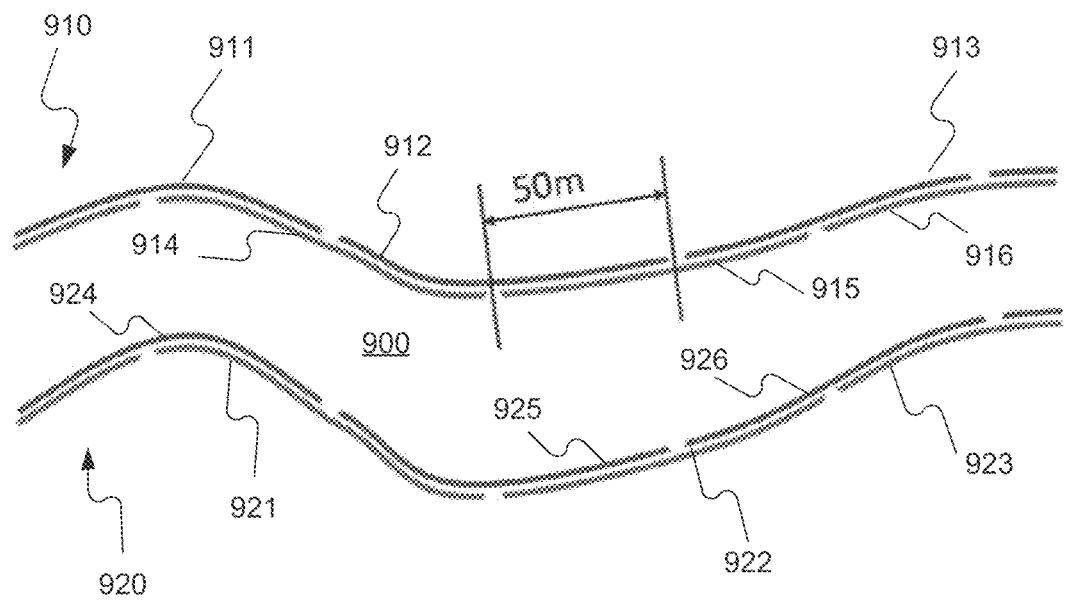
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. As depicted in FIG. 9A, lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913. The second group includes polynomial segments 914, 915, and 916. The two groups, while substantially parallel to each other, follow the locations of their respective sides of the road. Polynomial segments 911, 912, 913, 914, 915, and 916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 9A, right side 920 of lane 900 is further represented by a first group having polynomial segments 921, 922, and 923 and a second group having polynomial segments 924, 925, and 926.

Figure 9B:
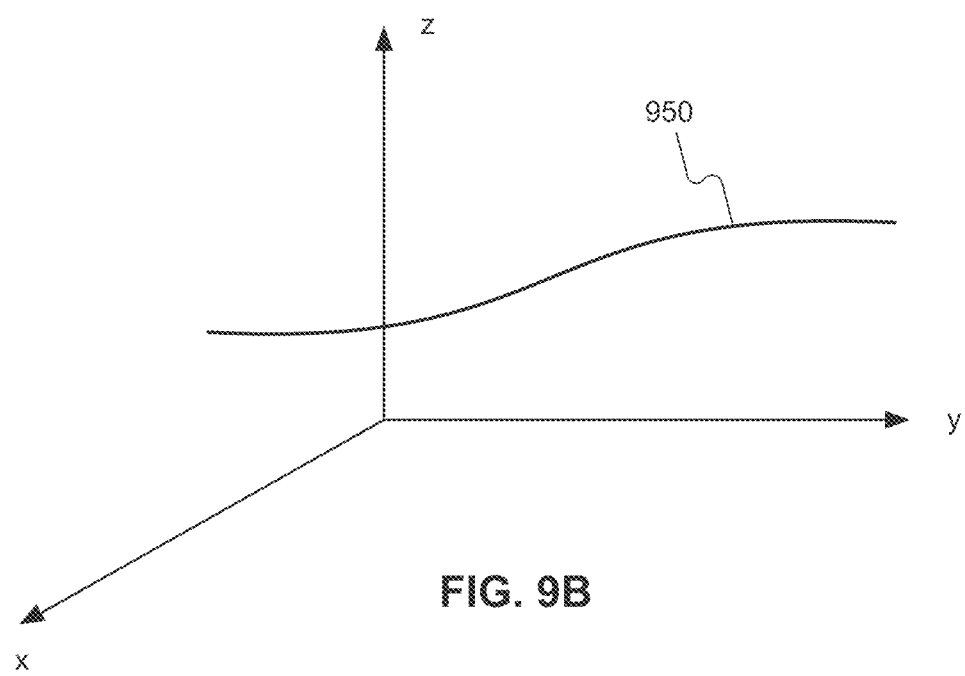
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may still include sufficient information for describing or identifying the landmarks along a road. Storing data describing characteristics of landmarks, rather than the actual images of landmarks, may reduce the size of sparse map 800.

Figure 10:
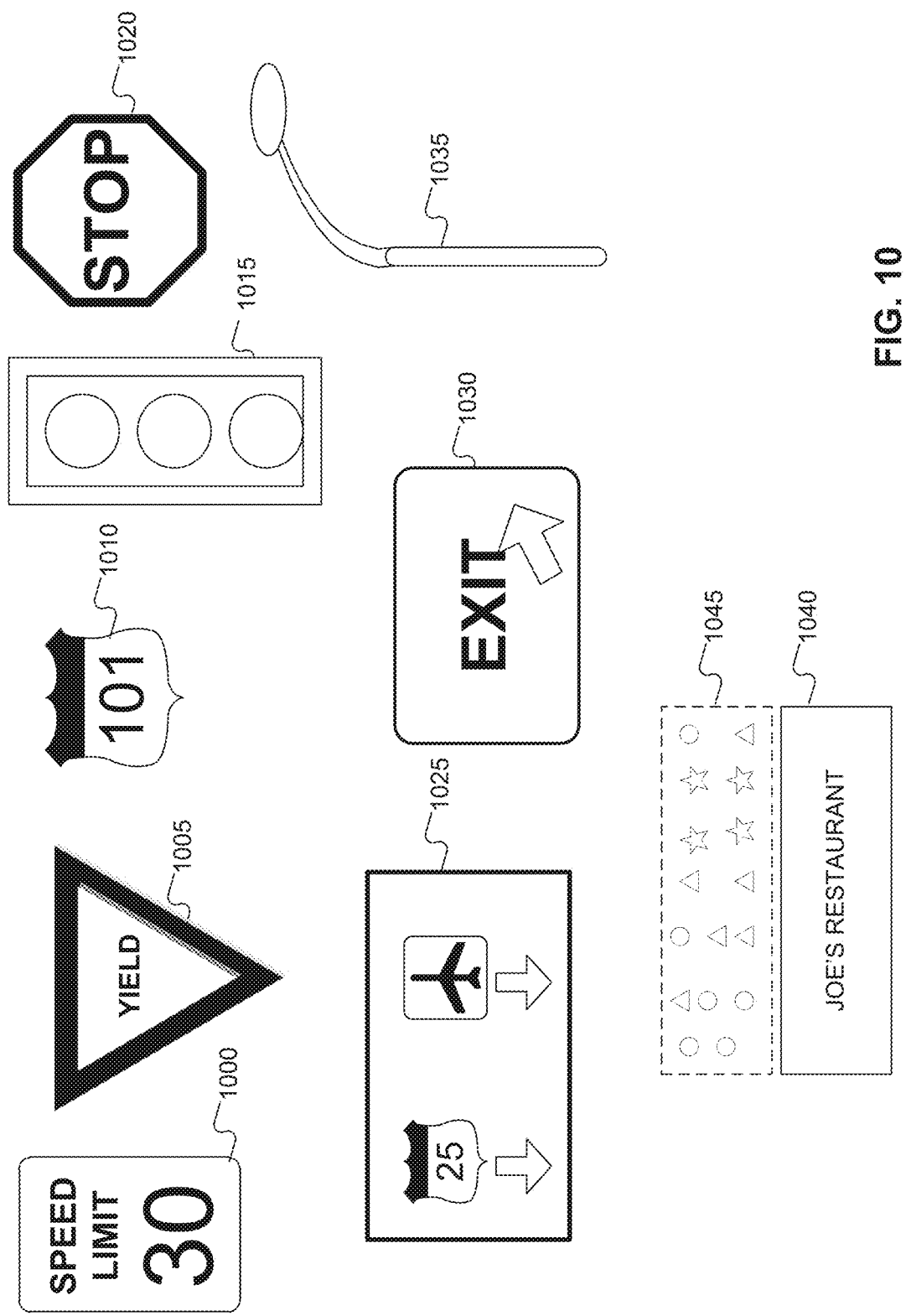
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc. Accordingly, at least one of the plurality of landmarks may include a road sign.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type—what type of directional sign, traffic sign, etc.), a GPS coordinate (e.g., to support global localization), and any other suitable parameters. Each parameter may be associated with a data size. For example, a landmark size may be stored using 8 bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used. Representing landmarks in sparse map 800 in this manner may offer a lean solution for efficiently representing landmarks in the database. In some embodiments, objects may be referred to as standard semantic objects or non-standard semantic objects. A standard semantic object may include any class of object for which there's a standardized set of characteristics (e.g., speed limit signs, warning signs, directional signs, traffic lights, etc. having known dimensions or other characteristics). A non-standard semantic object may include any object that is not associated with a standardized set of characteristics (e.g., general advertising signs, signs identifying business establishments, potholes, trees, etc. that may have variable dimensions). Each non-standard semantic object may be represented with 38 bytes of data (e.g., 8 bytes for size; 12 bytes for distance to previous landmark, lateral offset, and height; 2 bytes for a type code; and 16 bytes for position coordinates). Standard semantic objects may be represented using even less data, as size information may not be needed by the mapping server to fully represent the object in the sparse map.

Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr. It should be noted that in some environments (e.g., urban environments) there may be a much higher density of detected objects available for inclusion in the sparse map (perhaps more than one per meter). In some embodiments, a generally rectangular object, such as a rectangular sign, may be represented in sparse map 800 by no more than 100 bytes of data. The representation of the generally rectangular object (e.g., general sign 1040) in sparse map 800 may include a condensed image signature or image hash (e.g., condensed image signature 1045) associated with the generally rectangular object. This condensed image signature/image hash may be determined using any suitable image hashing algorithm and may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040.

For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Accordingly, the plurality of landmarks may be identified through image analysis of the plurality of images acquired as one or more vehicles traverse the road segment. As explained below with respect to "crowdsourcing," in some embodiments, the image analysis to identify the plurality of landmarks may include accepting potential landmarks when a ratio of images in which the landmark does appear to images in which the landmark does not appear exceeds a threshold. Furthermore, in some embodiments, the image analysis to identify the plurality of landmarks may include rejecting potential landmarks when a ratio of images in which the landmark does not appear to images in which the landmark does appear exceeds a threshold.

Figure 11A:
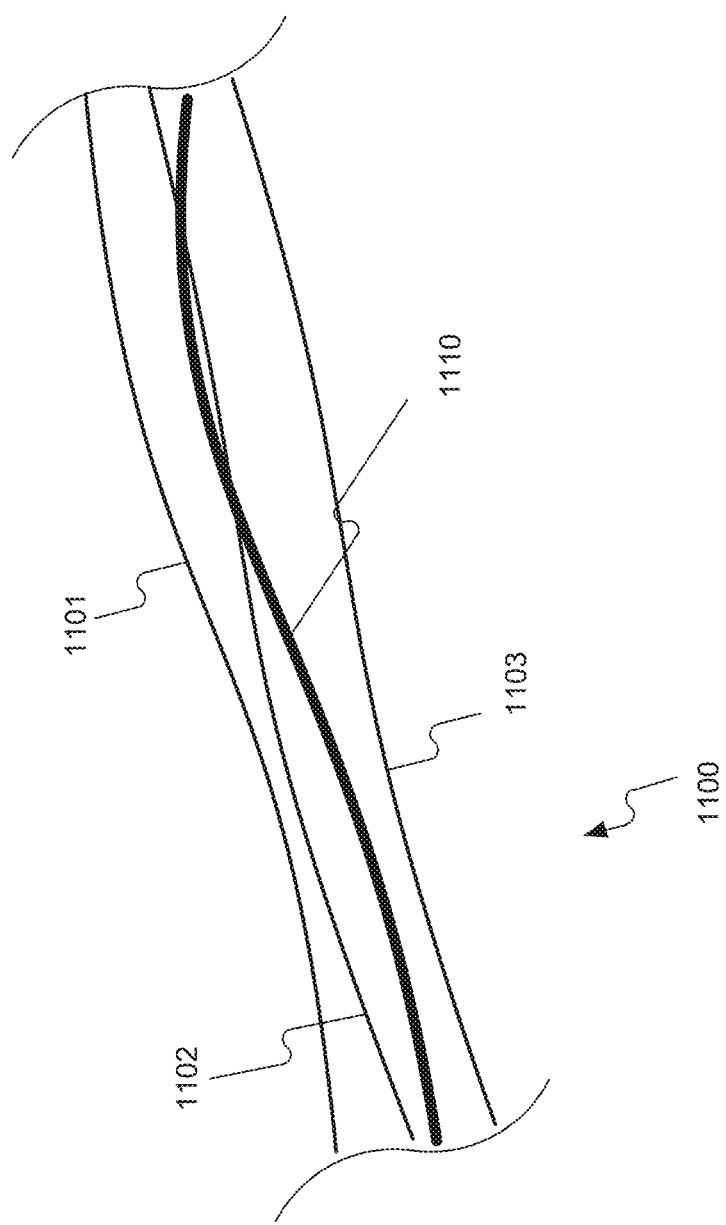
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 11A, a road segment 1100 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories.

At the mapping server, the server may receive actual trajectories for a particular road segment from multiple harvesting vehicles traversing the road segment. To generate a target trajectory for each valid path along the road segment (e.g., each lane, each drive direction, each path through a junction, etc.), the received actual trajectories may be aligned. The alignment process may include using detected objects/features identified along the road segment along with harvested positions of those detected objects/features to correlate the actual, harvested trajectories with one another. Once aligned, an average or "best fit" target trajectory for each available lane, etc. may be determined based on the aggregated, correlated/aligned actual trajectories.

Figure 11B:
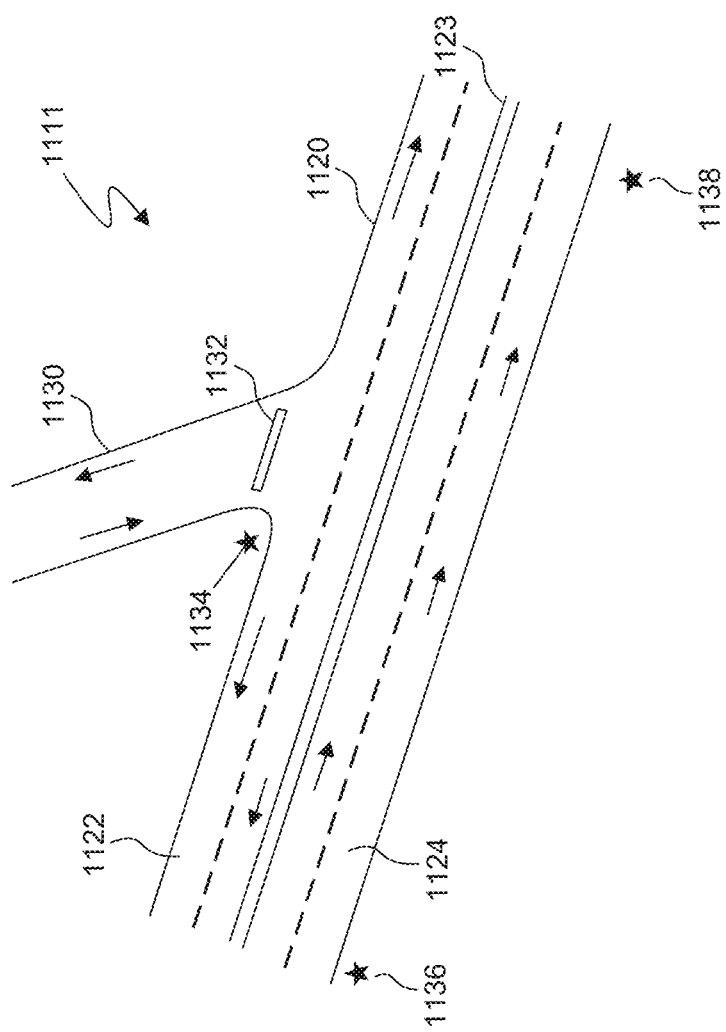
FIGS. 11B and 11C show target trajectories along a multi-lane road consistent with disclosed embodiments.
Figure 11C:
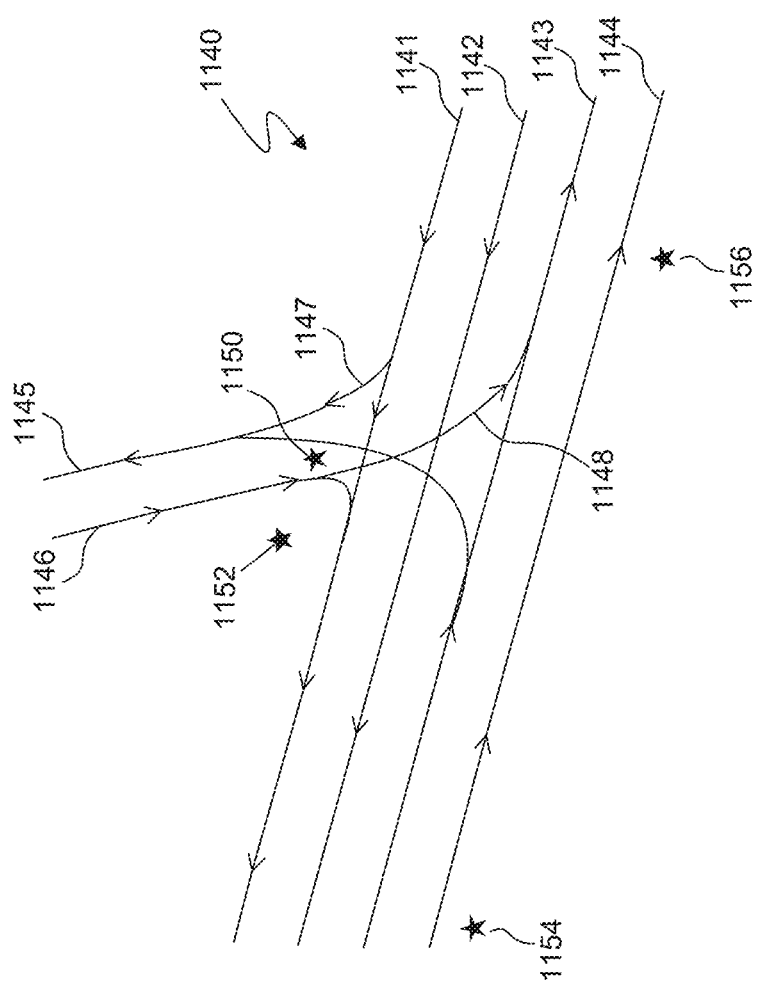

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 11C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location.

Figure 11D:
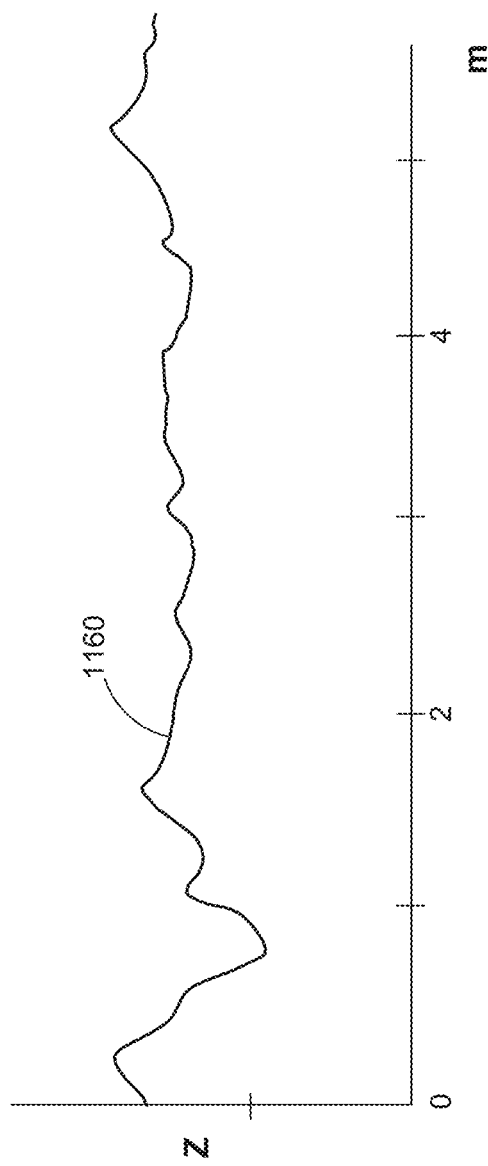
FIG. 11D shows an example road signature profile consistent with disclosed embodiments.

In some embodiments, sparse map 800 may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment.

Alternatively or concurrently, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowdsourcing a Sparse Map

The disclosed sparse maps may be efficiently (and passively) generated through the power of crowdsourcing. For example, any private or commercial vehicle equipped with a camera (e.g., a simple, low resolution camera regularly included as OEM equipment on today's vehicles) and an appropriate image analysis processor can serve as a harvesting vehicle. No special equipment (e.g., high definition imaging and/or positioning systems) are required. As a result of the disclosed crowdsourcing technique, the generated sparse maps may be extremely accurate and may include extremely refined position information (enabling navigation error limits of 10 cm or less) without requiring any specialized imaging or sensing equipment as input to the map generation process. Crowdsourcing also enables much more rapid (and inexpensive) updates to the generated maps, as new drive information is continuously available to the mapping server system from any roads traversed by private or commercial vehicles minimally equipped to also serve as harvesting vehicles. There is no need for designated vehicles equipped with high-definition imaging and mapping sensors. Therefore, the expense associated with building such specialized vehicles can be avoided. Further, updates to the presently disclosed sparse maps may be made much more rapidly than systems that rely upon dedicated, specialized mapping vehicles (which by virtue of their expense and special equipment are typically limited to a fleet of specialized vehicles of far lower numbers than the number of private or commercial vehicles already available for performing the disclosed harvesting techniques).

The disclosed sparse maps generated through crowdsourcing may be extremely accurate because they may be generated based on many inputs from multiple (10s, hundreds, millions, etc.) of harvesting vehicles that have collected drive information along a particular road segment. For example, every harvesting vehicle that drives along a particular road segment may record its actual trajectory and may determine position information relative to detected objects/features along the road segment. This information is passed along from multiple harvesting vehicles to a server. The actual trajectories are aggregated to generate a refined, target trajectory for each valid drive path along the road segment. Additionally, the position information collected from the multiple harvesting vehicles for each of the detected objects/features along the road segment (semantic or non-semantic) can also be aggregated. As a result, the mapped position of each detected object/feature may constitute an average of hundreds, thousands, or millions of individually determined positions for each detected object/feature. Such a technique may yield extremely accurate mapped positions for the detected objects/features.

In some embodiments, the disclosed systems and methods may generate a sparse map for autonomous vehicle navigation. For example, disclosed systems and methods may use crowdsourced data for generation of a sparse map that one or more autonomous vehicles may use to navigate along a system of roads. As used herein, "crowdsourcing" means that data are received from various vehicles (e.g., autonomous vehicles) travelling on a road segment at different times, and such data are used to generate and/or update the road model, including sparse map tiles. The model or any of its sparse map tiles may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle or may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as the vehicle travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign.

The vehicle may determine a distance from the vehicle to the landmark or a position associated with the landmark (e.g., any semantic or non-semantic object or feature along a road segment) based on the analysis of the one or more images. In some embodiments, the distance may be determined based on analysis of images of the landmark using a suitable image analysis method, such as a scaling method and/or an optical flow method. As previously noted, a position of the object/feature may include a 2D image position (e.g., an X-Y pixel position in one or more captured images) of one or more points associated with the object/feature or may include a 3D real-world position of one or more points (e.g., determined through structure in motion/optical flow techniques, LIDAR or RADAR information, etc.). In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, during navigation, a navigating vehicle may capture an image that includes a representation of the landmark, process the image (e.g., using a classifier), and compare the result landmark in order to confirm detection of the mapped landmark and to use the mapped landmark in localizing the navigating vehicle relative to the sparse map.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. For example, as discussed below with respect to FIG. 19, the server may generate a sparse map having the unified road model using the uploaded curves and landmarks.

The server may also distribute the model to clients (e.g., vehicles). For example, the server may distribute the sparse map to one or more vehicles. The server may continuously or periodically update the model when receiving new data from the vehicles. For example, the server may process the new data to evaluate whether the data includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before the vehicle reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment. For example, the remote server may align the trajectories to generate a crowdsourced sparse map from the collected trajectories.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral portion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation. For example, as discussed further below, the server may use crowdsourced data to filter out "ghost" landmarks detected by vehicles.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Figure 12:
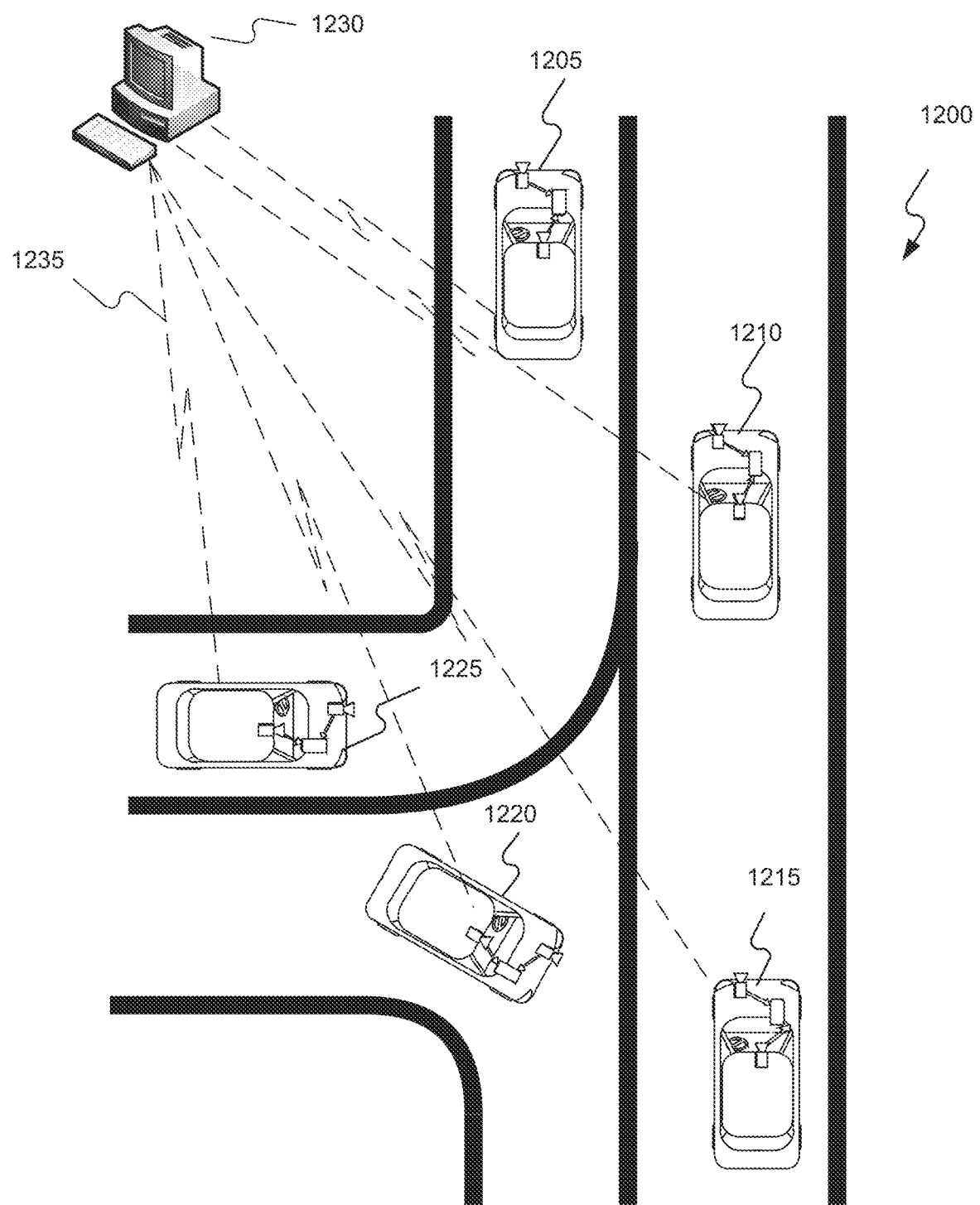
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowdsourcing to generate a sparse map (as well as distribute and navigate using a crowdsourced sparse map). FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205, 1210, 1215, 1220, and 1225 may be an autonomous vehicle. For simplicity of the present example, all of the vehicles 1205, 1210, 1215, 1220, and 1225 are presumed to be autonomous vehicles.

Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205, 1210, 1215, 1220, and 1225 travel on road segment 1200, navigation information collected (e.g., detected, sensed, or measured) by vehicles 1205, 1210, 1215, 1220, and 1225 may be transmitted to server 1230. In some embodiments, the navigation information may be associated with the common road segment 1200. The navigation information may include a trajectory associated with each of the vehicles 1205, 1210, 1215, 1220, and 1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205, 1210, 1215, 1220, and 1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205, 1210, 1215, 1220, and 1225 to server 1230 may include data regarding the road surface, the road geometry, or the road profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205, 1210, 1215, 1220, and 1225 and may store the model as a portion of a sparse map. Server 1230 may determine a trajectory associated with each lane based on crowdsourced data (e.g., navigation information) received from multiple vehicles (e.g., 1205, 1210, 1215, 1220, and 1225) that travel on a lane of road segment at different times. Server 1230 may generate the autonomous vehicle road navigation model or a portion of the model (e.g., an updated portion) based on a plurality of trajectories determined based on the crowd sourced navigation data. Server 1230 may transmit the model or the updated portion of the model to one or more of autonomous vehicles 1205, 1210, 1215, 1220, and 1225 traveling on road segment 1200 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 1200.

As explained above, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205, 1210, 1215, 1220, and 1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

As explained above, the autonomous vehicle road navigation model included in the sparse map may include other information, such as identification of at least one landmark along road segment 1200. The landmark may be visible within a field of view of a camera (e.g., camera 122) installed on each of vehicles 1205, 1210, 1215, 1220, and 1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205, 1210, 1215, 1220, and 1225. In some embodiments, the position of the landmark may be determined by averaging the position measurements detected, collected, or received by sensor systems on different vehicles 1205, 1210, 1215, 1220, and 1225 through multiple drives. For example, vehicles 1205, 1210, 1215, 1220, and 1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time.

When the physical size of the landmark is known, the distance to the landmark may also be determined based on the following equation: $Z=f*W/\omega$, where f is the focal length, W is the size of the landmark (e.g., height or width), $\omega$ is the number of pixels when the landmark leaves the image. From the above equation, a change in distance Z may be calculated using $\Delta Z=f*W*\Delta\omega/\omega^2+f*\Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z=f*W*\Delta\omega/\omega^2+$ f*ΔW/ω. However, ΔW decays to zero by averaging; hence ΔZ is determined by Δω (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
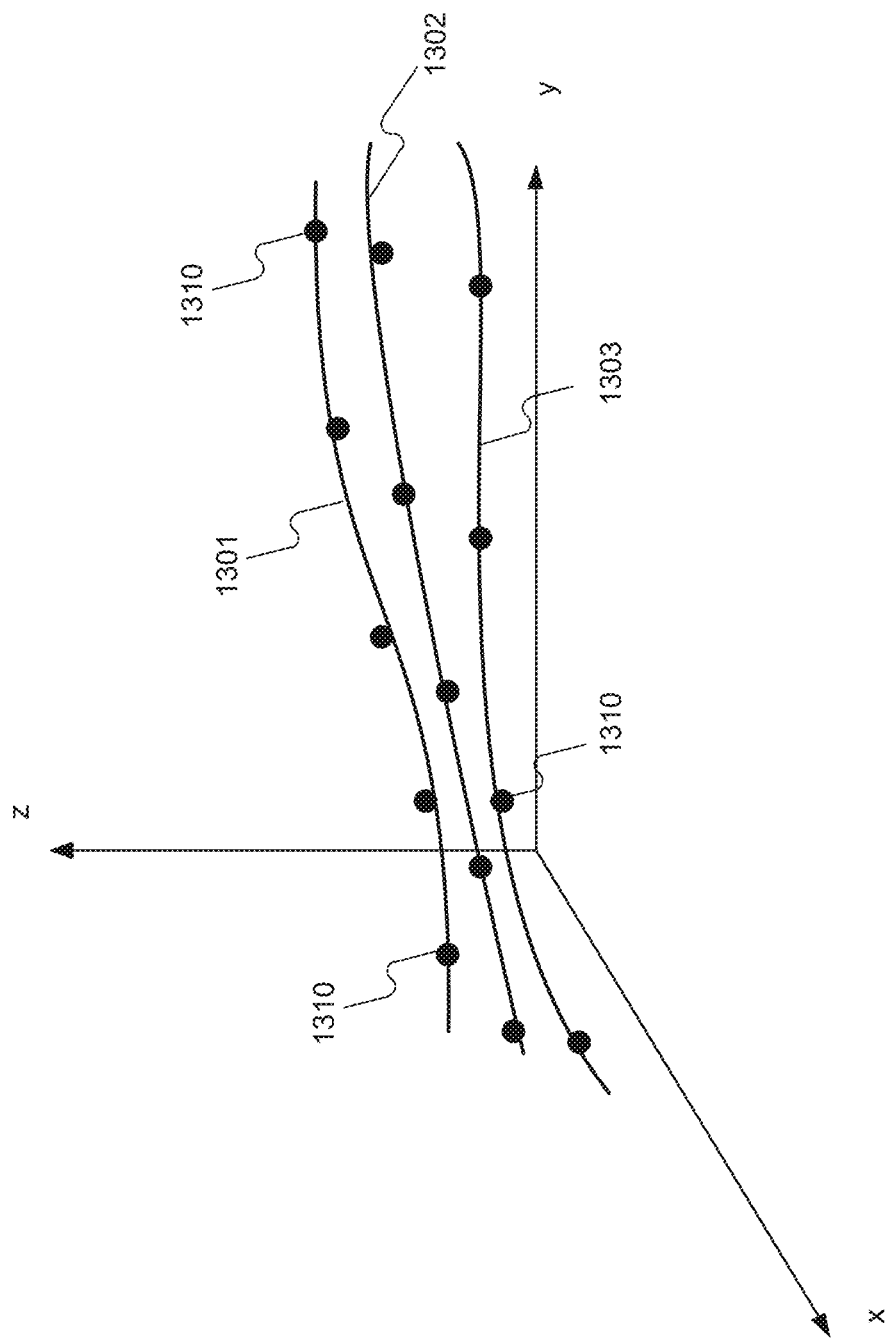
FIG. 13 illustrates an example autonomous vehicle road navigation model represented by a plurality of three dimensional splines, consistent with the disclosed embodiments.

FIG. 13 illustrates an example autonomous vehicle road navigation model represented by a plurality of three dimensional splines 1301, 1302, and 1303. The curves 1301, 1302, and 1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205, 1210, 1215, 1220, and 1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
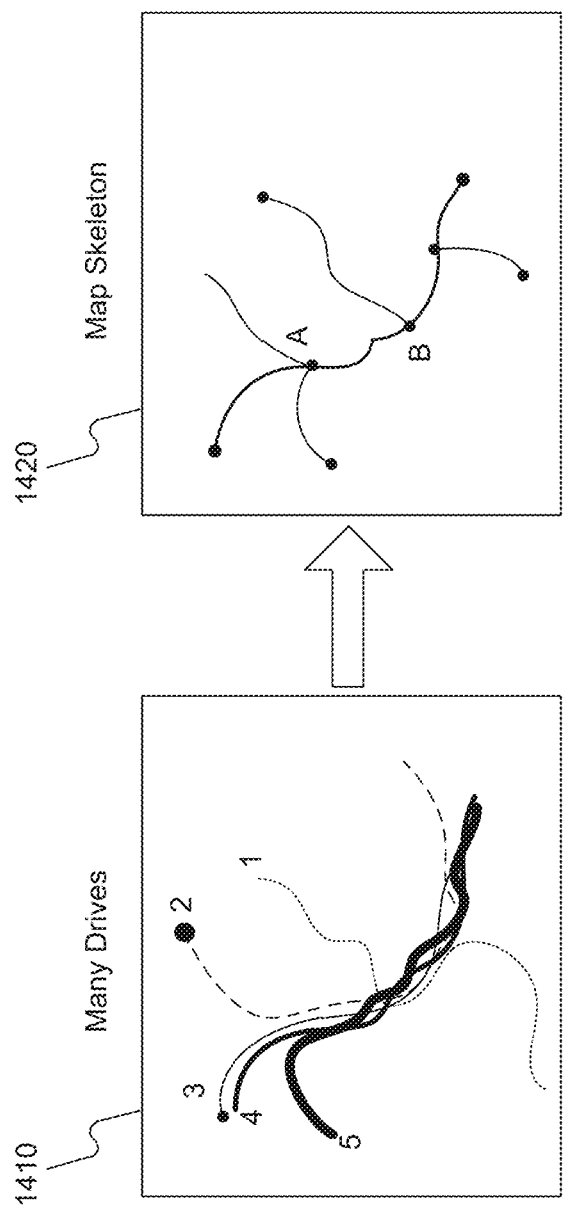
FIG. 14 shows a map skeleton generated from combining location information from many drives, consistent with the disclosed embodiments.

FIG. 14 illustrates raw location data 1410 (e.g., GPS data) received from five separate drives. One drive may be separate from another drive if it was traversed by separate vehicles at the same time, by the same vehicle at separate times, or by separate vehicles at separate times. To account for errors in the location data 1410 and for differing locations of vehicles within the same lane (e.g., one vehicle may drive closer to the left of a lane than another), server 1230 may generate a map skeleton 1420 using one or more statistical techniques to determine whether variations in the raw location data 1410 represent actual divergences or statistical errors. Each path within skeleton 1420 may be linked back to the raw data 1410 that formed the path. For example, the path between A and B within skeleton 1420 is linked to raw data 1410 from drives 2, 3, 4, and 5 but not from drive 1. Skeleton 1420 may not be detailed enough to be used to navigate a vehicle (e.g., because it combines drives from multiple lanes on the same road unlike the splines described above) but may provide useful topological information and may be used to define intersections.

Figure 15:
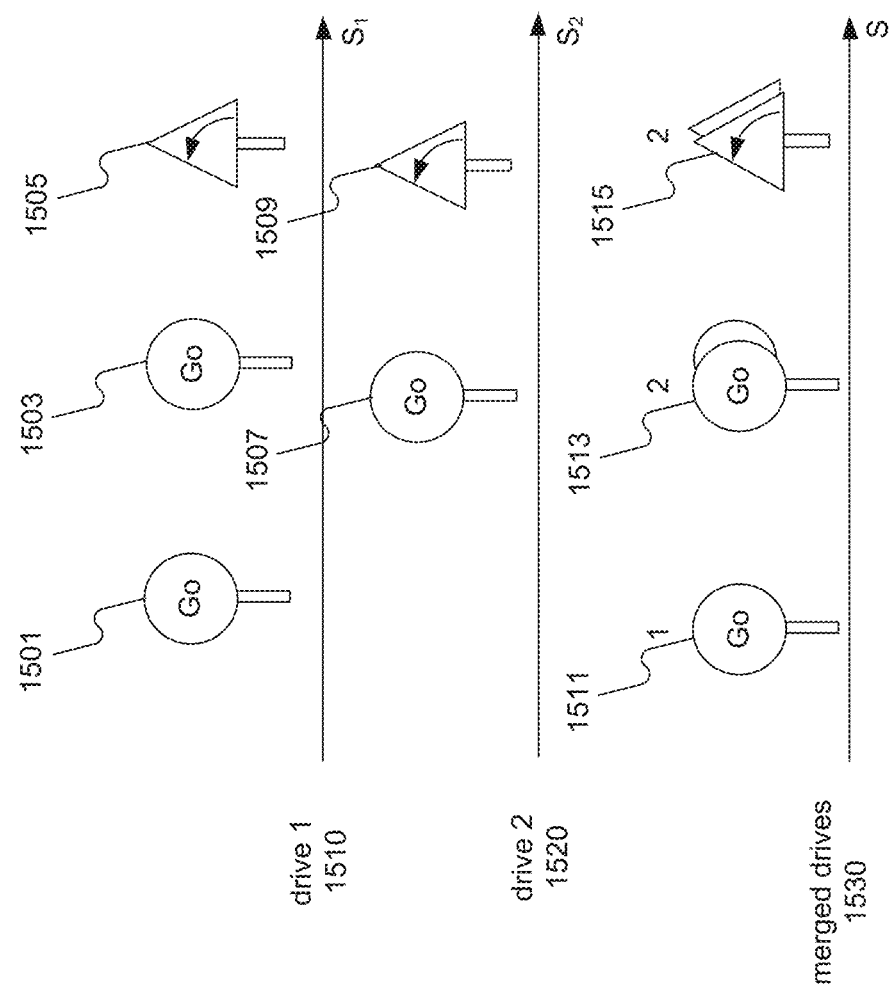
FIG. 15 shows an example of a longitudinal alignment of two drives with example signs as landmarks, consistent with the disclosed embodiments.

FIG. 15 illustrates an example by which additional detail may be generated for a sparse map within a segment of a map skeleton (e.g., segment A to B within skeleton 1420). As depicted in FIG. 15, the data (e.g. ego-motion data, road markings data, and the like) may be shown as a function of position S (or $S_1$ or $S_2$) along the drive. Server 1230 may identify landmarks for the sparse map by identifying unique matches between landmarks 1501, 1503, and 1505 of drive 1510 and landmarks 1507 and 1509 of drive 1520. Such a matching algorithm may result in identification of landmarks 1511, 1513, and 1515. One skilled in the art would recognize, however, that other matching algorithms may be used. For example, probability optimization may be used in lieu of or in combination with unique matching. Server 1230 may longitudinally align the drives to align the matched landmarks. For example, server 1230 may select one drive (e.g., drive 1520) as a reference drive and then shift and/or elastically stretch the other drive(s) (e.g., drive 1510) for alignment.

Figure 16:
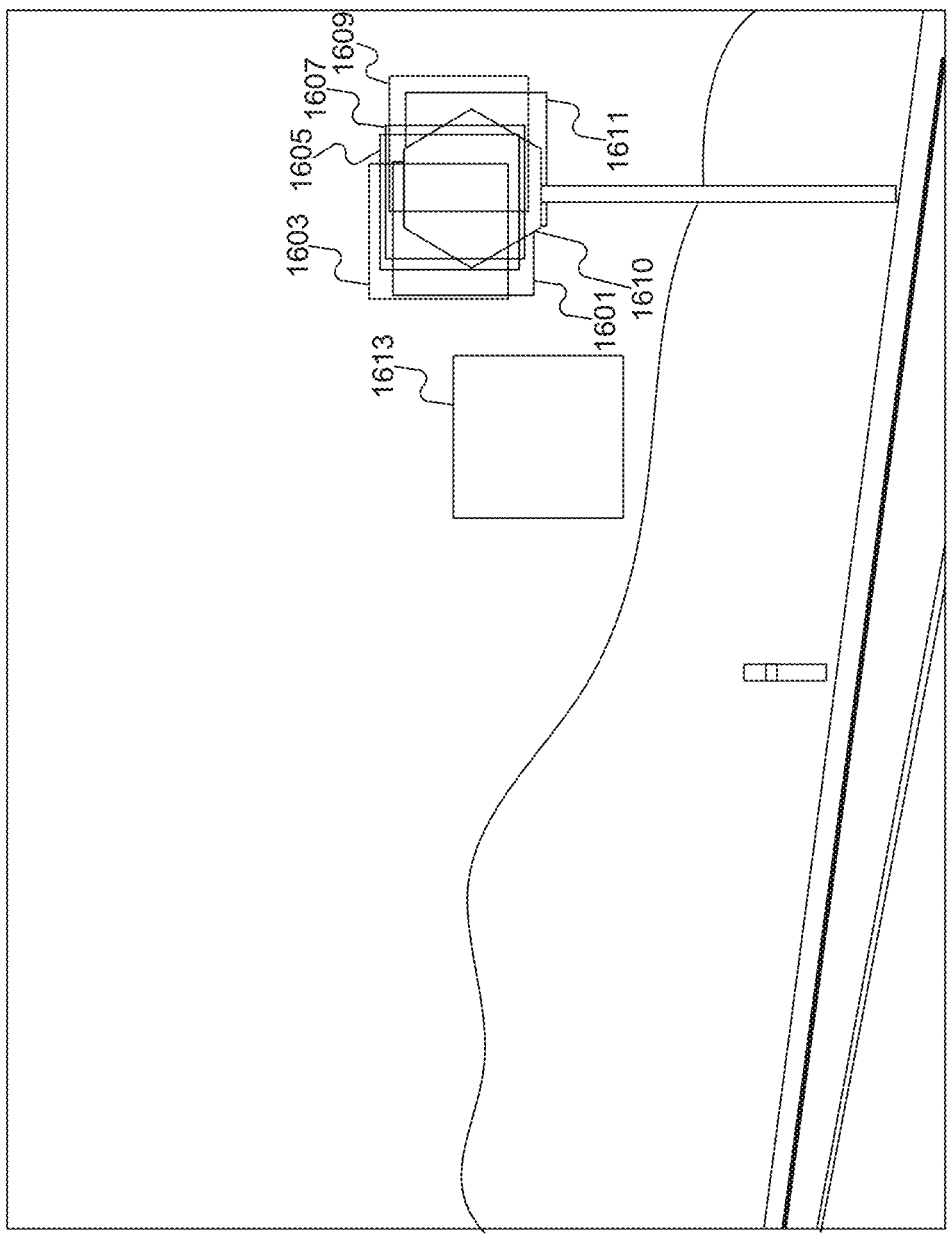
FIG. 16 shows an example of a longitudinal alignment of many drives with an example sign as a landmark, consistent with the disclosed embodiments.

FIG. 16 shows an example of aligned landmark data for use in a sparse map. In the example of FIG. 16, landmark 1610 comprises a road sign. The example of FIG. 16 further depicts data from a plurality of drives 1601, 1603, 1605, 1607, 1609, 1611, and 1613. In the example of FIG. 16, the data from drive 1613 consists of a "ghost" landmark, and the server 1230 may identify it as such because none of drives 1601, 1603, 1605, 1607, 1609, and 1611 include an identification of a landmark in the vicinity of the identified landmark in drive 1613. Accordingly, server 1230 may accept potential landmarks when a ratio of images in which the landmark does appear to images in which the landmark does not appear exceeds a threshold and/or may reject potential landmarks when a ratio of images in which the landmark does not appear to images in which the landmark does appear exceeds a threshold.

Figure 17:
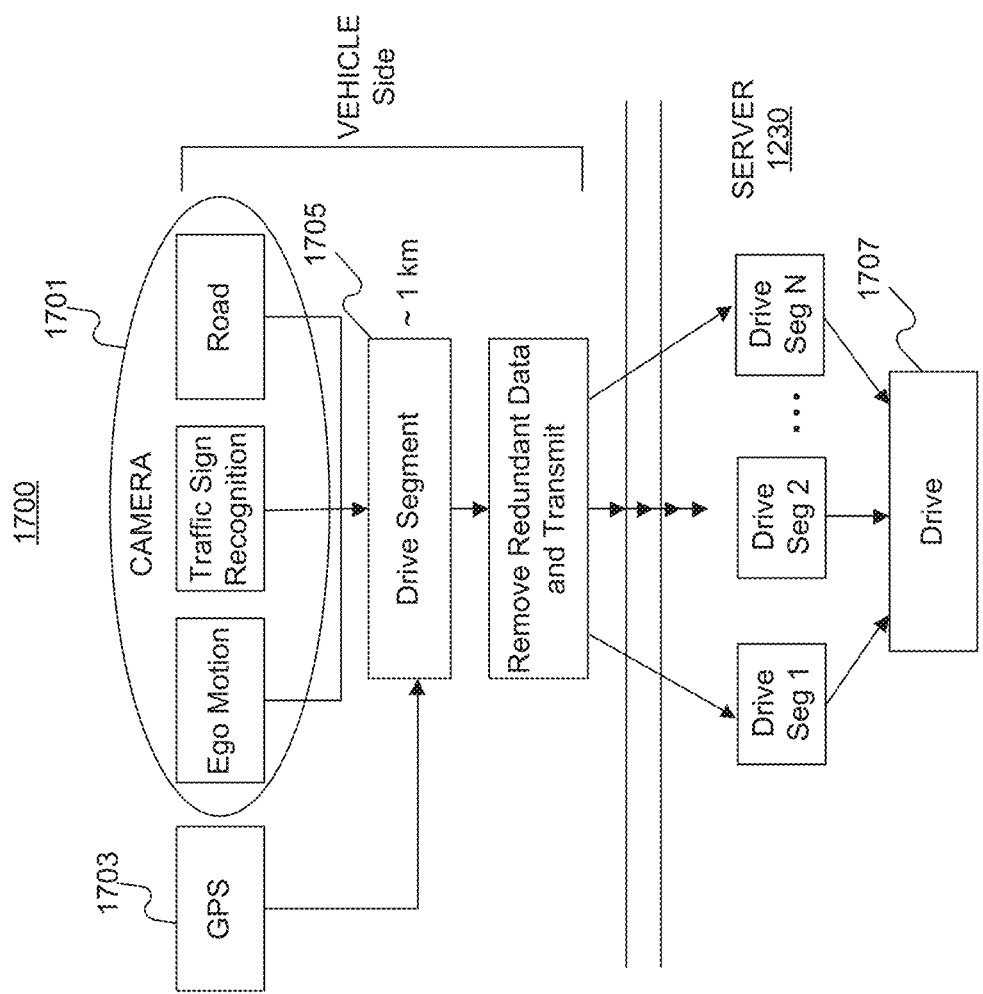
FIG. 17 is a schematic illustration of a system for generating drive data using a camera, a vehicle, and a server, consistent with the disclosed embodiments.

FIG. 17 depicts a system 1700 for generating drive data, which may be used to crowdsource a sparse map. As depicted in FIG. 17, system 1700 may include a camera 1701 and a locating device 1703 (e.g., a GPS locator). Camera 1701 and locating device 1703 may be mounted on a vehicle (e.g., one of vehicles 1205, 1210, 1215, 1220, and 1225). Camera 1701 may produce a plurality of data of multiple types, e.g., ego motion data, traffic sign data, road data, or the like. The camera data and location data may be segmented into drive segments 1705. For example, drive segments 1705 may each have camera data and location data from less than 1 km of driving.

In some embodiments, system 1700 may remove redundancies in drive segments 1705. For example, if a landmark appears in multiple images from camera 1701, system 1700 may strip the redundant data such that the drive segments 1705 only contain one copy of the location of and any metadata relating to the landmark. By way of further example, if a lane marking appears in multiple images from camera 1701, system 1700 may strip the redundant data such that the drive segments 1705 only contain one copy of the location of and any metadata relating to the lane marking.

System 1700 also includes a server (e.g., server 1230). Server 1230 may receive drive segments 1705 from the vehicle and recombine the drive segments 1705 into a single drive 1707. Such an arrangement may allow for reduce bandwidth requirements when transferring data between the vehicle and the server while also allowing for the server to store data relating to an entire drive.

Figure 18:
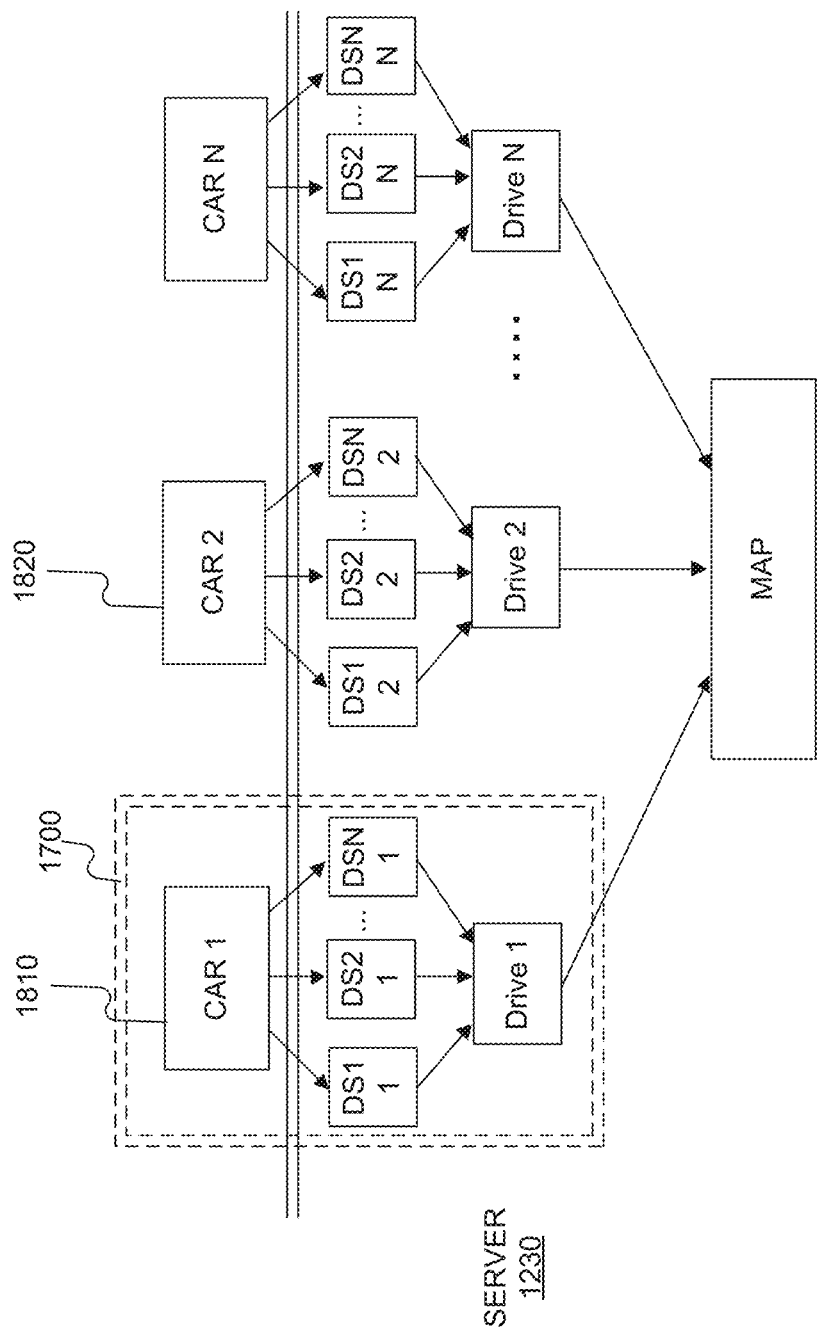
FIG. 18 is a schematic illustration of a system for crowdsourcing a sparse map, consistent with the disclosed embodiments.

FIG. 18 depicts system 1700 of FIG. 17 further configured for crowdsourcing a sparse map. As in FIG. 17, system 1700 includes vehicle 1810, which captures drive data using, for example, a camera (which produces, e.g., ego motion data, traffic sign data, road data, or the like) and a locating device (e.g., a GPS locator). As in FIG. 17, vehicle 1810 segments the collected data into drive segments (depicted as "DS1 1," "DS2 1," "DSN 1" in FIG. 18). Server 1230 then receives the drive segments and reconstructs a drive (depicted as "Drive 1" in FIG. 18) from the received segments.

As further depicted in FIG. 18, system 1700 also receives data from additional vehicles. For example, vehicle 1820 also captures drive data using, for example, a camera (which produces, e.g., ego motion data, traffic sign data, road data, or the like) and a locating device (e.g., a GPS locator). Similar to vehicle 1810, vehicle 1820 segments the collected data into drive segments (depicted as "DS1 2," "DS2 2," "DSN 2" in FIG. 18). Server 1230 then receives the drive segments and reconstructs a drive (depicted as "Drive 2" in FIG. 18) from the received segments. Any number of additional vehicles may be used. For example, FIG. 18 also includes "CAR N" that captures drive data, segments it into drive segments (depicted as "DS1 N," "DS2 N," "DSN N" in FIG. 18), and sends it to server 1230 for reconstruction into a drive (depicted as "Drive N" in FIG. 18).

As depicted in FIG. 18, server 1230 may construct a sparse map (depicted as "MAP") using the reconstructed drives (e.g., "Drive 1," "Drive 2," and "Drive N") collected from a plurality of vehicles (e.g., "CAR 1" (also labeled vehicle 1810), "CAR 2" (also labeled vehicle 1820), and "CAR N").

Figure 19:
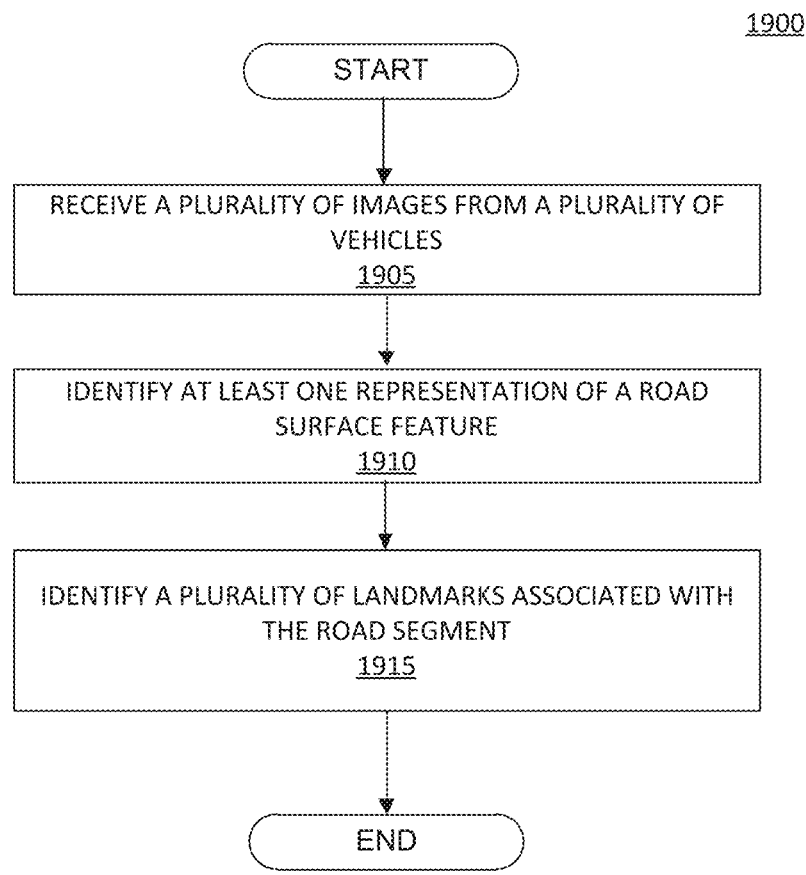
FIG. 19 is a flowchart showing an exemplary process for generating a sparse map for autonomous vehicle navigation along a road segment, consistent with the disclosed embodiments.

FIG. 19 is a flowchart showing an example process 1900 for generating a sparse map for autonomous vehicle navigation along a road segment. Process 1900 may be performed by one or more processing devices included in server 1230.

Process 1900 may include receiving a plurality of images acquired as one or more vehicles traverse the road segment (step 1905). Server 1230 may receive images from cameras included within one or more of vehicles 1205, 1210, 1215, 1220, and 1225. For example, camera 122 may capture one or more images of the environment surrounding vehicle 1205 as vehicle 1205 travels along road segment 1200. In some embodiments, server 1230 may also receive stripped down image data that has had redundancies removed by a processor on vehicle 1205, as discussed above with respect to FIG. 17.

Process 1900 may further include identifying, based on the plurality of images, at least one line representation of a road surface feature extending along the road segment (step 1910). Each line representation may represent a path along the road segment substantially corresponding with the road surface feature. For example, server 1230 may analyze the environmental images received from camera 122 to identify a road edge or a lane marking and determine a trajectory of travel along road segment 1200 associated with the road edge or lane marking. In some embodiments, the trajectory (or line representation) may include a spline, a polynomial representation, or a curve. Server 1230 may determine the trajectory of travel of vehicle 1205 based on camera ego motions (e.g., three dimensional translation and/or three dimensional rotational motions) received at step 1905.

Process 1900 may also include identifying, based on the plurality of images, a plurality of landmarks associated with the road segment (step 1910). For example, server 1230 may analyze the environmental images received from camera 122 to identify one or more landmarks, such as road sign along road segment 1200. Server 1230 may identify the landmarks using analysis of the plurality of images acquired as one or more vehicles traverse the road segment. To enable crowdsourcing, the analysis may include rules regarding accepting and rejecting possible landmarks associated with the road segment. For example, the analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold.

Process 1900 may include other operations or steps performed by server 1230. For example, the navigation information may include a target trajectory for vehicles to travel along a road segment, and process 1900 may include clustering, by server 1230, vehicle trajectories related to multiple vehicles travelling on the road segment and determining the target trajectory based on the clustered vehicle trajectories, as discussed in further detail below. Clustering vehicle trajectories may include clustering, by server 1230, the multiple trajectories related to the vehicles travelling on the road segment into a plurality of clusters based on at least one of the absolute heading of vehicles or lane assignment of the vehicles. Generating the target trajectory may include averaging, by server 1230, the clustered trajectories. By way of further example, process 1900 may include aligning data received in step 1905. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle may determine its position and orientation relative to the map. It seems natural to use a GPS device on board, in order to position the vehicle on the map and in order to find the rotation transformation between the body reference frame and the world reference frame (e.g., North, East and Down). Once the body reference frame is aligned with the map reference frame, then the desired route may be expressed in the body reference frame and the steering commands may be computed or generated.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include a sparse map having the geometry of the road, its lane structure, and landmarks that may be used to determine the location or position of vehicles along a trajectory included in the model. As discussed above, generation of the sparse map may be performed by a remote server that communicates with vehicles travelling on the road and that receives data from the vehicles. The data may include sensed data, trajectories reconstructed based on the sensed data, and/or recommended trajectories that may represent modified reconstructed trajectories. As discussed below, the server may transmit the model back to the vehicles or other vehicles that later travel on the road to aid in autonomous navigation.

Figure 20:
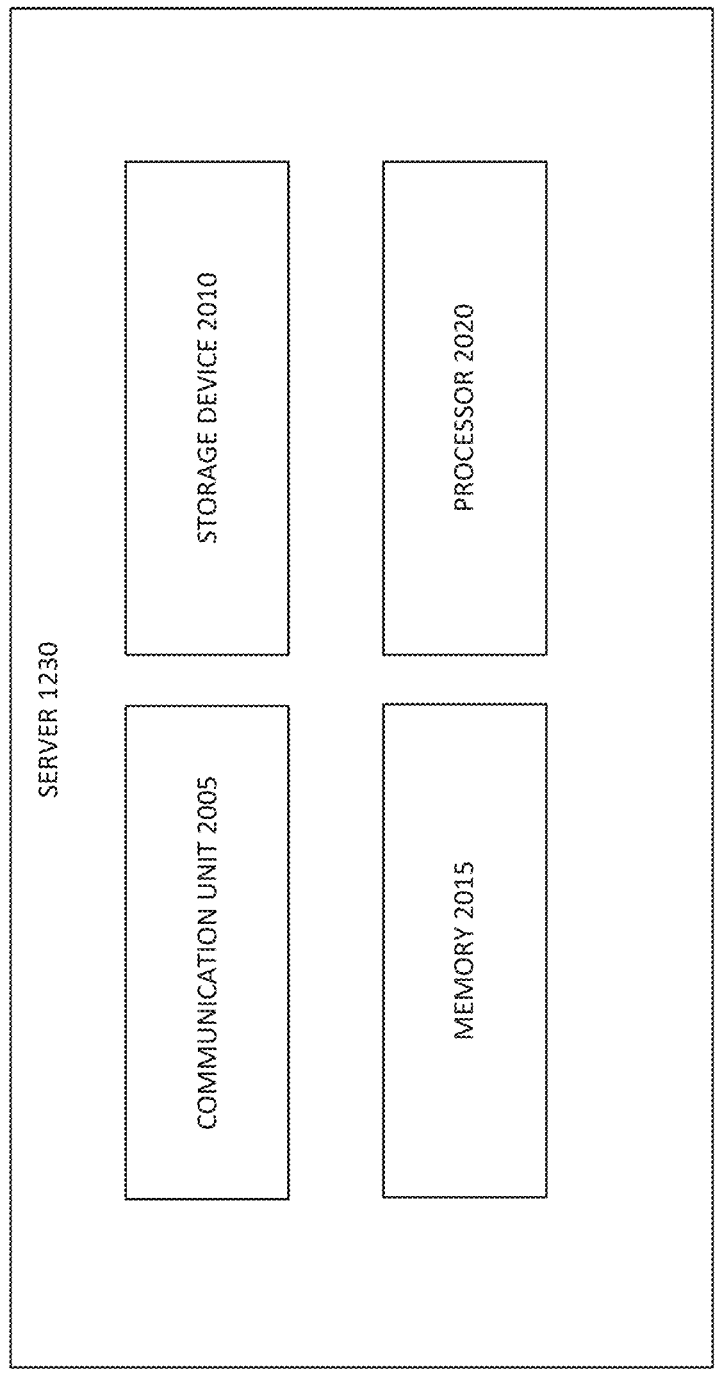
FIG. 20 illustrates a block diagram of a server consistent with the disclosed embodiments.

FIG. 20 illustrates a block diagram of server 1230. Server 1230 may include a communication unit 2005, which may include both hardware components (e.g., communication control circuits, switches, and antenna), and software components (e.g., communication protocols, computer codes). For example, communication unit 2005 may include at least one network interface. Server 1230 may communicate with vehicles 1205, 1210, 1215, 1220, and 1225 through communication unit 2005. For example, server 1230 may receive, through communication unit 2005, navigation information transmitted from vehicles 1205, 1210, 1215, 1220, and 1225. Server 1230 may distribute, through communication unit 2005, the autonomous vehicle road navigation model to one or more autonomous vehicles.

Server 1230 may include at least one non-transitory storage medium 2010, such as a hard drive, a compact disc, a tape, etc. Storage device 1410 may be configured to store data, such as navigation information received from vehicles 1205, 1210, 1215, 1220, and 1225 and/or the autonomous vehicle road navigation model that server 1230 generates based on the navigation information. Storage device 2010 may be configured to store any other information, such as a sparse map (e.g., sparse map 800 discussed above with respect to FIG. 8).

In addition to or in place of storage device 2010, server 1230 may include a memory 2015. Memory 2015 may be similar to or different from memory 140 or 150. Memory 2015 may be a non-transitory memory, such as a flash memory, a random access memory, etc. Memory 2015 may be configured to store data, such as computer codes or instructions executable by a processor (e.g., processor 2020), map data (e.g., data of sparse map 800), the autonomous vehicle road navigation model, and/or navigation information received from vehicles 1205, 1210, 1215, 1220, and 1225.

Server 1230 may include at least one processing device 2020 configured to execute computer codes or instructions stored in memory 2015 to perform various functions. For example, processing device 2020 may analyze the navigation information received from vehicles 1205, 1210, 1215, 1220, and 1225, and generate the autonomous vehicle road navigation model based on the analysis. Processing device 2020 may control communication unit 1405 to distribute the autonomous vehicle road navigation model to one or more autonomous vehicles (e.g., one or more of vehicles 1205, 1210, 1215, 1220, and 1225 or any vehicle that travels on road segment 1200 at a later time). Processing device 2020 may be similar to or different from processor 180, 190, or processing unit 110.

Figure 21:
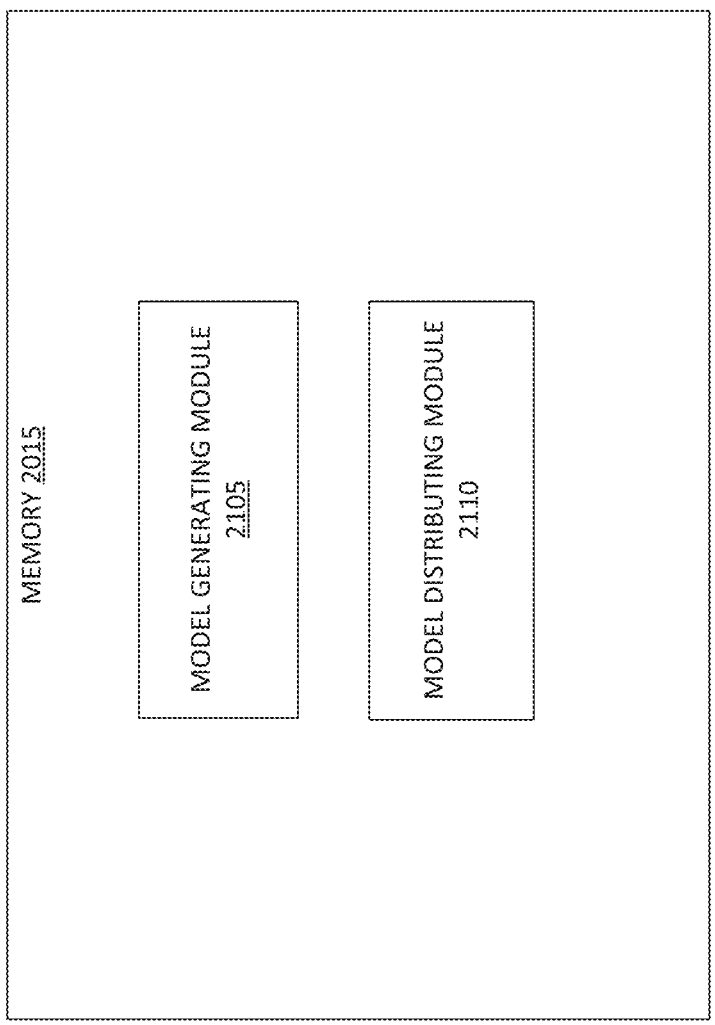
FIG. 21 illustrates a block diagram of a memory consistent with the disclosed embodiments.

FIG. 21 illustrates a block diagram of memory 2015, which may store computer code or instructions for performing one or more operations for generating a road navigation model for use in autonomous vehicle navigation. As shown in FIG. 21, memory 2015 may store one or more modules for performing the operations for processing vehicle navigation information. For example, memory 2015 may include a model generating module 2105 and a model distributing module 2110. Processor 2020 may execute the instructions stored in any of modules 2105 and 2110 included in memory 2015.

Model generating module 2105 may store instructions which, when executed by processor 2020, may generate at least a portion of an autonomous vehicle road navigation model for a common road segment (e.g., road segment 1200) based on navigation information received from vehicles 1205, 1210, 1215, 1220, and 1225. For example, in generating the autonomous vehicle road navigation model, processor 2020 may cluster vehicle trajectories along the common road segment 1200 into different clusters. Processor 2020 may determine a target trajectory along the common road segment 1200 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 1200.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 1230. Various vehicles travelling along the same road segment at multiple drives may have different trajectories. Server 1230 may identify routes or trajectories associated with each lane from the trajectories received from vehicles through a clustering process.

Figure 22:
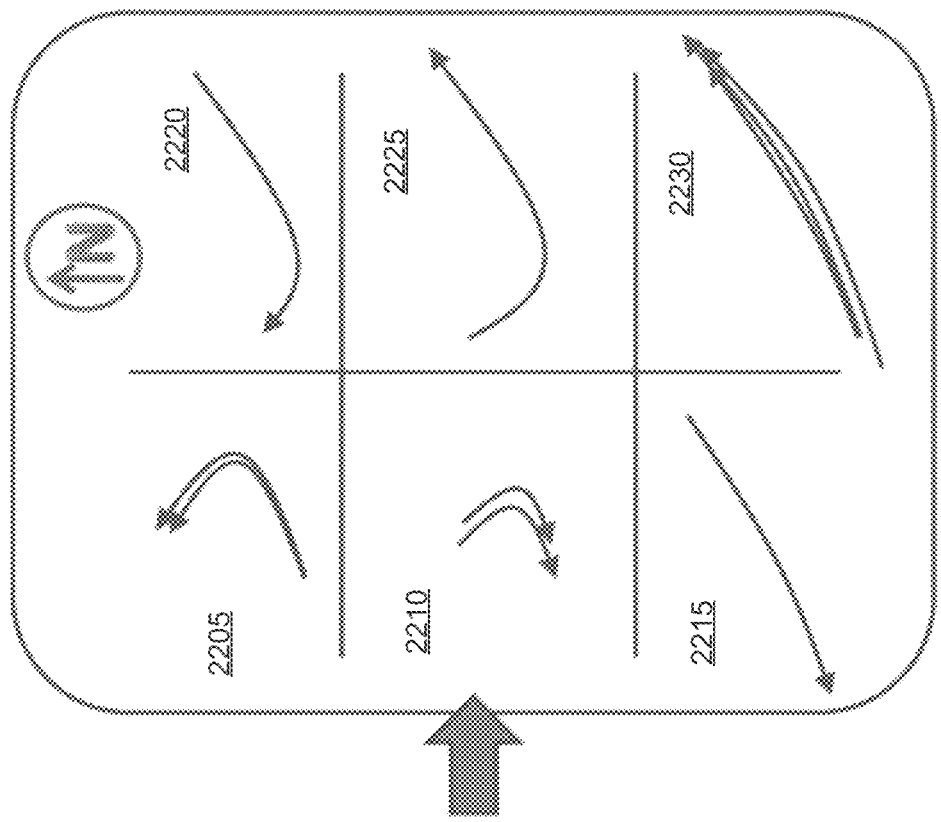
FIG. 22 illustrates a process of clustering vehicle trajectories associated with vehicles, consistent with the disclosed embodiments.
Figure 22:
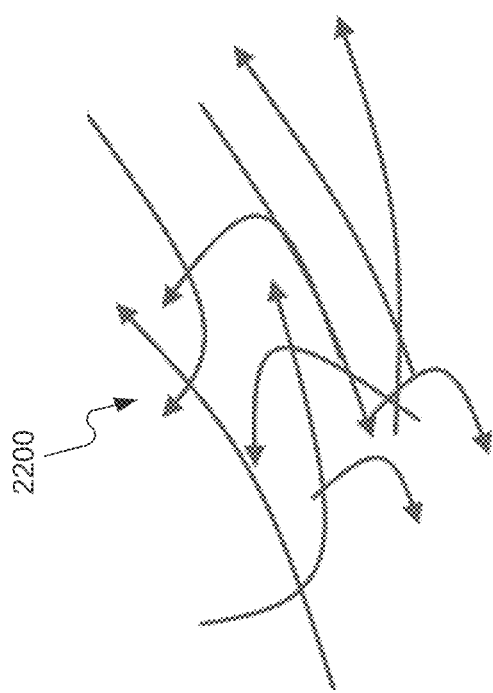

FIG. 22 illustrates a process of clustering vehicle trajectories associated with vehicles 1205, 1210, 1215, 1220, and 1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205, 1210, 1215, 1220, and 1225 traveling along road segment 1200 may transmit a plurality of trajectories 2200 to server 1230. In some embodiments, server 1230 may generate trajectories based on landmark, road geometry, and vehicle motion information received from vehicles 1205, 1210, 1215, 1220, and 1225. To generate the autonomous vehicle road navigation model, server 1230 may cluster vehicle trajectories 1600 into a plurality of clusters 2205, 2210, 2215, 2220, 2225, and 2230, as shown in FIG. 22.

Clustering may be performed using various criteria. In some embodiments, all drives in a cluster may be similar with respect to the absolute heading along the road segment 1200. The absolute heading may be obtained from GPS signals received by vehicles 1205, 1210, 1215, 1220, and 1225. In some embodiments, the absolute heading may be obtained using dead reckoning Dead reckoning, as one of skill in the art would understand, may be used to determine the current position and hence heading of vehicles 1205, 1210, 1215, 1220, and 1225 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 2205, 2210, 2215, 2220, 2225, and 2230, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, . . . , Cn), server 1230 may find a rigid transformation that maps Ci to C0, where i=1, 2, . . . , n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205, 1210, 1215, 1220, and 1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an Extended Kalman Filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 23:
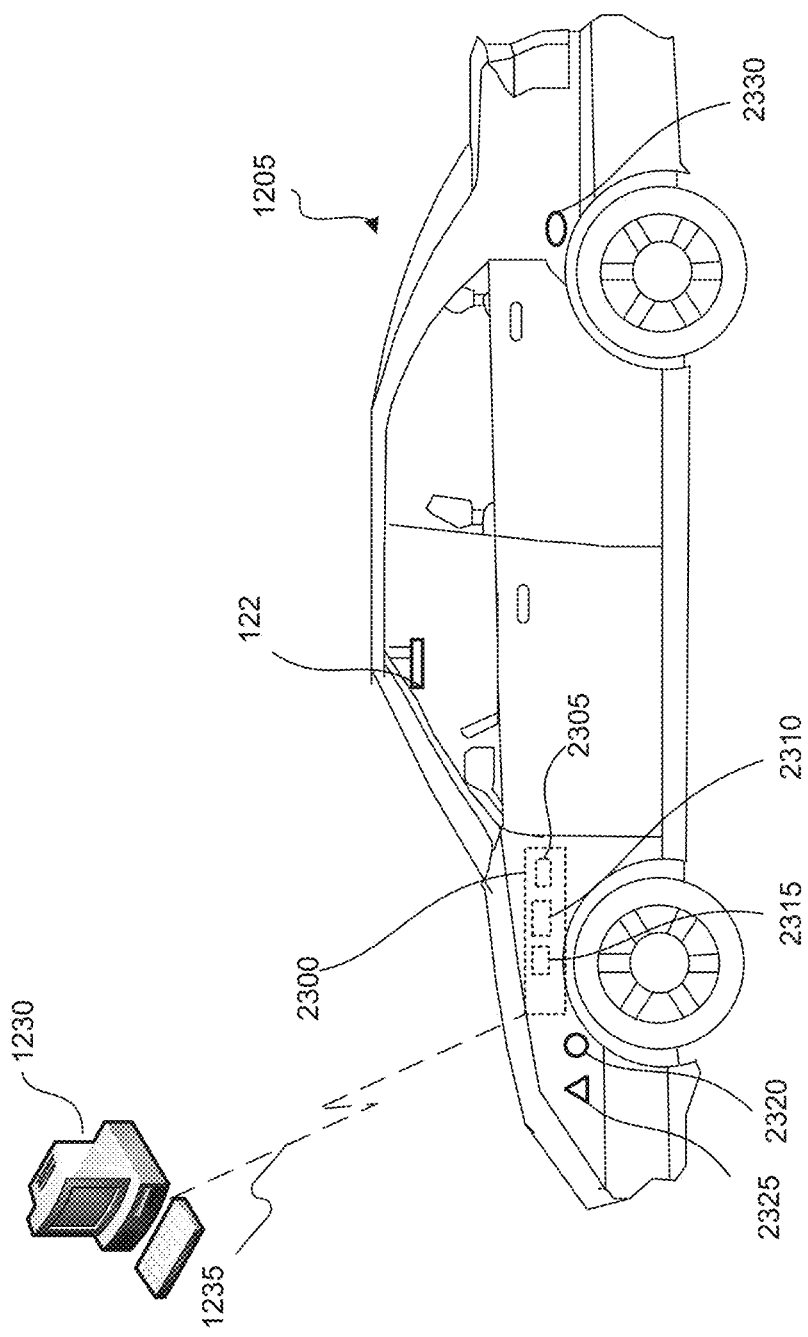
FIG. 23 illustrates a navigation system for a vehicle, which may be used for autonomous navigation, consistent with the disclosed embodiments.

FIG. 23 illustrates a navigation system for a vehicle, which may be used for autonomous navigation using a crowdsourced sparse map. For illustration, the vehicle is referenced as vehicle 1205. The vehicle shown in FIG. 23 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 2300 configured for providing navigation guidance for vehicle 1205 to travel on a road (e.g., road segment 1200). Vehicle 1205 may also include other sensors, such as a speed sensor 2320 and an accelerometer 2325. Speed sensor 2320 may be configured to detect the speed of vehicle 1205. Accelerometer 2325 may be configured to detect an acceleration or deceleration of vehicle 1205. Vehicle 1205 shown in FIG. 23 may be an autonomous vehicle, and the navigation system 2300 may be used for providing navigation guidance for autonomous driving. Alternatively, vehicle 1205 may also be a non-autonomous, human-controlled vehicle, and navigation system 2300 may still be used for providing navigation guidance.

Navigation system 2300 may include a communication unit 2305 configured to communicate with server 1230 through communication path 1235. Navigation system 2300 may also include a GPS unit 2310 configured to receive and process GPS signals. Navigation system 2300 may further include at least one processor 2315 configured to process data, such as GPS signals, map data from sparse map 800 (which may be stored on a storage device provided onboard vehicle 1205 and/or received from server 1230), road geometry sensed by a road profile sensor 2330, images captured by camera 122, and/or autonomous vehicle road navigation model received from server 1230. The road profile sensor 2330 may include different types of devices for measuring different types of road profile, such as road surface roughness, road width, road elevation, road curvature, etc. For example, the road profile sensor 2330 may include a device that measures the motion of a suspension of vehicle 2305 to derive the road roughness profile. In some embodiments, the road profile sensor 2330 may include radar sensors to measure the distance from vehicle 1205 to road sides (e.g., barrier on the road sides), thereby measuring the width of the road. In some embodiments, the road profile sensor 2330 may include a device configured for measuring the up and down elevation of the road. In some embodiment, the road profile sensor 2330 may include a device configured to measure the road curvature. For example, a camera (e.g., camera 122 or another camera) may be used to capture images of the road showing road curvatures. Vehicle 1205 may use such images to detect road curvatures.

The at least one processor 2315 may be programmed to receive, from camera 122, at least one environmental image associated with vehicle 1205. The at least one processor 2315 may analyze the at least one environmental image to determine navigation information related to the vehicle 1205. The navigation information may include a trajectory related to the travel of vehicle 1205 along road segment 1200. The at least one processor 2315 may determine the trajectory based on motions of camera 122 (and hence the vehicle), such as three dimensional translation and three dimensional rotational motions. In some embodiments, the at least one processor 2315 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 2315 may also be programmed to transmit the navigation information from vehicle 1205 to server 1230. In some embodiments, the navigation information may be transmitted to server 1230 along with road information. The road location information may include at least one of the GPS signal received by the GPS unit 2310, landmark information, road geometry, lane information, etc. The at least one processor 2315 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 2315 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 2315 may be configured to communicate with various sensors and components included in vehicle 1205, including communication unit 1705, GPS unit 2315, camera 122, speed sensor 2320, accelerometer 2325, and road profile sensor 2330. The at least one processor 2315 may collect information or data from various sensors and components, and transmit the information or data to server 1230 through communication unit 2305. Alternatively or additionally, various sensors or components of vehicle 1205 may also communicate with server 1230 and transmit data or information collected by the sensors or components to server 1230.

In some embodiments, vehicles 1205, 1210, 1215, 1220, and 1225 may communicate with each other, and may share navigation information with each other, such that at least one of the vehicles 1205, 1210, 1215, 1220, and 1225 may generate the autonomous vehicle road navigation model using crowdsourcing, e.g., based on information shared by other vehicles. In some embodiments, vehicles 1205, 1210, 1215, 1220, and 1225 may share navigation information with each other and each vehicle may update its own the autonomous vehicle road navigation model provided in the vehicle. In some embodiments, at least one of the vehicles 1205, 1210, 1215, 1220, and 1225 (e.g., vehicle 1205) may function as a hub vehicle. The at least one processor 2315 of the hub vehicle (e.g., vehicle 1205) may perform some or all of the functions performed by server 1230. For example, the at least one processor 2315 of the hub vehicle may communicate with other vehicles and receive navigation information from other vehicles. The at least one processor 2315 of the hub vehicle may generate the autonomous vehicle road navigation model or an update to the model based on the shared information received from other vehicles. The at least one processor 2315 of the hub vehicle may transmit the autonomous vehicle road navigation model or the update to the model to other vehicles for providing autonomous navigation guidance.

Navigation Based on Sparse Maps

As previously discussed, the autonomous vehicle road navigation model including sparse map 800 may include a plurality of mapped lane marks and a plurality of mapped objects/features associated with a road segment. As discussed in greater detail below, these mapped lane marks, objects, and features may be used when the autonomous vehicle navigates. For example, in some embodiments, the mapped objects and features may be used to localized a host vehicle relative to the map (e.g., relative to a mapped target trajectory). The mapped lane marks may be used (e.g., as a check) to determine a lateral position and/or orientation relative to a planned or target trajectory. With this position information, the autonomous vehicle may be able to adjust a heading direction to match a direction of a target trajectory at the determined position.

Vehicle 200 may be configured to detect lane marks in a given road segment. The road segment may include any markings on a road for guiding vehicle traffic on a roadway. For example, the lane marks may be continuous or dashed lines demarking the edge of a lane of travel. The lane marks may also include double lines, such as a double continuous lines, double dashed lines or a combination of continuous and dashed lines indicating, for example, whether passing is permitted in an adjacent lane. The lane marks may also include freeway entrance and exit markings indicating, for example, a deceleration lane for an exit ramp or dotted lines indicating that a lane is turn-only or that the lane is ending. The markings may further indicate a work zone, a temporary lane shift, a path of travel through an intersection, a median, a special purpose lane (e.g., a bike lane, HOV lane, etc.), or other miscellaneous markings (e.g., crosswalk, a speed hump, a railway crossing, a stop line, etc.).

Vehicle 200 may use cameras, such as image capture devices 122 and 124 included in image acquisition unit 120, to capture images of the surrounding lane marks. Vehicle 200 may analyze the images to detect point locations associated with the lane marks based on features identified within one or more of the captured images. These point locations may be uploaded to a server to represent the lane marks in sparse map 800. Depending on the position and field of view of the camera, lane marks may be detected for both sides of the vehicle simultaneously from a single image. In other embodiments, different cameras may be used to capture images on multiple sides of the vehicle. Rather than uploading actual images of the lane marks, the marks may be stored in sparse map 800 as a spline or a series of points, thus reducing the size of sparse map 800 and/or the data that must be uploaded remotely by the vehicle.

Figure 24A:
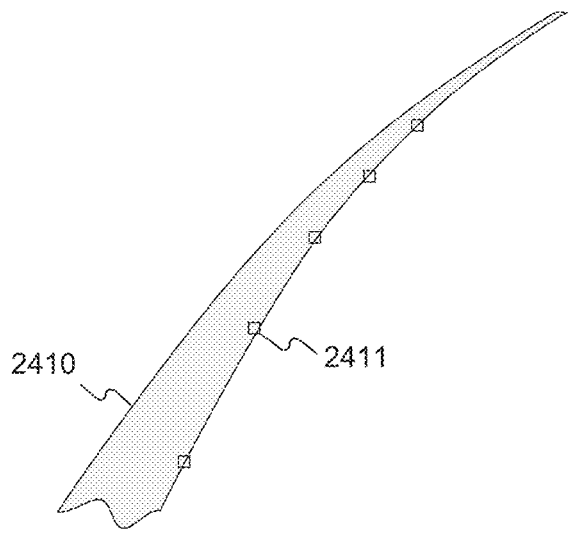
FIGS. 24A, 24B, 24C, and 24D illustrate exemplary lane marks that may be detected consistent with the disclosed embodiments.

FIGS. 24A-24D illustrate exemplary point locations that may be detected by vehicle 200 to represent particular lane marks. Similar to the landmarks described above, vehicle 200 may use various image recognition algorithms or software to identify point locations within a captured image. For example, vehicle 200 may recognize a series of edge points, corner points or various other point locations associated with a particular lane mark. FIG. 24A shows a continuous lane mark 2410 that may be detected by vehicle 200. Lane mark 2410 may represent the outside edge of a roadway, represented by a continuous white line. As shown in FIG. 24A, vehicle 200 may be configured to detect a plurality of edge location points 2411 along the lane mark. Location points 2411 may be collected to represent the lane mark at any intervals sufficient to create a mapped lane mark in the sparse map. For example, the lane mark may be represented by one point per meter of the detected edge, one point per every five meters of the detected edge, or at other suitable spacings. In some embodiments, the spacing may be determined by other factors, rather than at set intervals such as, for example, based on points where vehicle 200 has a highest confidence ranking of the location of the detected points. Although FIG. 24A shows edge location points on an interior edge of lane mark 2410, points may be collected on the outside edge of the line or along both edges. Further, while a single line is shown in FIG. 24A, similar edge points may be detected for a double continuous line. For example, points 2411 may be detected along an edge of one or both of the continuous lines.

Figure 24B:
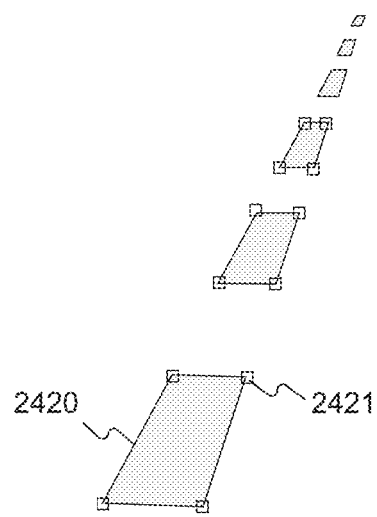

Vehicle 200 may also represent lane marks differently depending on the type or shape of lane mark. FIG. 24B shows an exemplary dashed lane mark 2420 that may be detected by vehicle 200. Rather than identifying edge points, as in FIG. 24A, vehicle may detect a series of corner points 2421 representing corners of the lane dashes to define the full boundary of the dash. While FIG. 24B shows each corner of a given dash marking being located, vehicle 200 may detect or upload a subset of the points shown in the figure. For example, vehicle 200 may detect the leading edge or leading corner of a given dash mark, or may detect the two corner points nearest the interior of the lane. Further, not every dash mark may be captured, for example, vehicle 200 may capture and/or record points representing a sample of dash marks (e.g., every other, every third, every fifth, etc.) or dash marks at a predefined spacing (e.g., every meter, every five meters, every 10 meters, etc.) Corner points may also be detected for similar lane marks, such as markings showing a lane is for an exit ramp, that a particular lane is ending, or other various lane marks that may have detectable corner points. Corner points may also be detected for lane marks consisting of double dashed lines or a combination of continuous and dashed lines.

Figure 24C:
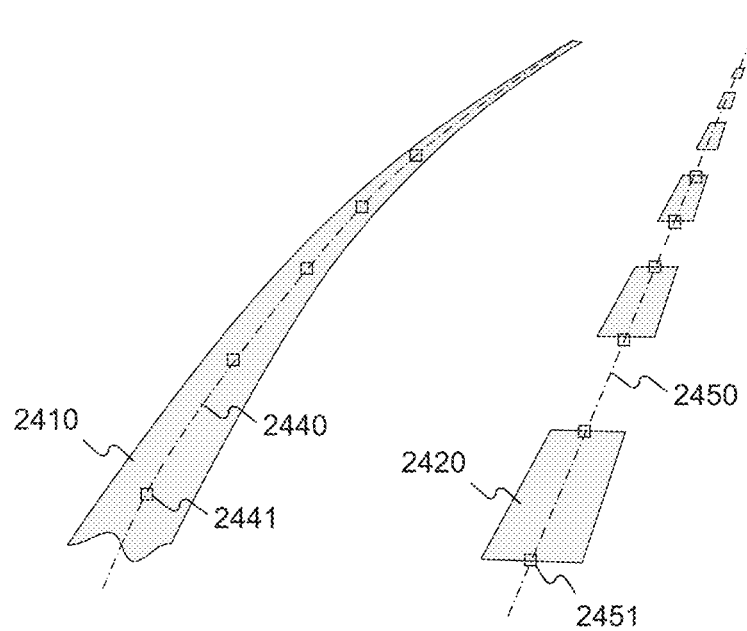

In some embodiments, the points uploaded to the server to generate the mapped lane marks may represent other points besides the detected edge points or corner points. FIG. 24C illustrates a series of points that may represent a centerline of a given lane mark. For example, continuous lane 2410 may be represented by centerline points 2441 along a centerline 2440 of the lane mark. In some embodiments, vehicle 200 may be configured to detect these center points using various image recognition techniques, such as convolutional neural networks (CNN), scale-invariant feature transform (SIFT), histogram of oriented gradients (HOG) features, or other techniques. Alternatively, vehicle 200 may detect other points, such as edge points 2411 shown in FIG. 24A, and may calculate centerline points 2441, for example, by detecting points along each edge and determining a midpoint between the edge points. Similarly, dashed lane mark 2420 may be represented by centerline points 2451 along a centerline 2450 of the lane mark. The centerline points may be located at the edge of a dash, as shown in FIG. 24C, or at various other locations along the centerline. For example, each dash may be represented by a single point in the geometric center of the dash. The points may also be spaced at a predetermined interval along the centerline (e.g., every meter, 5 meters, 10 meters, etc.). The centerline points 2451 may be detected directly by vehicle 200, or may be calculated based on other detected reference points, such as corner points 2421, as shown in FIG. 24B. A centerline may also be used to represent other lane mark types, such as a double line, using similar techniques as above.

Figure 24D:
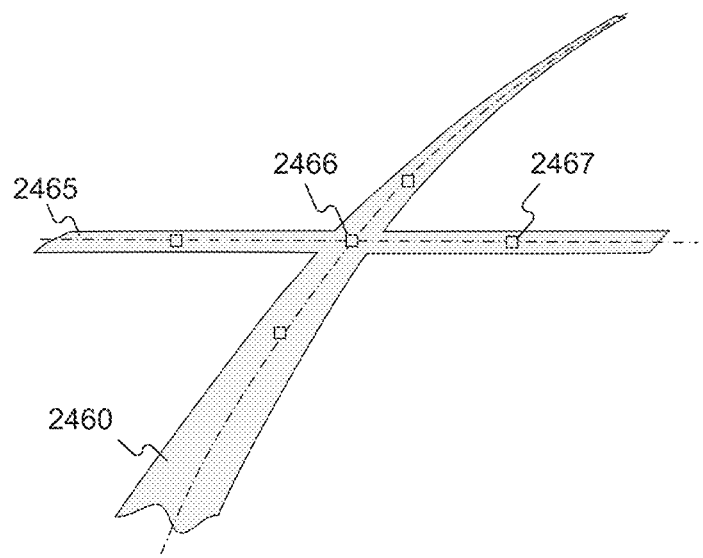

In some embodiments, vehicle 200 may identify points representing other features, such as a vertex between two intersecting lane marks. FIG. 24D shows exemplary points representing an intersection between two lane marks 2460 and 2465. Vehicle 200 may calculate a vertex point 2466 representing an intersection between the two lane marks. For example, one of lane marks 2460 or 2465 may represent a train crossing area or other crossing area in the road segment. While lane marks 2460 and 2465 are shown as crossing each other perpendicularly, various other configurations may be detected. For example, the lane marks 2460 and 2465 may cross at other angles, or one or both of the lane marks may terminate at the vertex point 2466. Similar techniques may also be applied for intersections between dashed or other lane mark types. In addition to vertex point 2466, various other points 2467 may also be detected, providing further information about the orientation of lane marks 2460 and 2465.

Vehicle 200 may associate real-world coordinates with each detected point of the lane mark. For example, location identifiers may be generated, including coordinate for each point, to upload to a server for mapping the lane mark. The location identifiers may further include other identifying information about the points, including whether the point represents a corner point, an edge point, center point, etc. Vehicle 200 may therefore be configured to determine a real-world position of each point based on analysis of the images. For example, vehicle 200 may detect other features in the image, such as the various landmarks described above, to locate the real-world position of the lane marks. This may involve determining the location of the lane marks in the image relative to the detected landmark or determining the position of the vehicle based on the detected landmark and then determining a distance from the vehicle (or target trajectory of the vehicle) to the lane mark. When a landmark is not available, the location of the lane mark points may be determined relative to a position of the vehicle determined based on dead reckoning. The real-world coordinates included in the location identifiers may be represented as absolute coordinates (e.g., latitude/longitude coordinates), or may be relative to other features, such as based on a longitudinal position along a target trajectory and a lateral distance from the target trajectory. The location identifiers may then be uploaded to a server for generation of the mapped lane marks in the navigation model (such as sparse map 800). In some embodiments, the server may construct a spline representing the lane marks of a road segment. Alternatively, vehicle 200 may generate the spline and upload it to the server to be recorded in the navigational model.

Figure 24E:
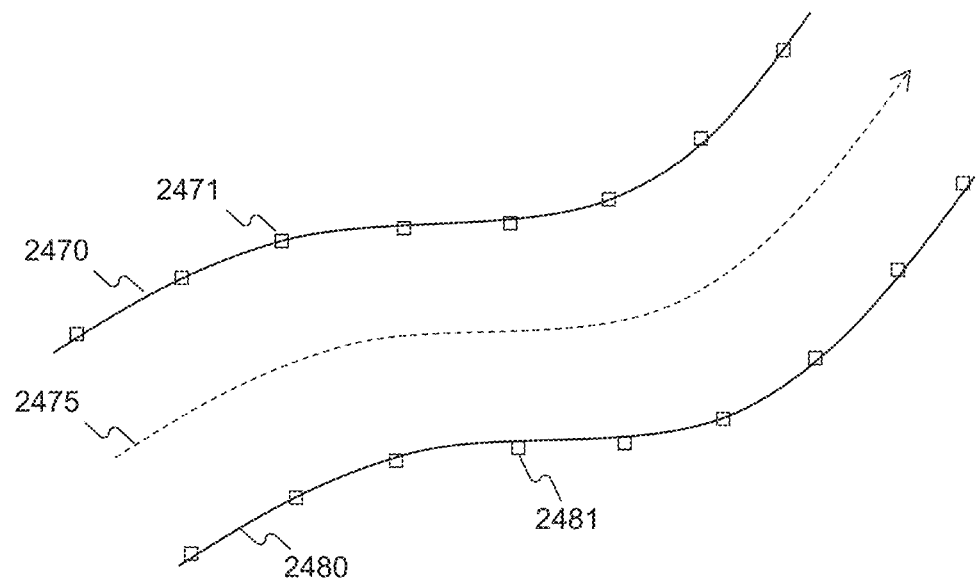
FIG. 24E shows exemplary mapped lane marks consistent with the disclosed embodiments.

FIG. 24E shows an exemplary navigation model or sparse map for a corresponding road segment that includes mapped lane marks. The sparse map may include a target trajectory 2475 for a vehicle to follow along a road segment. As described above, target trajectory 2475 may represent an ideal path for a vehicle to take as it travels the corresponding road segment, or may be located elsewhere on the road (e.g., a centerline of the road, etc.). Target trajectory 2475 may be calculated in the various methods described above, for example, based on an aggregation (e.g., a weighted combination) of two or more reconstructed trajectories of vehicles traversing the same road segment.

In some embodiments, the target trajectory may be generated equally for all vehicle types and for all road, vehicle, and/or environment conditions. In other embodiments, however, various other factors or variables may also be considered in generating the target trajectory. A different target trajectory may be generated for different types of vehicles (e.g., a private car, a light truck, and a full trailer). For example, a target trajectory with relatively tighter turning radii may be generated for a small private car than a larger semi-trailer truck. In some embodiments, road, vehicle and environmental conditions may be considered as well. For example, a different target trajectory may be generated for different road conditions (e.g., wet, snowy, icy, dry, etc.), vehicle conditions (e.g., tire condition or estimated tire condition, brake condition or estimated brake condition, amount of fuel remaining, etc.) or environmental factors (e.g., time of day, visibility, weather, etc.). The target trajectory may also depend on one or more aspects or features of a particular road segment (e.g., speed limit, frequency and size of turns, grade, etc.). In some embodiments, various user settings may also be used to determine the target trajectory, such as a set driving mode (e.g., desired driving aggressiveness, economy mode, etc.).

The sparse map may also include mapped lane marks 2470 and 2480 representing lane marks along the road segment. The mapped lane marks may be represented by a plurality of location identifiers 2471 and 2481. As described above, the location identifiers may include locations in real world coordinates of points associated with a detected lane mark. Similar to the target trajectory in the model, the lane marks may also include elevation data and may be represented as a curve in three-dimensional space. For example, the curve may be a spline connecting three dimensional polynomials of suitable order the curve may be calculated based on the location identifiers. The mapped lane marks may also include other information or metadata about the lane mark, such as an identifier of the type of lane mark (e.g., between two lanes with the same direction of travel, between two lanes of opposite direction of travel, edge of a roadway, etc.) and/or other characteristics of the lane mark (e.g., continuous, dashed, single line, double line, yellow, white, etc.). In some embodiments, the mapped lane marks may be continuously updated within the model, for example, using crowdsourcing techniques. The same vehicle may upload location identifiers during multiple occasions of travelling the same road segment or data may be selected from a plurality of vehicles (such as 1205, 1210, 1215, 1220, and 1225) travelling the road segment at different times. Sparse map 800 may then be updated or refined based on subsequent location identifiers received from the vehicles and stored in the system. As the mapped lane marks are updated and refined, the updated road navigation model and/or sparse map may be distributed to a plurality of autonomous vehicles.

Figure 24F:
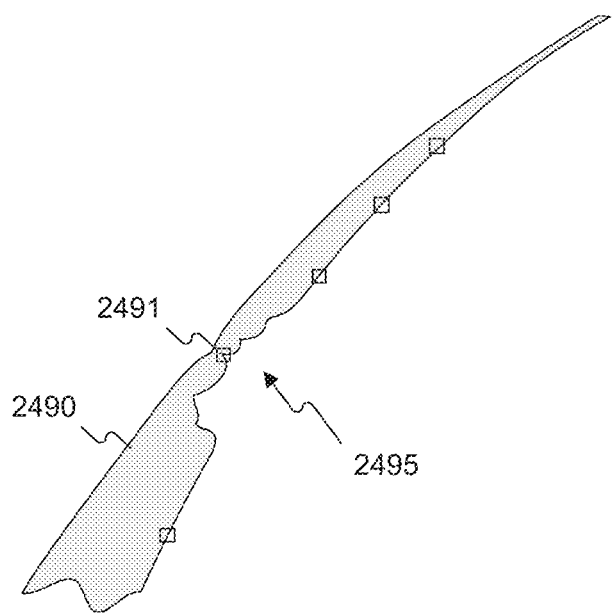
FIG. 24F shows an exemplary anomaly associated with detecting a lane mark consistent with the disclosed embodiments.

Generating the mapped lane marks in the sparse map may also include detecting and/or mitigating errors based on anomalies in the images or in the actual lane marks themselves. FIG. 24F shows an exemplary anomaly 2495 associated with detecting a lane mark 2490. Anomaly 2495 may appear in the image captured by vehicle 200, for example, from an object obstructing the camera's view of the lane mark, debris on the lens, etc. In some instances, the anomaly may be due to the lane mark itself, which may be damaged or worn away, or partially covered, for example, by dirt, debris, water, snow or other materials on the road. Anomaly 2495 may result in an erroneous point 2491 being detected by vehicle 200. Sparse map 800 may provide the correct the mapped lane mark and exclude the error. In some embodiments, vehicle 200 may detect erroneous point 2491 for example, by detecting anomaly 2495 in the image, or by identifying the error based on detected lane mark points before and after the anomaly. Based on detecting the anomaly, the vehicle may omit point 2491 or may adjust it to be in line with other detected points. In other embodiments, the error may be corrected after the point has been uploaded, for example, by determining the point is outside of an expected threshold based on other points uploaded during the same trip, or based on an aggregation of data from previous trips along the same road segment.

The mapped lane marks in the navigation model and/or sparse map may also be used for navigation by an autonomous vehicle traversing the corresponding roadway. For example, a vehicle navigating along a target trajectory may periodically use the mapped lane marks in the sparse map to align itself with the target trajectory. As mentioned above, between landmarks the vehicle may navigate based on dead reckoning in which the vehicle uses sensors to determine its ego motion and estimate its position relative to the target trajectory. Errors may accumulate over time and vehicle's position determinations relative to the target trajectory may become increasingly less accurate. Accordingly, the vehicle may use lane marks occurring in sparse map 800 (and their known locations) to reduce the dead reckoning-induced errors in position determination. In this way, the identified lane marks included in sparse map 800 may serve as navigational anchors from which an accurate position of the vehicle relative to a target trajectory may be determined.

Figure 25A:
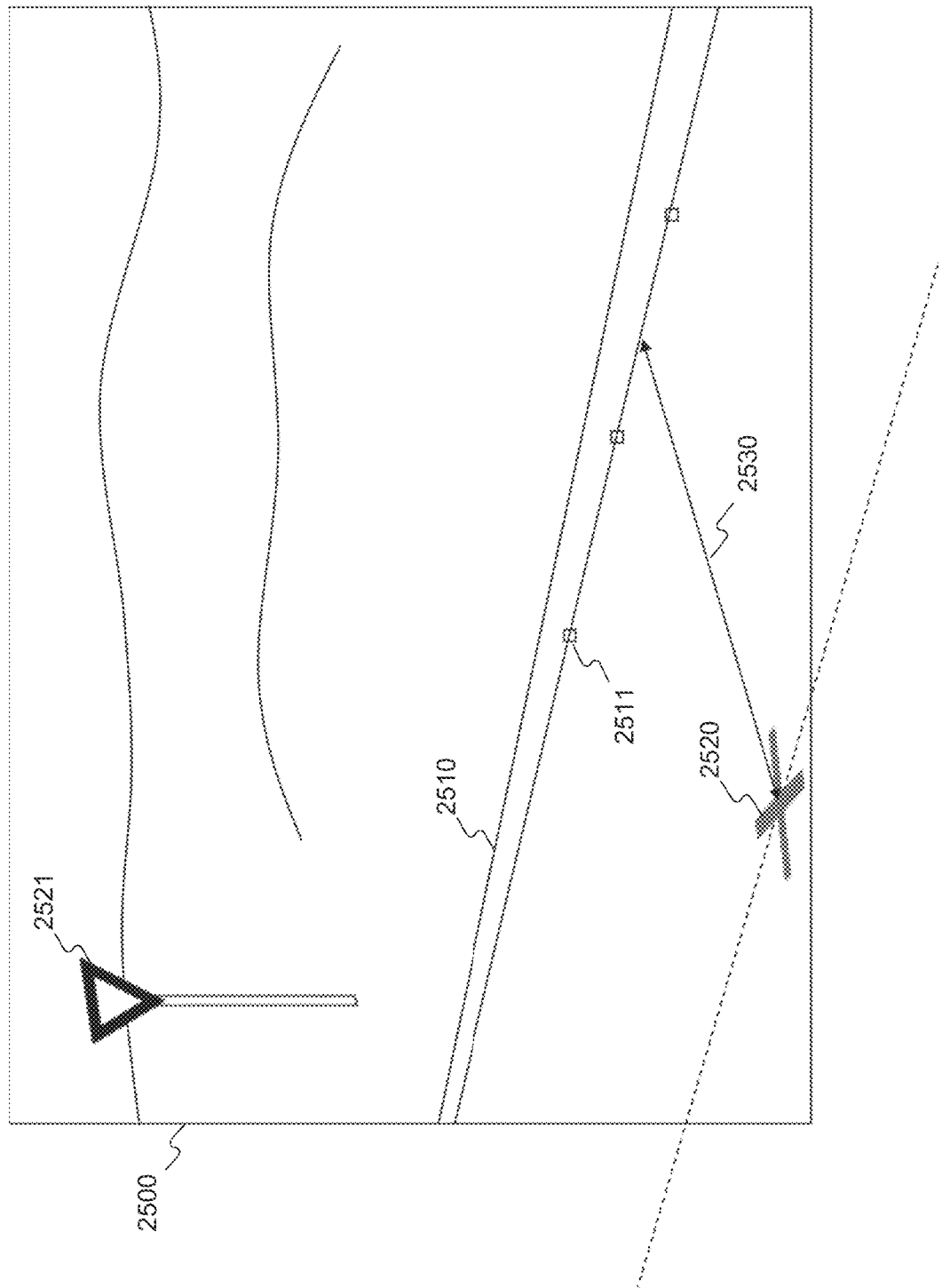
FIG. 25A shows an exemplary image of a vehicle's surrounding environment for navigation based on the mapped lane marks consistent with the disclosed embodiments.

FIG. 25A shows an exemplary image 2500 of a vehicle's surrounding environment that may be used for navigation based on the mapped lane marks. Image 2500 may be captured, for example, by vehicle 200 through image capture devices 122 and 124 included in image acquisition unit 120. Image 2500 may include an image of at least one lane mark 2510, as shown in FIG. 25A. Image 2500 may also include one or more landmarks 2521, such as road sign, used for navigation as described above. Some elements shown in FIG. 25A, such as elements 2511, 2530, and 2520 which do not appear in the captured image 2500 but are detected and/or determined by vehicle 200 are also shown for reference.

Using the various techniques described above with respect to FIGS. 24A-D and 24F, a vehicle may analyze image 2500 to identify lane mark 2510. Various points 2511 may be detected corresponding to features of the lane mark in the image. Points 2511, for example, may correspond to an edge of the lane mark, a corner of the lane mark, a midpoint of the lane mark, a vertex between two intersecting lane marks, or various other features or locations. Points 2511 may be detected to correspond to a location of points stored in a navigation model received from a server. For example, if a sparse map is received containing points that represent a centerline of a mapped lane mark, points 2511 may also be detected based on a centerline of lane mark 2510.

The vehicle may also determine a longitudinal position represented by element 2520 and located along a target trajectory. Longitudinal position 2520 may be determined from image 2500, for example, by detecting landmark 2521 within image 2500 and comparing a measured location to a known landmark location stored in the road model or sparse map 800. The location of the vehicle along a target trajectory may then be determined based on the distance to the landmark and the landmark's known location. The longitudinal position 2520 may also be determined from images other than those used to determine the position of a lane mark. For example, longitudinal position 2520 may be determined by detecting landmarks in images from other cameras within image acquisition unit 120 taken simultaneously or near simultaneously to image 2500. In some instances, the vehicle may not be near any landmarks or other reference points for determining longitudinal position 2520. In such instances, the vehicle may be navigating based on dead reckoning and thus may use sensors to determine its ego motion and estimate a longitudinal position 2520 relative to the target trajectory. The vehicle may also determine a distance 2530 representing the actual distance between the vehicle and lane mark 2510 observed in the captured image (s). The camera angle, the speed of the vehicle, the width of the vehicle, or various other factors may be accounted for in determining distance 2530.

Figure 25B:
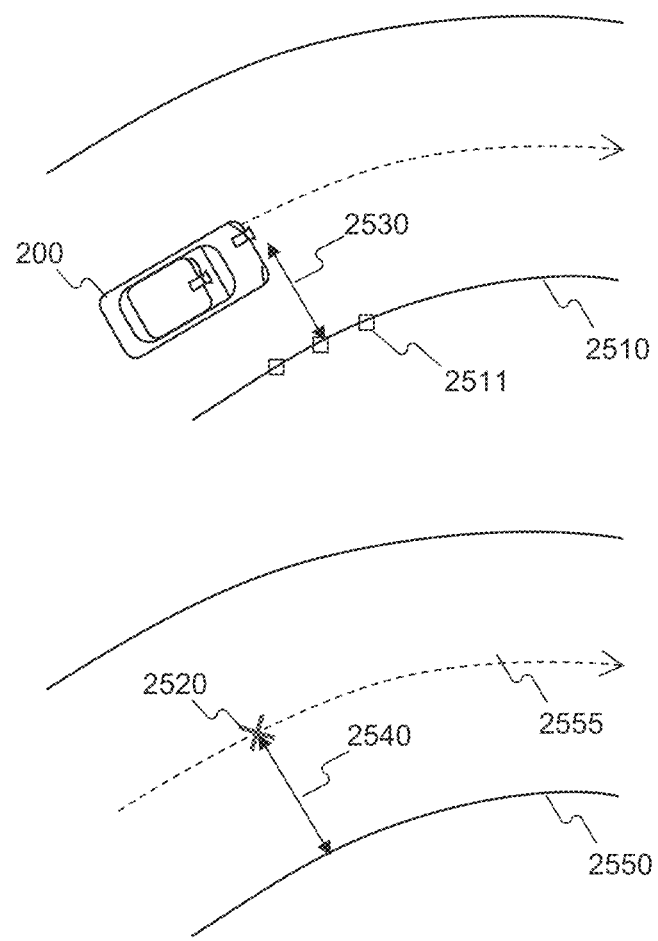
FIG. 25B illustrates a lateral localization correction of a vehicle based on mapped lane marks in a road navigation model consistent with the disclosed embodiments.

FIG. 25B illustrates a lateral localization correction of the vehicle based on the mapped lane marks in a road navigation model. As described above, vehicle 200 may determine a distance 2530 between vehicle 200 and a lane mark 2510 using one or more images captured by vehicle 200. Vehicle 200 may also have access to a road navigation model, such as sparse map 800, which may include a mapped lane mark 2550 and a target trajectory 2555. Mapped lane mark 2550 may be modeled using the techniques described above, for example using crowdsourced location identifiers captured by a plurality of vehicles. Target trajectory 2555 may also be generated using the various techniques described previously. Vehicle 200 may also determine or estimate a longitudinal position 2520 along target trajectory 2555 as described above with respect to FIG. 25A. Vehicle 200 may then determine an expected distance 2540 based on a lateral distance between target trajectory 2555 and mapped lane mark 2550 corresponding to longitudinal position 2520. The lateral localization of vehicle 200 may be corrected or adjusted by comparing the actual distance 2530, measured using the captured image(s), with the expected distance 2540 from the model.

Figure 25C:
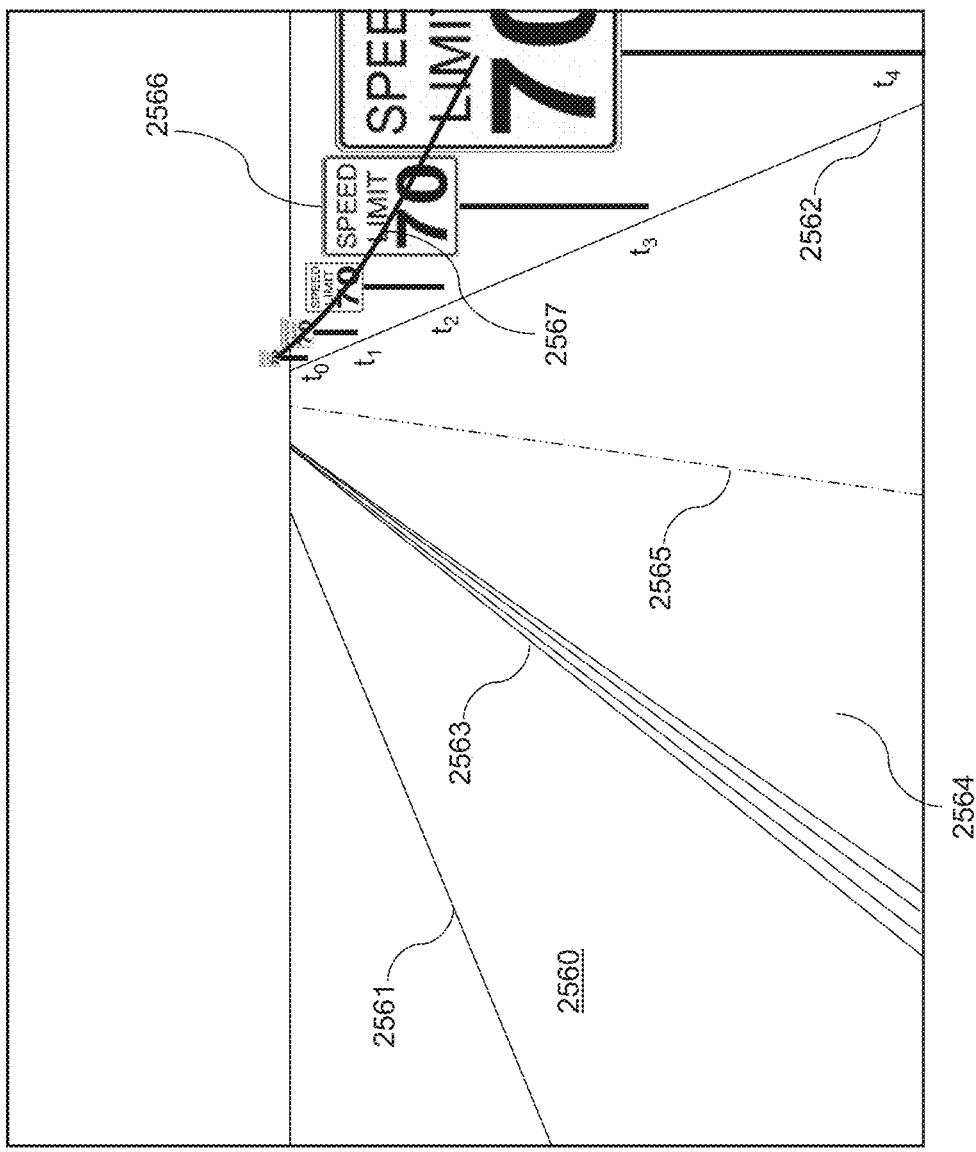
FIGS. 25C and 25D provide conceptual representations of a localization technique for locating a host vehicle along a target trajectory using mapped features included in a sparse map.
Figure 25D:
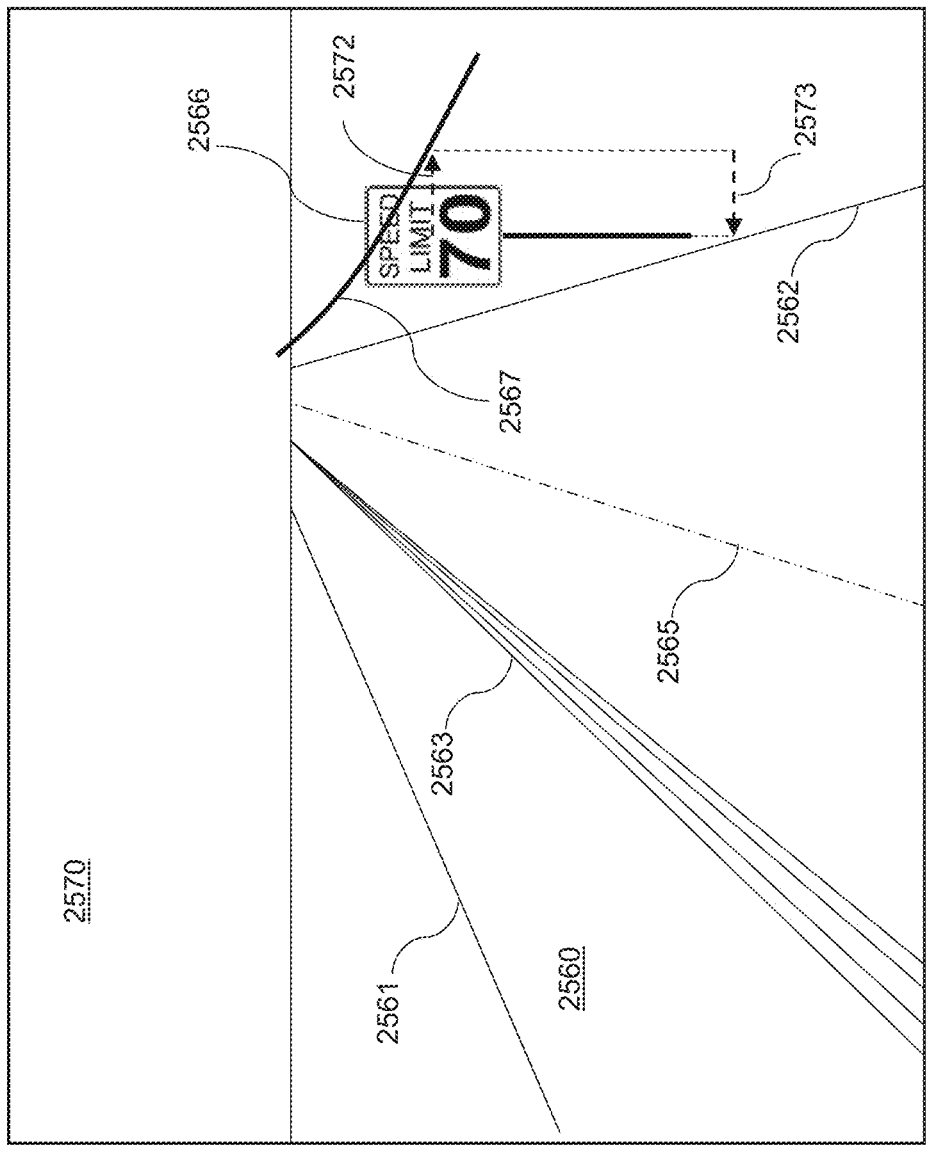

FIGS. 25C and 25D provide illustrations associated with another example for localizing a host vehicle during navigation based on mapped landmarks/objects/features in a sparse map. FIG. 25C conceptually represents a series of images captured from a vehicle navigating along a road segment 2560. In this example, road segment 2560 includes a straight section of a two-lane divided highway delineated by road edges 2561 and 2562 and center lane marking 2563. As shown, the host vehicle is navigating along a lane 2564, which is associated with a mapped target trajectory 2565. Thus, in an ideal situation (and without influencers such as the presence of target vehicles or objects in the roadway, etc.) the host vehicle should closely track the mapped target trajectory 2565 as it navigates along lane 2564 of road segment 2560. In reality, the host vehicle may experience drift as it navigates along mapped target trajectory 2565. For effective and safe navigation, this drift should be maintained within acceptable limits (e.g., +/−10 cm of lateral displacement from target trajectory 2565 or any other suitable threshold). To periodically account for drift and to make any needed course corrections to ensure that the host vehicle follows target trajectory 2565, the disclosed navigation systems may be able to localize the host vehicle along the target trajectory 2565 (e.g., determine a lateral and longitudinal position of the host vehicle relative to the target trajectory 2565) using one or more mapped features/objects included in the sparse map.

As a simple example, FIG. 25C shows a speed limit sign 2566 as it may appear in five different, sequentially captured images as the host vehicle navigates along road segment 2560. For example, at a first time, to, sign 2566 may appear in a captured image near the horizon. As the host vehicle approaches sign 2566, in subsequentially captured images at times $t_1$, $t_2$, $t_3$, and $t_4$, sign 2566 will appear at different 2D X-Y pixel locations of the captured images. For example, in the captured image space, sign 2566 will move downward and to the right along curve 2567 (e.g., a curve extending through the center of the sign in each of the five captured image frames). Sign 2566 will also appear to increase in size as it is approached by the host vehicle (i.e., it will occupy a great number of pixels in subsequently captured images).

These changes in the image space representations of an object, such as sign 2566, may be exploited to determine a localized position of the host vehicle along a target trajectory. For example, as described in the present disclosure, any detectable object or feature, such as a semantic feature like sign 2566 or a detectable non-semantic feature, may be identified by one or more harvesting vehicles that previously traversed a road segment (e.g., road segment 2560). A mapping server may collect the harvested drive information from a plurality of vehicles, aggregate and correlate that information, and generate a sparse map including, for example, a target trajectory 2565 for lane 2564 of road segment 2560. The sparse map may also store a location of sign 2566 (along with type information, etc.). During navigation (e.g., prior to entering road segment 2560), a host vehicle may be supplied with a map tile including a sparse map for road segment 2560. To navigate in lane 2564 of road segment 2560, the host vehicle may follow mapped target trajectory 2565.

The mapped representation of sign 2566 may be used by the host vehicle to localize itself relative to the target trajectory. For example, a camera on the host vehicle will capture an image 2570 of the environment of the host vehicle, and that captured image 2570 may include an image representation of sign 2566 having a certain size and a certain X-Y image location, as shown in FIG. 25D. This size and X-Y image location can be used to determine the host vehicle's position relative to target trajectory 2565. For example, based on the sparse map including a representation of sign 2566, a navigation processor of the host vehicle can determine that in response to the host vehicle traveling along target trajectory 2565, a representation of sign 2566 should appear in captured images such that a center of sign 2566 will move (in image space) along line 2567. If a captured image, such as image 2570, shows the center (or other reference point) displaced from line 2567 (e.g., the expected image space trajectory), then the host vehicle navigation system can determine that at the time of the captured image it was not located on target trajectory 2565. From the image, however, the navigation processor can determine an appropriate navigational correction to return the host vehicle to the target trajectory 2565. For example, if analysis shows an image location of sign 2566 that is displaced in the image by a distance 2572 to the left of the expected image space location on line 2567, then the navigation processor may cause a heading change by the host vehicle (e.g., change the steering angle of the wheels) to move the host vehicle leftward by a distance 2573. In this way, each captured image can be used as part of a feedback loop process such that a difference between an observed image position of sign 2566 and expected image trajectory 2567 may be minimized to ensure that the host vehicle continues along target trajectory 2565 with little to no deviation. Of course, the more mapped objects that are available, the more often the described localization technique may be employed, which can reduce or eliminate drift-induced deviations from target trajectory 2565.

The process described above may be useful for detecting a lateral orientation or displacement of the host vehicle relative to a target trajectory. Localization of the host vehicle relative to target trajectory 2565 may also include a determination of a longitudinal location of the target vehicle along the target trajectory. For example, captured image 2570 includes a representation of sign 2566 as having a certain image size (e.g., 2D X-Y pixel area). This size can be compared to an expected image size of mapped sign 2566 as it travels through image space along line 2567 (e.g., as the size of the sign progressively increases, as shown in FIG. 25C). Based on the image size of sign 2566 in image 2570, and based on the expected size progression in image space relative to mapped target trajectory 2565, the host vehicle can determine its longitudinal position (at the time when image 2570 was captured) relative to target trajectory 2565. This longitudinal position coupled with any lateral displacement relative to target trajectory 2565, as described above, allows for full localization of the host vehicle relative to target trajectory 2565, as the host vehicle navigates along road 2560.

FIGS. 25C and 25D provide just one example of the disclosed localization technique using a single mapped object and a single target trajectory. In other examples, there may be many more target trajectories (e.g., one target trajectory for each viable lane of a multi-lane highway, urban street, complex junction, etc.) and there may be many more mapped available for localization. For example, a sparse map representative of an urban environment may include many objects per meter available for localization.

Figure 26A:
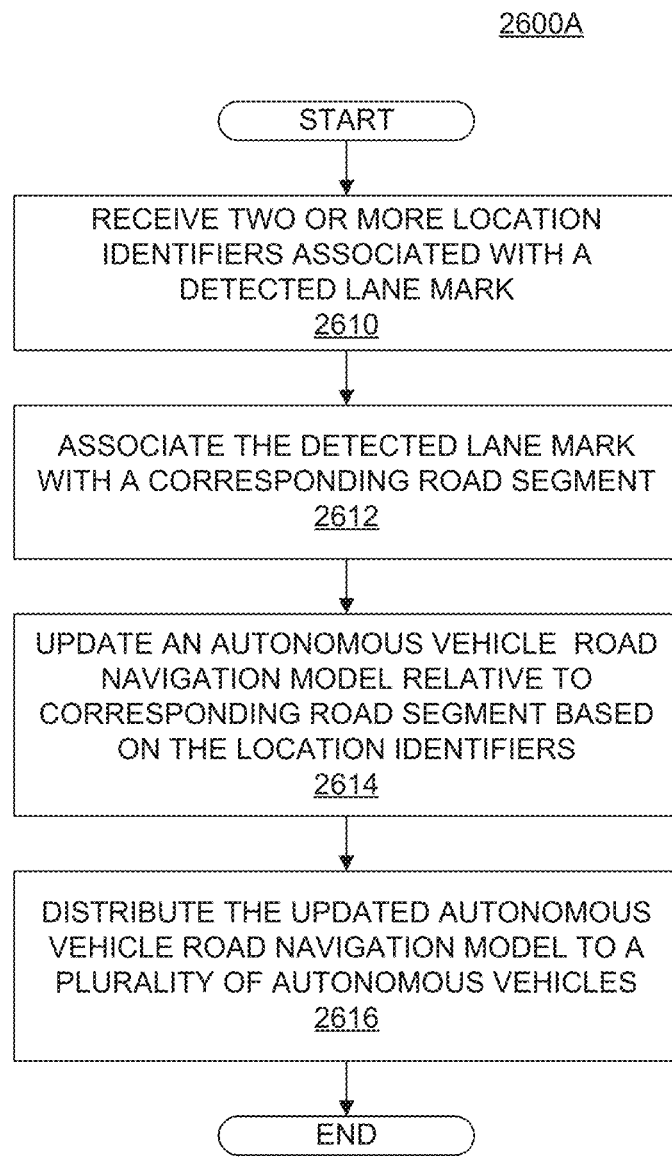
FIG. 26A is a flowchart showing an exemplary process for mapping a lane mark for use in autonomous vehicle navigation consistent with disclosed embodiments.

FIG. 26A is a flowchart showing an exemplary process 2600A for mapping a lane mark for use in autonomous vehicle navigation, consistent with disclosed embodiments. At step 2610, process 2600A may include receiving two or more location identifiers associated with a detected lane mark. For example, step 2610 may be performed by server 1230 or one or more processors associated with the server. The location identifiers may include locations in real-world coordinates of points associated with the detected lane mark, as described above with respect to FIG. 24E. In some embodiments, the location identifiers may also contain other data, such as additional information about the road segment or the lane mark. Additional data may also be received during step 2610, such as accelerometer data, speed data, landmarks data, road geometry or profile data, vehicle positioning data, ego motion data, or various other forms of data described above. The location identifiers may be generated by a vehicle, such as vehicles 1205, 1210, 1215, 1220, and 1225, based on images captured by the vehicle. For example, the identifiers may be determined based on acquisition, from a camera associated with a host vehicle, of at least one image representative of an environment of the host vehicle, analysis of the at least one image to detect the lane mark in the environment of the host vehicle, and analysis of the at least one image to determine a position of the detected lane mark relative to a location associated with the host vehicle. As described above, the lane mark may include a variety of different marking types, and the location identifiers may correspond to a variety of points relative to the lane mark. For example, where the detected lane mark is part of a dashed line marking a lane boundary, the points may correspond to detected corners of the lane mark. Where the detected lane mark is part of a continuous line marking a lane boundary, the points may correspond to a detected edge of the lane mark, with various spacings as described above. In some embodiments, the points may correspond to the centerline of the detected lane mark, as shown in FIG. 24C, or may correspond to a vertex between two intersecting lane marks and at least one two other points associated with the intersecting lane marks, as shown in FIG. 24D.

At step 2612, process 2600A may include associating the detected lane mark with a corresponding road segment. For example, server 1230 may analyze the real-world coordinates, or other information received during step 2610, and compare the coordinates or other information to location information stored in an autonomous vehicle road navigation model. Server 1230 may determine a road segment in the model that corresponds to the real-world road segment where the lane mark was detected.

At step 2614, process 2600A may include updating an autonomous vehicle road navigation model relative to the corresponding road segment based on the two or more location identifiers associated with the detected lane mark. For example, the autonomous road navigation model may be sparse map 800, and server 1230 may update the sparse map to include or adjust a mapped lane mark in the model. Server 1230 may update the model based on the various methods or processes described above with respect to FIG. 24E. In some embodiments, updating the autonomous vehicle road navigation model may include storing one or more indicators of position in real world coordinates of the detected lane mark. The autonomous vehicle road navigation model may also include a at least one target trajectory for a vehicle to follow along the corresponding road segment, as shown in FIG. 24E.

At step 2616, process 2600A may include distributing the updated autonomous vehicle road navigation model to a plurality of autonomous vehicles. For example, server 1230 may distribute the updated autonomous vehicle road navigation model to vehicles 1205, 1210, 1215, 1220, and 1225, which may use the model for navigation. The autonomous vehicle road navigation model may be distributed via one or more networks (e.g., over a cellular network and/or the Internet, etc.), through wireless communication paths 1235, as shown in FIG. 12.

In some embodiments, the lane marks may be mapped using data received from a plurality of vehicles, such as through a crowdsourcing technique, as described above with respect to FIG. 24E. For example, process 2600A may include receiving a first communication from a first host vehicle, including location identifiers associated with a detected lane mark, and receiving a second communication from a second host vehicle, including additional location identifiers associated with the detected lane mark. For example, the second communication may be received from a subsequent vehicle travelling on the same road segment, or from the same vehicle on a subsequent trip along the same road segment. Process 2600A may further include refining a determination of at least one position associated with the detected lane mark based on the location identifiers received in the first communication and based on the additional location identifiers received in the second communication. This may include using an average of the multiple location identifiers and/or filtering out "ghost" identifiers that may not reflect the real-world position of the lane mark.

Figure 26B:
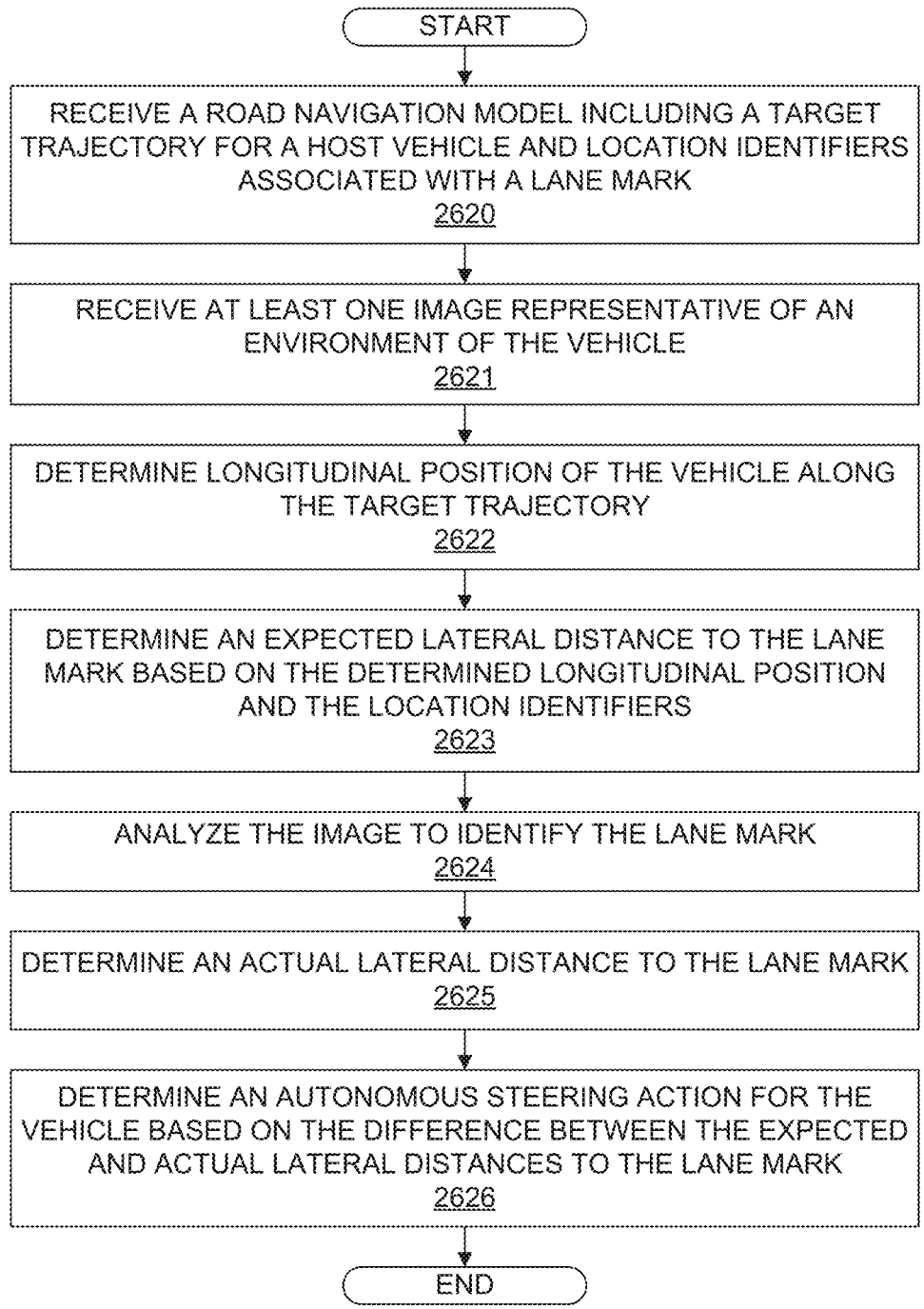
FIG. 26B is a flowchart showing an exemplary process for autonomously navigating a host vehicle along a road segment using mapped lane marks consistent with disclosed embodiments.

FIG. 26B is a flowchart showing an exemplary process 2600B for autonomously navigating a host vehicle along a road segment using mapped lane marks. Process 2600B may be performed, for example, by processing unit 110 of autonomous vehicle 200. At step 2620, process 2600B may include receiving from a server-based system an autonomous vehicle road navigation model. In some embodiments, the autonomous vehicle road navigation model may include a target trajectory for the host vehicle along the road segment and location identifiers associated with one or more lane marks associated with the road segment. For example, vehicle 200 may receive sparse map 800 or another road navigation model developed using process 2600A. In some embodiments, the target trajectory may be represented as a three-dimensional spline, for example, as shown in FIG. 9B. As described above with respect to FIGS. 24A-F, the location identifiers may include locations in real world coordinates of points associated with the lane mark (e.g., corner points of a dashed lane mark, edge points of a continuous lane mark, a vertex between two intersecting lane marks and other points associated with the intersecting lane marks, a centerline associated with the lane mark, etc.).

At step 2621, process 2600B may include receiving at least one image representative of an environment of the vehicle. The image may be received from an image capture device of the vehicle, such as through image capture devices 122 and 124 included in image acquisition unit 120. The image may include an image of one or more lane marks, similar to image 2500 described above.

At step 2622, process 2600B may include determining a longitudinal position of the host vehicle along the target trajectory. As described above with respect to FIG. 25A, this may be based on other information in the captured image (e.g., landmarks, etc.) or by dead reckoning of the vehicle between detected landmarks.

At step 2623, process 2600B may include determining an expected lateral distance to the lane mark based on the determined longitudinal position of the host vehicle along the target trajectory and based on the two or more location identifiers associated with the at least one lane mark. For example, vehicle 200 may use sparse map 800 to determine an expected lateral distance to the lane mark. As shown in FIG. 25B, longitudinal position 2520 along a target trajectory 2555 may be determined in step 2622. Using spare map 800, vehicle 200 may determine an expected distance 2540 to mapped lane mark 2550 corresponding to longitudinal position 2520.

At step 2624, process 2600B may include analyzing the at least one image to identify the at least one lane mark. Vehicle 200, for example, may use various image recognition techniques or algorithms to identify the lane mark within the image, as described above. For example, lane mark 2510 may be detected through image analysis of image 2500, as shown in FIG. 25A.

At step 2625, process 2600B may include determining an actual lateral distance to the at least one lane mark based on analysis of the at least one image. For example, the vehicle may determine a distance 2530, as shown in FIG. 25A, representing the actual distance between the vehicle and lane mark 2510. The camera angle, the speed of the vehicle, the width of the vehicle, the position of the camera relative to the vehicle, or various other factors may be accounted for in determining distance 2530.

At step 2626, process 2600B may include determining an autonomous steering action for the host vehicle based on a difference between the expected lateral distance to the at least one lane mark and the determined actual lateral distance to the at least one lane mark. For example, as described above with respect to FIG. 25B, vehicle 200 may compare actual distance 2530 with an expected distance 2540. The difference between the actual and expected distance may indicate an error (and its magnitude) between the vehicle's actual position and the target trajectory to be followed by the vehicle. Accordingly, the vehicle may determine an autonomous steering action or other autonomous action based on the difference. For example, if actual distance 2530 is less than expected distance 2540, as shown in FIG. 25B, the vehicle may determine an autonomous steering action to direct the vehicle left, away from lane mark 2510. Thus, the vehicle's position relative to the target trajectory may be corrected. Process 2600B may be used, for example, to improve navigation of the vehicle between landmarks.

Processes 2600A and 2600B provide examples only of techniques that may be used for navigating a host vehicle using the disclosed sparse maps. In other examples, processes consistent with those described relative to FIGS. 25C and 25D may also be employed.

Virtual Stop Line Mapping and Navigation

As described elsewhere in this disclosure, a vehicle or a driver may navigate the vehicle according to the environment. For example, an autonomous vehicle may navigate and stop at an intersection according to a marking of a stop line on a road segment. Sometimes, however, a road segment on which a vehicle is driving may include no markings (or inadequate markings due to the poor maintenance) indicating a location for stopping at an intersection, and the vehicle may not be able to navigate properly at the intersection. As another example, an intersection may not be easily detected by a driver or vehicle due to various factors, such as the geometry of the road or intersection or poor visibility conditions (e.g., the sight being blocked by another vehicle, certain weather conditions), etc. Under such circumstances, it may be desirable to determine a virtual stop line (e.g., an unmarked location) at which vehicles can stop to navigate through the intersection (by, for example, slowing down or stopping at the intersection). The systems and methods disclosed herein may allow the determination of a virtual stop line based on images captured by a plurality of devices associated with a plurality of vehicles. The systems and methods may also update a road navigation model based on one or more virtual stop lines and distribute the updated road navigation model to vehicles. The systems and methods may further allow vehicles to perform one or more navigation actions (e.g., slowing, stopping, etc.) based on virtual stop lines included in a road navigation model.

Figure 27:
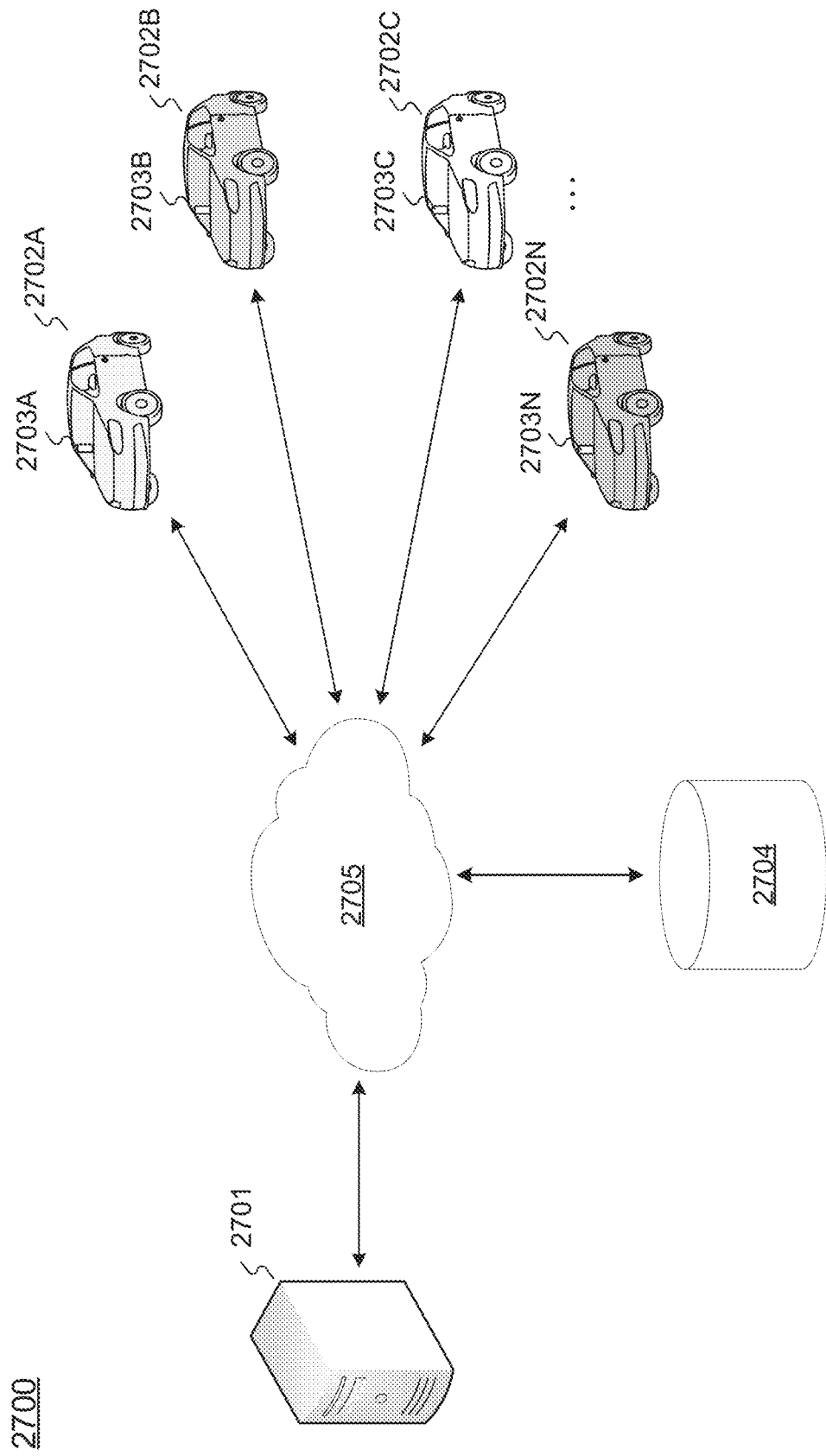
FIG. 27 illustrates an exemplary system for vehicle navigation, consistent with the disclosed embodiments.

FIG. 27 illustrates an exemplary system 2700 for vehicle navigation, consistent with the disclosed embodiments. As illustrated in FIG. 27, system 2700 may include a server 2701, one or more vehicles 2702 (e.g., vehicles 2702A, 2702B, 2702C, ..., 2702N) and one or more vehicle devices 2703 associated with a vehicle (e.g., vehicle devices 2703A, 2703B, 2703C, ..., 2703N), a database 2704, and a network 2705. Server 2701 may be configured to update a road navigation model based on drive information received from one or more vehicles (and/or one or more vehicle devices associated with a vehicle). For example, vehicle 2702 and/or vehicle device 2703 may be configured to collect drive information and transmit the drive information to server 2701 for updating a road navigation model. Database 2704 may be configured to store information for the components of system 2700 (e.g., server 2701, vehicle 2702, and/or vehicle device 2703). Network 2705 may be configured to facilitate communications among the components of system 2700.

Server 2701 may be configured to receive drive information from each of a plurality of vehicles. The drive information may include a stopping location at which a particular vehicle from among the plurality of vehicles stopped relative to an intersection during a drive along the road segment. Server 2701 may also be configured to aggregate the stopping locations in the drive information received from the plurality of vehicles and determine, based on the aggregated stopping locations, a stop line location relative to the intersection. Server 2701 may further be configured to update the road navigation model to include the stop line location. In some embodiments, server 2701 may also be configured to distribute the updated road navigation model to one or more vehicles. For example, server 2701 may be a cloud server that performs the functions disclosed herein. The term "cloud server" refers to a computer platform that provides services via a network, such as the Internet. In this example configuration, server 2701 may use virtual machines that may not correspond to individual hardware. For example, computational and/or storage capabilities may be implemented by allocating appropriate portions of desirable computation/storage power from a scalable repository, such as a data center or a distributed computing environment. In one example, server 2701 may implement the methods described herein using customized hard-wired logic, one or more Application Specific Integrated Circuits (ASICs) or Field Programmable Gate Arrays (FPGAs), firmware, and/or program logic which, in combination with the computer system, cause server 2701 to be a special-purpose machine.

Vehicle 2702 and/or vehicle device 2703 may be configured to collect drive information and transmit the drive information to server 2701 for updating a road navigation model. For example, vehicle 2702A and/or vehicle device 2703A may be configured to receive one or more images captured from an environment of vehicle 2702A. Vehicle 2702A and/or vehicle device 2703A may also be configured to analyze the one or more images to detect an indicator of an intersection. Vehicle 2702A and/or vehicle device 2703A may further be configured to determine, based on output received from at least one sensor of vehicle 2702A, a stopping location of vehicle 2702A relative to the detected intersection. Vehicle 2702A and/or vehicle device 2703A may also be configured to analyze the one or more images to determine an indicator of whether one or more other vehicles are in front of vehicle 2702A. Vehicle 2702A and/or vehicle device 2703A may further be configured to send the stopping location of vehicle 2702A and the indicator of whether one or more other vehicles are in front of vehicle 2702A to server 2701 for use in updating a road navigation model.

In some embodiments, vehicle 2702 and/or vehicle device 2703 may be configured to receive an updated road navigation model and cause vehicle 2702 to perform at least one navigational action based on the updated road navigation model. For example, vehicle 2702B and/or vehicle device 2703B may be configured to receive, from a camera of vehicle 2702B, one or more images captured from an environment of vehicle 2702B. Vehicle 2702B and/or vehicle device 2703B may also be configured to detect an indicator of an intersection in an environment of vehicle 2702B. Vehicle 2702B and/or vehicle device 2703B may further be configured to receive map information including a stop line location relative to the intersection from server 2701. Vehicle 2702B and/or vehicle device 2703B may also be configured to plan a routing path and/or navigate vehicle 2702B according to the map information. For example, vehicle 2702B and/or vehicle device 2703B may be configured to take the stop line location account when planning a route to a destination (e.g., adding the stop time into the estimated arrival time if passing the intersection, selecting a different route by not to pass the intersection, etc.). As another example, vehicle 2702B and/or vehicle device 2703B may be configured to take the stop line location into account as part of long-term planning well ahead of approaching the stop line location. For example, vehicle 2702B and/or vehicle device 2703B may be configured to deaccelerate the vehicle when the vehicle reaches within a predetermined distance from the stop line location. Alternatively or additionally, vehicle 2702B and/or vehicle device 2703B may be configured to brake and stop vehicle 2702B before reaching the stop line location.

In some embodiments, vehicle 2702 may include a device having a similar configuration and/or performing similar functions as system 100 described above. Alternatively or additionally, vehicle device 2703 may have a similar configuration and/or performing similar functions as system 100 described above.

Database 2704 may include a map database configured to store map data for the components of system 2700 (e.g., server 2701, vehicle 2702, and/or vehicle device 2703). In some embodiments, server 2701, vehicle 2702, and/or vehicle device 2703 may be configured to access database 2704, and obtain data stored from and/or upload data to database 2704 via network 2705. For example, server 2701 may transmit data relating to one or more road navigation models to database 2704 for storage. Vehicle 2702 and/or vehicle device 2703 may download a road navigation model from database 2704. In some embodiments, database 2704 may include data relating to the position, in a reference coordinate system, of various items, including roads, water features, geographic features, businesses, points of interest, restaurants, gas stations, or the like, or a combination thereof. In some embodiments, database 2704 may include a database similar to map database 160 described elsewhere in this disclosure.

Network 2705 may be any type of network (including infrastructure) that provides communications, exchanges information, and/or facilitates the exchange of information between the components of system 2700. For example, network 2705 may include or be part of the Internet, a Local Area Network, wireless network (e.g., a Wi-Fi/302.11 network), or other suitable connections. In other embodiments, one or more components of system 2700 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

Figure 28:
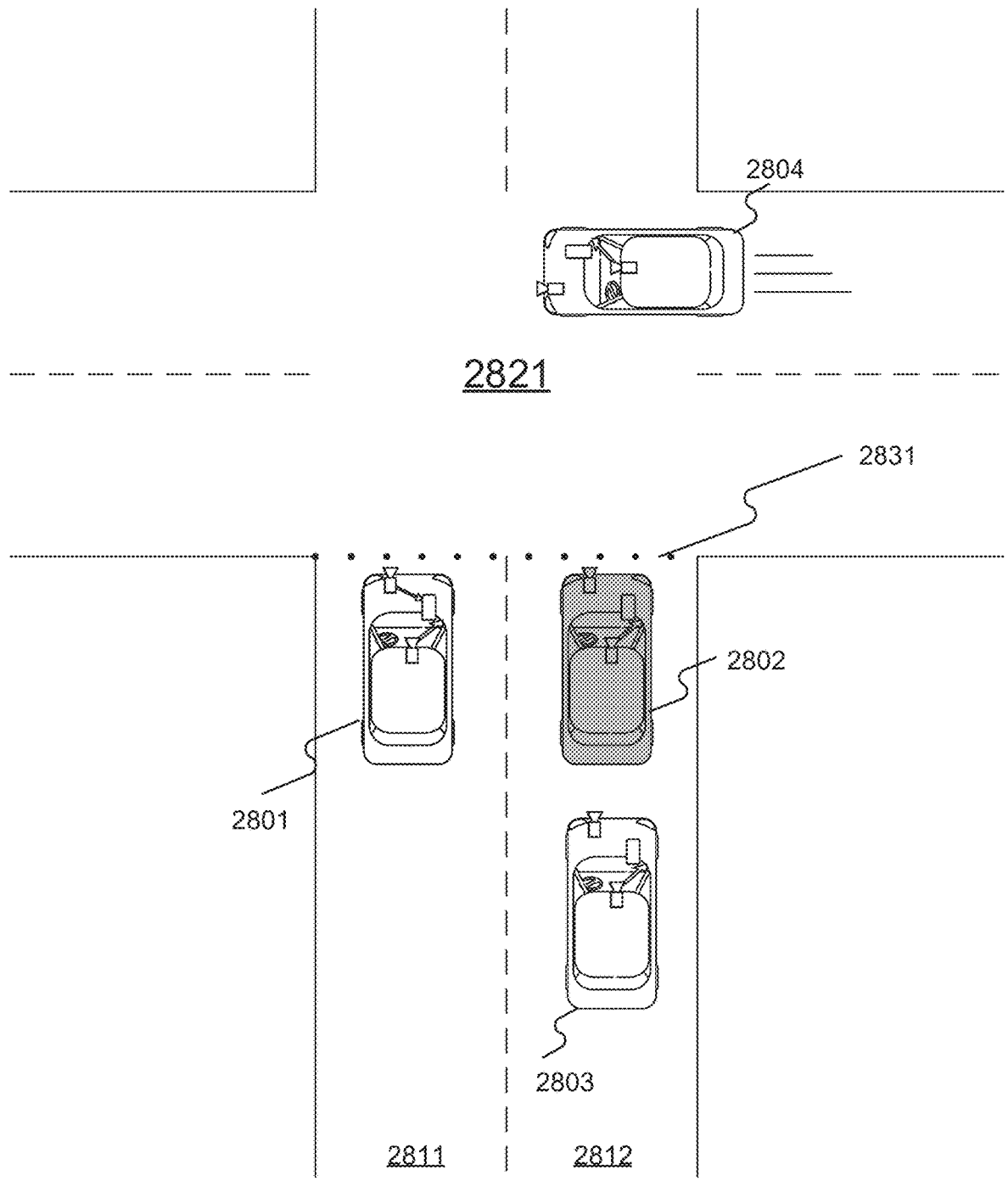
FIG. 28 is a schematic illustration of exemplary vehicles at an intersection consistent with the disclosed embodiments.

FIG. 28 is a schematic illustration of exemplary vehicles at an intersection consistent with the disclosed embodiments. As illustrated in FIG. 28, a vehicle 2801 may drive in lane 2811, a vehicle 2802 and a vehicle 2803 may drive in lane 2812. Vehicle 2801, vehicle 2802, and/or vehicle 2803 may include one more cameras configured to capture one or more images from the environment and may include one or more devices (e.g., vehicle device 2703) configured to detect an indicator of intersection 2821 based on the analysis of the one or more images. An indicator of an intersection may include one or more road markings, one or more traffic lights, one or more stop signs, one or more crosswalks, one or more vehicles crossing in front of the host vehicle, one or more vehicles stopping at a location close to the host vehicle (e.g., within a predetermined distance threshold from the host vehicle), or the like, or a combination thereof. For example, vehicle 2801 may be configured to analyze the one or more images and detect a traffic light in the forward direction in at least one of the one or more images. As another example, vehicle 2802 (similar to vehicle 2702) may analyze the one or more images from the environment of vehicle 2802 and detect vehicle 2804 crossing (in this example, moving from the right to the left) in front of vehicle 2802 based on the image analysis. As another example, vehicle 2803 may analyze the one or more images from the environment of vehicle 2803 and detect a road sign indicating an intersection. For example, vehicle 2803 may analyze the one or more images and detect a stop sign, and based on the facing direction of the stop sign, determine whether the stop sign is indicative of an intersection. As another example, vehicle 2803 may analyze the one or more images and detect a cross walk, and based on an orientation of the cross walk relative to vehicle 2803 (e.g., a cross walk spanning a lane ahead of vehicle 2803 may indicate an intersection is near), determine whether the cross walk is indicative of an intersection.

Vehicle 2801, vehicle 2802, and/or vehicle 2803 may also be configured to determine, based on output received from at least one sensor of the host vehicle, a stopping location of the host vehicle relative to the detected intersection. For example, vehicle 2801 may receive a signal output from a sensor (e.g., a GPS device, a speed sensor, an accelerometer, a suspension sensor, or the like, or a combination thereof) and determine that vehicle 2801 stops at a location relative to intersection 2821. The position of vehicle 2801 may be determined based on GPS information, map information, such as using the mapping techniques described elsewhere in this disclosure, or a combination thereof). Vehicle 2801, vehicle 2802, and/or vehicle 2803 may further be configured to analyze the one or more images to determine an indicator of whether one or more other vehicles are in front of the host vehicle. For example, vehicle 2801 and vehicle 2802 may determine that no vehicles are in front of them based on the image analysis. As another example, vehicle 2803 may determine that there is one or more vehicles in front of it. By way of example, vehicle 2803 may determine that there is a vehicle that is in front of it along the same path where the host vehicle travels (e.g., vehicle 2802) and/or there is a vehicle that is in front of it along a path parallel to or a path sharing the same virtual stop line in the path where the host vehicle is traveling (e.g., vehicle 2801). In instances when or more other vehicles are in front of a host vehicle, it may be appropriate to conclude that the host vehicle is not located a stop line location. Similarly, in instances when a host vehicle is stopped and no other vehicles are located in front of host vehicle (or no other vehicles are located within a predetermined threshold distance in front of the host vehicle), it may be appropriate to conclude that the host vehicle is located at a stop line location. Vehicle 2801, vehicle 2802, and/or vehicle 2803 may also be configured to transmit drive information relating to their stopping locations and intersection 2821 to server 2701. For example, a host vehicle may transmit a stopping location of the host vehicle and an indicator of whether one or more other vehicles are in front of the host vehicle. The indicator of whether one or more other vehicles are in front of the host vehicle may include any appropriate information, such as any identifier (e.g., an alphanumeric identifier). In some embodiments, the indicator of whether one or more other vehicles are in front of the host vehicle may include an image and/or a portion of an image. Server 2701 may be configured to determine a stop line location (e.g., represented by dotted line 2831) based on the drive information received from the vehicles (and/or other vehicles) and update a road navigation model to include the stop line location.

FIG. 29A is a flowchart showing an exemplary process 2910 for vehicle navigation, consistent with the disclosed embodiments. One or more steps of process 2910 may be performed by a vehicle (e.g., vehicle 2702), a device associated with the host vehicle (e.g., vehicle device 2703), and/or a server (e.g., server 2701). While the descriptions of process 2910 provided below use vehicle 2702 as an example, one skilled in the art would appreciate that one or more steps of process 2910 may be performed by a vehicle device (e.g., vehicle device 2703) and/or a server (e.g., server 2701).

At step 2911, vehicle 2702 may be configured to receive one or more images captured from an environment of the host vehicle. For example, a camera associated with vehicle 2702 (e.g., a camera or image capture device of image acquisition device 120) may capture one or more images of an environment of the vehicle, as described elsewhere in this disclosure. Vehicle 2702 may receive the one or more images from the image capture device. In some embodiments, the camera may capture one or more images continuously, and vehicle 2702 may receive the images continuously or intermittently. For example, the camera may capture one or more images from the environment of vehicle 2702 prior to the host vehicle reaching a stopping location. As another example, the camera may capture one or more images during a predetermined time threshold prior to the host vehicle reaching a stopping location. Alternatively, or additionally, the camera may capture one or more images starting at a certain distance from the stopping location. Alternatively or additionally, the camera may capture one or more images upon or after a trigger event. For example, vehicle 2702 may detect that vehicle 2702 stops (e.g., at a stopping location) based on a signal from a sensor (e.g., a global positioning system (GPS) device, a speed sensor, an accelerometer, a suspension sensor, or the like, or a combination thereof). Vehicle 2702 may instruct the camera to capture one or more images of the environment of vehicle 2702. The camera may capture one or more images while the host vehicle is stopped at a stopping location. Alternatively or additionally, the camera may capture one or more images after the host vehicle reaches a stopping location. The capture of the images related to the stopping location may be associated with other factors such as the vehicle speed and/or ambient conditions (light level, precipitation, etc.). Thus, for example, if the vehicle is traveling at a relatively high rate of speed when the capture of images begins, the vehicle may further away from the stopping location compared to a similar scenario in which the vehicle is traveling more slowly.

At step 2912, vehicle 2702 may be configured to analyze the one or more images to detect an indicator of an intersection. An indicator of an intersection may include one or more road markings, one or more traffic lights, one or more stop signs, one or more cross walks, one or more vehicles crossing in front of the host vehicle, one or more vehicles stopping at a location close to the host vehicle, or the like, or a combination thereof. For example, vehicle 2702 may be configured to analyze the one or more images and detect a traffic light in the forward direction in at least one of the one or more images. As another example, vehicle 2702 may be configured to detect a road marking, such as a lane marking, a turn lane marking, etc., in at least one of the one or more images. By way of example, as illustrated in FIG. 28, vehicle 2802 (similar to vehicle 2702) may analyze the one or more images from the environment of vehicle 2802 and detect vehicle 2804 crossing (moving from the right to the left) in front of vehicle 2802 based on the image analysis. As another example, vehicle 2801 (similar to vehicle 2702) may analyze the one or more images from the environment of vehicle 2801 and detect vehicle 2802 stopping in a lane parallel to the land where vehicle 2802 drives based on the image analysis. In some embodiments, a surface of the road segment corresponding to the stop location is free of markings designating where vehicles should stop relative to the intersection. For example, lane 2811 may have no markings designating where vehicles should stop relative to intersection 2821. By way of example, a surface of the road segment in a lane forward of the host vehicle may not include a marking indicating a stop line.

Alternatively or additionally, vehicle 2702 may be configured to receive information distinguishing an intersection from another vehicle or an infrastructure object. By way of example, as illustrated in FIG. 28, vehicle 2803 may receive a signal (or message) distinguishing intersection 2821 from vehicle 2801 and/or vehicle 2802. Alternatively or additionally, vehicle 2803 may receive a signal (or message) distinguishing intersection 2821 from a signal post (not shown).

In some embodiments, alternatively or additionally, vehicle 2702 may transmit the one or more images to server 2701, which may be configured to analyze the one or more images to detect an indicator of an intersection.

In some embodiments, vehicle 2702 and/or server 2701 may use a machine learning algorithm to analyze the one or more images and detect an indicator of an intersection. For example, vehicle 2702 may obtain or use a trained machine learning algorithm for detecting an indicator of an intersection. In some embodiments, the machine learning algorithm may be trained based on a supervised training process. For example, the machine learning algorithm may be trained using a large number of training samples in which one or more stopping locations are labeled (manually or automatically by a computer) in a paired image. Vehicle 2702 may also input the one or more images into the machine learning algorithm, which may output an indicator of an intersection based on the input.

At step 2913, vehicle 2702 may be configured to determine, based on output received from at least one sensor of the host vehicle, a stopping location of the host vehicle relative to the detected intersection. For example, vehicle 2702 may receive a signal output from a sensor (e.g., a GPS device, a speed sensor, an accelerometer, a suspension sensor, or the like, or a combination thereof) and determine that vehicle 2702 stops at a location relative to the detected intersection. Vehicle 2702 may also be configured to determine the stop location at which vehicle 2702 stops. By way of example, as illustrated in FIG. 28, vehicle 2801 may receive a signal from a GPS sensor and determine that the vehicle stops at a location close to intersection 2821. Vehicle 2801 may also be configured to determine the stopping location of vehicle 2801 (e.g., GPS coordinates of the stopping location). As another example, as illustrated in FIG. 28, vehicles 2802 and 2803 may stop in lane 2812. Vehicle 2802 may determine the stopping location of vehicle 2802 in relative to intersection 2821 based on output received from at least one sensor of vehicle 2802, and vehicle 2803 may determine the stopping location of vehicle 2803 in relative to intersection 2821 based on output received from at least one sensor of vehicle 2803.

At step 2914, vehicle 2702 may be configured to analyze the one or more images to determine an indicator of whether one or more other vehicles are in front of the host vehicle. For example, vehicle 2702 may be configured to analyze the one or more images to determine an indicator indicating whether there is one or more vehicles within a predetermined threshold distance in front of the host vehicle. By way of example, as illustrated in FIG. 28, vehicle 2801 may analyze one or more images to determine an indicator indicating that no vehicles are within a predetermined threshold (e.g., 2 meters) distance in front of vehicle 2801. Vehicle 2802 may analyze one or more images to determine an indicator indicating that no vehicles are within a predetermined threshold (e.g., 2 meters) distance in front of vehicle 2802, while vehicle 2803 may analyze one or more images to determine an indicator indicating that there is another vehicle (i.e., vehicle 2802) within a predetermined threshold (e.g., 2 meters) distance in front of vehicle 2803. The threshold distance may be in the range of 10 centimeters to 10 meters. In some embodiments, the threshold distance may be restricted into subranges of 10 to 50 centimeters, 50 centimeters to 1 meter, 1 to 2 meters, 2 to 5 meters, and 5 to 10 meters.

In some embodiments, alternatively or additionally, vehicle 2702 may be configured to determine an indicator of whether one or more other vehicles are in front of the host vehicle based on information received from another vehicle, an infrastructure object, and/or server 2701. By way of example, as illustrated in FIG. 28, vehicle 2803 may receive a signal (or message) from vehicle 2801 (and/or vehicle 2802) indicating that another vehicle (vehicle 2801 and/or vehicle 2802) is in front of it. Alternatively or additionally, vehicle 2803 may receive a signal (or message) from a signal post indicating that indicating that another vehicle (vehicle 2801 and/or vehicle 2802) is in front of it. Alternatively or additionally, vehicle 2803 may receive a signal (or message) from server 2701 indicating that indicating that another vehicle (vehicle 2801 and/or vehicle 2802) is in front of it. In any of these examples, the signal (or message) may also include a position of a vehicle in front of the host vehicle. For example, the position information may include map information relative to a coordinate system for identifying a location of the leading vehicle relative to the host vehicle.

In some embodiments, vehicle 2702 and/or server 2701 may use a machine learning algorithm to determine an indicator of whether one or more other vehicles are in front of the host vehicle. For example, vehicle 2702 may obtain or use a trained machine learning algorithm for determining an indicator of whether one or more other vehicles are in a front area of the vehicle and possibly also whether such vehicles are in front of the host vehicle, e.g., within the same lane as the vehicle. Vehicle 2702 may also input the one or more images into the machine learning algorithm, which may output an indicator of whether one or more other vehicles are in front of the host vehicle based on the input.

At step 2915, vehicle 2702 may be configured to send the stopping location of the host vehicle to a server. Optionally, vehicle 2702 may also be configured to send the indicator of whether one or more other vehicles are in front of the host vehicle to the server. For example, vehicle 2702 may transmit the stopping location of vehicle 2702 and the indicator of whether one or more other vehicles are in front of vehicle 2702 to server 2701 for use in updating a road navigation model via network 2705. By way of example, as illustrated in FIG. 28, vehicle 2801 may transmit data indicating the stopping location of vehicle 2801 (e.g., GPS coordinates) and an indicator that no vehicles are in front of vehicle 2801 to server 2701 via network 2705. As another example, vehicle 2803 may transmit data indicating the stopping location of vehicle 2803 (e.g., GPS coordinates) and an indicator that there are one or more vehicles in front of vehicle 2803 to server 2701 via network 2705.

In some embodiments, vehicle 2702 may also transmit location information relating to the intersection to server 2701. For example, vehicle 2702 may also transmit to server 2701 location information relating to the intersection, such as the GPS coordinates of the intersection, the size of the intersection, the boundaries of the intersection, the shape or structure of the intersection, lane information relating to the intersection (e.g., driving direction, the number of the lanes crossing the interaction), one or more landmarks in and/or around the intersection, one or more infrastructure objects in and/or around the intersection, or the like, or a combination thereof.

In some embodiments, vehicle 2702 may transmit the stopping location of vehicle 2702 to server 2701 when the number of vehicles that are in front it is equal to or less than a threshold number. For example, vehicle 2702 may transmit the stopping location of vehicle 2702 to server 2701 only when there are two or fewer vehicles in front of it. As another example, vehicle 2702 may transmit the stopping location of vehicle 2702 to server 2701 only when there is no vehicle in front of vehicle 2702.

In some embodiments, vehicle 2702 may be configured to transmit the stopping location of vehicle 2702 to server 2701 when no vehicles are in front of the host vehicle. For example, vehicle 2702 may determine that no vehicles are in front of the host vehicle based on the analysis of the one or more images (as described elsewhere in this disclosure). Vehicle 2702 may also transmit the stopping location of the host vehicle to the server in response to the determination that no vehicles are in front of the host vehicle. In some embodiments, vehicle 2702 may transmit the stopping location of the host vehicle to the server only when no vehicles are in front of the host vehicle.

FIG. 29B is a flowchart showing an exemplary process 2920 for updating a road navigation model, consistent with the disclosed embodiments. One or more steps of process 2920 may be performed by a vehicle (e.g., vehicle 2702), a device associated with the host vehicle (e.g., vehicle device 2703), and/or a server (e.g., server 2701). While the descriptions of process 2910 provided below use server 2701 as an example, one skilled in the art would appreciate that one or more steps of process 2920 may be performed by a vehicle and/or a vehicle device.

At step 2921, server 2701 may be configured to receive drive information from each of a plurality of vehicles. The drive information may include a stopping location at which a particular vehicle from among the plurality of vehicles stopped relative to an intersection during a drive along the road segment. For example, server 2701 may be configured to receive driving information from vehicle 2801, vehicle 2802, and vehicle 2803, which may include the stopping location of each of the vehicles relative to intersection 2821 (as illustrated in FIG. 28 and described elsewhere in this disclosure) during the drive along the corresponding road segment (e.g., lane 2811 for vehicle 2801, lane 2812 for vehicle 2802 and vehicle 2803). In some embodiments, a surface of the road segment corresponding to the stop location is free of markings designating where vehicles should stop relative to the intersection. For example, lane 2811 may have no markings designating where vehicles should stop relative to intersection 2821.

In some embodiments, the drive information received from a vehicle may also include an indicator indicating whether at least one other vehicle resided between the intersection and the stopping location of the vehicle. Alternatively or additionally, the drive information received from a vehicle may include one or more images relating to the stopping location of the vehicle and/or the intersection. Alternatively or additionally, the drive information may include location information relating to the intersection. For example, the drive information received from a vehicle may include the location information of the intersection such as the GPS coordinates of the intersection, the size of the intersection, the boundaries of the intersection, the shape of the intersection, or the like, or a combination thereof.

At step 2922, server 2701 may be configured to aggregate the stopping locations in the drive information received from the plurality of vehicles. In some embodiments, aggregating the stopping locations may include computing an average of the stopping locations. For example, server 2701 may be configured to aggregate the stopping locations of vehicle 2801, vehicle 2802, and/or vehicle 2803 (and/or the stopping locations of other vehicles) in relative to intersection 2821. As another example, server 2701 may aggregate the stopping location of a first vehicle along a road segment at an intersection at a first time and the stopping locations of a second vehicle along the same road segment at the same intersection at a second time (and/or the stopping locations of other vehicles).

In some embodiments, in aggregating the stopping locations, server 2701 may be configured to eliminate at least one stopping location received from one of the plurality of vehicles based on a determination that the at least one stopping location is greater than a predetermined threshold distance away from at least one other stopping location received from another of the plurality of vehicles. For example, server 2701 may determine that the stopping location of vehicle 2803 is greater than a predetermined threshold (e.g., 2 meters) distance away from the stopping location of vehicle 2801 and/or the stopping location of vehicle 2802. Server 2701 may also eliminate the stopping location of vehicle 2803 based on the determination. The threshold distance may be in the range of 10 centimeters to 10 meters. In some embodiments, the threshold distance may be restricted into subranges of 10 to 50 centimeters, 50 centimeters to 1 meter, 1 to 2 meters, 2 to 5 meters, and 5 to 10 meters.

Alternatively or additionally, in aggregating the stopping locations, server 2701 may be configured to eliminate a particular stopping location received from a particular one of the plurality of vehicles based on an indicator that at least one other vehicle resided between the intersection and the particular stopping location of the particular one of the plurality of vehicles. For example, server 2701 may determine an indicator indicating that vehicle 2802 resided between intersection 2821 and the stopping location of vehicle 2803. Server 2701 may also eliminate the stopping location received from vehicle 2803 when aggregating the stopping locations received from the vehicles. In some embodiments, an indicator indicating whether at least one other vehicle resided between the intersection and the particular stopping location of the particular one of the plurality of vehicles may be included in the drive information received from the particular vehicle. Alternatively or additionally, the indicator may be determined based on analysis of at least one image captured by a camera on board the particular one of the plurality of vehicles. For example, server 2701 may be configured to receive one or more images captured by a camera associated with vehicle 2803 and determine that there is a vehicle (e.g., vehicle 2802) resided between intersection 2821 and the stopping location of vehicle 2803 as illustrated in FIG. 28.

At step 2923, server 2701 may be configured to determine, based on the aggregated stopping locations, a stop line location relative to the intersection. For example, as illustrated in FIG. 28 server 2701 may be configured to determine a stop line location (e.g., represented by dotted line 2831 or a part thereof) relative to intersection 2821 based on the aggregated stopping locations including at least one of the stopping locations of vehicle 2801 and vehicle 2802. By way of example, server 2701 may be configured to determine a stop line location by averaging (or by computing a weighted average of) the distances of the stopping location of vehicle 2801 relative to intersection 2821 and the stopping location of vehicle 2802 relative to intersection 2821. In some embodiments, server 2701 may also be configured to take other factors, such as ambient conditions when the images were captured, into account when determining a stop line location. For example, server 2701 may be configured to determine a stop line location by computing a weighted average of the distance of a first stopping location relative to the intersection determined based on a first image and the distance of a second stopping location relative to the intersection determined based on a second image by giving more weight to the first stopping location if the ambient condition when the first image was capture is more optimal than the second image (e.g., the first image is brighter than the second image).

In some embodiments, server 2701 may also determine location information of the stop line location (e.g., GPS coordinates associated with the stop line location, position of the stop line location relative to one or more known references, such as lane markings, road signs, highway exit ramps, traffic lights, and any other feature, etc.). In some embodiments, server 2701 may also determine location information relating to the intersection such as the GPS coordinates of the intersection, the size of the intersection, the boundaries of the intersection, the shape and/or structure of the intersection, lane information relating to the intersection (e.g., driving direction, the number of the lanes crossing the interaction), one or more landmarks in and/or around the intersection, one or more infrastructure objects in and/or around the intersection, or the like, or a combination thereof.

In some embodiments, server 2701 may determine a confidence score for each of the determined stopping locations relative to the intersection based on the images received from the vehicles. For example, server 2701 may assign a first confidence score for a first stopping location determined based on the first image received from the first vehicle. Server 2701 may also assign a second confidence score for a second stopping location determined based on the second image received from the second vehicle. To determine a final stop location in relative to the intersection, server 2701 may be configured to take the confidence scores into account. For example, server 2701 may be configured to compute a weighted average based on the first and second stopping locations by giving more weight to the first stopping location than the second stopping location if the first confidence score is higher than the second confidence score.

At step 2924, server 2701 may be configured to update the road navigation model to include the stop line location. For example, server 2701 may be configured to add the stop line location into a navigation map (i.e., a road navigation model or part thereof). In some embodiments, server 2701 may also include information relating to the intersection into the road navigation model. In some embodiments, server 2701 may add descriptions of the stop line location and/or the intersection into the road navigation model. Alternatively or additionally, server 2701 may update navigation instructions according to the stop line location. For example, server 2701 may update the navigation instruction relating to the intersection to instruct a vehicle to stop at the stop line location and/or slow down when approaching the stop line or the intersection.

In some embodiments, server 2701 may be configured to distribute the updated road navigation model to at least one vehicle. For example, server 2701 may be configured to transmit the updated road navigation model to a plurality of vehicles via network 2705. Alternatively or additionally, server 2701 may store the updated road navigation model into database 2704, and one or more vehicles may obtain the updated road navigation model from database 2704.

Figure 29C:
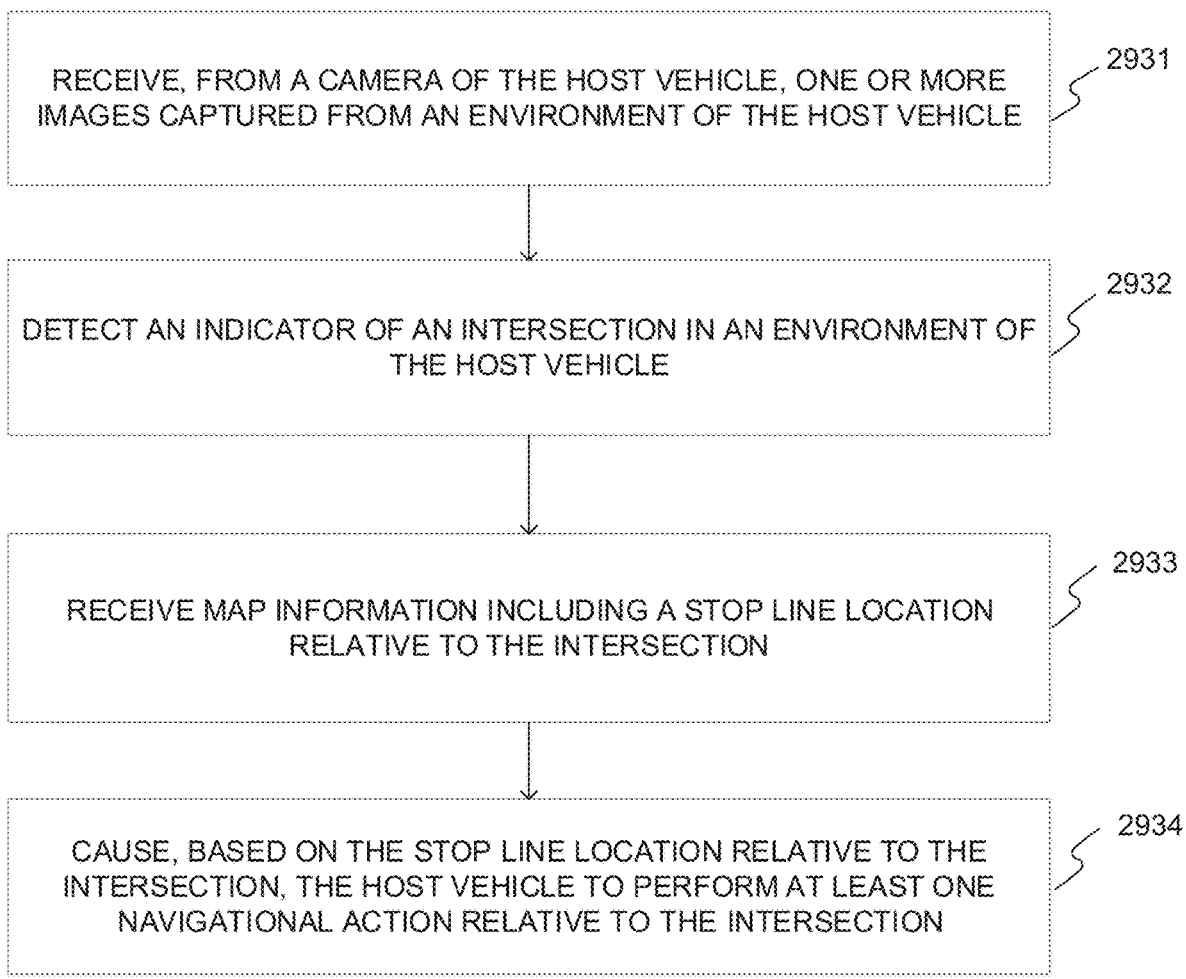
FIG. 29C is a flowchart showing an exemplary process for vehicle navigation, consistent with the disclosed embodiments.

FIG. 29C is a flowchart showing an exemplary process for vehicle navigation, consistent with the disclosed embodiments. One or more steps of process 2930 may be performed by a vehicle (e.g., vehicle 2702), a device associated with the host vehicle (e.g., vehicle device 2703), and/or a server (e.g., server 2701). While the descriptions of process 2930 provided below use vehicle 2702 as an example, one skilled in the art would appreciate that one or more steps of process 2930 may be performed by a vehicle device and/or a server.

At step 2931, vehicle 2702 may be configured to receive, from a camera of the host vehicle, one or more images captured from an environment of the host vehicle (as described elsewhere in this disclosure).

At step 2932, vehicle device 2703 may be configured to detect an indicator of an intersection in an environment of the host vehicle (as described elsewhere in this disclosure). In some embodiments, a surface of road segment in a lane forward of the host vehicle includes no markings indicating a location for stopping.

At step 2933, vehicle device 2703 may be configured to receive map information including a stop line location relative to the intersection. For example, vehicle device 2703 may receive map information including a stop line location (e.g., dotted line 2831 illustrated in FIG. 28) from server 2701. In some embodiments, vehicle 2702 may receive the map information before it approaches the intersection. For example, vehicle 2702 may receive the map information after server 2701 updates the map information relating to the intersection (e.g., as part of regular updates of the road navigation model).

At step 2934, vehicle 2702 may be configured to cause, based on the stop line location relative to the intersection, the host vehicle to perform at least one navigational action relative to the intersection. For example, vehicle 2702 may cause vehicle 2702 to brake and stop vehicle 2702 before reaching dotted line 2831 illustrated in FIG. 28. Alternatively or additionally, vehicle 2702 may cause vehicle 2702 to slow down when approaching the intersection (e.g., within a predetermined distance from the stop line location).

Relevant Traffic Light Mapping and Navigation

The present disclosure describes a navigation system for an autonomous vehicle that may be configured to identify traffic lights along a roadway traveled by an autonomous vehicle. The navigation system may be configured to receive information from the autonomous vehicles about locations of various traffic lights along the roadway, map the locations of the traffic map on a sparse map available to the navigation system and to the autonomous vehicles, and receive from the autonomous vehicles various information related to the traffic lights, as well as information related to the autonomous vehicle navigation. For example, when an autonomous vehicle approaches a traffic light that has a green light, and proceeds to travel along a roadway, the system may be configured to receive the information about the state of the traffic light (e.g., the traffic light has a green light) as well as the information that the autonomous vehicle has continued to travel along the roadway. Using the received information, the system may determine the relevancy of the traffic light to a lane traveled by the autonomous vehicle.

In various embodiments, the navigation system includes functionality for mapping traffic lights and for determining traffic light relevancy for use in autonomous vehicle navigation. Furthermore, the navigation system may be used to provide autonomous vehicle navigation. The navigation system may be part of server 1230, or/and may be part of a vehicle control system associated with an autonomous vehicle. In some embodiments, the navigation system may include a first navigation system that may be associated with an autonomous vehicle (also referred to as a vehicle navigation system), and a second navigation system that may be associated with server 1230 (also referred to as a server navigation system). The navigation system may include non-transitory storage devices or computer-readable media. In some embodiments, the storage devices may include hard drives, compact discs, flash memory, magnetic-based memory devices, optical based memory devices, and the like. The navigation system may include one or more processors configured to perform instructions that may be stored on one or more non-transitory storage devices associated with the navigation system. In some embodiments, the navigation system may include a separate mapping system and a separate navigation system.

A navigational action may be executed by a vehicle relating to vehicle navigation. For example, navigational actions are actions that are related to vehicle motion, such as steering, braking, or acceleration of the vehicle. In various embodiments, the navigational action may include parameters such as rate of steering, rate of braking or rate of acceleration. In various embodiments, navigational action may include actions that may not be directly related to the motion of a vehicle. For example, such navigational actions may include turning on/off headlights, engaging/disengaging antilock brakes, switching transmission gears, adjusting parameters of a vehicle suspension, turning on/off vehicle warning lights, turning on/off vehicle turning lights or brake lights, producing audible signals and the like. In various embodiments, navigational actions are based on navigational data available to server 1230.

The navigational data available to server 1230 may include any suitable data available for server 1230 that may be used to facilitate navigation of various vehicles communicating with server 1230. Examples of navigational data may include the position of various autonomous and human-operated vehicles that are in communication with server 1230, velocities of the various vehicles, accelerations of the various vehicles, destinations for the various vehicles, and the like.

It should be noted that navigational actions involve any suitable actions that change navigational information of a vehicle. In an example embodiment, change of vehicle's velocity may constitute a navigational action, as it changes the navigational information for the vehicle. The navigational information may describe dynamic or kinematic characteristics of the vehicle, and may include a position of the vehicle, a distance between the vehicle and the traffic light, a velocity of the vehicle, a speed of the vehicle, an acceleration of the vehicle, an orientation of the vehicle, an angular velocity of the vehicle, and an angular acceleration of the vehicle, as well as forces acting on the vehicle. The navigational information may be recorded by the vehicle control system. For example, a position of the vehicle may be continuously recorded to provide indicators for a path traveled by the vehicle along a road segment. For instance, the indicators of the path may be a trajectory for the vehicle. In some cases, the trajectory for the vehicle may indicate a stopping location for the vehicle along the road segment.

The navigational information may also include parameters related to vehicle characteristics, such as a mass of the vehicle, a moment of inertia of the vehicle, a length of the vehicle, a width of the vehicle, a height of the vehicle, vehicle traction with a roadway, and the like.

In various embodiments, the navigation system may receive from an autonomous vehicle at least one location identifier associated with a traffic light detected along a road segment. The term "location identifier" may be any suitable identifier (e.g., a numerical identifier, an alphanumerical identifier, a set of numbers such as coordinates of the traffic light and the like) associated with a traffic light that allows unique identification of a location of the traffic light at least by server 1230. For example, server 1230 may use the location identifier to identify the location of the traffic light on the map. Additionally, or alternatively, the traffic light location identifier may allow unique identification of the traffic light by at least one vehicle in the proximity of the traffic light. For instance, a vehicle may identify the traffic light using the traffic light identifier on a sparse map accessible to the vehicle.

The navigation system may also receive, from an autonomous vehicle, a state identifier associated with the traffic light detected along the road segment. A state identifier for a traffic light may be used to identify a state for a traffic light that can be used on a roadway. For example, the state of the traffic light can be represented by a color of the traffic light (e.g., red, green, yellow, or white), by an image displayed by the traffic light (e.g., green arrow, orange palm, image of a person, and the like), or by words displayed by the traffic light (e.g., speed of a vehicle, indication to slow down, indication of road work, and the like).

In various embodiments, the navigation system may receive from multiple autonomous vehicles various states of the traffic light, when the autonomous vehicles pass through the traffic light at different times throughout the day. In an example embodiment, the information about the state of the traffic light may be collected from an autonomous vehicle at several different locations from the traffic light. For example, the information about the state of the traffic light may first be received from the vehicle at a first distance from the traffic light. The first distance may be, for example, a distance at which the traffic light is first observed by the vehicle control system associated with the autonomous vehicle. The information about the state of the traffic light may then be received for the autonomous vehicle when it is located at a set of locations relative to the traffic light, including a location when the vehicle enters a junction of a roadway related to the traffic light or passes the junction of the roadway. In various embodiments, the autonomous vehicle may collect state information for all the traffic lights of the junction that are observable to the autonomous vehicle as it moves towards, through, or away from the junction. In various embodiments, the navigation system may determine a relationship between the states of all the traffic lights of the junction that are observable to the autonomous vehicle by determining a correlation between all of the collected state-related data (e.g., by determining correlation between one traffic light having a green light state and another traffic light having a red light state).

In some embodiments, traffic lights may include parameters that may not be observable to a human vehicle operator (e.g., human driver), but may be detectable by an autonomous vehicle. For example, a traffic light may communicate with an autonomous vehicle using wireless communication. The wireless communication may include one or more devices configured to exchange transmissions over an air interface to one or more networks (e.g., cellular, the Internet, etc.) using an electromagnetic field at the radio frequency, infrared frequency, or ultraviolet frequency. Additionally, or alternatively, wireless communication may use magnetic fields, electric fields or sound. Such transmissions can include communications between a traffic light and an autonomous vehicle in the proximity of the traffic light, and/or in some cases, such communication may include communication between the traffic light and server 1230 and between server 1230 and an autonomous vehicle. It should be noted, that various other forms of communication between the traffic light and the vehicle may be used that may include audio communication (e.g., communication using soundwaves such as ultrasound, laser-based communications and the like). In some cases, communications may include time-dependent visible communications (e.g., time-dependent signal produced by LED sources).

In various embodiments, a traffic light may include a traffic light communication system for generating a signal to an autonomous vehicle. For example, the traffic light communication system may include a signal generating module for generating a "stop" signal, a "go" signal, a "slowdown" signal, a "speedup" signal and the like. For example, the "stop" signal may indicate that the autonomous vehicle needs to abruptly stop. Such signal, for example, may correspond to a red light. The "go" signal may indicate that the vehicle needs to start or continue moving. Such signal may correspond, for example, to a green light. The "slowdown" signal may indicate that the autonomous vehicle needs to slow down. In some embodiments, the "slowdown" signal may include additional parameters incorporated in information related to the signal that may include the required speed for the vehicle or deceleration of the vehicle. In an example embodiment, the "slowdown" signal may correspond to yellow light. The "speed up" signal may indicate that the autonomous vehicle needs to increase its speed. It should be noted that various signals described above are only illustrative and various other signals may be incorporated as well. For example, generated signals may indicate that the vehicle needs to turn to the right, turn to the left, change lanes, or make a U-turn.

In various embodiments, in addition to generating signals, the traffic light communication system may receive navigational information from various vehicles and generate signals based on the received information. For example, the traffic light communication system may receive vehicle's speed and a distance of the vehicle from the traffic light, and may generate deceleration request for the vehicle based on the vehicle's speed and the distance from the traffic light.

In various embodiments, communication may include various ways to authenticate communication from/to a traffic light as well as to provide secure communication between the traffic light and an autonomous vehicle. Additionally, or alternatively, secure communication may be established between the autonomous vehicle and server 1230. In an example embodiment, secure communication may be established through the use of private and public keys. For example, the autonomous vehicle and server 1230 may exchange the public key for encrypting the secure information and may use private keys for information decryption. Similarly, the autonomous vehicle may exchange public keys with the traffic light communication system. In some embodiments, the traffic light communication system may authenticate through server 1230. For example, the traffic light communication system may provide password information to the server 1230 and server 1230 may issue a secure token to the traffic light communication system. In some embodiment, server 1230 may encrypt the secure token using the public key of the traffic light communication system and transmit the encrypted token to the traffic light communication system. Further server 1230 may be configured to encrypt the secure token using public key associated with an autonomous vehicle and transmit the encrypted token to the autonomous vehicle. In various embodiments, the traffic communication system may include the secure token for a communication data packet transmitted to the autonomous vehicle to provide authentication for the vehicle. Additionally, or alternatively, the traffic communication system may include the secure token for a communication data packet transmitted to server 1230. In a similar way, the autonomous vehicle may include the secure token for a communication data packet transmitted to the traffic light communication system. Additionally, or alternatively, the autonomous vehicle may include the secure token for a communication data packet transmitted to server 1230. It should be noted, that the secure communication process described above is only illustrative, and various other approaches may be used. The authenticated secure communication between various autonomous vehicles, traffic lights, and server 1230 (as well as secure communication among various autonomous vehicles) may ensure that system for navigation of various autonomous vehicles cannot be compromised by a third party (e.g., a party attempting to alter movements of the autonomous vehicles).

Figure 30A:
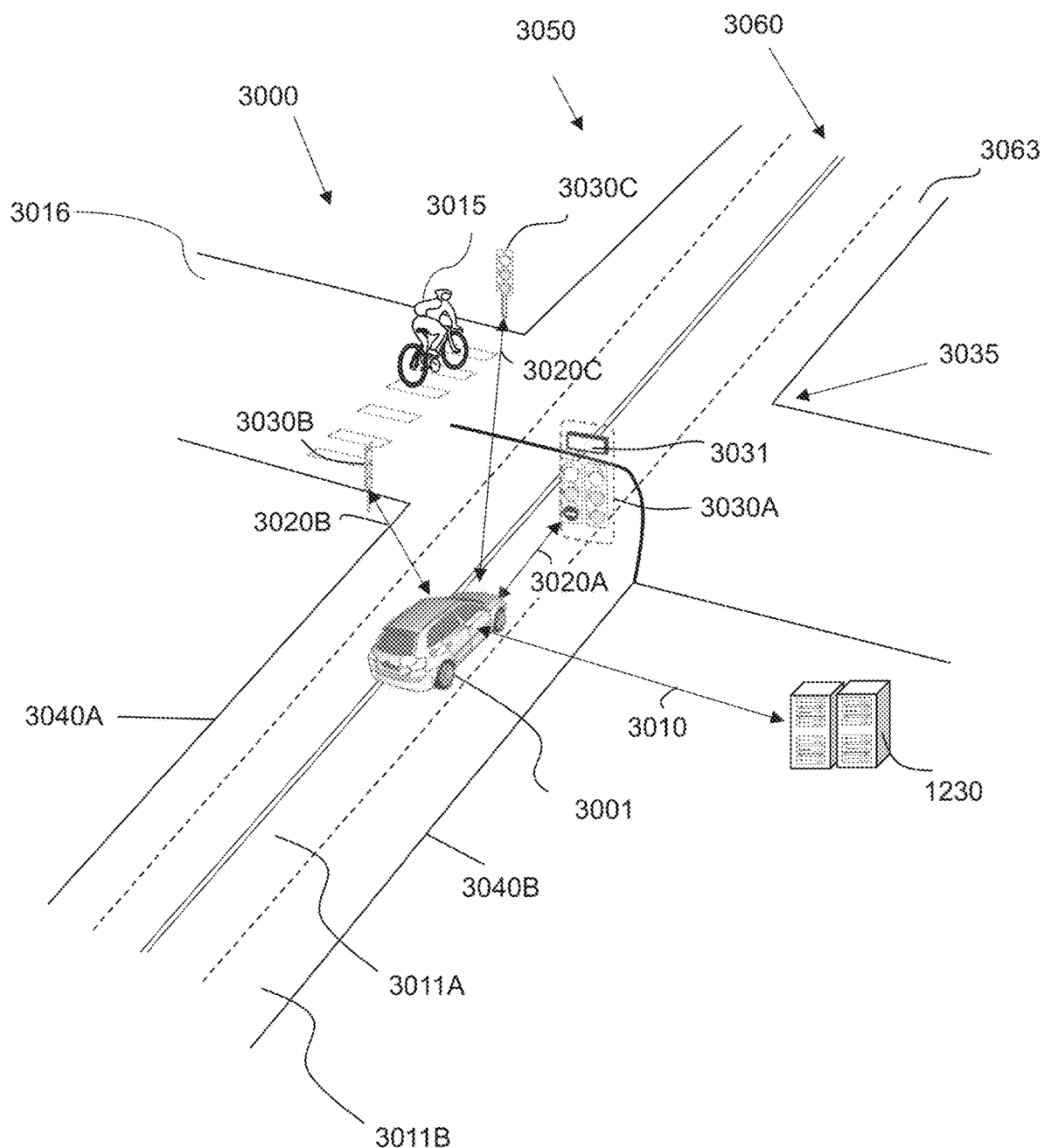
FIG. 30A is a schematic illustration of a roadway including an intersection, consistent with the disclosed embodiments.

FIG. 30A shows a system 3000 that includes server 1230, traffic lights 3030A-3030C, and a vehicle 3001. In some embodiments, vehicle 3010 may be an autonomous vehicle. Vehicle 3001 may be traveling along a lane 3011A of a roadway 3060 that contains an intersection 3035. Vehicle 3001 may detect a traffic light (e.g., traffic light 3030A) and determine a location of traffic light 3030A. In various embodiments, when referring to representative vehicles, vehicle 3001 is used, when referring to a representative lane traveled by vehicle 3001, lane 3011A is used, and when referring to a representative traffic light related to a representative lane, traffic light 3030A is used. FIG. 30A illustrates a set of roads that may be defined as a roadmap 3050 as indicated in FIG. 30A. Roadmap 3050 may include all the lanes/pathways, roadways, driveways, bicycle lanes, pedestrian lanes, sidewalks, etc. in proximity to vehicle 3001 (e.g., a region about vehicle 3001 with a radial distance of ten feet to few miles). A portion of a roadway around vehicle 3001 may be defined as a road segment 3063 indicated in FIG. 30A.

In an example embodiment, vehicle 3001 may determine a location identifier of traffic light 3030A based on the vehicle 3001 location (e.g., obtained via a vehicle's GPS) and/or based on direction to traffic light 3030A as well as the apparent distance to traffic light 3030A (e.g., distance deduced from multiple images captured by camera of vehicle 3001). In some embodiments, distance to a traffic light located to the left or right side of a moving vehicle 3001 may be obtained using triangulation. For example, distance to traffic light 3030B or 3030C may be obtained using triangulation.

Figure 30B:
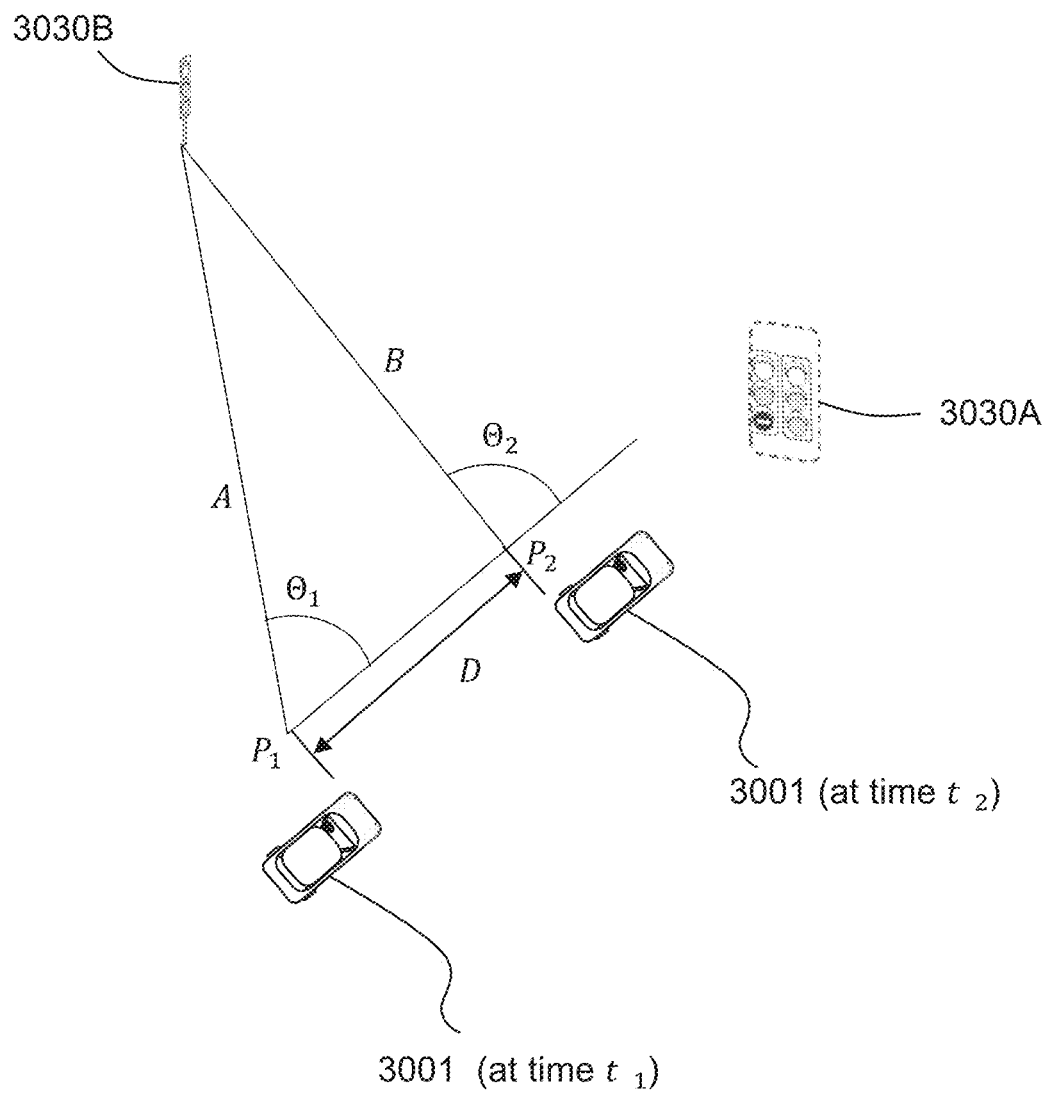
FIG. 30B is a schematic illustration of a triangulation technique for determining a position of a vehicle relative to a traffic light, consistent with the disclosed embodiments.

FIG. 30B shows a triangulation example where vehicle 3001 is traveling from point $P_1$ corresponding to a position of vehicle 3001 at a first time (time $t_1$) to point $P_2$ corresponding to a position of vehicle 3001 at a second time (time $t_2$) through a distance D that can be accurately measured by vehicle 3001. In an example embodiment, vehicle 3001 is traveling towards traffic light 3030A, which may not be used for triangulation, as it may be in a path of vehicle 3001. Vehicle 3001 camera may observe traffic light 3030B and measure angles $\Theta_1$ and $\Theta_2$, as shown in FIG. 30B. Using angles $\Theta_1$ and $\Theta_2$, and distance D, sides A and B may be determined (using, for example, the law of sines) providing the distances A and B, and corresponding directions, characterized by angles $\Theta_1$ and $\Theta_2$, from vehicle 3001 to traffic light 3030B. The distance to traffic light 3030A may then be determined by using a displacement vector (e.g., distance and direction) between traffic light 3030B and 3030A. It should be noted that displacement vector between traffic lights 3030B and 3030A may be known to the navigation system as traffic lights 3030A-3030C may be recognized landmarks on the map related to the roadway traveled by vehicle 3001. It should be noted, that for vehicles with accurate GPS, (e.g., GPS reporting the location of a vehicle with the accuracy of a few feet to a few tens of feet) the triangulation procedure may not be necessary and position of vehicle 3001 may be evaluated using GPS coordinates.

In an example embodiment, the navigation system may be configured to receive a location of vehicle 3001 and determine the one or more recognized landmarks in the vicinity of the location of vehicle 3001, such as traffic lights 3030A-3030C. It should be noted, that the triangulation approach may be one of many approaches used to measure distance and direction to various traffic lights. Additionally, or alternatively, vehicle 3001 may measure distance and direction to a traffic light (e.g., traffic light 3030A) using any other suitable means (e.g., radar, lidar, acoustic sensors, information received from one or more transceivers outside of a vehicle, etc.). In various embodiments, vehicle 3001 may determine locations of various traffic lights such as traffic lights 3030A-3030C, and report location identifiers for these traffic lights to the navigation system. In an example embodiment, vehicle 3001 may be configured to report location identifiers of traffic lights 3030A-3030C to the navigation system. In an example embodiment, location identifiers may be coordinates of traffic lights 3030A-3030C.

Vehicle 3001 may use any suitable means to detect a state of a traffic light (e.g., a state of traffic light 3030A). For example, vehicle 3001 may use a signal detection device for detecting the state of traffic light 3030A. In an example embodiment, the signal detection device may be a camera for capturing visible light. For example, the camera may be used to capture image data for traffic light 3030A. The image data for traffic light 3030A may correspond to a "red light," a "green light," a "yellow light," an "image of a palm," an "arrow indicating a turn," and the like. In some cases, image data may include video data associated with a state of traffic light 3030A. For example, state of traffic light 3030A may be characterized by a video data that may include a "blinking red light," a "blinking yellow light," a "moving/blinking text," and the like. It should be noted, that any other suitable image data may be detected by a camera for capturing visible light.

It should be further noted that, as discussed above, a signal detection device may detect any suitable signal emitted by a traffic light communication system. For example, the signal detection device may detect a radio frequency electric field, an infrared frequency electric field, a time-dependent magnetic field, or any other suitable electric field. It should be noted that various other means of communication between the traffic light and the vehicle may be used. For example, communications means may include audio communication (e.g., communication using soundwaves such as ultrasound), laser-based communications and the like. In some cases, communication signal may include a time-dependent visible communication signal (e.g., a time-dependent signal produced by LED sources). In various embodiments vehicle 3001 may detect the state of traffic lights 3030A-3030C by communicating (e.g., receiving a signal) via communication channels 3020A-3020C. In some embodiments, vehicle 3001 communication with traffic lights 3030A-3030C may include not only receiving signals, but also sending signals to traffic lights 3030A-3030C.

In various embodiments, the navigation system may be configured to receive, from vehicle 3001, a state identifier associated with a traffic light detected along the road segment. For example, such state identifier may be communicated by vehicle 3001 to server 1230 via a connection 3010 as shown in FIG. 30A that may be a wireless connection. In some embodiments, vehicle 3001 may be configured to send to server 1230, image data related to signal from traffic lights 3030A-3030C, and in some embodiments, vehicle 3001 may be configured to analyze image data of traffic lights 3030A-3030C. In some embodiments, vehicle 3001 may be configured to analyze any relevant data communicated to vehicle 3001 from traffic lights 3030A-3030C via communication channels 3020A-3020C using a traffic communication system (e.g., a system 3031 as shown in FIG. 30A) to obtain the state identifier (e.g., a state of a traffic light) associated with the traffic light detected along the road segment. In some embodiments, the vehicle navigation system associated with vehicle 3001 may be configured to receive a state identifier associated with a respective traffic light via traffic communication system 3031.

In various embodiments, the navigation system may be configured to receive, from a vehicle, navigational information indicative of one or more aspects of the motion of the first vehicle along the road segment. In an example embodiment, based on a position of vehicle 3001 or/and other related navigational information (e.g., a prior position of vehicle 3001 and a known time-dependent trajectory of vehicle 3001), the navigation system may determine a lane of travel followed by vehicle 3001 along roadway 3030. In an example embodiment, a processor of the navigation system may be configured to execute instructions to analyze navigational information for vehicle 3001 and determine the lane of travel followed by vehicle 3001.

The navigation system may be configured to determine, based on the navigational information associated with a vehicle, a lane of travel traversed by the vehicle along the road segment. In an example embodiment, vehicle 3001 may report the lane of travel to server 1230 based on the previously determined lane of travel and a set of lane-switching navigational actions executed by a vehicle (e.g., navigational actions that result in vehicle 3001 switching lanes). Additionally, or alternatively, vehicle 3001 may determine the lane of travel (and communicate the lane of travel to server 1230) based on a proximity of a left curbside 3040A and/or a right curbside 3040B, a proximity of a road shoulder feeder lane and the like. Additionally, or alternatively, vehicle 3001 may determine the lane of travel by communicating with neighboring vehicles that may determine their lanes of travel. In some cases, when roadway may not have a well-defined lane of travel, vehicle 3001 may be configured to communicate with server 1230 a distance to the left and/or right curbside/shoulder of the road.

In various embodiments, the navigation system may be configured to, determine, based on navigational information and based on a state identifier received from a vehicle, whether a traffic light is relevant to a lane of travel traversed by the vehicle. For example, if state identifier for a traffic light corresponds to a red light state, and a vehicle stops in front of the traffic light, the navigation system may determine that the traffic light is relevant to the lane traveled by the vehicle. In some embodiments, the navigation system may be configured to receive state identifiers corresponding to the traffic lights as well as navigational information from various autonomous vehicles in order to determine the relevancy of various traffic lights. For instance, a first vehicle may communicate to the navigation system a first state identifier for a traffic light and first navigational information associated with the movement of the first vehicle, and a second vehicle may communicate to the navigation system a second state identifier for the traffic light and a second navigational information associated with the movement of the second vehicle.

In various embodiments, the relevancy of traffic lights 3030A-3030C to lane 3011A may be determined by obtaining a correlation between navigational actions of various vehicles traveled in lane 3011A, and various state identifiers observed for traffic lights 3030A-3030C. Additionally, or alternatively, the navigation system may determine the relevancy for traffic lights 3030A-3030C by determining a direction to traffic lights 3030A-3030C. For example, traffic lights 3030A-3030C may be determined to be in front of vehicle 3001, along a lane followed by vehicle 3001 (e.g., for cases when the lane contains a curve), to the side of vehicle 3001, facing vehicle 3001, sideways to vehicle 3001 and the like. Further, the navigation system may compare images associated with traffic lights 3030A-3030C with images of various traffic lights (e.g., images of traffic lights having a green light, red light, yellow light, etc.) stored in a memory of the navigation system to determine the state of a traffic light 3030A. In various embodiments, a traffic light may be relevant if it is determined by the navigation system that the traffic light is in front of vehicle 3001, and/or along a lane followed by vehicle 3001. It should be noted that such relevancy criteria for a traffic light are illustrative, and other relevancy criteria for the traffic light that utilizes the navigation system may be used, as discussed further.

In various embodiments, the lanes of roadway 3060 such as lanes 3011A and 3011B may be identified by numerical, alphanumerical values or any other suitable identifiers. In an example embodiment, vehicle 3001 may determine the lane identifier by analyzing navigational information of vehicle 3001 using the vehicle control system associated with vehicle 3001. The analysis of navigational information may include evaluating the position of vehicle 3001 and/or distance to a curbside 3040A or 3040B for vehicle 3001. In some embodiments, the lane may have markers related to its identifier positioned along the lane that may be detected and identified by the vehicle control system of vehicle 3001.

In various embodiments, when traffic light 3030A communicates with vehicle 3001 via traffic light communication system 3031, traffic light communication system 3031 may communicate the lane identifier to the navigation system. The navigation system may compare the lane identifier received from traffic light communication system 3031 with the lane identifier obtained by vehicle 3001 using the vehicle control system via analysis of the navigational information. If the lane identifier received from traffic light communication system 3031 matches the lane identifier obtained by vehicle 3001 via analysis of the navigational information, then traffic light 3030A is relevant to the lane traveled by vehicle 3001.

In various embodiments, the relevance of a traffic light to a given lane may be obtained by the navigation system using statistical data. For example, server 1230 may receive from various autonomous vehicles a location identifier associated with a traffic light detected along a road segment, a state identifier associated with the traffic light detected along the road segment and navigational information indicative of one or more aspects of the motion of autonomous vehicles traveling along the road segment. The navigation system may use navigational information associated with autonomous vehicles, to determine a lane of travel followed by the autonomous vehicles along the road segment using any suitable approaches discussed above. For example, the server navigation system may use GPS data for a vehicle or use data obtained by the vehicle control system of the vehicle. The sever navigation system may collect statistical data relating navigational information such as types of motion executed by an autonomous vehicle and the state identifier for the traffic light that is relevant to the lane traveled the autonomous vehicle. In some embodiments, the server navigation system may collect statistical data relating navigational actions for a vehicle and the changes in the state identifier for the traffic light.

In some jurisdictions, a lane assignment may dynamically change at, for example, different times of the day or according to varying congestion levels for lanes traveling through a junction (e.g., lanes traveling into a particular location may experience heavy traffic in the morning, and lanes traveling away from the location may experience heavy traffic in the afternoon). Accordingly, in some embodiments, the system may monitor at, for example, one more junctions with such dynamic traffic light systems or lane assignments to obtain (e.g., through image analysis, a report, information broadcast by a traffic signal, etc.) and record the time of the reported traffic light state and/or the congestion state of a host vehicle's lane of travel and/or a congestion state at other lanes passing through the junction.

As another example, a person, such as a public official (e.g., a policer officer) may direct traffic in lieu of the traffic lights. Traffic may thus travel in contradiction with the signal indicated by the traffic light. In some embodiments, the system can be configured to detect the official directing traffic, e.g., through image analysis. In another example, the official may use an electronic beacon or any other object that may be detected by a sensor onboard the vehicle, indicating that the official is directing traffic in a manner which may contradict a traffic light operating within the junction.

Figure 31A:
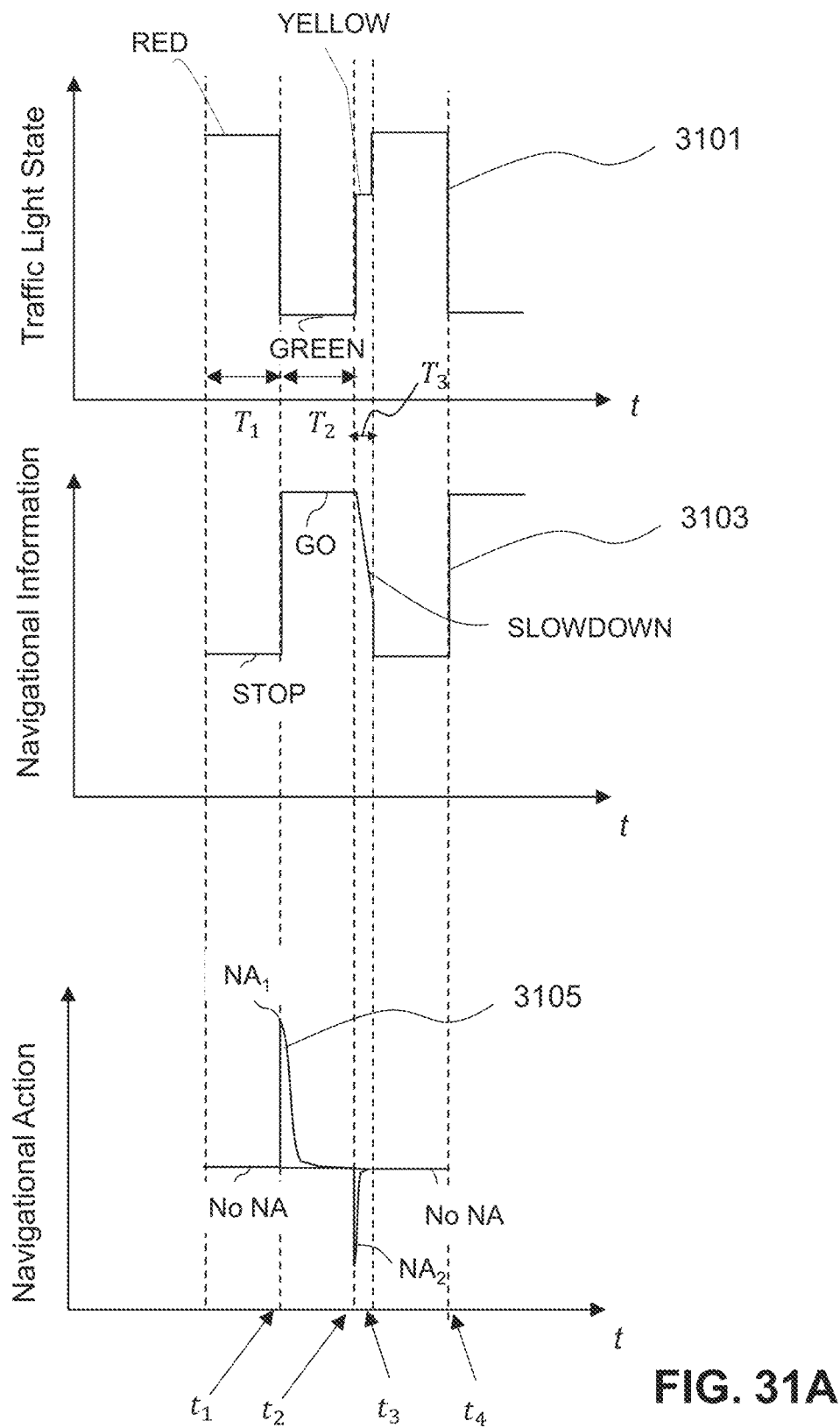
FIGS. 31A and 31B are illustrative graphs of time-dependent variables determining navigation of a vehicle, consistent with the disclosed embodiments.

FIG. 31A illustrates a possible relation between the time-dependent navigational information of an autonomous vehicle (e.g., vehicle 3001) traveling in lane 3011A as shown in FIG. 30A, and time-dependent state identifier for a traffic light (e.g., traffic light 3030A). A graph 3101 shows a time-dependent traffic light state identifier for traffic light 3030A. Traffic light 3030A may be in a first state corresponding to the color red (the color red being the state identifier) observed during a time interval $T_1$. The state identifier for traffic light 3030A may change to a different, second state corresponding to color green observed during a time interval $T_2$, and may change to a third state corresponding to color yellow observed during a time interval $T_3$. It should be noted, that the state identifiers discussed above are only illustrative, and various other state identifiers are possible.

A graph 3103 shows a time-dependent function of navigational information for vehicle 3001 evaluated as a function of time. During the time interval $T_1$, vehicle 3001 may stop (e.g., navigational information may correspond to no observable motion of vehicle 3001, e.g., the navigational information may be characterized by a state "STOP", corresponding, for example, to the time-dependent function of navigational information having a value of zero). During the time interval $T_2$, vehicle 3001 may start and continue motion (e.g., the navigational information may be characterized by a state "GO", corresponding, for example, to the time-dependent function of navigational information having a value of one), and during the time interval $T_3$, vehicle 3001 may slow down to a stop at the completion of the time interval $T_3$ (e.g., the navigational information may be characterized by a state "SLOWDOWN", corresponding, for example, to the time-dependent function of navigational information having a value between one and zero). It should be noted, that a change in some or any of the navigational information, and consecutively, the change in the time-dependent function shown, for example, by graph 3103, corresponds to a navigational action for vehicle 3001. For example, change between state "STOP" to state "GO" constitutes a navigational action.

Graph 3103 indicates that the time-dependent behavior of the time-dependent function of the navigational information for vehicle 3001 directly correlates with the time-dependent behavior of the state identifier for traffic light 3030A as described by graph 3101. While graphs 3101 and 3103 are plotted for vehicle 3001 traveling in lane 3011A, the server navigation system may generate similar graphs for various other vehicles (autonomous or non-autonomous vehicles) traveling in the same or a different lane. If vehicles traveling in lane 3011A exhibit a direct correlation between vehicles' navigational information and state identifiers corresponding to traffic light 3030A, then server navigation system may conclude that traffic light 3030A is relevant to lane 3011A.

Figure 31B:
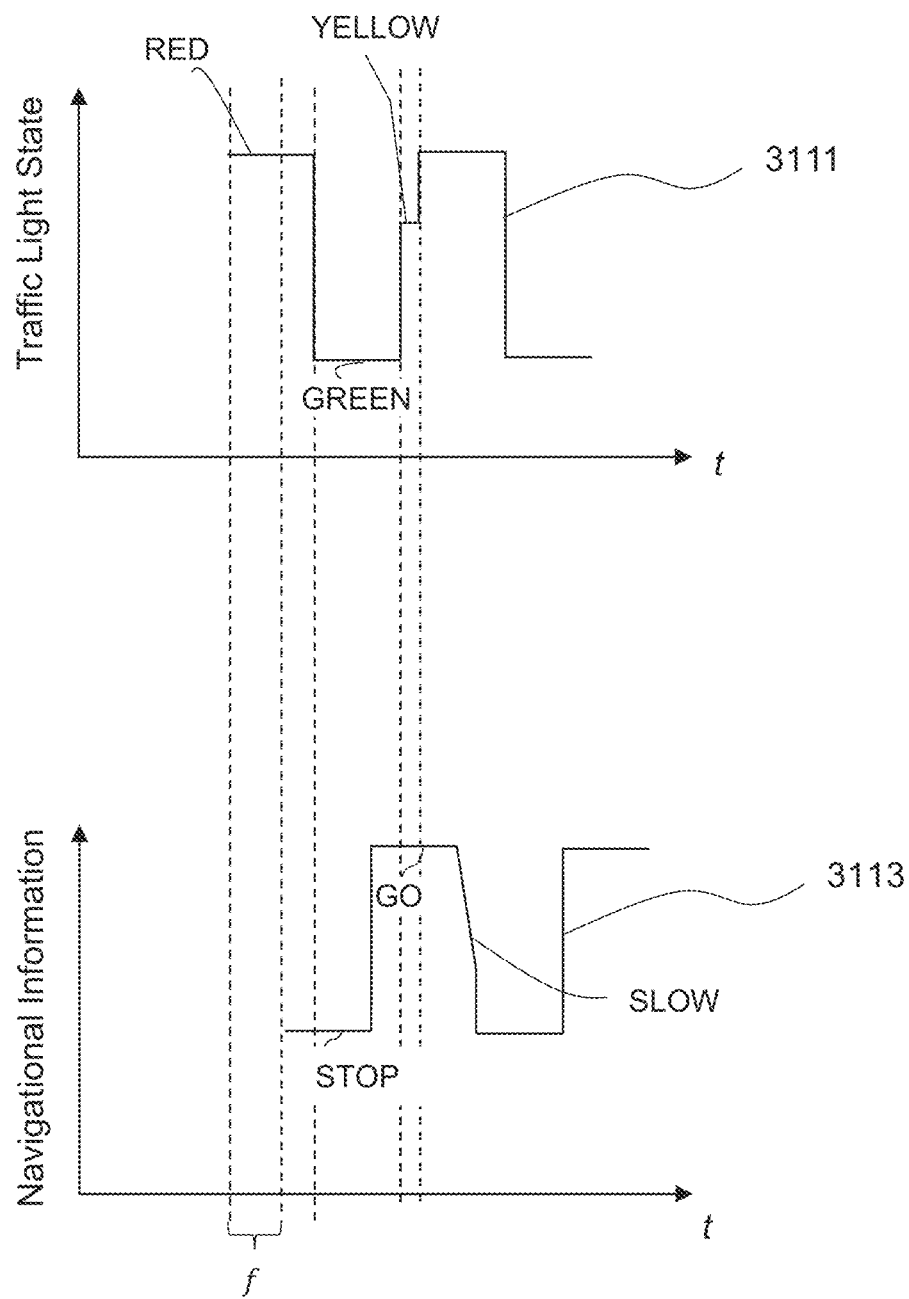

FIG. 31B shows an example embodiment, where a time-dependent function of navigational information shown by a graph 3113 for a vehicle (e.g., vehicle 3001) may be shifted by a phase factor f relative to a time-dependent state identifier shown by a graph 3111. In an example embodiment, the time-dependent state identifier, as shown by a graph 3111, may be related to the state of traffic light 3030B or 3030C that is not positioned directly in front of vehicle 3001 traveling along lane 3011A. Similar to graph 3101, graph 3111 may include red light, green light or yellow light states labeled correspondingly as "RED," "GREEN," and "YELLOW" for a traffic light (e.g., traffic light 3030B) associated with the time-dependent state identifier shown by graph 3111. Similar to graph 3103, graph 3113 may show that the time-dependent function of the navigational information for vehicle 3001 may be characterized by regions of a state "STOP", where the time-dependent function of the navigational information may be zero, regions of a state "GO", where time-dependent function may be one, and regions of a state "SLOWDOWN" where time dependent function of navigational information may be between zero and one. In various embodiments, even though the time-dependent function of the navigational information for vehicle 3001 exhibits a phase shift f, server navigation system may conclude that traffic light 3030B is relevant to lane 3011A, at least because state identifier shown by graph 3111 may be used together with the known phase shift f to predict the time-dependent function of the navigational information, as shown by graph 3113, for vehicles traveling along lane 3011A.

It should be noted, that traffic light 3030A may be relevant to lane 3011B as well as to lane 3011A. For example, vehicles traveling in lane 3011B may "obey" traffic light 3030A just as well as vehicles traveling in lane 3011A, where the term "obey" is used to indicate that navigational information for vehicles traveling in lane 3011B may directly correlate to a state identifier corresponding to traffic light 3030A. In an illustrative embodiment, the vehicles traveling in lane 3011A may obey traffic light 3030A by executing a first set of navigational actions that correlate with the state identifier for traffic light 3030A, that may include stopping at light 3030A when light 3030A is in a red light state (e.g., labeled "RED" in FIG. 31A, and also referred to as state "RED"), moving through light 3030A when light 3030A is in a green light state (e.g., labeled "GREEN" in FIG. 31A, and also referred to as state "GREEN"), slowing down in front of light 3030A when light 3030A is in a yellow light state (e.g., labeled "YELLOW" in FIG. 31A, and also referred to as state "YELLOW"), or turning left when the state identifier for light 3030A is a green turning arrow. The vehicles traveling in lane 3011B may obey traffic light 3030A by executing a second set of navigational actions (e.g., execute all of the navigational actions of the vehicles traveling in lane 3011A except for the action of turning left when the state identifier for light 3030A is a green turning arrow). When the state identifier for light 3030A is a green turning arrow, the vehicles traveling in lane 3011B may be configured to travel through light 3030A.

In various embodiments, the server navigation system may collect data related to a time-dependent state identifier for a traffic light (e.g., traffic light 3030A) and time-dependent navigational information related to various vehicles traveling along a given road segment (e.g., the road segment containing lanes 3011A and 3011B). The collected time-dependent state identifier for traffic light 3030A and the time-dependent navigational information may be used to establish the relevancy of traffic light 3030A to the given road segment.

In an example embodiment, as shown in FIG. 31A, navigational actions for vehicle 3001 may be a function of time and depend on a traffic light state identifier for a given lane. For example, when the traffic light state is in state "RED" as shown by graph 3101, no navigational actions may be required. When the traffic light state changes from state "RED" to state "GREEN" at a time $t_1$, a navigational action $NA_1$ may be required as shown by a graph 3105. In an example embodiment, $NA_1$ may correspond to vehicle 3001 accelerating and acquiring a nonzero velocity. At a time $t_2$, the traffic light state changes from state "GREEN" to state "YELLOW", and a navigational action $NA_2$ may be required as shown by graph 3105. In an example embodiment, $NA_2$ may correspond to vehicle 3001 starting deceleration at time $t_2$ and acquiring a zero velocity at a time $t_3$. After time $t_3$, no navigational action may be required until a time $t_4$ as shown by graph 3105.

It should be noted, that example embodiment of the relationship between the time-dependent traffic light state identifier, the time-dependent navigational information and the time-dependent navigational actions presented in FIG. 31A are only illustrative, and various other configurations describing the relationship between these time-dependent variables are possible. For instance, the time-dependent traffic light state identifier may have a variety of states besides states of "RED," "GREEN," or "YELLOW." In various embodiments, navigational information associated with vehicles other than vehicle 3001 traveling on the road segment (or on nearby road segments, such as a roadway 3016, as shown in FIG. 30) may influence time-dependent navigational actions for vehicle 3001.

It should also be noted, that time-dependent navigational actions may be influenced by other road-related events that may be unrelated (or not directly related) to time-dependent traffic light state identifier. For example, such events may include pedestrian jaywalking across lane 3011A traveled by vehicle 3001, unlawfully parked vehicles at curbside 3040A, mechanical failure of vehicle 3001 or other vehicles in proximity of vehicle 3001, police vehicles, fire engines or medical emergency vehicles in proximity of vehicle 3001, roadwork, adverse road conditions (e.g., ice, hail, rain, road defects, etc.) and the like.

In various embodiments, server 1230 may be configured to monitor vehicles traveling along a roadway 3060 and 3016 and to predict trajectories of vehicles to ensure that vehicles do not come in close proximity of one another. For example, server 1230 may be configured to transmit an indication for one or more collision avoidance navigational actions for the vehicles that are predicted to come in close proximity of one another. In various embodiments, the term "close proximity" may be a distance between the vehicles that may depend on the vehicles' speed or relative speed between two vehicles. In some embodiments, a close proximity distance between two vehicles along the lane of travel may be different than a close proximity distance between vehicles traveling in neighboring lanes. In an example embodiment, the close proximity distance between two vehicles traveling along the lane of travel may be based on a two-second rule (e.g., the distance that it takes for a vehicle to travel in two seconds) to provide an appropriate reaction time for vehicles operated by human drivers.

In some embodiments, a vehicle control system of an example vehicle may accept and execute (or schedule to execute at a later time) the collision avoidance navigational actions suggested by server 1230, and in other embodiments, the vehicle control system may execute (or schedule to execute at a later time) a different set of collision avoidance navigational actions. In some embodiments, the vehicle control system may ignore the execution of the collision avoidance navigational actions. In various embodiments, the vehicle control system may notify server 1230 on navigational actions executed or scheduled to be executed at a later time by the vehicle control system.

In various embodiments, the navigation system may be configured to update an autonomous vehicle road navigation model relative to a road segment, where the update is based on the at least one location identifier and based on whether the traffic light is relevant to the lane of travel traversed by a vehicle. The navigation model may be updated when such a model requires an update. For example, the model may require an update if the observed correlation between the time-dependent traffic light state identifier and the time-dependent navigational information for a vehicle do not match the expected navigational actions from the vehicle as determined from the navigational model. For example, the navigation system may obtain navigational actions $NA_V$ for a representative vehicle (e.g., vehicle 3001) traveling along lane 3011A of road segment 3063. The navigation system may compare navigational actions $NA_V$ with navigational actions obtained using the autonomous vehicle road navigation model $NA_{MODEL}$, and if $NA_V$ are different from $NA_{MODEL}$ the autonomous vehicle road navigation model may be updated.

In various embodiments, the updated autonomous vehicle road navigation model may be distributed to various autonomous vehicles. For example, the updated model may be used as a suggested or possible approach for the navigation system to determine navigational actions $NA_{MODEL}$ using the autonomous vehicle road navigation model. It should be noted that the navigation system may use alternative approaches, for obtaining navigational actions. For example, the navigation system may determine a direction to traffic light 3030A using an image capturing device, such as camera, to establish the relevancy of traffic light 3030A to lane 3011A. After establishing the relevancy of traffic light 3030A, the navigation system may determine the state of the traffic light 3030A based on image data obtained for traffic light 3030A. Based on the state of traffic light 3030A, the navigation system may determine an appropriate navigational action using a set of predetermined relationships between the states of traffic light 3030A and the possible navigational actions. For example, the navigation system may use a hash table to store navigational actions (values of the hash table) mapped to states of traffic light 3030A (keys of the hash table). In some embodiments, keys of the has table may include not only information about the states of traffic light 3030A but also navigational information for vehicle 3001 or navigational information for the vehicles located in the proximity of vehicle 3001.

In various embodiments, an update to the autonomous vehicle road navigation model may be performed when sufficient amount of information is collected for various vehicles traveling a lane of a roadway related to a traffic light in order to ensure the statistical certainty of the relevancy of the traffic light to the lane traveled by the vehicles. In an example embodiment, the certainty may be above 99%, 99.9%, 99.99% or higher. In some embodiments, the information may be collected for two vehicles traveling along the lane of the roadway, for ten vehicles traveling along the lane, for hundreds or even thousands of vehicles traveling along the lane. In various embodiments, the information relating navigational actions of vehicles to a traffic light state of a traffic light may be collected when other vehicles are in proximity of the vehicles traveling the road segments. For example, the information may be collected for vehicles traveling along roadway 3060 when other vehicles are traveling along roadway 3016.

Figure 32:
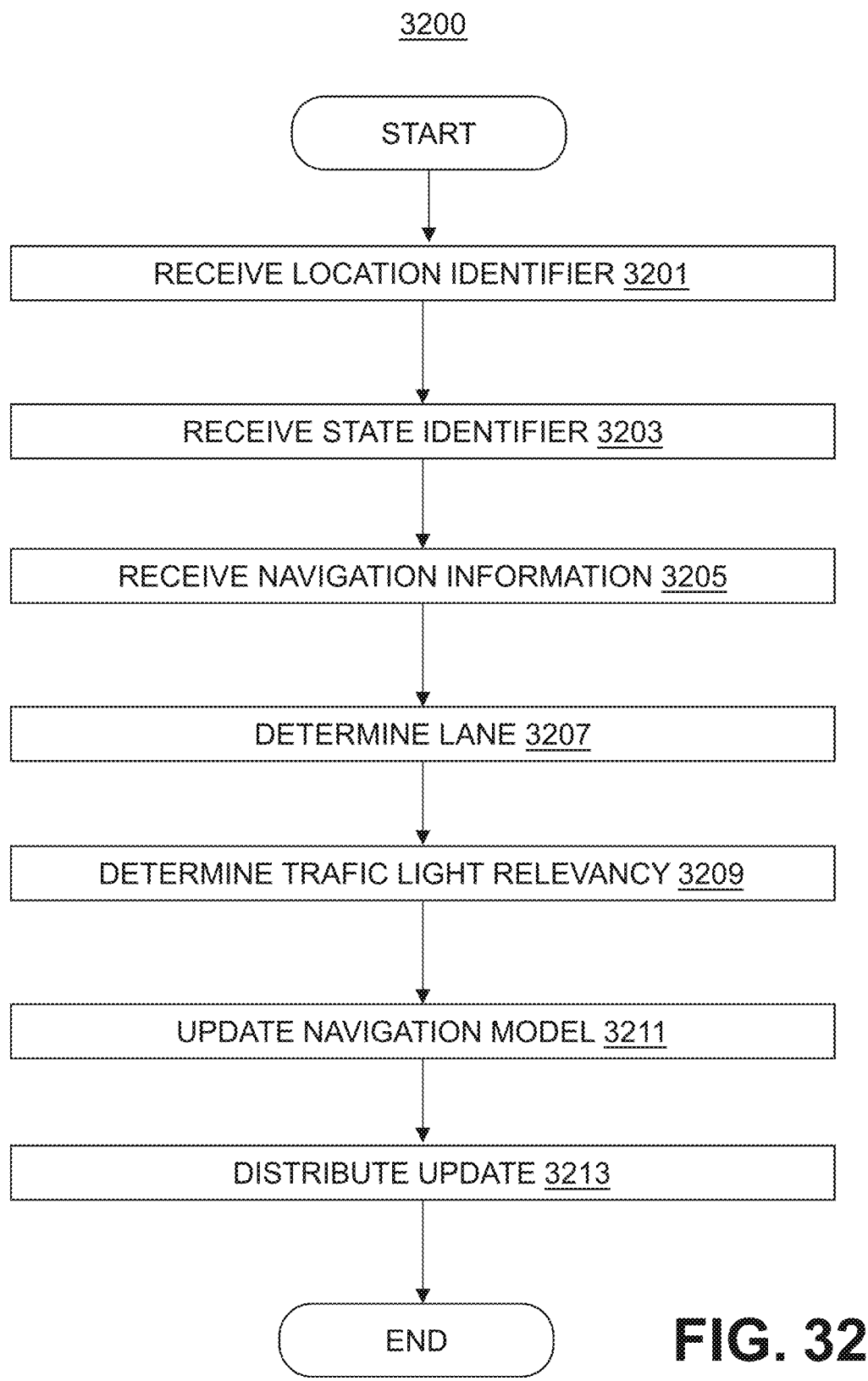
FIG. 32 is an illustrative process for updating an autonomous vehicle road navigation model, consistent with the disclosed embodiments.

FIG. 32 illustrates an example process 3200 for updating an autonomous vehicle road navigation model for various autonomous vehicles via the navigation system. In various embodiments, process 3200 may be performed by a processor of the navigation system. At step 3201 of process 3200, at least one processor of the navigation system may receive, from a vehicle, at least one location identifier associated with a traffic light detected along a road segment. For example, the processor may receive a location identifier associated with a traffic light 3030A, as shown in FIG. 30A. In various embodiments, the processor may receive a location identifier from one or more vehicles traveling along a road segment containing traffic light 3030A. For example, the processor may receive location identifier form vehicle 3001 traveling along lane 3011A. The location identifier for traffic light 3030A may be obtained using any of the suitable approaches described above.

At step 3203, the processor may receive, from a vehicle, a state identifier associated with the traffic light detected along the road segment. In an example embodiment, the state identifier may identify the traffic light as emitting red light (e.g., the state identifier is "RED" as shown in FIG. 30A), emitting green light (e.g., the state identifier is "GREEN" as shown in FIG. 30A) or emitting yellow light (e.g., the state identifier is "YELLOW" as shown in FIG. 30A). In some embodiments, various other state identifiers may be used. In various embodiments, the processor of the navigation system may receive the state identifier from one or more vehicles traveling along a road segment containing traffic light 3030A. In some embodiments, the state identifier received from the vehicle depends on the vehicle's time of travel along the road segment.

At step 3205, the processor may be configured to receive, from the vehicle, navigational information related to the vehicles traveling along the road segment. For example, the processor of the navigation system may be configured to receive navigational information of a vehicle (e.g., vehicle 3001) such as a position of vehicle 3001, a velocity of vehicle 3001, an acceleration of vehicle 3001, a deceleration of vehicle 3001 and the like. In some embodiments, the processor may be configured to receive navigational information related to the vehicles traveling along the same lane (e.g., lane 3011A), and in some embodiments, the processor may be configured to receive navigational information related to vehicles traveling next to the lane 3011A, across lane 3011A (e.g., vehicles traveling along roadway 3016 as shown in FIG. 30A) or in any other lane located in proximity to a traffic light contained by the road segment.

In various embodiments, the processor may be configured, at step 3203, to receive a first state identifier for a traffic light (e.g., traffic light 3030A) from at least one vehicle (e.g., a first vehicle) that is different from a second state identifier received from at least another vehicle (e.g., a second vehicle). For example, the first state identifier may correspond to a red light state corresponding to label "RED," as shown in FIG. 30A, or yellow light state, corresponding to label "YELLOW," as shown in FIG. 30A, and the second state identifier may correspond to a green light state corresponding to label "GREEN," as shown in FIG. 30A. In various embodiment, the processor of the navigation system may be configured, at step 3205, to receive navigational information associated with the first vehicle and the navigational information associated with the second vehicle that indicate a response to the first state identifier for traffic light 3030A by the first vehicle that may be different from a response to the second state identifier for traffic light 3030A by the second vehicle. For example, for the red light state received by the first vehicle, the first vehicle may slow down to a complete stop (i.e., have the first type of response) and for the green light state received by the second vehicle, the second vehicle, may continue or start a vehicle motion (i.e., have the second type of response). In some cases, the first state identifier for traffic light 3030A may be the same as the second state identifier.

In various embodiments, the processor of the navigation system may be configured, at step 3205, to receive navigational information associated with the first vehicle and the navigational information associated with the second vehicle indicating that the first response to the first state identifier for traffic light 3030A by the first vehicle may be substantially the same as the second response to the second state identifier for traffic light 3030A by the second vehicle. As defined herein, unless otherwise noted, the term "substantially" as applied to vehicle's response to a state identifier may indicate that the first response is at least qualitatively the same as the second response, while allowing to be different quantitatively. For example, the first and the second response may include braking, but the magnitude of deceleration for the first response may be different than the magnitude of deceleration for the second response.

At step 3207 the processor of the navigation system may determine the lane traveled by vehicle 3001. In an example embodiment, the processor may use the navigational information received from vehicle 3001 to determine the lane traveled by vehicle 3001. For example, the processor may determine the lane traveled by vehicle 3001 based on vehicle's position or based on vehicle's distance to various features of the road segment (e.g., based on a distance to the curbside of the roadway). In an example embodiment, the lane of travel followed by vehicle 3001 along the road segment may be determined by comparing a trajectory of vehicle 3001 traveled by vehicle 3001 (referred herein as traveled or actual trajectory) to one or more available target trajectories (as defined above) associated with the autonomous vehicle road navigation model for vehicles traveling the road segment. For example, the target trajectory may include information about the lanes of the road segment for different regions along the target trajectory. If the traveled trajectory of vehicle 3001 matches a segment of the target trajectory, the processor may be configured to determine a lane traveled by vehicle 3001 based on the lane associated with the segment of the target trajectory. Alternatively, if traveled trajectory for vehicle 3001 is near and to a side of the target trajectory, the processor may be configured to determine that a lane traveled by vehicle 3001 is a neighboring lane to the lane associated with the segment of the target trajectory.

At step 3209, the processor may determine the traffic light relevancy for a lane (e.g., lane 3011A). In an example embodiment, the lane relevancy may be determined by analyzing a correlation between the time-dependent navigational information for various vehicles traveling along the road segment containing a traffic light (e.g., traffic light 3030A) and the time-dependent state identifier for traffic light 3030A. For example, if there is a direct correlation between the navigational information (or one or more changes in the navigational information) and the state identifier for traffic light 3030A (or changes in the state identifier), the processor may determine that traffic light 3030A is relevant to lane 3011A. In various embodiments, the correlation between the time-dependent navigational information for various vehicles traveling along the road segment containing traffic light 3030A and the time-dependent state identifier for traffic light 3030A may be obtained by collecting information for multiple vehicles traveling along the road segment at different times.

At step 3211, the processor may update the autonomous vehicle road navigation model as it relates to the relationship between the time-dependent navigational information for various vehicles traveling along the road segment and the time-dependent state identifier for traffic light 3030A. In various embodiments, the update may include updating a location identifier for traffic light 3030A or updating the relevancy of traffic light 3030A to lane 3011A followed by vehicle 3001. In some embodiments, updating model may include updating relationship between the time-dependent navigational information for various vehicles traveling along the road segment and the time-dependent state identifier for traffic light 3030A that may be represented by a function.

At step 3213, the processor may be configured to distribute the updated model to various autonomous vehicles traveled in the proximity of the road segment. In an example embodiment, the navigation system may be configured to distribute the updated model to the most relevant vehicles (e.g., the vehicles that are approaching traffic light 3030A) first, and then distribute the model to various other vehicles.

It should be noted, that various steps of process 3200 may be modified or omitted. For example, the processor may receive navigational information at step 3205 that may include information about the lane traveled by a vehicle. For such a case, step 3207 of process 3200 may be omitted. In some instances, the processor may determine the relevancy of a traffic light, thus, resulting in step 3209 being unnecessary.

Figure 33:
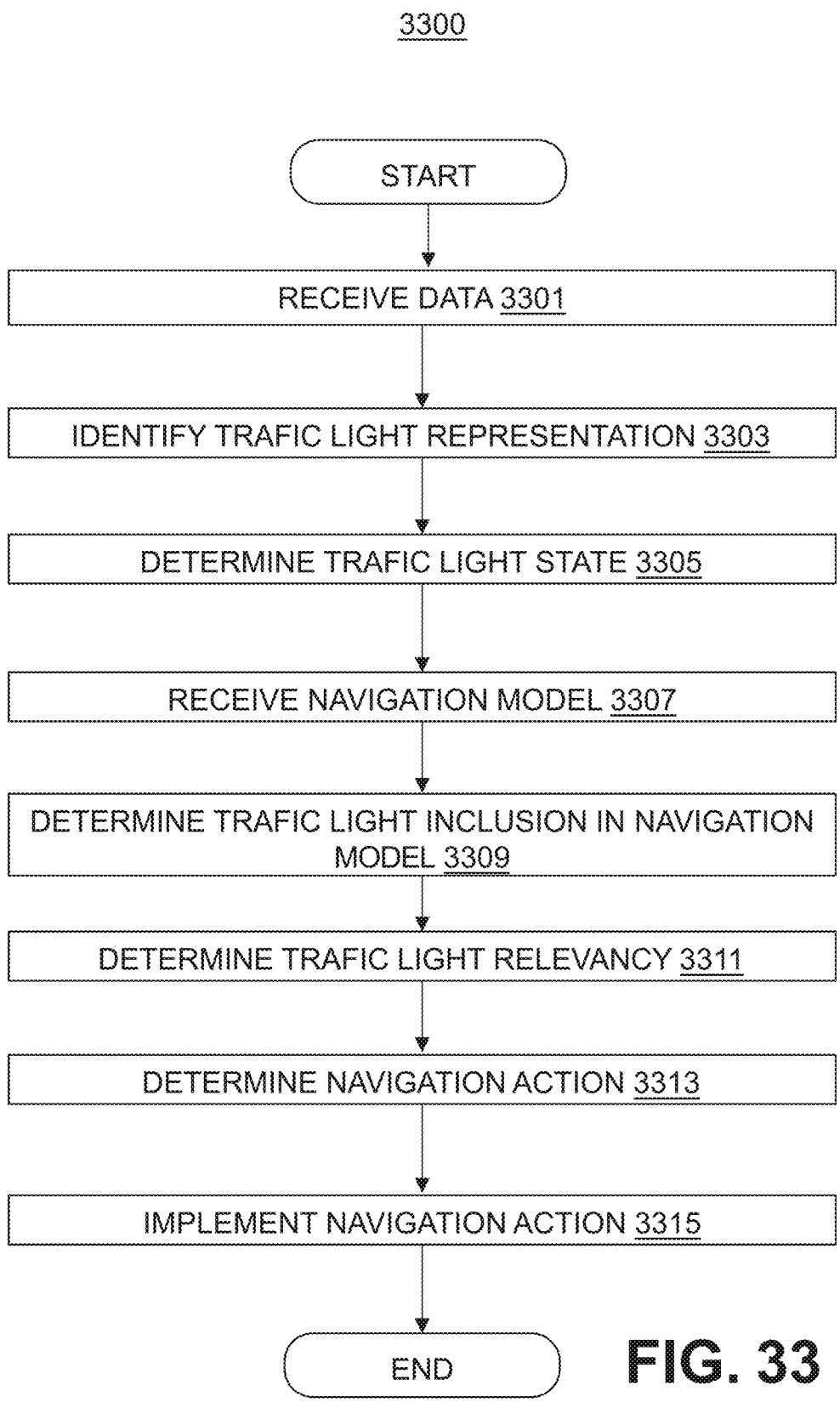
FIG. 33 is an illustrative process for selecting and implementing a navigational action, consistent with the disclosed embodiments.

FIG. 33 illustrates an example process 3300 for autonomous vehicle navigation using the navigation system. At step 3301 of process 3300, the processor of the navigation system may receive from a signal detection device various data signals from the environment of an example vehicle, such as vehicle 3001. For instance, such data signals may be audio data, video or image data, as well as data signals communicated from various traffic lights using traffic light communication systems 3031. In an example embodiment, the signal detection device for vehicle 3001 may be an image capturing device for capturing one or more images representative of an environment of vehicle 3001.

At step 3303, the processor may be configured to identify, based on the analysis of the data signal received from the signal detection device, a representation of at least one traffic light. In an example embodiment, analysis of received images from the image capturing device may be used to identify at least one traffic light in the images and to obtain a representation of the identified traffic light. In an example embodiment, the representation of an illustrative traffic light may be a traffic light location identifier described above. The location identifier for a traffic light may be obtained using any of the suitable approaches described above.

At step 3305 the processor may be configured to determine a state of the at least one identified traffic light (e.g., traffic light 3030A) based on the analysis of the images obtained using the image capturing device. In an example embodiment, the processor may compare the images obtained for various traffic lights with images of various traffic lights (e.g., images of traffic lights having a green light, red light, yellow light, etc. stored in a memory of the navigation system) to determine states of various traffic lights. In some embodiments the processor may be configured to transmit the images of the one or more traffic lights to server 1230 for further processing of the images (e.g. compressing images, editing images, etc.), analysis of the images (analysis of images for determining a state of the one or more of the identified traffic lights, as well as identifying other objects that may be present within the images, such as roadway landmarks) and/or storage of the images.

At step 3307, the processor may be configured to receive from the navigation system (or from any related server-based system) an autonomous vehicle road navigation model, where the autonomous vehicle road navigation model may include stored information related to various traffic lights associated with the road segment. In an example embodiment, the stored information may include location identifier for a traffic light, as well as one or more relevant lanes, associated with the traffic light, that are being followed by vehicles traveling along the road segment. Additionally, or alternatively, the stored information related to the various traffic lights may correlate with one or more possible trajectories available to vehicle 3001 traveling along the road segment. In an example embodiment, each possible trajectory may be associated with a trajectory related lane of the road segment. In some embodiments, a lane of the road segment may be related to a portion of a trajectory, for example, for cases when a trajectory passes through several different lanes. The possible trajectories may be provided by the autonomous vehicle road navigation model and may be represented by three-dimensional splines.

At step 3309, the processor may determine whether some of the identified traffic lights, identified in the images that are captured by the image capturing device, are among the mapped traffic lights associated with the autonomous vehicle road navigation model. For example, the navigation system may access a traffic light location identifier associated with the identified traffic lights, and may compare the location of the identified traffic light with locations of various mapped traffic lights associated with the autonomous vehicle road navigation model. After determining that the at least one traffic light, identified in the images, is among the mapped traffic lights associated with the autonomous vehicle road navigation model, the processor may be configured, at step 3311, to determine whether the identified traffic light, determined to be among the mapped traffic lights, is relevant to a lane traveled by vehicle 3001. The relevancy of the one or more traffic lights may be established using various approaches discussed above for the one or more traffic lights that have associated location identifiers. In an example embodiment, a relevant traffic light may be the light aligned with a lane of a road segment, such as traffic light 3030A that may be aligned with the lane 3011A. Additionally, or alternatively, the processor may determine at least another traffic light among the mapped traffic lights associated with the autonomous vehicle road navigation model that may not be aligned with lane 3011A traveled by vehicle 3001 (e.g., traffic lights 3030B or 3030C). Such traffic lights may be aligned with a lane of travel of the road segment that is different than lane 3011A. For example, traffic lights 3030B and 3030C correspond to roadway 3016, as shown in FIG. 30A that is different than roadway 3030, and thus are not aligned with lane 3011A. It can be said, that traffic lights 3030B and 3030C are aligned with roadway 3016. In various embodiments, the processor may use information about the state of one or more traffic lights not aligned with lane 3011A to determine possible navigational actions as previously described. Such information may be used, for example, when one or more traffic lights aligned with lane 3011A are obscured from a view of the image capturing device of vehicle 3001, or/and are not operational.

At step 3313 the processor may determine if a navigational action is required based on a state identifier for a traffic light, such as traffic light 3030A, that is relevant to lane 3011A traveled by vehicle 3001. If no relevant traffic lights are found, no navigational actions related to a traffic light may be needed. That does not necessarily imply that no navigational actions are needed, as some of the navigational actions may not be related to the navigational action related to a traffic light. For example, the navigational actions may be required if pedestrians or stopped vehicles are observed in lane 3011A traveled by vehicle 3001.

At step 3315, if the navigational action is required, the processor may be used to cause one or more actuator systems associated with vehicle 3001 to implement the determined one or more navigational actions for vehicle 3001. In various embodiments, the one or more actuator systems may include regular controls for vehicle 3001 such as a gas pedal, a braking pedal, a transmission shifter, a steering wheel, a hand brake and the like. In some embodiments, actuator systems may be internal systems not accessible by a human operator that perform similar functions as the regular controls accessible to the human operator. In an example embodiment, the navigation system may be configured to accelerate vehicle 3001 via an actuator system that may, for example, include a gas pedal of a vehicle.

It should be noted, that various steps of process 3300 may be modified or omitted. Additionally, or alternatively, the sequence of steps of process 3300 may be modified. For example, step 3305 may follow step 3311, and step 3307 may follow step 3303. In some embodiment, step 3309 may be omitted, when the determination of relevancy of an example traffic light is analyzed by the navigation system.

Blinking Traffic Light Detection

As described throughout the present disclosure, the disclosed embodiments may detect traffic lights within the environment of one or more vehicles. These detection results may be used to generate navigational maps and/or navigate a host vehicle. In many instances, a traffic light may include multiple lamps that may blink or flash to convey information. Further, the information being conveyed may change based on the color of the lamp that is blinking. For example, in the United States, a blinking red light typically signals to drivers that a vehicle may proceed through an intersection only after making a complete stop (similar to the presence of a stop sign). A blinking yellow light, on the other hand, typically warns a driver to proceed with caution. In other jurisdictions, a blinking light may have other meanings. For example, depending on the country, a blinking green light may indicate a vehicle has permission to travel straight ahead as well as make a left turn, may indicate the end of a green cycle before a light will change to yellow, may indicate an intersection includes a pedestrian crosswalk, or the like. Blinking lights may also convey a particular meaning in other contexts, such as at a railroad crossing, on a school bus, on a stalled vehicle, or in similar scenarios. Accordingly, it may be beneficial for autonomous or semi-autonomous vehicles to detect whether a traffic lamp is flashing and determine navigational actions based on whether the traffic lamp is flashing.

The disclosed embodiments provide techniques for detecting flashing traffic lamps. In particular, one or more images may be captured by one or more image capture devices included in a vehicle and may be analyzed to identify lamps associated with the traffic light. The lamps may be associated with labels or other data indicating properties of the lamps, such as a color, shape, symbol, or the like. One or more subsequently captured images may then be captured and analyzed to determine whether any of the detected lamps are blinking. For example, a long short term memory (LSTM) network or similar machine learning algorithm may be used to analyzed portions of the subsequently captured images corresponding to locations of representations of the lamps. As a result, a detected blinking light, along with a color, shape, or other properties of the lamp, may be used by a navigation system to determine a meaning of the traffic lamp for purposes such as navigation. Accordingly, the disclosed embodiments provide improved safety, efficiency, and performance over existing navigational systems.

Figure 34A:
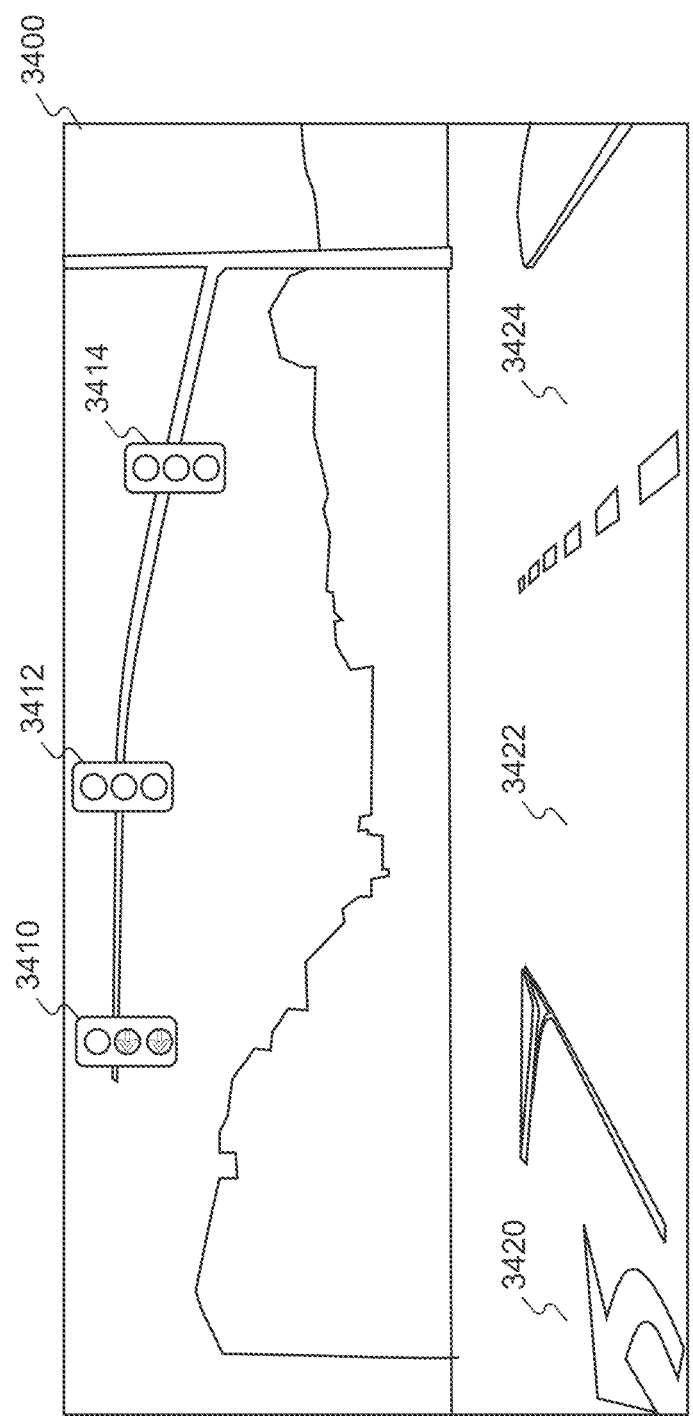
FIG. 34A illustrates an example image representing an environment of a host vehicle, consistent with the disclosed embodiments.

As noted above, the disclosed embodiments may receive one or more images captured by a vehicle. FIG. 34A illustrates an example image 3400 representing an environment of a host vehicle, consistent with the disclosed embodiments. Image 3400 maybe captured by a camera of a host vehicle, such as image capture devices 122, 124, and/or 126. In the example shown in FIG. 34, the image may be captured from a front-facing camera of the host vehicle as the vehicle travels along a road segment. In this example, the road segment may include a lane 3422 along which the host vehicle is travelling. The road segment may also include a turn lane 3420 to the left of lane 3422 and an additional through-lane 3424 to the right of lane 3422. While image 3400 represents an image captured form the front of the host vehicle, the same or similar processes may also apply to images captured from other camera positions, such as images captured from a side or the rear of the host vehicle. In some embodiments, multiple images 3400 may be used, as discussed further below.

Image 3400 may include representations of one or more traffic lights within the environment of the host vehicle. As used herein, a traffic light may include any device or mechanism for conveying traffic information through illumination of one or more lamps. As a common example, a traffic light may include a light at an intersection, such as traffic lights 3410, 3412, and 3414 shown in image 3400. Traffic lights may include various other types of light devices, such as railway crossing lights, lights on other vehicles (e.g., hazard lights, school bus lights, emergency lights), road construction markers, crosswalk signs (e.g., a flashing orange hand), or any other lights along a roadway that may blink to convey information.

A navigation system of the host vehicle may detect representations of traffic lights in captured images. For example, the host vehicle may detect one or more of traffic lights 3410, 3412, and 3414 in image 3400. This may include applying one or more computer vision algorithms configured to detect edges, features, corners, and/or objects within an image, as described throughout the present disclosure. For example, this may include non-neural object detection techniques, such as Viola-Jones object detection, scale-invariant feature transform (SIFT), histogram of oriented gradients (HOG), etc., or neural network-based object detection algorithms, such as region proposals (R-CNN, Fast R-CNN, etc.), single shot MultiBox Detector (SSD), or other forms of convolutional neural networks. Accordingly, detecting the representation of traffic lights in captured images may include generating at least one convolution of the image and analyzing the convoluted image.

In some embodiments, the host vehicle may be configured to determine one or more properties of lamps included in the detected traffic lights. As used herein, a lamp refers to an indicator or other component of a traffic light configured to illuminate to convey traffic-related information. The lamp may include one or more electric bulbs configured to light up and may also include a diffuser device, such as a shade or cover. For example, the lamp may include an array of light-emitting diodes (LEDs), one or more incandescent or halogen-based bulbs, or other light components. A traffic light may have a single lamp, or may include multiple different lamps. In the example of a traffic light at an intersection, the traffic light may include a red lamp, a yellow lamp, and a green lamp. Lamps may also have various shapes or sizes depending on the type of traffic light. For example, a lamp may have an arrow shape indicating a signal associated with a turn lane. A lamp may have various other shapes (e.g., a person walking, an open hand, etc.) depending on the particular traffic light.

Figure 34C:
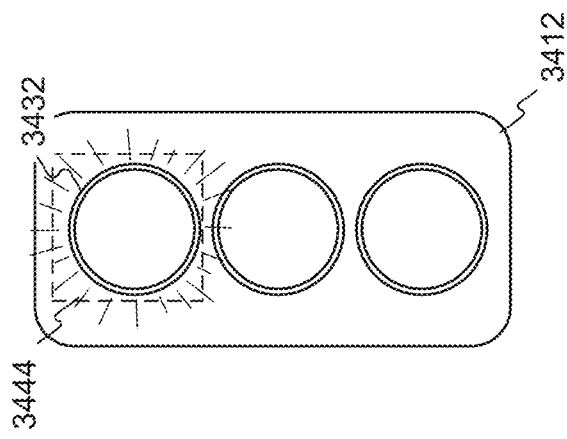
FIG. 34C illustrates a representation of a traffic light that may be captured in a subsequent image, consistent with the disclosed embodiments.
Figure 34B:
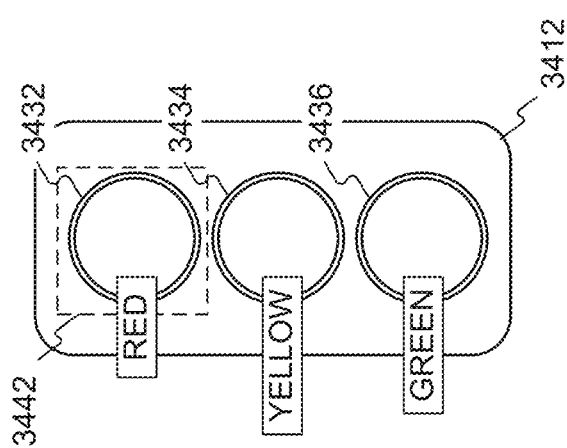
FIG. 34B illustrates an example representation of a traffic light that may be detected in an image, consistent with the disclosed embodiments.

FIG. 34B illustrates an example representation of a traffic light that may be detected within an image, consistent with the disclosed embodiments. In the example shown, this may include traffic light 3412 represented in image 3400. Traffic light 3412 may include three lamps 3432, 3434, and 3436. Lamps 3432, 3434, and 3436 may each illuminate at different times to convey different information. For example, lamp 3432 may be a red lamp indicating instructions to stop, lamp 3436 may be a green lamp indicating vehicles in an associated lane may proceed through the intersection, and lamp 3434 may be a yellow lamp indicating an imminent change to a red light signal (e.g., by illuminating lamp 3434).

The navigation system may be configured to determine a label or other form of data indicating detected properties of a particular lamp. In some embodiments, this may include determining a color associated with a lamp. For example, for traffic light 3412, the system may associate lamp 3432 with the label "RED" indicating lamp 3432 has a red color. The system may similarly associate lamps 3434 and 3436 with "YELLOW" and "GREEN" labels, respectively. The color of lamps 3432, 3434, and 3436 may be determined based on image 3400. For example, even when not illuminated, lamps 3432, 3434, and 3436 may have a hue or tint indicating a color of the lamp when illuminated. In some embodiments, a color or other properties may be determined or assumed based on a position of the lamps relative to the traffic light. For example, in the United States, it may be customary for a traffic light to have a red lamp on top, a yellow lamp in the middle, and a green lamp at the bottom. Accordingly, based on the position of lamps 3432, 3434, and 3436, the system may assign color labels as shown in FIG. 34B. Alternatively or additionally, the labels may indicate the position (e.g., "TOP," "MIDDLE," "BOTTOM"). In some embodiments, various other properties may be associated with a particular lamp, similar to the color labels described above. For example, a traffic light may include a turn arrow lamp, such as traffic light 3410 shown in FIG. 34A. Accordingly, a label such as "ARROW" may be applied. This may also include an indicator of direction, such as "LEFT TURN," "LEFT ARROW," or a similar label. Properties may include other information such as a type of traffic light, a position of the traffic light relative to roadway, a size of the lamp, a shape of the lamp, or various other characteristics or contextual information that may indicate a meaning or significance of the lamp.

In some embodiments, the navigation system may identify portions of an image that include the representation of a particular lamp. For example, as shown in FIG. 34A, the system may identify a portion 3442 of image 3400 associated with lamp 3432. Portion 3442 may be selected to encompass at least a portion of the representation of lamp 3432 in image 3400. Accordingly, in some embodiments, portion 3442 may be analyzed independently to determine whether lamp 3432 is illuminated in subsequent images, as described in further detail below. Additionally or alternatively, portion 3442 may be used to identify representations of lamp 3432 in subsequent images. Portion 3442 may have a size or shape (e.g., measured in a number of pixels, etc.) depending on the representation of lamp 3432, or may have a predetermined size or shape (e.g., a set number of pixels, a square shape, etc.).

Consistent with the disclosed embodiments, subsequent images of the environment of the host vehicle may be analyzed to determine whether one or more lamps of a traffic light are blinking. FIG. 34C illustrates a representation of traffic light 3412 that may be captured in a subsequent image, consistent with the disclosed embodiments. As with image 3400, the subsequent images may be captured by a camera of the host vehicle, such as image capture devices 122, 124, and/or 126. In the example, image shown in FIG. 34C, lamp 3432 of traffic light 3412 may be illuminated. The system may detect the illumination of lamp 3432, which may indicate that lamp 3432 is blinking. The illumination of lamp 3432 may be determined based on analysis of the subsequent images. For example, the pixels associated with lamp 3432 in the images may have a different intensity, color, or other properties when lamp 3432 is illuminated as compared to when it is not illuminated. In some embodiments, this may include analyzing pixels surrounding the representation of lamp 3432, which may include a glare or reflection of the illuminated lamp. The system may perform the analysis on multiple subsequent images to determine whether lamp 3432 is blinking or whether it has simply transitioned to (or from) an illuminated state. For example, this may include determining a pattern of how long a lamp is in an off versus illuminated state, the timing between illuminations, the consistency of the pattern, or other properties of the pattern that may indicate the lamp is blinking. In some embodiments, this may include comparing one or more of the properties to a threshold value to classify the lamp as a blinking lamp. For example, the system may consider a lamp to be blinking if an on/off cycle is less than a predetermined time threshold (e.g., 1 second, 2 seconds, 5 seconds, etc.).

In some embodiments, a machine learning algorithm such as long short-term memory (LSTM) or other artificial recurrent neural network architecture may be used to detect whether a lamp is blinking. The LSTM model may receive as an input the first and subsequent images and may detect state changes of lamps within the images. In some embodiments, the output of the LSTM model may be a binary set of values (e.g., a 0 indicating the lamp is blinking and a 1 indicating the lamp is blinking). The LSTM model may be trained in various ways. For example, the model may be trained in a supervised fashion, in which a set of images including a traffic lamp and labels indicating whether the lamp is blinking may be input into a LSTM algorithm. As a result, the LSTM model may be configured to determine whether subsequent series of images include blinking lamps. In some embodiments, other forms of training, such as unsupervised training or semi-supervised training may be used.

Consistent with the disclosed embodiments, the system may extract subsections of images including a lamp to input into the LSTM model. For example, this may include extracting portion 3442 of image 3400 and corresponding portion 3444 of a subsequent image to input into the LSTM model, which may improve the accuracy and/or efficiency of detecting whether lamp 3432 is blinking. Portion 3444 may be identified in the same or similar manner as portion 3442 as described above. For example, this may include detecting lamp 3432 in the image and determining a portion 3444 of the image including some or all of lamp 3432. In some embodiments, portion 3444 may have the same shape or size as portion 3442, however, they may equally be of different sizes or shapes depending on the particular implementation.

In some embodiments, portion 3444 may be determined, at least in part, based on portion 3442. For example, lamp 3432 may be expected to be in the same or close to the same position within subsequently captured images (e.g., consecutive images or images captured close together). Accordingly, the system may initially look for lamp 3432 in a region of an image associated with portion 3442. In some embodiments, a motion history of a host vehicle from or between a time when a first image frame was acquired and a subsequent time when an additional image was acquired may be determined. A motion history may include any indication of movement of the host vehicle. For example, the motion history may include location information, speed, acceleration (or deceleration), rotation (e.g., pitch, yaw, or roll), elevation change, or the like. In some embodiments, the motion history may be determined based on the detection of landmarks in the environment of a vehicle, as described throughout the present disclosure. In some embodiments, the motion history may be determined by one or more ego motion sensors of the vehicle, such as speed sensors, accelerometers, gyroscopes, GPS sensors, or the like. The present disclosure is not limited to any particular way of obtaining motion history for a vehicle.

Figure 35:
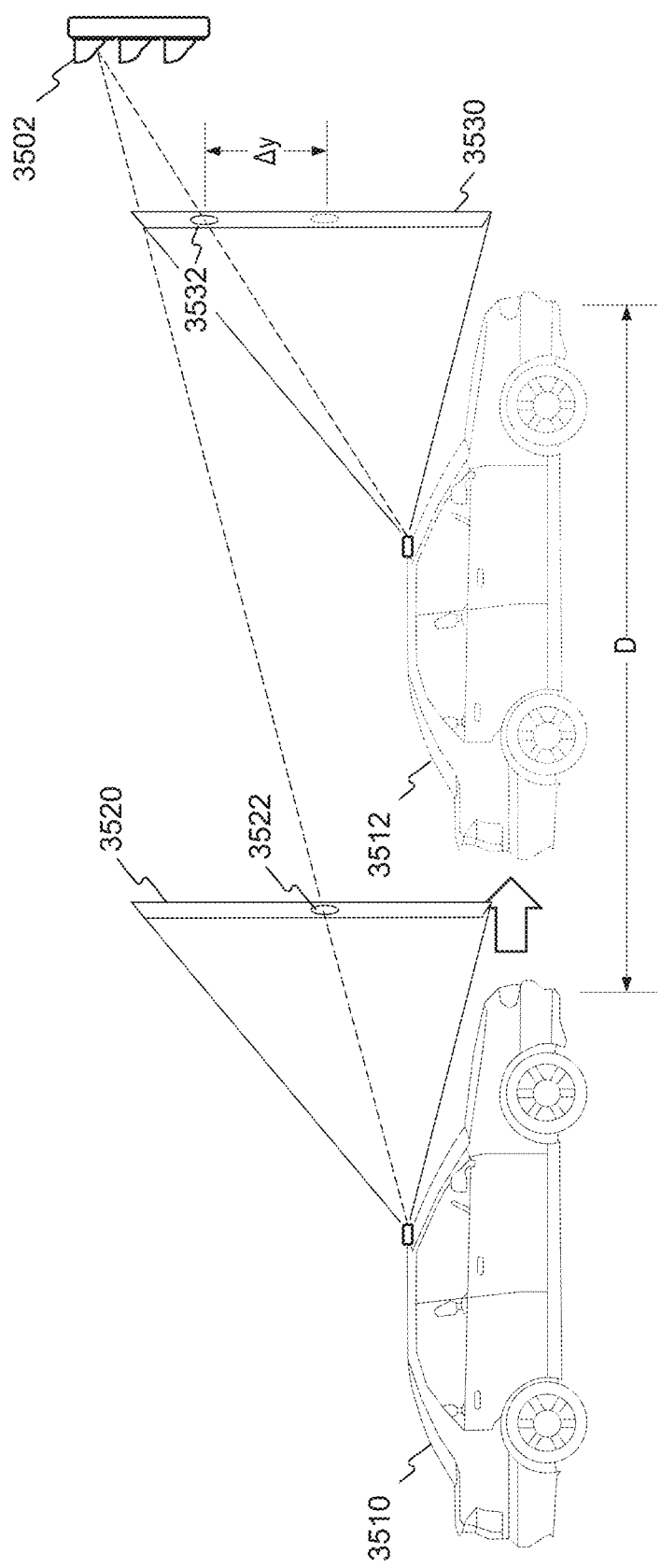
FIG. 35 illustrates an example technique for determining a portion of an image associated with a traffic light lamp based on a motion history of a vehicle, consistent with the disclosed embodiments.

FIG. 35 illustrates an example technique for determining a portion of an image associated with a traffic light lamp based on a motion history of a vehicle, consistent with the disclosed embodiments. As shown, a host vehicle may capture an image 3520 when the host vehicle is at a first position 3510. Image 3520 may include a representation of a traffic light lamp 3502 at position 3522 within the image. The host vehicle may then capture a subsequent image 3530 from a second position 3512 after the host vehicle has traveled a distance D. As illustrated in FIG. 35, the representation of lamp 3502 may be located at a different position (e.g., at position 3532) within image 3530 than position 3522 in image 3520. In particular, position 3532 may vary by a vertical distance $\Delta y$ in image coordinates relative to position 3522. Using a determined position of lamp 3502 relative to the camera when the vehicle is at position 3510 and the approximate distance D (which may be determined from a motion history of the vehicle), the system may determine (or estimate) position 3532. Accordingly, the system may extract a subsection of image 3530 including lamp 3502 based on determined position 3532, which may be used to determine whether lamp 3502 is blinking. The motion history shown in FIG. 35 is shown by way of example. It is to be understood that the motion history may include changes in heading direction (e.g., changes in yaw angle), changes in pitch or roll of the vehicle (which may be based on road surface geometry), changes in speed or acceleration, or other changes in movement of the vehicle, which may be factored in for determining position 3532.

Based on the detection of a blinking lamp, the host vehicle may implement a navigation action in accordance with properties of the blinking lamp. In other words, the navigational action may be determined based on a "state" of the traffic light indicating which of the lamps is currently illuminated. In some embodiments, the state may be a color state indicating a color associated with the lamp, as described above. As another example, the state may be a visual signal state, which may indicate the position of the lamp within the traffic light. The state may also indicate a shape, size, angle, a blinking rate, or other properties or combinations of properties of the lamp, which may be associated with the meaning. For example, a blinking arrow lamp may have a different meaning than a circular blinking lamp. The state information may be used to determine a meaning of the blinking lamp, which may determine the appropriate navigational action.

In some embodiments, this may include looking up properties of the blinking lamp in one or more data structures correlating blinking lamp properties (or states) with associated navigation actions. The data structure may include any format for storing data in an associative manner. For example, the data structure may include an array, an associative array, a linked list, a binary tree, a balanced tree, a heap, a stack, a queue, a set, a hash table, a record, a tagged union, ER model, a database, and/or a graph. As an illustrative example, a blinking lamp having a red color state may be associated with stopping the host vehicle, a blinking lamp having a yellow color state may be associated with slowing of the host vehicle, a blinking lamp having a green color state may be associated with causing the vehicle to yield. In some embodiments, the navigation action may also consider a shape of the blinking lamp, as discussed above. For example, a blinking lamp including a directional arrow and having a yellow color state may be associated with instructions for the vehicle to yield when turning. The particular navigational actions may depend on a jurisdiction in which the vehicle is driving. In some embodiments, the data structure may include navigational actions with multiple jurisdictions and the location of the host vehicle may be used to determine the associated jurisdiction and, accordingly, the correct navigational action.

Figure 36:
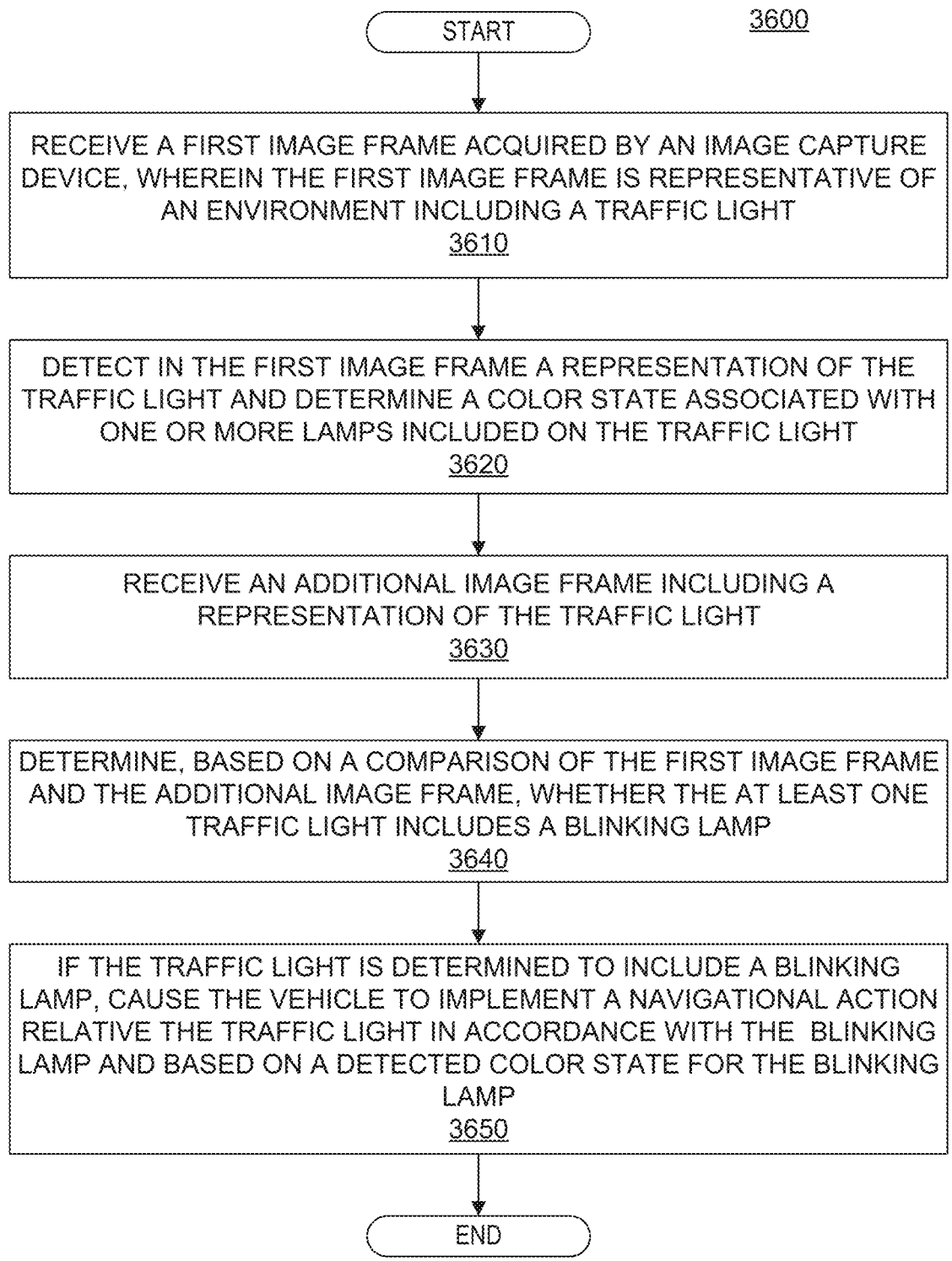
FIG. 36 is a flowchart showing an example process for harvesting data for a sparse map, consistent with the disclosed embodiments.

FIG. 36 is a flowchart showing an example process 3600 for navigating a vehicle, consistent with the disclosed embodiments. Process 3600 may be performed by at least one processing device of a host vehicle, such as processing unit 110, as described above. It is to be understood that throughout the present disclosure, the term "processor" is used as a shorthand for "at least one processor." In other words, a processor may include one or more structures (e.g., circuitry) that perform logic operations whether such structures are collocated, connected, or disbursed. In some embodiments, a non-transitory computer readable medium may contain instructions that when executed by a processor cause the processor to perform process 3600. Further, process 3600 is not necessarily limited to the steps shown in FIG. 36, and any steps or processes of the various embodiments described throughout the present disclosure may also be included in process 3600, including those described above with respect to FIGS. 34A, 34B, and 35.

In step 3610, process 3600 includes receiving a first image frame acquired by an image capture device. For example, step 3610 may include receiving image 3400, which may be captured by image capture devices 122, 124, and/or 126, as described above. The first image frame may be representative of an environment of the vehicle, where the environment includes at least one traffic light. For example, the image may include a representation of traffic lights 3410, 3412, and/or 3414, as described above with respect to FIG. 34A.

In step 3620, process 3600 includes detecting in the first image frame a representation of the at least one traffic light and determining a color state associated with one or more lamps included on the at least one traffic light. For example, the color state may indicate whether the lamp is green, yellow, or red, as illustrated in FIG. 34B. In some embodiments, the state may be determined based on a position of the lamp relative to the traffic light, as discussed further above. While the term color state is used in step 3620, it is to be understood that this may include other properties indicating the current state, such as position, shape, etc.

In step 3630, process 3600 includes receiving at least one additional image frame acquired by the image capture device, wherein the at least one additional image frame includes a representation of the at least one traffic light. For example, the additional image may include a representation of traffic light 3412, as described above with respect to FIG. 34C. In some embodiments, the at least a portion of the at least one additional image frame may constitute an extracted subsection of the at least one additional image frame including the representation in the at least one additional image frame of the at least one traffic light. For example, the extracted subsection may correspond to portion 3444, as shown in FIG. 34C. Further, in some embodiments, a location of the extracted subsection in the at least one additional image frame may be determined based on a location in the first image frame of the representation of the at least one traffic light and based on a motion history of the vehicle between a time when the first image frame was acquired and a subsequent time when the at least one additional image frame was acquired. For example, a location of the extracted subsection may correspond with portion 3532 of image 3530, which may be determined based on position 3522 and a motion history of the vehicle, as described above with respect to FIG. 35.

In step 3640, process 3600 includes determining, based on a comparison of at least a portion of the first image frame and at least a portion of the at least one additional image frame, whether the at least one traffic light includes a blinking lamp. For example, step 3640 may include determining whether lamp 3432 is blinking as described above with respect to FIG. 34C. In some embodiments, the comparison may include providing the at least a portion of the first image frame and the at least a portion of the at least one additional image frame to a long short-term memory (LSTM) network, as described above. For example, the LSTM network is configured to output for each of the one or more lamps included in the at least one traffic light a first value (e.g., a logical "0") if the no blinking is detected and second value (e.g., a logical "1") if blinking is detected. In some embodiments, the at least a portion of the first image and the at least a portion of the at least one additional image frame may include extracted subsections of the first image and the at least one additional image.

In step 3650, process 3600 includes, if the at least one traffic light is determined to include a blinking lamp, causing the vehicle to implement a navigational action relative the at least one traffic light in accordance with the determination that the at least one traffic light includes a blinking lamp and also based on a detected color state for the blinking lamp. For example, the navigational action may include stopping of the vehicle in response to a determination that the at least one traffic light includes a blinking lamp having a red color state, slowing of the vehicle in response to a determination that the at least one traffic light includes a blinking lamp having a yellow color state, causing the vehicle to yield in response to a determination that the at least one traffic light includes a blinking lamp having a yellow color state and wherein the blinking lamp includes a directional arrow, or causing the vehicle to yield in response to a determination that the at least one traffic light includes a blinking lamp having a green color state. Various other example navigational actions may be implemented according to a range of properties of the blinking lamp as described above. In some embodiments, the particular navigational actions my depend on a jurisdiction in which the vehicle is driving.

Traffic Light Relevancy

As described generally above, the disclosed embodiments may include functionality for mapping traffic lights and for determining traffic light relevancy for use in autonomous vehicle navigation. Various additional or alternative techniques may be implemented to improve or supplement the traffic light relevance determinations described above. In particular, the disclosed embodiments may include functionality for mapping relevant traffic lights to available lanes based on stop lines of an intersection. This may include physical stop lines detected within an intersection, or may include virtual stop lines, as described generally above. For example, in some embodiments, the system may crowd source observed vehicle behavior relative to an intersection to aggregate and refine detected stopping positions for the intersection. In some embodiments, the system may further determine drivable paths relative to an intersection.

Based on images captured from image capture devices in vehicles traversing the intersection, the system may assign logical groupings of traffic lights that have a synchronized signal pattern. These logical groupings may be correlated with particular lanes of travel in the intersection based on the stop line data described above. For example, drive data that indicates vehicles in a particular lane of travel typically stop at a particular point when a traffic light grouping is red may indicate that traffic light grouping is associated with the lane of travel. The assignment of logical traffic light groupings may be refined based on additional information such as detected road signs or arrows on a road surface. The assigned logical traffic light groupings as well as links between the groupings and associated lanes or drivable paths may be stored in a navigational map, which may be used to navigate the junction by one or more vehicles. Accordingly, the disclosed embodiments provide improved safety, efficiency, and performance over existing navigational systems. These embodiments are described in further detail below and example embodiments are illustrated in the accompanying drawings.

Figure 37A:
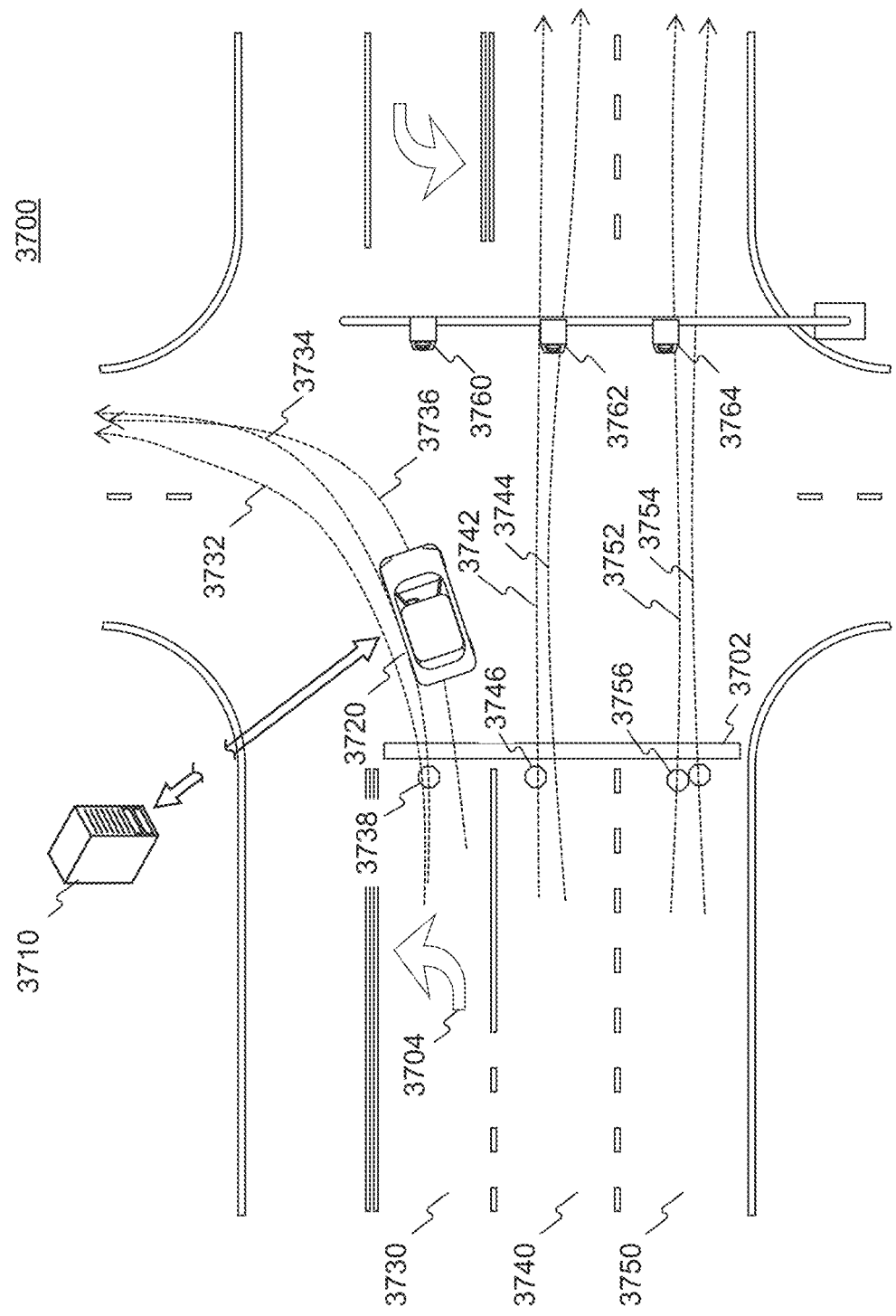
FIG. 37A illustrates an example junction for which traffic light relevancy may be determined, consistent with the disclosed embodiments.

FIG. 37A illustrates an example junction 3700 for which traffic light relevancy may be determined, consistent with the disclosed embodiments. Junction 3700 may include three lanes of travel 3730, 3740, and 3750 entering the junction from a particular direction, as shown in FIG. 37A. In particular, lane 3730 may be a left-turn only lane while lanes 3740 and 3750 may be through lanes along which vehicles may proceed straight through the junction. Lane 3750 may also allow for right turns onto an intersecting roadway. Junction 3700 may include a plurality of traffic lights, such as traffic lights 3760, 3762, and 3764. For example, traffic light 3760 may be associated with lane 3730, while traffic lights 3762 and 3764 may both be associated with each of lanes 3740 and 3750. While this association may be apparent to a driver of a vehicle, it may be difficult for conventional autonomous or semi-autonomous vehicle navigation systems to reliably determine these associations. Using the techniques disclosed herein, traffic lights 3760, 3762, and 3764 may be grouped into one or more logical groups and the relevance of the groups may be determined using stop locations and other drive information. While junction 3700 is provided as an illustrative example, it is to be understood that the same or similar techniques may be applied in a variety of junction types or arrangements.

In order to determine the relevancy of traffic lights, a server may be configured to receive drive information collected from a plurality of vehicles that traversed a road segment associated with a junction. For example, a server 3710 may receive drive information 3736 from a host vehicle 3720 as it navigates through junction 3700, as shown in FIG. 37A. In some embodiments, server 3710 may correspond to sever 1230 described above. Accordingly, any of the descriptions or disclosures made herein in reference to server 1230 may also apply to server 3710, and vice versa. Server 3710 may be configured to receive drive information from multiple vehicles as they traverse junction 3700, which may include drive information 3731, 3734, 3736, 3742, 3744, 3752, and 3754. The drive information shown in FIG. 37A is provided for purposes of illustration, and it is to be understood that, in some embodiments, many more sets of drive information may be analyzed. For example, server 3720 may be configured to crowd source drive information from many vehicles traversing junction 3700 to determine the relevance of traffic lights 3760, 3762, and 3764.

As described throughout the present disclosure, drive information may include any information collected by a host vehicle as it traverses along a roadway. The drive information may include a motion history of the vehicle, such as position, speed, orientation, acceleration, elevation, or other information associated with the physical movement of a vehicle. Accordingly, the drive information may identify a path a vehicle traveled through junction 3700 as well as positions at which the vehicle stopped (which may include a complete stop or a near complete stop) as it traversed the intersection. The drive information may also include information captured from various sensors of the host vehicle as it traverses junction 3700. For example, the drive information may include image data representing the environment of the vehicle. In particular, the images may include representations of one or more of traffic lights 3760, 3762, and 3764 as vehicles traverse junction 3700. Server 3710 may determine a state of traffic lights 3760, 3762, and 3764 based on the image data, as described further below.

Consistent with the disclosed embodiments, server 3710 may determine a location of at least one stop line associated with a junction. In some embodiments, the stop location may be determined based on drive information. For example, server 3710 may be configured to receive drive information from each of a plurality of vehicles. The drive information may include a stopping location at which a particular vehicle from among the plurality of vehicles stopped relative to an intersection during a drive along the road segment. For example, the drive information may include stopping locations 3738, 3746, and 3756 as shown in FIG. 37A. Server 3710 may be configured to aggregate the stopping locations in the drive information received from the plurality of vehicles and determine, based on the aggregated stopping locations, a stop line location relative to the intersection. Techniques for determining stop lines associated with a junction are described in greater detail above with respect to FIGS. 27, 28, 29A, and 29B.

Additionally or alternatively, information from images captured by the plurality of vehicles may be used to identify the stop lines. For example, images captured by vehicles traversing through junction 3700 may include representations of painted stop line 3702, which may indicate the location of a stop line for vehicles entering junction 3700. The stop line may be identified based on other features or landmarks in the vicinity of junction 3700, such as lane marks (e.g., the end of a solid or dashed lane mark), a crosswalk, areas with identifiable wear (e.g., oil spots, worn pavement, etc.), or any other indicators that vehicles may stop at a particular area. Various other landmarks, such as road signs, lamp posts, poles, sidewalks, or other features in the vicinity of the junction may indicate the location of the stop line.

In some embodiments, the location of a stop line may be determined based on observed geometry of traffic lights relative to the junction. For example, a stop line may be assumed to run parallel to traffic lights 3760, 3762, and 3764 in junction 3700. Further, the stop line may be assumed to be a predetermined distance ahead of traffic lights 3760, 3762, and 3764, which may also take into account a height of the traffic lights or other geometries that may indicate where vehicles stop relative to the traffic lights. In some embodiments, a traffic light that is not applicable to the direction of travel of the vehicles capturing the drive information may indicate the location of a stop line. For example, a traffic light for traffic approaching from the opposite direction (not shown in FIG. 37A) may be placed above where vehicles stop for traffic lights 3760, 3762, and 3764. As another example, a traffic light may be placed near the entrance of a junction and a stop line may be assumed to be aligned with or near the traffic light at the entrance of the junction. In some embodiments, this may include pedestrian crossing signals, such as "walk" or "do not walk" signals. For example, the system may determine a stop line is located ahead of a pedestrian walk signal for pedestrians crossing the road segment (i.e., based on an imaginary line extending from the walk signal perpendicular to the road segment).

As described above, drive information collected from the plurality of vehicles may include locations of traffic lights detected as each of the plurality of vehicles navigates relative to a road segment. The drive information may further include indicators of states of detected traffic lights, which may be used to form logical traffic light groups. The states of the detected traffic lights may refer to the current signal being displayed by the traffic light. The state may be defined in reference to whether a lamp included on the traffic light is illuminated (or which of a plurality of lamps is being illuminated). The state may also be defined based on an illumination pattern of a particular lamp (e.g., whether a lamp is blinking), which may be determined as described in greater detail above. In some embodiments, the state may refer to a color state indicating the color of the lamp currently being illuminated. For example, a traffic light may have a current state of "RED," "YELLOW," (or "AMBER"), or "GREEN." The particular color states may depend on the type of traffic light or the jurisdiction in which the traffic light is located. In some embodiments, the state may be determined based on a position of the lamp currently being illuminated. For example, a top lamp may be associated with a different state than a bottom lamp on a traffic light. Shape or other properties of a lamp may also indicate the state of a traffic light. For example, a traffic light in which a turn arrow is illuminated may be associated with a "LEFT TURN" or "RIGHT TURN" state. Images within the drive information captured by the plurality of vehicles may be analyzed to identify properties of the traffic lights, including a number of lamps, which (if any) lamps are illuminated, colors of the lamps, shapes of the lamps, positions of the lamps, or any other properties that may be determined based on image analysis. In some embodiments, the state may be defined based on a combination of properties. For example, a traffic light may have a state of "BLINKING GREEN LEFT ARROW" or "SOLID RED RIGHT ARROW." While example traffic light configurations and states are provided by way of example, the present disclosure is not limited to any particular form or configuration of traffic light, and the particular states may vary depending on the application or jurisdiction.

In some embodiments, the states of the traffic lights may be determined by a processing device of a host vehicle (e.g., host vehicle 3720) as it traverses the junction. Accordingly, the drive information may include determined states of traffic lights represented in images captured by hosts vehicle 3720, which may be analyzed by server 3710. Alternatively or additionally, server 3710 may determine the states of the traffic lights based on image data included in the drive information. In some embodiments, determining the states may include selecting a state from a predefined list of traffic light states. For example, server 3710 or host vehicle 3720 may store a list of predefined traffic states (which may be specific to a particular jurisdiction) and may select a current state of the traffic light based on properties of a traffic light determined by analyzing captured images. Alternatively or additionally, the state may be defined as a set of identified properties. For example, the state may be represented as a combination of position, color, shape, illumination pattern, or other properties. Accordingly, any traffic lights with the same combination of these properties may be said to have the same state. In some embodiments, each property may have a predetermined set of values (although this is not necessarily so). For example, a color property may have a list of green, yellow, red, white, and orange (or other colors depending on the application) and the closest color from the list may be assigned as the value for the color property to avoid slight variations in colors being associated with different states. In some embodiments, the states may be defined based on a signal or message indicated by the traffic light. For example, the states may include "no left turn," "proceed straight," "stop," or other information that may be indicated by a traffic light. Various other methods for defining a state may be used.

Based on the detected states of traffic lights in a junction, a server or host vehicle may group the traffic lights into one or more logical traffic light groups. The logical groups may be defined such that any traffic lights that operate according to the same traffic signal pattern are grouped together. Any traffic lights that exhibit a different state from each other at any given time may be separated into different logical groups. Any traffic lights that exhibit the same states consistently throughout a traffic pattern cycle may be grouped together. In other words, a logical traffic light group may be defined to only include traffic lights that always exhibit the same state as each other. Accordingly, simply because two traffic lights are in the same state in one image or within one set of drive information may not necessarily mean they are logically grouped together. To account for this, server 3710 may analyze drive information from multiple vehicles collected over an extended period of time (e.g., several minutes, several hours, several days, etc.) to more accurately define the logical groupings.

Figure 37B:
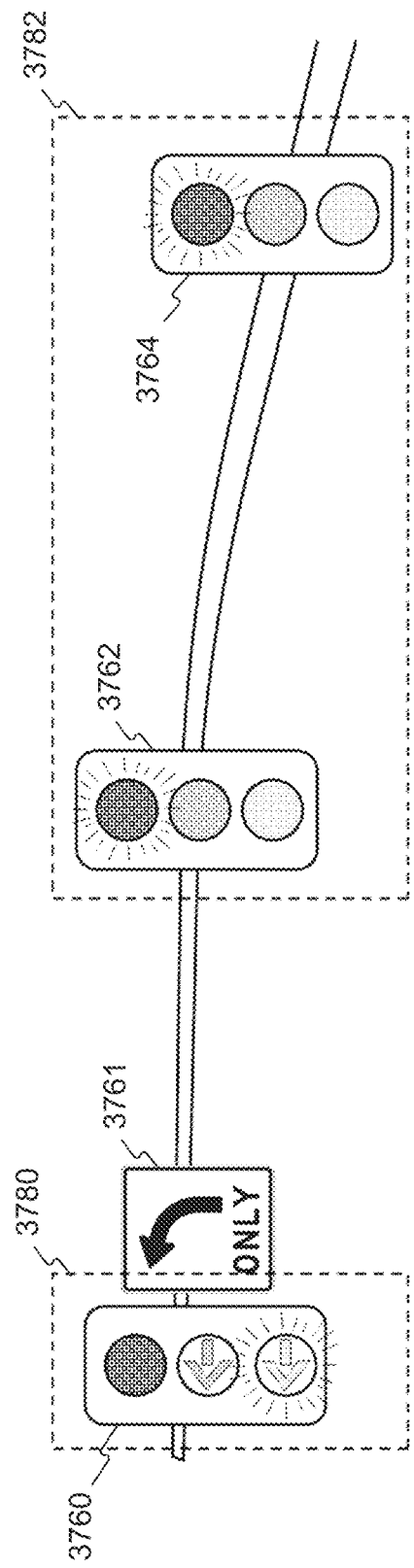
FIG. 37B illustrates an example grouping of traffic lights, consistent with the disclosed embodiments.

FIG. 37B illustrates an example grouping of traffic lights, consistent with the disclosed embodiments. In this example, traffic lights 3760, 3762, and 3764 (as shown in FIG. 37A) may be grouped into two logical groups 3780 and 3782. In particular, traffic light 3760 may be grouped separate from traffic lights 3762 and 3764 because it has been detected to be in a different state (e.g., green left arrow illuminated) than traffic lights 3762 and 3764 (e.g., red lamp illuminated) as shown in FIG. 37B. It should be noted that if traffic lights 3762 and 3764 were to be identified as having different states (e.g., in subsequent drive information), they may be separated in to two distinct groups. Accordingly, the grouping of traffic lights may be determined dynamically as drive information is received at server 3710.

In some embodiments, other indicators besides current states of traffic lights may be used to determine the logical traffic light groups. For example, the configuration of lamps on a traffic light, even if they are not currently illuminated, may indicate traffic lights may be grouped differently. In the example shown in FIG. 37B, traffic light 3760 may be grouped separately from traffic lights 3762 and 3764 by virtue of traffic light 3760 having two turn indicator lamps, which are not included on either of traffic lights 3762 and 3764. As another example, the placement or orientation of the traffic lights may provide context for logical groupings. For example, traffic lights positioned closer to each other relative to other traffic lights may be more likely to be grouped together. Further, a logical group may be more likely to include contiguously positioned traffic lights. For example, a logical group including traffic lights 3762 and 3764 may be more likely than a logical group including traffic lights 3760 and 3764 and excluding traffic light 3762 based on placement of the traffic lights. Various other identified features or landmarks included in the drive information may provide cues as to logical traffic light groupings as well. For example, traffic light 3760 may be positioned adjacent to left turn only sign 3761, which may indicate it has a different logical grouping than traffic lights 3762 and 3764. It should be noted that while positioning of traffic lights may provide contextual cues, traffic lights spaced apart from each other within a junction may be included within the same logical grouping. For example, logical traffic light groups may include a first traffic light in a vicinity of an entrance to the junction and a second traffic light in a vicinity of an exit to the junction. A traffic light may be said to be in the vicinity of the entrance of an entrance to a junction if it is closer to the entry point of the junction than an exit point of the junction along a particular direction of travel, or vice versa. In other words, traffic lights that are longitudinally spaced from each other along a road segment passing through the junction may be grouped together based on observed traffic patterns. This may include traffic lights positioned near the entry point of a junction, in the middle of the junction (e.g., hanging above the junction), or at the exit of the junction.

Consistent with the disclosed embodiments, server 3710 may store representations of the logical traffic light groups in a crowd-source navigational map, which may be used by host vehicles traversing junction 3700. The representations of the grouping may be stored in various ways. For example, each detected traffic light stored in the map may be associated with a group ID indicating a logical group the traffic light is associated with. As another example, an array or other data structure may correlate traffic lights in the crowd-sourced map with each other to indicate logical groupings. Any other suitable method for defining groups within the crowd-sourced map data may be used.

In some embodiments, server 3710 may further be configured to link the logical traffic light groupings with drivable paths included in or associated with the crowd-sourced map. Accordingly, the crowd-source maps may indicate to vehicles traveling along a particular drivable path which traffic lights in a junction are relevant to that drivable path. The vehicles may therefore determine navigational actions based on detected states of the relevant traffic lights.

Figure 37C:
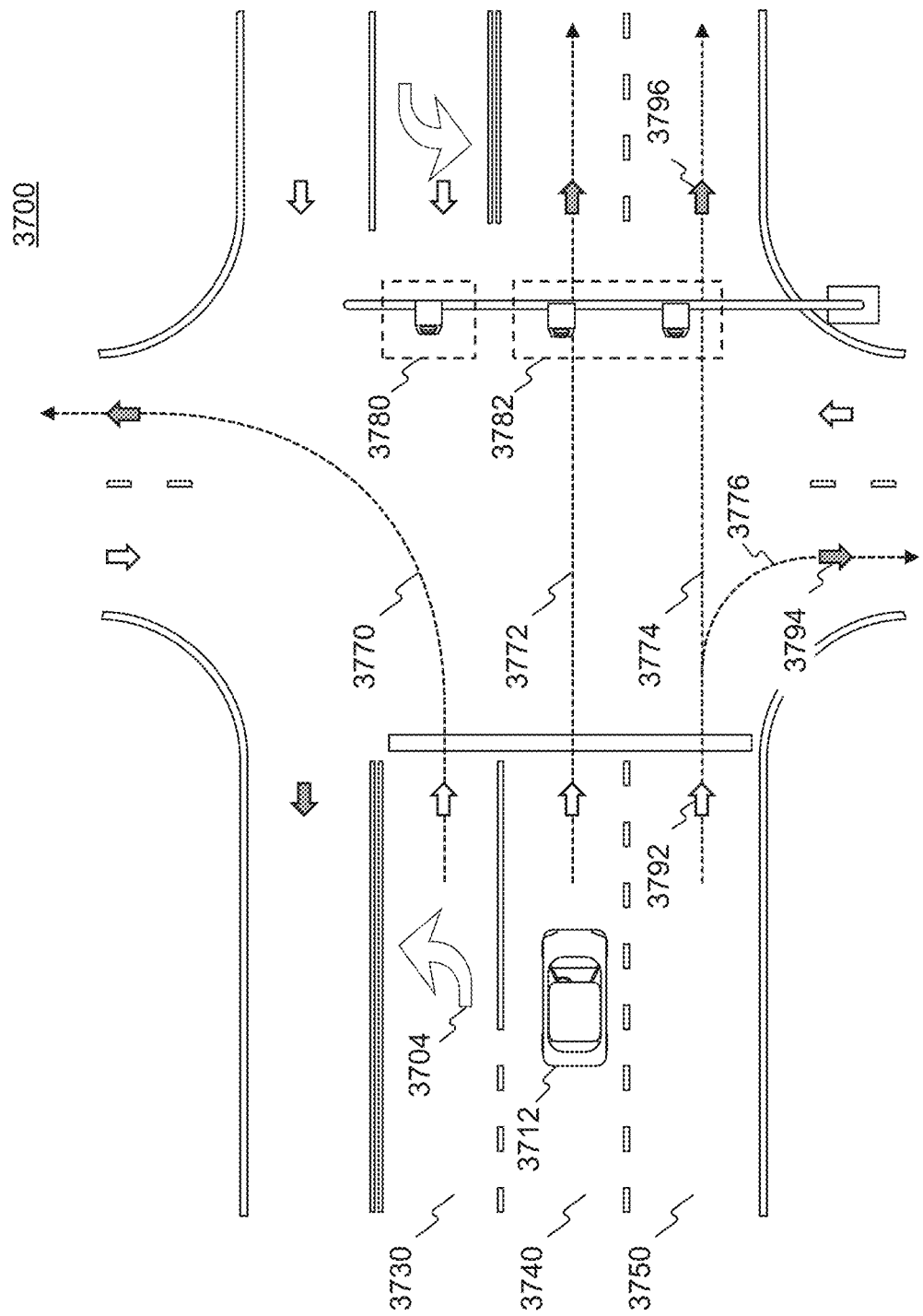
FIG. 37C illustrates example drivable paths that may be associated with a junction, consistent with the disclosed embodiments.

FIG. 37C illustrates example drivable paths that may be associated with junction 3700, consistent with the disclosed embodiments. In particular, a crowd-sourced map may include drivable paths 3770, 3772, 3774, and 3776, as shown. The drivable paths may be determined based on aggregated motion characteristics of a plurality of vehicles as they traverse junction 3700. For example, drive information 3732, 3734, and 3736 (as shown in FIG. 37A) may be aggregated to generate drivable path 3770. Likewise drive information 3742 and 3744 may be aggregated to generate drivable path 3772 and drive information 3752 and 3754 may be aggregated to generate drivable path 3774. The drivable paths may correspond to target trajectories included in the navigational map, as described throughout the present disclosure. Accordingly, the various methods described herein for determining the target trajectories may be used to determine the drivable paths. For example, the drivable paths may be represented as a 3D spline as described above with respect to FIG. 9B. While drivable paths are shown with respect to lanes 3730, 3740, and 3750 for purposes of illustration, drivable paths may be defined for other directions of travel through junction 3700. In some embodiments, drivable paths may be defined for each possible entrance and exit combination for a junction. For example, junction 3700 may include a plurality of entrance points shown as white arrows and a plurality of exit points shown as grey arrows. Based on the aggregated motion characteristics, drivable junction paths may be generated between each entrance of junction 3700 and each exit associated with the entrance. For example, entrance 3792 may be associated with each of exits 3794 and 3796, as illustrated by drivable paths 3744 and 3776, respectively. Accordingly, all of the possible drivable paths for a junction may be defined in a crowd-sourced map.

Server 3710 or a host vehicle may link drivable paths for a road segment with at least one logical traffic light group. In particular, the links may indicate which of the logical traffic light groups for a junction are relevant to each of the drivable paths. The links may be determined based on vehicle behavior relative to the traffic lights, which may be indicated in the collected drive information. For example, the links may be determined based on an observed state of the traffic lights as each of the vehicles crosses a stop line when traveling a drivable path, which may be based on stop locations in the drive information, such as stop locations 3738, 3746, and 3756 shown in FIG. 37A. In particular, if a vehicle comes to a stop at or near a stop line while a logical traffic light group is in a "stop" state (e.g., when a red lamp is illuminated), it may indicate the logical traffic light group is relevant to a drivable path the vehicle is traveling along. For example, if drive information drive information 3742 includes stop location 3746 while logical traffic light group 3782 is in a stop state, this may indicate a link between logical traffic light group 3782 and drivable path 3772.

Conversely, if a vehicle does not stop at or near a stop line while a logical traffic light group is in a stop state, it may indicate the logical traffic light group is not relevant to a drivable path the vehicle is traveling along. For example, drivable information 3744 may not include a stop point and may indicate a stop state for logical traffic light group 3780. Accordingly, server 3710 or a host vehicle may determine logical traffic light group 3780 may not be associated with drivable path 3772. As another example, if a vehicle does not stop at or near a stop line while a logical traffic light group is in a "go" state (e.g., when a green lamp is illuminated), it may indicate the logical traffic light group is relevant to a drivable path the vehicle is traveling along, and if a vehicle comes to a stop at or near a stop line while a logical traffic light group is in the go state, it may indicate the logical traffic light group is not relevant to a drivable path the vehicle is traveling along.

In some embodiments, the links may be determined based on a statistical analysis of vehicle behaviors, which may provide a more accurate indication of relevancy of the traffic lights. For example, there may be valid reasons why a vehicle may stop even though a light is green, such as a pedestrian or animal crossing the intersection, making a right turn, etc. Therefore, a vehicle stopping at a stop line when a logical traffic light group is in a go state may not necessarily be determinative of relevancy of the logical traffic light group to the drivable path. However, statistical analysis of vehicle behaviors over time may be more indicative of the traffic light relevancy.

In some embodiments, the statistical analysis may include comparing a number of vehicles exhibiting a particular behavior associated with a stop line to a threshold value. As an illustrative example, particular drivable path may not be linked to a particular logical traffic light group if more than a threshold number of vehicles traveling along the drivable path pass a stop line while a traffic light in the group is in a stop state (e.g., a red color state, etc.). In some embodiments, the threshold may be based on a percentage of vehicles. For example, a particular drivable path may be linked to a particular logical traffic light group if more than a threshold percentage of vehicles traveling along the drivable path pass a stop line when a traffic light in the logical group is in a go state (e.g., a green color state, etc.). Conversely, if more than a threshold number of vehicles stop at a stop line when a traffic light in the logical group is in a go state, the logical grouping may not be associated with that drivable path. Similar thresholds may be used for other types of traffic light states (e.g., vehicles turning, slowing down, etc.).

In some embodiments, additional information may be used to supplement or confirm the information used to determine the links between drivable paths and traffic light groups. This may include road markings associated with a particular drivable path, such as turn arrow 3704. For example, turn arrow 3704 may indicate that drivable path 3770 is associated with logical traffic light group 3780 due to the presence of a turn indicator in traffic light 3760. This may similarly indicate that drivable path 3770 is not associated with logical traffic light group 3782. As another example, the links may be determined based on a recognized road directional indicator from one or more images. For example, this may include the presence of a turn indicator lamp in a traffic light, such as traffic light 3760. As another example, this may include determining that left turn only sign 3761 is associated with traffic light 3760. Accordingly, server 3710 may determine that straight through drivable paths, such as drivable paths 3772 and 3774, or drivable paths associated with turns in another direction, such as drivable path 3776, are not linked with logical traffic light group 3780. Similarly, the motion characteristics of a vehicle may also indicate relevance to a logical traffic light grouping (e.g., whether a vehicle turns, travels straight through an intersection, slows down, etc.).

According to some embodiments, a machine learning algorithm may be used to determine a relevancy of traffic light groupings. For example, a training algorithm, such as an artificial neural network may receive training data in the form of vehicle drive information. The drive information may include image data with representations of traffic lights as described above. The training data may be labeled such that traffic lights relevant to a vehicle associated with the drive information are identified. As a result, a model may be trained to determine a relevance of traffic lights (or traffic light groups) based on drive information. Consistent with the present disclosure, various other machine learning algorithms may be used, including a logistic regression, a linear regression, a regression, a random forest, a K-Nearest Neighbor (KNN) model (for example as described above), a K-Means model, a decision tree, a cox proportional hazards regression model, a Naïve Bayes model, a Support Vector Machines (SVM) model, a gradient boosting algorithm, or any other form of machine learning model or algorithm.

As a result, a crowd-sourced map may be developed that includes links between drivable paths and relevant logical traffic light groups, as described above. Accordingly, a host vehicle, such as host vehicle 3712 shown in FIG. 37C may determine relevant traffic lights based on the crowd-sourced map data. In some embodiments host vehicle 3712 may correspond to host vehicle 100 described above. Accordingly, any embodiments or features described above with respect to host vehicle 100 may equally apply to host vehicle 3712, and vice versa. Host vehicle 3712 may capture images while traversing junction 3700 along drivable path 3772. For example, host vehicle 3712 may be equipped with an image capture device or camera, such as image capture devices 122, 124, and 126, as described in greater detail above. Host vehicle 3712 may detect traffic lights 3760, 3762, and 3764 in the captured images. Further, host vehicle 3712 may access a crowd-sourced map linking drivable path with logical traffic light grouping 3782. In some embodiments, this may include accessing the crowd-sourced map from a memory of the host vehicle, such as memory 140. In some embodiments, host vehicle 3712 may receive the crowdsourced map from a server, such as server 3710. Additionally or alternatively, host vehicle 3712 may receive update data that may update, supplement, or replace portions of a crowd-sourced map stored in memory. Based on the crowd-sourced map, host vehicle 3712 may determine that traffic lights 3762 and 3764 included in logical traffic light group 3782 are relevant to drivable path 3772. Accordingly, host vehicle 3712 may determine a navigation action based on a detected state of one or both of traffic lights 3762 and 3764. For example, if one or both of lights 3762 and 3764 are determined to be in a stop state (e.g., based on a color or position of an illuminated lamp), host vehicle 3712 may stop at a stop line associated with junction 3700. Conversely, if one or both of lights 3762 and 3764 are determined to be in a go state, host vehicle 3712 may proceed through junction 3700. Host vehicle 3712 may also determine that it can ignore detected states of traffic light 3760 based on the link information included in the crowd-sourced map. If host vehicle 3712 changes lanes, host vehicle 3712 may determine a new logical traffic light group relevant to the new drivable path and determine appropriate navigational actions accordingly.

Figure 38A:
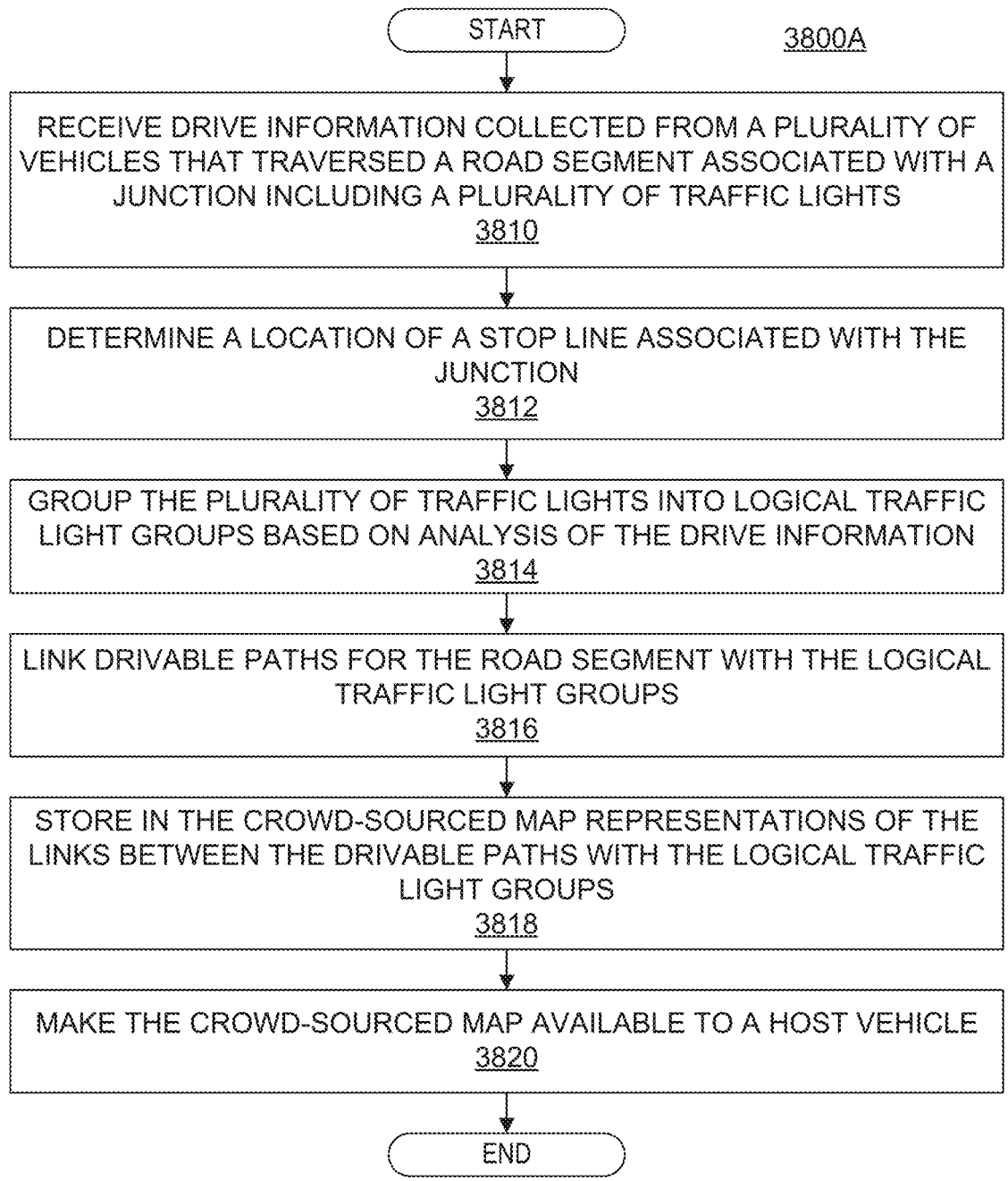
FIG. 38A is a flowchart showing an example process for generating a crowd-sourced map for use in vehicle navigation, consistent with the disclosed embodiments.

FIG. 38A is a flowchart showing an example process 3800A for generating a crowd-sourced map for use in vehicle navigation, consistent with the disclosed embodiments. Process 3800A may be performed by at least one processing device of a remotely located entity, such as server 3710, as described above. In some embodiments, a non-transitory computer readable medium may contain instructions that when executed by a processor cause the processor to perform process 3800A. Further, process 3800A is not necessarily limited to the steps shown in FIG. 38A, and any steps or processes of the various embodiments described throughout the present disclosure may also be included in process 3800A, including those described above with respect to FIGS. 37A, 37B, and 37C.

In step 3810, process 3800A includes receiving drive information collected from a plurality of vehicles that traversed a road segment. The road segment may be associated with a junction, which may include a plurality of traffic lights. For example, the road segment may be associated with junction 3700, which may include traffic lights 3760, 3762, and 3764, as shown in FIG. 37A. Accordingly, step 3810 may include collecting drive information 3732, 3734, 3736, 3742, 3744, 3752, and/or 3754 as described above. The drive information may include any information captured by the plurality of vehicles as they traverse the road segment. For example, the drive information may include at least a portion of images captured by one or more cameras associated with each of the plurality of vehicles while navigating relative to the road segment. In some embodiments, the drive information may include location and type information for one or more landmarks detected as each of the plurality of vehicles navigated relative to the road segment. For example, the recognized landmarks may include one or more of a pole, a lamp post, a lane marking, a traffic sign, or various other types of landmarks described throughout the present disclosure. As another example, the drive information may include locations of traffic lights detected as each of the plurality of vehicles navigated relative to the road segment, such as traffic lights 3760, 3762, and 3764. Similarly, the drive information may include indicators of states of detected traffic lights as each of the plurality of vehicles navigated relative to the road segment. In some embodiments, the drive information may include motion characteristics of each of the plurality of vehicles while navigating relative to the road segment. The drive information may include vehicle stop locations relative to the road segment, such as stop locations 3738, 3746, and 3756 as described above.

In step 3812, process 3800A includes determining a location of at least one stop line associated with the junction. In some embodiments, the location of the at least one stop line may be determined based on aggregated stop positions of the plurality of vehicles relative to the junction. For example, this may include aggregating stop locations 3738, 3746, and 3756. Alternatively or additionally, the location of the at least one stop line may be determined based on observed geometry the plurality of traffic lights relative to the junction, as described above. Additional details regarding determining stop lines are provided above at least with respect to FIGS. 29A and 29B.

In step 3814, process 3800A includes grouping the plurality of traffic lights into one or more logical traffic light groups based on analysis of the drive information collected from the plurality of vehicles. For example, this may include determining groups 3780 and 3782 as described above. Accordingly, grouping of the plurality of traffic lights into one or more logical traffic light groups may be based, at least in part, on indicators of states (e.g., color states, etc.) for each of the plurality of traffic lights as each of the plurality of vehicles navigated relative to the at least one junction. The indicators of color states may be determined based on analysis of one or more image frames captured by each of the plurality of vehicles as it navigated relative to the at least one junction, as described above. The traffic lights may be grouped based on traffic lights exhibiting the same sequence of states at the same times. For example, traffic lights observed by any of the plurality of vehicles as having different color states from one another may be grouped into different logical traffic light groups. Conversely, traffic lights observed by the plurality of vehicles as having common color states may be grouped into a common logical traffic light group. The grouping may also be based on the shape or other properties of lamps on the traffic lights. For example, traffic lights observed by the plurality of vehicles as being associated with common directional indicators are grouped into a common logical traffic light group, as described in further detail above. The grouping may not necessarily be limited to traffic lights located in the same part of the junction (e.g., on the same pole, etc.). For example, at least one of the one or more logical traffic light groups may include a first traffic light in a vicinity of an entrance to the junction and a second traffic light in a vicinity of an exit to the junction, as described above.

In step 3816, process 3800A includes linking each of two or more drivable paths for the road segment with at least one of the one or more logical traffic light groups. Each of the drivable paths may be associated with a different travel lane along the road segment. In some embodiments, the drivable paths may be determined based on analysis of drive information. For example, process 3800A may further include generating the two or more drivable paths for the road segment based on aggregated motion characteristics of the plurality of vehicles as they traversed the road segment. Process 3800A may further include storing the generated two or more drivable paths in the crowd-sourced map. For example, the two or more drivable paths may be map as three-dimensional splines. In some embodiments, the drivable paths may be generated based on entrance and exit points for a junction. For example, process 3800A may include generating drivable junction paths between each entrance and an associated exit of the junction and store the generated drivable junction paths in the crowd-sourced map.

Each drivable junction path is associated with an entrance point and/or an exit point stored in the crowd-sourced map.

The links between each of the two or more drivable paths and at least one of the one or more logical traffic light groups may indicate which of the one or more logical traffic light groups is relevant to each of the two or more drivable paths. In some embodiments, the drivable paths may be determined based on the at least one stop line. For example, the links between each of the two or more drivable paths and at least one of the one or more logical traffic light groups are determined based on an observed color state of at least one of the plurality of traffic lights as each of the plurality of vehicles passed an intersection between the at least one stop line and one of the two or more drivable paths, as described above. A particular drivable path may not be linked to a particular logical traffic light group if one or more of the plurality of vehicles observed any traffic light associated with the particular logical traffic light group in a stop color state as the one or more of the plurality of vehicles passed the intersection between the at least one stop line and the particular drivable path. In some embodiments, the links may be determined based on a threshold value, as described above. For example, a particular drivable path may not be linked to a particular logical traffic light group if more than a threshold number of the plurality of vehicles observed any traffic light associated with the particular logical traffic light group in a stop color state upon passing the intersection between the at least one stop line and the particular drivable path. As another example, a particular drivable path may be linked to a particular logical traffic light group if more than a threshold percentage of the plurality of vehicles observed a traffic light associated with the particular logical traffic light group in a go color state upon passing the intersection between the at least one stop line and the particular drivable path.

In some embodiments, the links may be determined based, at least in part, on other information. For example, the links between each of the two or more drivable paths and at least one of the one or more logical traffic light groups may be determined based on at least one recognized road marking associated with the particular drivable path and/or a road directional indicator associated with a traffic light included in the at least one of the one or more logical traffic light groups, as described above. In some embodiments, the links between each of the two or more drivable paths and at least one of the one or more logical traffic light groups may be determined based on output provided by at least one machine learning model trained to predict relevancy of traffic light groups to drivable paths based on received input including color states of one or more traffic lamps. The links between each of the two or more drivable paths and at least one of the one or more logical traffic light groups may further be based on motion characteristics of one or more of the plurality of vehicles while navigating relative to the junction.

In step 3818, process 3800A includes storing in the crowd-sourced map representations of the links between each of the two or more drivable paths with at least one of the one or more logical traffic light groups. The representations of the links may be stored in any suitable manner associating the two or more drivable paths with at least one of the one or more logical traffic light groups. For example, this may include storing the representations of the links in an array or other data structure, or as properties of at least one of the drivable paths or the logical traffic light groups.

In step 3820, process 3800A includes making the crowd-sourced map available to at least one host vehicle for navigation relative to the plurality of traffic lights. For example, step 3820 may include making the crowd-sourced map available to host vehicle 3712, as described above. In some embodiments, the navigation relative to the plurality of traffic lights may include a traffic light warning issued to a vehicle operator. For example, host vehicle 3712 may display a warning to a driver of the vehicle that a particular traffic light is relevant to the current lane, that an action must be taken based on the current state of the traffic light (e.g., slow down, stop, or proceed through the junction), whether a current traffic light state is consistent with an intended route of the vehicle (e.g., displaying a turn arrow when the driver wants to go straight), or the like. In some embodiments, the host vehicle may be configured to navigate based on the representation of the links in the crowd-sourced map. For example, the navigation relative to the plurality of traffic lights includes autonomous braking relative to a detected color state of at least one traffic light determined to be in a logical traffic light group indicated in the crowd-sourced map as relevant to a current drivable path of the at least one host vehicle. Various other navigation actions described throughout the present disclosure may be performed relative to a detected state.

Figure 38B:
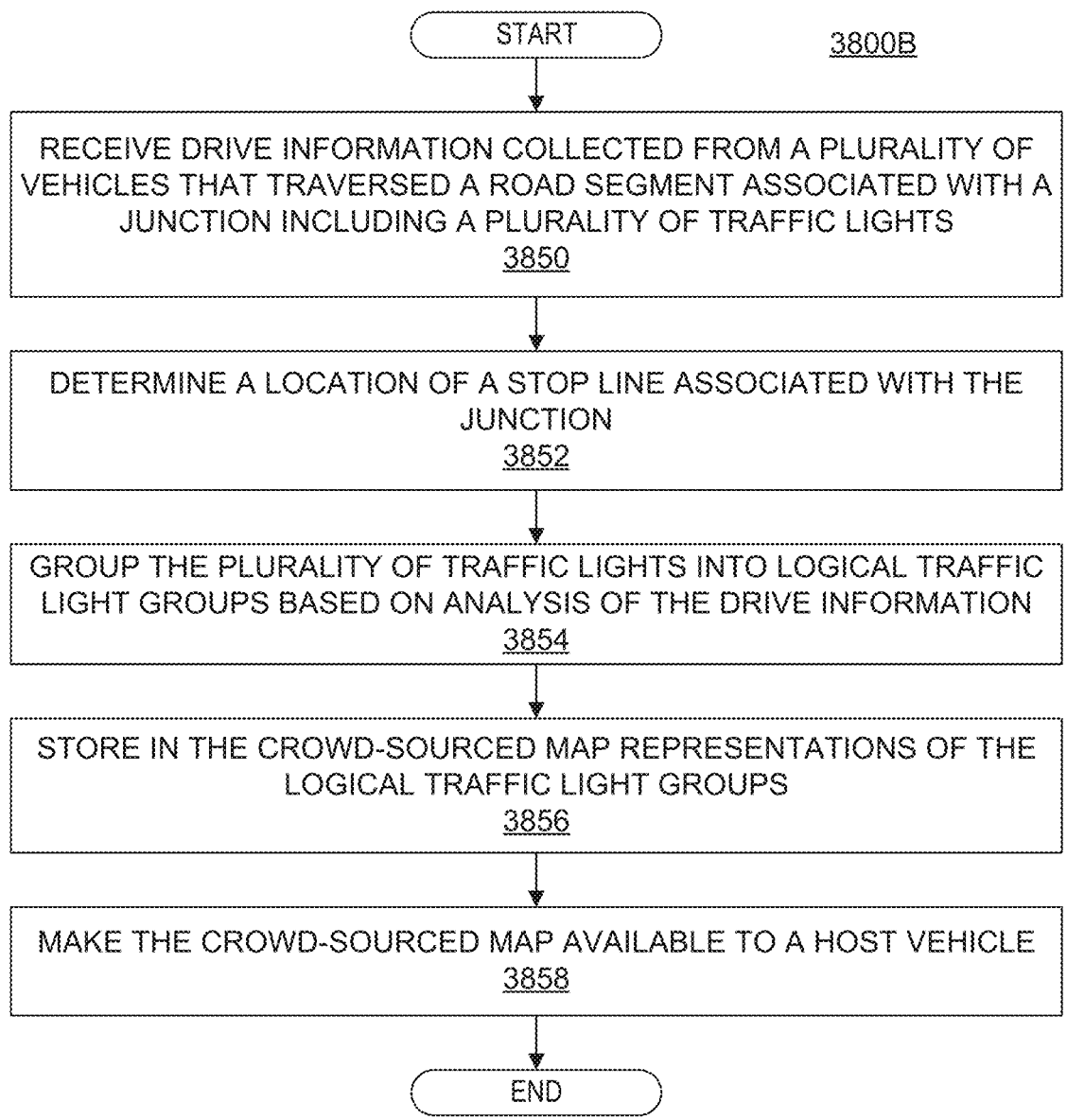
FIG. 38B is a flowchart showing an example process for generating a crowd-sourced map for use in vehicle navigation, consistent with the disclosed embodiments.

FIG. 38B is a flowchart showing an example process 3800B for generating a crowd-sourced map for use in vehicle navigation, consistent with the disclosed embodiments. Process 3800B may be performed by at least one processing device of a remotely located entity, such as server 3710, as described above. In some embodiments, a non-transitory computer readable medium may contain instructions that when executed by a processor cause the processor to perform process 3800B. Further, process 3800B is not necessarily limited to the steps shown in FIG. 38B, and any steps or processes of the various embodiments described throughout the present disclosure may also be included in process 3800B, including those described above with respect to FIGS. 37A, 37B, 37C, and 38A.

In step 3850, process 3800B includes receiving drive information collected from a plurality of vehicles that traversed a road segment. The road segment may be associated with a junction, which may include a plurality of traffic lights. As with step 3810, the drive information may include at least a portion of images captured by one or more cameras associated with each of the plurality of vehicles while navigating relative to the road segment; location and type information for one or more landmarks detected as each of the plurality of vehicles navigated relative to the road segment; locations of traffic lights detected as each of the plurality of vehicles navigated relative to the road segment; indicators of states of detected traffic lights as each of the plurality of vehicles navigated relative to the road segment; motion characteristics of each of the plurality of vehicles while navigating relative to the road segment; vehicle stop locations relative to the road segment; or various other forms of drive information described herein.

In step 3852, process 3800B includes determining a location of at least one stop line associated with the junction. In some embodiments, the location of the at least one stop line may be determined based on aggregated stop positions of the plurality of vehicles relative to the junction. Alternatively or additionally, the location of the at least one stop line may be determined based on observed geometry the plurality of traffic lights relative to the junction. Additional details regarding determining stop lines are provided above at least with respect to FIGS. 29A and 29B.

In step 3854, process 3800B includes grouping the plurality of traffic lights into one or more logical traffic light groups based on analysis of the drive information collected from the plurality of vehicles. For example, this may include determining groups 3780 and 3782 as described above. Accordingly, grouping of the plurality of traffic lights into one or more logical traffic light groups may be based, at least in part, on indicators of states (e.g., color states, etc.) for each of the plurality of traffic lights as each of the plurality of vehicles navigated relative to the at least one junction.

In step 3856, process 3800B includes storing in the crowd-sourced map representations of at least one of the one or more logical traffic light groups. For example, this may include associating one or more traffic lights together in an array or other data structure. As another example, a group ID or other data identifying a group may be stored as metadata or other data associated with a traffic light.

In step 3858, process 3800B includes making the crowd-sourced map available to at least one host vehicle for navigation relative to the plurality of traffic lights. For example, step 3858 may include making the crowd-sourced map available to host vehicle 3712, as described above.

In some embodiments process 3800B may include additional steps to link the logical traffic light groups with one or more drivable paths, as described above. In other words, process 3800B may further include linking each of two or more drivable paths for the road segment with at least one of the one or more logical traffic light groups. Process 3800B may include storing in the crowd-sourced map representations of the links between each of the two or more drivable paths with at least one of the one or more logical traffic light group. In some embodiments, the drivable paths may be generated as process 3800B. For example, process 3800B may further include generating the two or more drivable paths for the road segment based on aggregated motion characteristics of the plurality of vehicles as they traversed the road segment. This may further include storing the generated two or more drivable paths in the crowd-sourced map.

Figure 39:
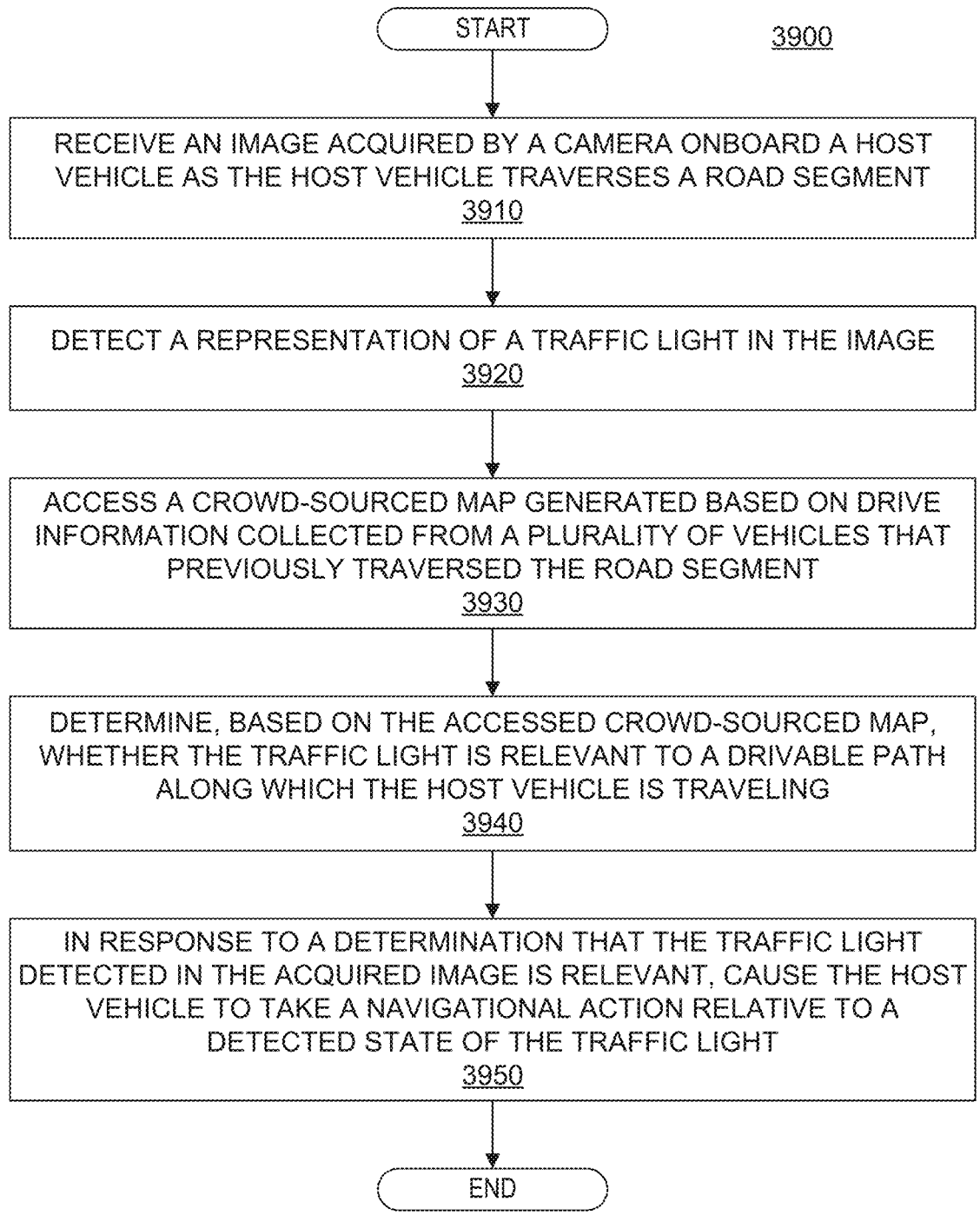
FIG. 39 is a flowchart showing an example process for navigating a host vehicle, consistent with the disclosed embodiments.

As described above, the resulting crowd-sourced map may be used by one or more autonomous or semi-autonomous vehicles for navigating the junction. FIG. 39 is a flowchart showing an example process 3900 for navigating a host vehicle, consistent with the disclosed embodiments. Process 3900 may be performed by at least one processing device of a host vehicle, such as processing unit 110. In some embodiments, at least a portion of process 3900 may be performed by a server, such as server 3710. A non-transitory computer readable medium may contain instructions that when executed by a processor cause the processor to perform process 3900. Further, process 3900 is not necessarily limited to the steps shown in FIG. 39, and any steps or processes of the various embodiments described throughout the present disclosure may also be included in process 3900, including those described above with respect to FIGS. 37A, 37B, 37C, 38A, and 38B.

In step 3910, process 3900 includes receiving an image acquired by at least one camera onboard the host vehicle as the host vehicle traverses a road segment. For example, this may include receiving an image acquired by image capture devices 122, 124, and 126 described above.

In step 3920, process 3900 includes detecting a representation of at least one traffic light in the acquired image. For example, this may include detecting a representation of traffic lights 3760, 3762, and/or 3764, as shown in FIG. 37B. The traffic lights may be detected based on a computer vision algorithm, or other image analysis algorithm as described throughout the present disclosure.

In step 3930, process 3900 includes accessing a crowd-sourced map generated based on drive information collected from a plurality of vehicles that previously traversed the road segment. For example, the crowd-sourced may be generated according to one of processes 3800A or 3800B, as described above. Accordingly, the crowd-sourced map may store links between one more drivable paths along the road segment and logical traffic light groups relevant to each of the one or more drivable paths. The drivable paths may be acquired in various ways. In some embodiments, the one more drivable paths stored in the crowd-sourced map may be determined by aggregating driving paths followed by the plurality of vehicles that previously traversed the road segment. For example, the drivable paths may correspond to drivable paths 3770, 3772, 3774, and 3776 described above. Accordingly, the one more drivable paths may be stored in the crowd-sourced map as three-dimensional splines.

In step 3940, process 3900 includes determining, based on the accessed crowd-sourced map, whether the at least one traffic light detected in the acquired image is relevant to a drivable path along which the host vehicle is traveling. For example, the host vehicle may navigate along a drivable path based on landmarks detected in one or more images captured from the environment of the host vehicle, as described above. The traffic lights may be determined to be relevant based on an indication that the drivable path is linked with a logical traffic light group that includes the traffic light, as described above.

In step 3950, process 3900 includes, in response to a determination that the at least one traffic light detected in the acquired image is relevant to a drivable path along which the host vehicle is traveling, causing the host vehicle to take at least one navigational action relative to a detected state of the at least one traffic light. The navigational action may include any of the various navigational actions described throughout the present disclosure. For example, when the detected state of the at least one traffic light is green, the at least one navigational action may include maintaining a current speed of the host vehicle along the current drivable path. In some embodiments, this may include steering the host vehicle along a drivable path through a junction. As another example, when the detected state of the at least one traffic light is red, the at least one navigational action may include braking the host vehicle. If the traffic light is not relevant, the host vehicle may ignore information indicated by the traffic light. For example, in response to a determination that the at least one traffic light detected in the acquired image is not relevant to a drivable path along which the host vehicle is traveling, step 3950 may include causing the host vehicle to forego a navigational response relative to a detected state of the at least one traffic light.

Traffic Sign Relevancy

While the various embodiments above pertain to determining a relevance of traffic lights, similar techniques may be used for determining and mapping the relevance of traffic signs. This may include stop signs, yield signs, roundabout signs, merge signs, or other signs that may be relevant to particular lanes of travel or particular vehicles along a roadway. For example, a road segment may include a right-turn only sign that applies to only particular lanes of travel along the road segment. Accordingly, it may be beneficial for an autonomous or semi-autonomous vehicle to distinguish between signs that are relevant to a current drivable path the vehicle is traveling along, and signs that are not relevant.

The disclosed embodiments may include techniques for determining a relevance of a traffic sign. In particular, a system may detect the presence of a road sign in a captured image and map a location and type of the road sign in a navigational map, as described in further detail above. The system may determine other information that may indicate a relevance of the road sign, such as a lateral distance between the road sign and one or more drivable paths, a lateral distance between the sign and a road edge, and/or whether a readable portion of the sign is visible from each drivable path. These characteristics, coupled with crowd-sourced driving behavior of vehicles in the vicinity of the detected road sign, road geometry, or other information, may enable the system to link the detected signs with relevant drivable paths, as described in further detail below. Accordingly, the disclosed embodiments provide improved safety, efficiency, and performance over existing navigational systems.

Figure 40:
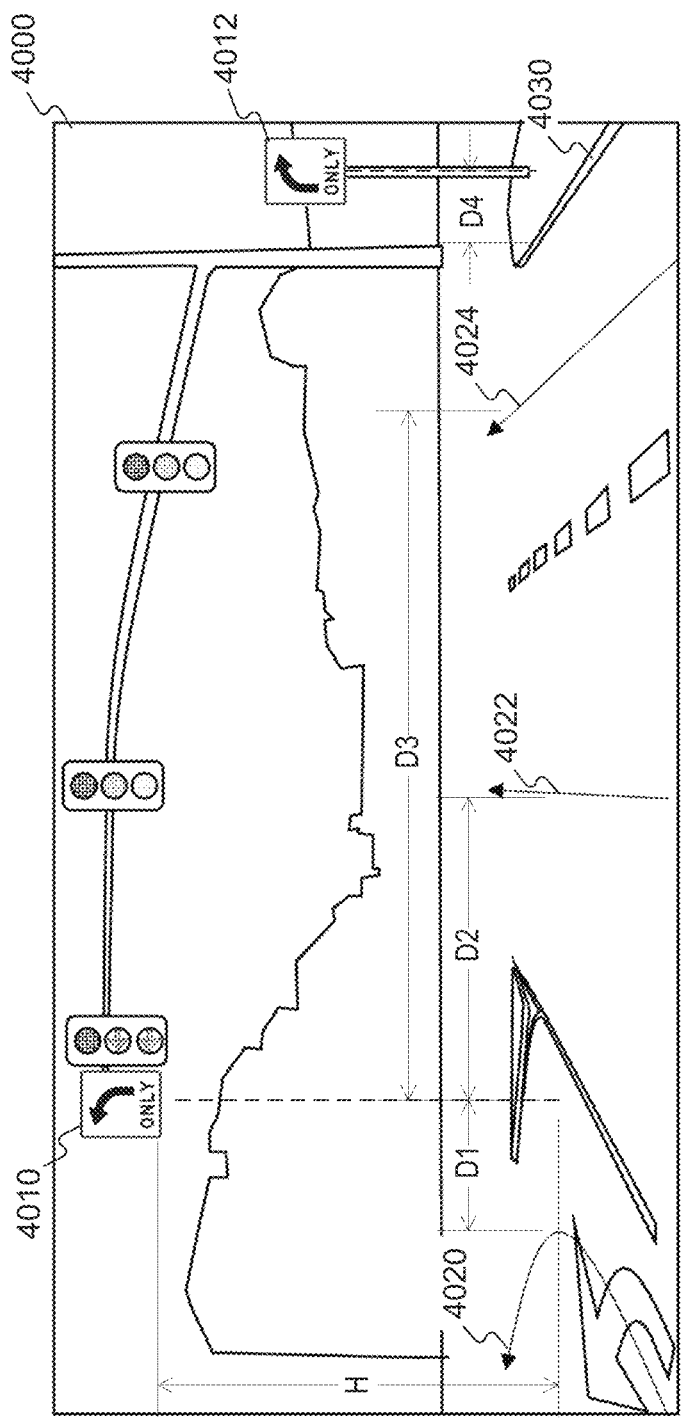
FIG. 40 illustrates an example image representing an environment of a host vehicle, consistent with the disclosed embodiments.

As described herein, the disclosed embodiments may receive one or more images captured by a vehicle. FIG. 40 illustrates an example image 4000 representing an environment of a host vehicle, consistent with the disclosed embodiments. Image 4000 maybe captured by a camera of a host vehicle, such as image capture devices 122, 124, and/or 126. In the example shown in FIG. 40, the image may be captured from a front-facing camera of the host vehicle as the vehicle travels along a road segment. In this example, the road segment may include a lane 4022 along which the host vehicle is travelling. The road segment may also include a left turn lane 4020 to the left of lane 4022, and a right turn lane 4024 to the right of lane 4022. While image 4000 represents an image captured form the front of the host vehicle, the same or similar processes may also apply to images captured from other camera positions, such as images captured from a side or the rear of the host vehicle.

Image 4000 may include representations of one or more traffic signs (also referred to as road signs) within the environment of the host vehicle. As used herein, a traffic sign may include any form of placard or display along a roadway for presenting instructions or other information to road users. Example road signs may include mandatory or regulatory signs (e.g., no entry signs, stop signs, speed limit signs, turn only signs, yield signs, etc.), warning signs (road curve signs, slippery road signs, narrow bridge signs, etc.), informative signs (e.g., hospital ahead signs, service station signs, roadway entrance or exit signs, etc.), railroad or other crossing signs, pedestrian or bicycle signs, route signs, construction signs, or any other signs that may convey information to road users. In some embodiments, a traffic sign may include an electronic display, such as a variable message sign placed along a roadway. In the example shown in FIG. 40, image 4000 may include traffic signs 4010 and 4012. Traffic signs may be placed above a roadway, such as traffic sign 4010, along the side of a roadway, such as traffic sign 4012, or in any other position visible to road users.

A navigation system of the host vehicle may detect representations of traffic signs in captured images, as described above with respect to FIG. 10, for example. In the example shown in FIG. 40, the host vehicle may detect one or more of traffic signs 4010 and 4012 in image 4000. This may include applying one or more computer vision algorithms configured to detect edges, features, corners, and/or objects within an image, as described throughout the present disclosure. For example, this may include non-neural object detection techniques, such as Viola-Jones object detection, scale-invariant feature transform (SIFT), histogram of oriented gradients (HOG), etc., or neural network-based object detection algorithms, such as region proposals (R-CNN, Fast R-CNN, etc.), single shot MultiBox Detector (SSD), or other forms of convolutional neural networks. Accordingly, detecting the representation of traffic signs in captured images may include generating at least one convolution of the image and analyzing the convoluted image.

The disclosed embodiments may further include determining one or more properties or characteristics of the traffic signs or properties or characteristics of the surroundings of the traffic signs (e.g., drivable path geometry, road features, vehicle motion characteristics, or the like) that may indicate a relevance to one or more drivable paths along the road segment. In some embodiments, this may include determining a position or orientation of the traffic sign relative to the road segment. The position may be in reference to other features of the road segment, including one or more drivable paths defined along the road segment. For example, the host vehicle (or a remote server) may determine lateral distances between a particular road sign and drivable paths along the road segment. As shown in FIG. 40, for traffic sign 4010, this may include determining lateral distance D1 to drivable path 4020, lateral distance D2 to drivable path 4022, and lateral distance D3 to drivable path 4024. Although not shown in FIG. 40, distances to drivable paths 4020, 4022, and 4024 may similarly be determined relative to road sign 4012. The lateral distances to each of the drivable paths may be indicative of a relevance of the traffic sign to the drivable paths. For example, because D1 is less than D2 or D3, traffic sign 4010 may be more likely to be relevant to drivable path 4020 than drivable paths 4022 or 4024. In some embodiments, other properties of the traffic sign may be factored in as well, such as a type of the traffic sign or a placement relative to a road segment. In particular, some types of signs may be applicable to all lanes of travel whereas other signs may typically be associated with only one lane. For example, a stop sign may be more likely to be relevant to all lanes of a roadway than a yield or turn only sign. Similarly, a traffic sign placed above a roadway may be more likely to be associated with a particular lane than a sign placed along an edge of a roadway.

Alternatively or additionally, the disclosed embodiments may include determining a lateral distance between a particular traffic sign and a road edge. For example, this may include determining distance D4 between traffic sign 4012 and road edge 4030, as shown in FIG. 40. A distance to road edge 4030 may similarly be determined with respect to traffic sign 4010. The distance to the road edge may be indicative of a relevance of the traffic sign to a particular lane. For example, the distance between the traffic sign and the road edge may be compared to a distance between a drivable path and the same road edge, which may indicate relevance similar to distances D1, D2, and D3, as described above. As another example, the greater distance a traffic sign is from a road edge may indicate a higher likelihood the traffic sign corresponds to a particular drivable path than a traffic sign closer to the road edge.

In some embodiments, the determination of whether a particular traffic sign is relevant to a drivable path may be determined based on other instances of the traffic sign along a road segment. For a given traffic sign, if another traffic sign that is the same as or similar to the traffic sign appears on an opposite side of a drivable path, this may indicate the sign is relevant to the drivable path. In other words, if the same or similar signs appear on both sides of a roadway, such as a stop sign, railroad crossing sign, etc., it may be likely that the sign applies to all drivable paths along the roadway. Conversely, if the traffic sign appears on one side of a roadway, it may be less likely the sign applies to all lanes.

According to some embodiments, relevancy of a sign may be determined based on other geometries associated with the traffic sign, such as a height of the sign relative to a roadway, a vehicle detecting the traffic sign, or other reference points. For example, as shown in FIG. 40, a height H between traffic sign 4010 and the roadway may be determined based on analysis of image 4000. In some embodiments, the height H may be compared to a threshold height to determine whether the traffic sign is relevant to a vehicle capturing an image including a representation of the traffic sign. For example, if a traffic sign is located at a height exceeding a threshold height (e.g., 5 m, 8 m, 10 m, etc.), this may indicate the traffic sign is directed to vehicles traveling on a roadway above the roadway currently being traversed, and therefore is not relevant. Traffic signs detected below the road surface may similarly be relevant to vehicles traveling on a road segment below the road segment currently being traversed.

As another example, traffic sign relevancy may be determined based on a direction the traffic sign is facing. Accordingly, a host vehicle (and/or a central server) may be configured to determine whether a semantic portion of a traffic sign is visible when traveling along a particular drivable path. As used herein, a semantic portion of the traffic sign refers to a portion of the sign including text and/or graphics for conveying the information intended by the traffic sign. For example, this may be the side of a sign that includes the word "STOP" or "YIELD." If the semantic portion is visible from a particular drivable path, it may be possible that the traffic sign is relevant to the drivable path. Or, perhaps more meaningfully, if the semantic portion is not visible from a particular drivable path, this may indicate the traffic sign is not relevant to the particular drivable path. For example, traffic signs are not likely to be placed in a manner in which they are not visible to the lane of travel along a road segment to which they apply. Accordingly, if an image contains the back of a traffic sign, for example, the traffic sign may be determined to not be relevant to the drivable path along which the image was captured.

Various other features of a road segment in the environment of the traffic sign may also indicate relevance to particular drivable paths. For example, as described above, a navigational map may include landmarks or other road features detected along a road segment. The proximity of a particular road sign to one or more road features represented in the crowd-sourced map may indicate relevance to drivable paths included in the crowd-sourced map. In some embodiments, this may be determined in context with a type of the sign. For example, if a traffic sign indicates a lane must merge ahead and a drivable path along the road segment includes a merge point following the traffic sign, the traffic sign may be determined to be associated with the drivable path including the merge point. Similarly, this may also indicate that the traffic sign is not relevant to other drivable paths not including the merge point. Other examples of road features may include a roundabout, a stop line, a lane split, or a curvature associated with a drivable path.

Similarly, the determination of whether a particular traffic sign is relevant to a drivable path may be determined based on motion characteristics of one or more vehicles within a vicinity of a particular traffic sign. A traffic sign may be considered to be in a vicinity of a traffic sign if it is within an operational range of a traffic sign (i.e., within a range at which a vehicle would typically perform a navigational action based on the traffic sign). In some embodiments, the vicinity may be defined based on a threshold distance. For example, motion characteristics within a range of 8 meters (or any other suitable value) may be analyzed. In some embodiments, whether the motion of a vehicles is within a vicinity of the traffic sign may depend on a type of the sign. For example, for a stop sign, motion characteristics may be analyzed within a specified range in front of the stop sign that vehicles typically stop within (e.g., 1 meter, 2 meters, 5 meters, etc.). On the other hand, for a merge ahead sign, motion characteristics may be analyzed following the sign (which may include a short distance ahead of the sign) as vehicles will typically perform a merge maneuver following the sign.

Various types of motion characteristics may be identified in relation to the traffic sign. In some embodiments, the motion characteristics may indicate a speed or change in speed of a vehicle. For example, if a vehicle slows down in the vicinity of a traffic sign, this may indicate the drivable path the vehicle is traveling along is relevant to the traffic sign (e.g., in the case of a yield sign, slow down sign, stop sign, etc.). In some embodiments, the motion characteristics may be analyzed in the context of other events indicated in the drive information for the vehicle, such as the motion of other nearby vehicles. For example, in the case of a yield sign, although vehicles are supposed to slow in the vicinity of the sign regardless, a vehicle may often only slow down (or slow down significantly) in the vicinity of the traffic sign if other vehicles are present. Accordingly, when other vehicles are present and the vehicle slows down or stops in the vicinity of the yield sign, this may indicate the yield sign is relevant to a particular lane of travel. As another example, the motion characteristics may indicate a change in heading direction of a vehicle, which may indicate a particular traffic sign is relevant to the drivable path. This may be especially true for signs associated with a turn, such as right- or left-turn only signs, detour signs, exit only signs, etc. In some embodiments, a statistical analysis of motion characteristics of multiple vehicles may be used to determine the relevancy of a sign. For example, a traffic sign may be considered relevant if more than a threshold number of vehicles, or a threshold percentage of vehicles exhibit a particular motion characteristic in the vicinity of the traffic sign, as described above with respect to determining relevancy of traffic lights. Various other statistical values or relationships may also be analyzed, as would be apparent to those skilled in the art.

Figure 41:
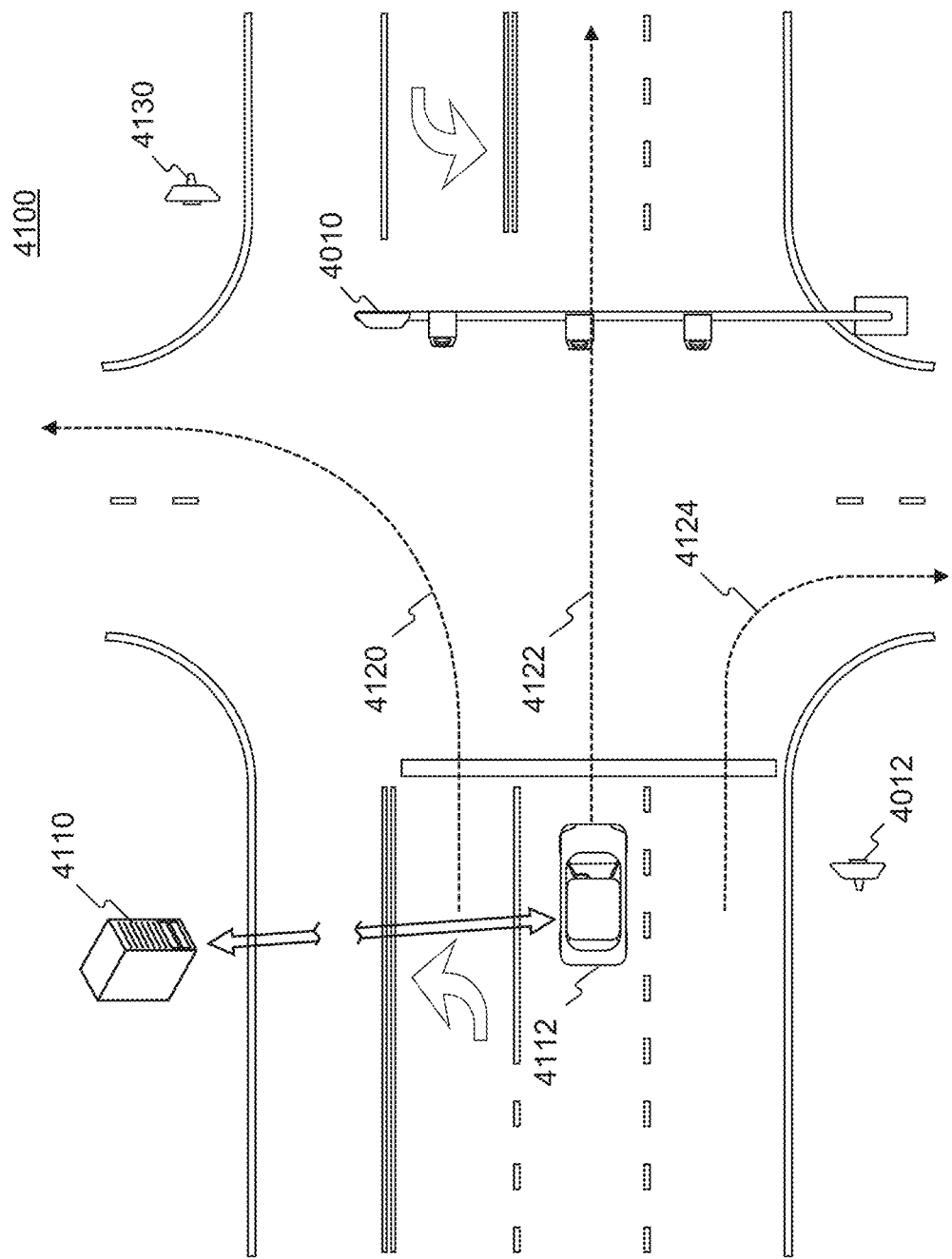
FIG. 41 illustrates an example road segment along which a relevance of traffic signs may be determined, consistent with the disclosed embodiments.

Based on one or more of these properties or characteristics of a traffic sign, the disclosed embodiments may include determining a relevance of the traffic sign to one or more drivable paths along a road segment. FIG. 41 illustrates an example road segment 4100 along which a relevance of traffic signs may be determined, consistent with the disclosed embodiments. While road segment 4100 is shown to include a junction by way of example, the disclosed embodiments may equally apply to various other types of road segments, including straight road portions, curved road portions, highway entrances or exits, roundabouts, parking lots, driveways, alleyways, or other road segment configurations. Road segment 4100 may be associated with a plurality of drivable paths 4120, 4122, and 4124, as shown in FIG. 41. Drivable paths 4120, 4122, and 4124 may be determined based on drive information collected from a plurality of vehicles as described throughout the present disclosure. For example, drivable paths 4120, 4122, and 4124 may be determined based on drive information similar to drive information 3732, 3734, 3736, 3742, 3744, 3752, and 3754, as described above with respect to FIGS. 37A and 37B. The drive information may be received from a plurality of vehicles by a server 4110. Server 4110 may correspond to various other servers described herein, such as server 3710 and/or server 1230. Additional details for generating drivable paths (which may correspond to target trajectories) are provided throughout the present disclosure.

Server 4110 may be configured to analyze collected drive information to determine whether a particular traffic sign along road segment 4100 is relevant to one or more of drivable paths 4120, 4122, and 4124. For example, server 4100 may analyze the various information associated with a traffic sign described above with respect to FIG. 40, such as a lateral distance from the traffic sign to a drivable path or road edge, a height of the traffic sign, road features in the vicinity of the traffic sign, motion characteristics of vehicles in the vicinity of the traffic sign, whether a semantic portion of the traffic sign is visible, whether similar traffic signs are included on an opposite side of a drivable path, or any other types of information associated with a traffic sign described herein. In some embodiments, the relevance of a particular traffic sign to a drivable path may be determined based on an aggregation of two or more of these factors. For example, for each type of information or characteristic described above being analyzed, server 4100 may determine a value or score indicating whether that particular type of information indicates a likelihood of a particular drivable path being associated with a traffic sign or not. These values may be averaged together or otherwise aggregated to determine an overall likelihood of a traffic sign being relevant to the drivable path. In some embodiments, the aggregation may be a weighted average. For example, if vehicles commonly stop along a particular drivable path in the vicinity of a stop sign, this may be weighted higher than a location of the stop sign or other information that may be less reliable for determining relevance. Various other means of aggregating the collected information may be used.

In some embodiments, the relevancy of traffic signs for a particular drivable path may be determined based on a machine learning model. For example, a training algorithm, such as an artificial neural network may receive training data associated with one or more traffic signs. In some embodiments, the training data may include various information described above, such as lateral distances to drivable paths, motion characteristics, or other data. Alternatively or additionally, the training data may be drive information from which the information described above is derivable. The training data may be labeled such that traffic signs relevant to one or more drivable paths associated with the training data are identified. As a result, a model may be trained to determine a relevance of traffic signs based on drive information or various factors determined based on the drive information, as described above. Consistent with the present disclosure, various other machine learning algorithms may be used, including a logistic regression, a linear regression, a regression, a random forest, a K-Nearest Neighbor (KNN) model (for example as described above), a K-Means model, a decision tree, a cox proportional hazards regression model, a Naïve Bayes model, a Support Vector Machines (SVM) model, a gradient boosting algorithm, or any other form of machine learning model or algorithm.

Based on the determined relevancies, server 4110 may store indications of which traffic signs are relevant to which drivable paths in a crowd-sourced map (i.e., a navigational map). The indications may be defined in any suitable format, as described above with respect to links between drivable paths and traffic lights or logical traffic light groups. For example, the indications may be stored in the form of an array or other data structure associating a traffic sign with one or more drivable paths. As another example, a drivable path may be stored with properties or metadata indicating a relevance to a particular traffic sign (or vice versa). The present disclosure is not limited to any format for indicating relevance in the crowd-sourced map.

Server 4110 may make the crowd-sourced map available to one or more host vehicles for navigating relative to the traffic signs. For example, server 4110 may make the map available to host vehicle 4112, as shown in FIG. 41. Accordingly, host vehicle 4112 may be configured to navigate road segment 4100 based on the relevancies indicated in the crowd-sourced map. In the example shown, host vehicle 4112 may be traveling along road segment 4122. Based on the crowd-sourced map, host vehicle 4112 may determine that traffic signs 4010 and 4012 are relevant to drivable paths 4120 and 4124, respectively, and are not relevant to drivable path 4122. Similarly, host vehicle 4112 may determine that traffic sign 4130 is not relevant and is associated with vehicles driving in an opposite direction. Accordingly, host vehicle 4112 may determine a navigational action to proceed straight along drivable path 4122 and ignore traffic signs 4010, 4012, and 4130. If host vehicle 4112 changes lanes, for example onto drivable path 4124, host vehicle 4112 may reassess the relevance of traffic signs 4010, 4012, and 4130 and determine whether an alternate navigational action is necessary based on the traffic signs.

Figure 42:
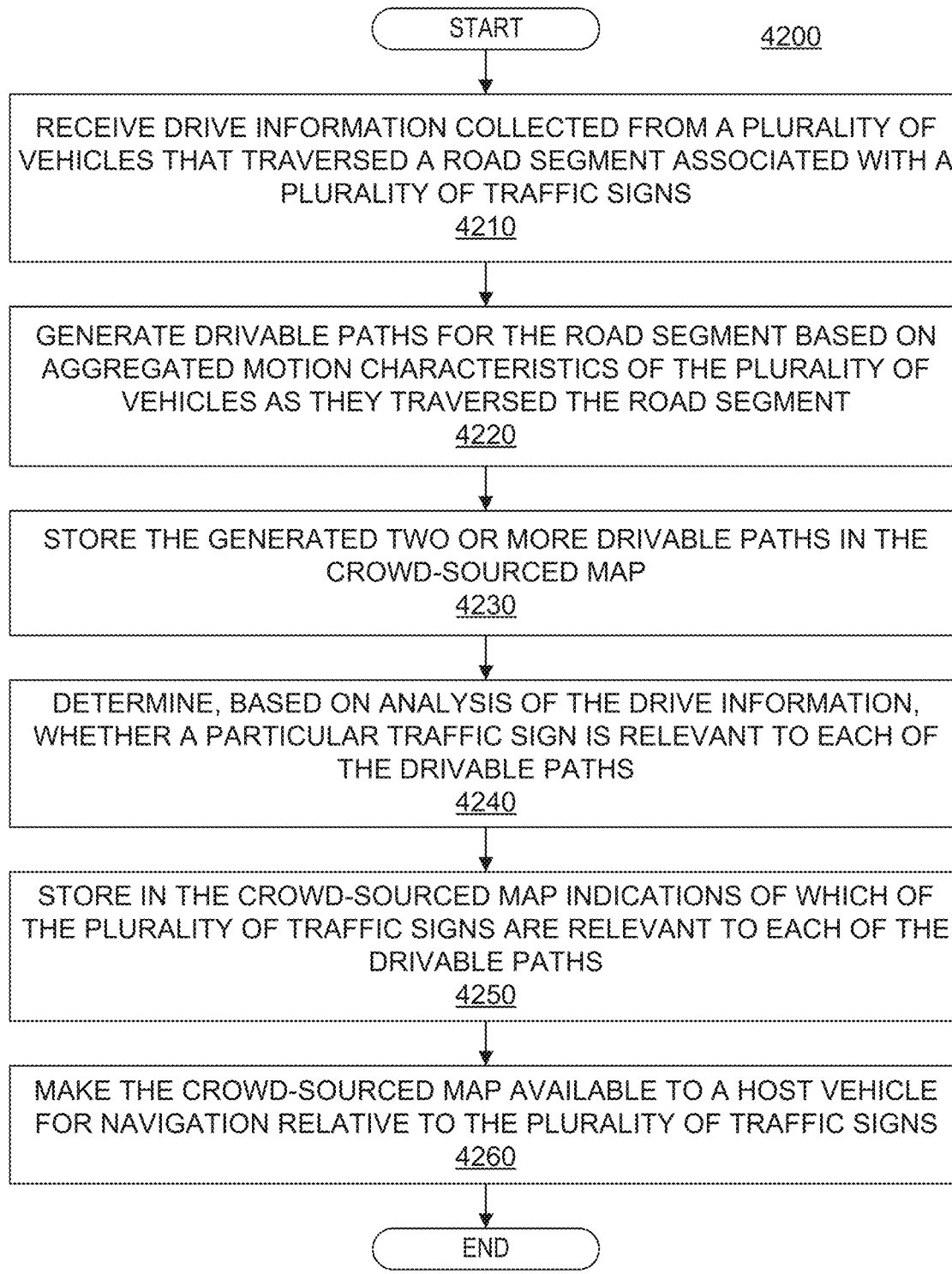
FIG. 42 is a flowchart showing an example process for generating a crowd-sourced map for use in vehicle navigation, consistent with the disclosed embodiments.

FIG. 42 is a flowchart showing an example process 4200 for generating a crowd-sourced map for use in vehicle navigation, consistent with the disclosed embodiments. Process 4200 may be performed by at least one processing device of a remotely located entity, such as server 4110, as described above. In some embodiments, a non-transitory computer readable medium may contain instructions that when executed by a processor cause the processor to perform process 4200. Process 4200 is not necessarily limited to the steps shown in FIG. 42, and any steps or processes of the various embodiments described throughout the present disclosure may also be included in process 4200, including those described above with respect to FIGS. 40 and 41. Further, any of the steps described above with respect to FIGS. 38A and 38B may pertain to and may be included in process 4200.

In step 4210, process 4200 includes receiving drive information collected from a plurality of vehicles that traversed a road segment. The road segment may be associated with a plurality of traffic signs, as described above. For example, the drive information may be collected by vehicles traversing road segment 4100, which may include traffic signs 4010, 4012, and 4030. The drive information may include any information captured by the plurality of vehicles as they traverse the road segment. For example, the drive information may include at least a portion of images captured by one or more cameras associated with each of the plurality of vehicles while navigating relative to the road segment. In some embodiments, the drive information may include locations and type indicators of traffic signs detected as each of the plurality of vehicles navigated relative to the road segment, as described in greater detail above. In addition (or alternatively) the drive information may include motion characteristics of each of the plurality of vehicles as it navigated relative to the road segment. In some embodiments, the drive information may include indicators of paths followed by each of the plurality of vehicles as it navigated relative to the road segment. Information regarding various other features or objects may be included in the drive information. For example, the drive information may include vehicle stop locations relative to the road segment. As another example, the drive information may include location and type information for one or more landmarks detected as each of the plurality of vehicles navigated relative to the road segment. For example, the landmark may include one or more of a pole, a lamp a post, a lane marking, or other forms of landmarks described herein.

In step 4220, process 4200 includes generating two or more drivable paths for the road segment based on aggregated motion characteristics of the plurality of vehicles as they traversed the road segment. For example, step 4220 may include generating drivable paths 4120, 4122, and 4124 as shown in FIG. 41. The drivable paths may be generated, for example, as described above with respect to FIG. 19.

In step 4230, process 4200 includes storing the generated two or more drivable paths in the crowd-sourced map. For example, the crowd-sourced map may be maintained in a storage location, such as storage medium 2010 or various other storage devices. In some embodiments, the two or more drivable paths may be represented in the crowd-sourced map as three-dimensional splines. As shown in FIG. 41, each of the two or more drivable paths may be associated with a different travel lane along the road segment.

In step 4240, process 4200 includes determining, based on analysis of the drive information collected from the plurality of vehicles, whether a particular traffic sign among the plurality of traffic signs is relevant to each one of the two or more drivable paths. For example, this may include determining whether one of traffic signs 4010, 4012, or 4030 is relevant to each of drivable paths 4120, 4122, and 4124. As described above with respect to FIG. 40, various types of information may be analyzed to determine the relevancy of the traffic signs. In some embodiments, the determination of whether a particular traffic sign is relevant to each one of the two or more drivable paths may be based on motion characteristics of the plurality of vehicles as they traversed the road segment. For example, the motion characteristics may indicate that the plurality of vehicles slowed in a vicinity of the particular traffic sign, or that the plurality of vehicles changed heading direction in a vicinity of the particular traffic sign, which may indicate relevancy of the particular traffic sign, as described above. Similarly, the determination of whether a particular traffic sign is relevant to each one of the two or more drivable paths may be based on a proximity of the particular traffic sign to one or more road features represented in the crowd-sourced map. For example, the one or more road features may include a roundabout, a stop line, a merge point, a lane split, or a curvature associated with a drivable path.

In some embodiments, the determination of whether a particular traffic sign is relevant to a particular one of the two or more drivable paths may be based on a lateral distance between the particular drivable path and the particular traffic sign. For example, step 4240 may include determining distances D1, D2, and/or D3 as described above. The determination of whether a particular traffic sign is relevant to a particular one of the two or more drivable paths may further be based on a lateral distance between the particular traffic sign and a road edge, such as distance D4. As another example, the determination of whether a particular traffic sign is relevant to a particular one of the two or more drivable paths may be based on a detected height of the particular traffic sign relative to the particular drivable path. For example, step 4240 may include determining height H, as described above.

In some embodiments, the determination of whether a particular traffic sign is relevant to a particular one of the two or more drivable paths may be based on a determination of whether a semantic portion of the particular traffic sign is visible when traveling along a particular drivable path in a direction associated with the particular drivable path. For example, traffic sign 4130 may be determined to be not relevant (or not likely to be relevant) to drivable paths 4120, 4122, and 4124 because it is facing an opposite direction and thus the semantic portion is not visible. In some embodiments, the determination of whether a particular traffic sign is relevant to a drivable path from the two or more drivable paths may be based on whether a traffic sign similar to the particular traffic sign appears on an opposing side of the drivable path from the particular traffic sign, as described above.

Consistent with the present disclosure, the determination of whether a particular traffic sign is relevant to a particular one of the two or more drivable paths may be based on an aggregation of two or more pieces of the information described above. In some embodiments, the determination of whether a particular traffic sign among the plurality of traffic signs is relevant to each one of the two or more drivable paths may be based on output provided by at least one machine learning model. As described above the machine learning model may be trained to predict relevancy of traffic signs to drivable paths based on received input, which may include at least one of: traffic sign geometry relative to a drivable path, traffic sign visibility relative to a drivable path, traffic sign geometry relative to one or more road features associated with the road segment, or motion characteristics of one or more of the plurality of vehicles as it navigated along the road segment.

In step 4250, process 4200 includes storing in the crowd-sourced map indications which ones of the plurality of traffic signs are relevant to each one of the two or more drivable paths. The indications of relevance may be stored in any suitable manner associating the two or more drivable paths with at least one of the plurality of traffic signs. For example, this may include storing the indications in an array or other data structure, or as properties of at least one of the drivable paths or the plurality of traffic signs.

In step 4260, process 4200 includes making the crowd-sourced map available to at least one host vehicle for navigation relative to the plurality of traffic signs. For example, step 4260 may include making the crowd-sourced map available to host vehicle 4112, as described above. In some embodiments, the navigation relative to the plurality of traffic signs includes a warning issued to a vehicle operator. For example, host vehicle 4112 may display a warning to a driver of the vehicle that a particular traffic sign is relevant to the current lane, that an action must be taken based on the current state of the traffic sign (e.g., slow down, stop, or proceed through the junction), whether a current traffic sign is consistent with an intended route of the vehicle (e.g., a turn only sign when the driver wants to go straight), or the like. In some embodiments, the host vehicle may be configured to navigate based on the indications of relevance in the crowd-sourced map. For example, the navigation relative to the plurality of traffic signs includes autonomous braking relative to a detected traffic sign. Various other navigation actions described throughout the present disclosure may be performed relative to a detected traffic sign.

Figure 43:
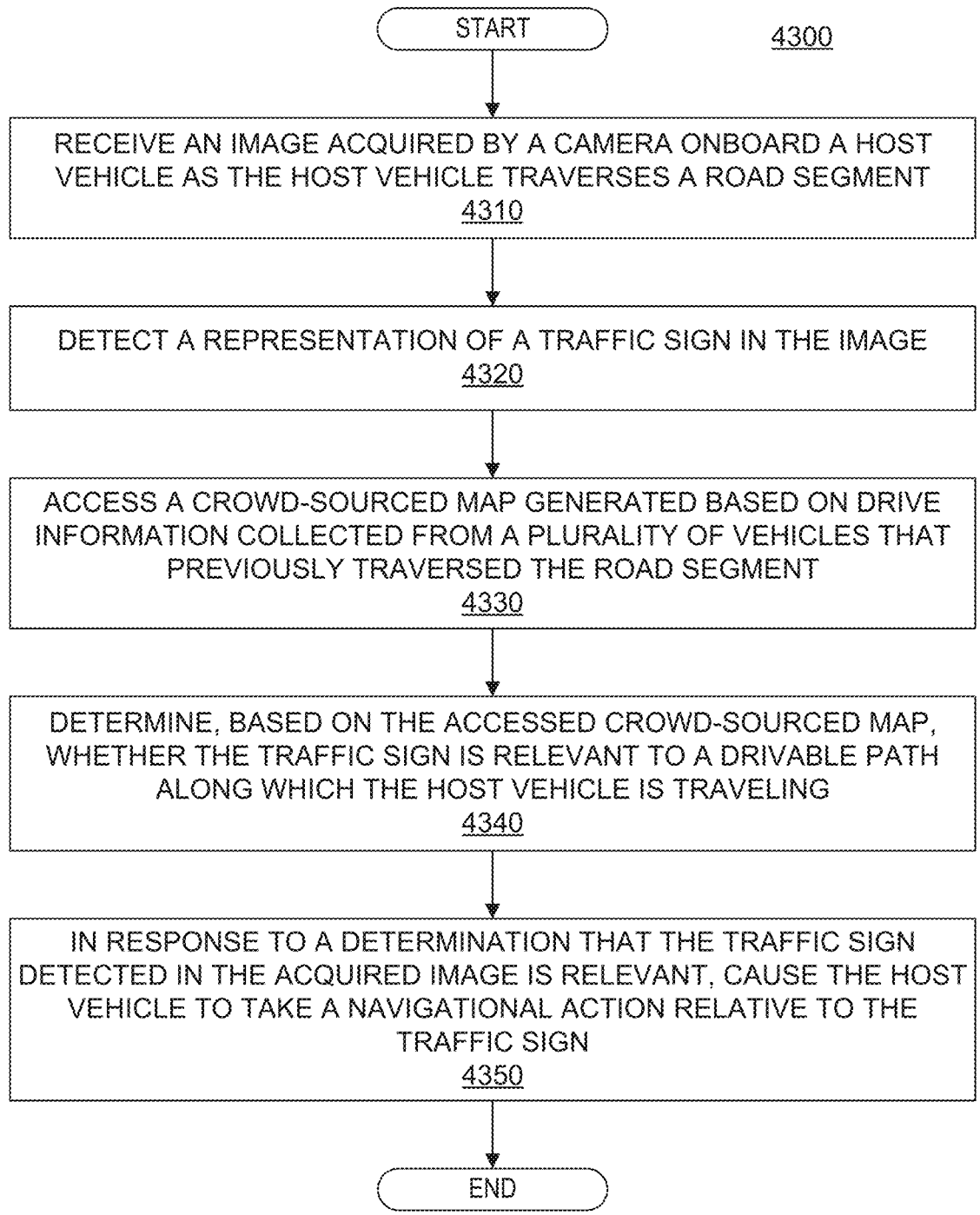
FIG. 43 is a flowchart showing an example process for navigating a host vehicle, consistent with the disclosed embodiments.

As described above, the resulting crowd-sourced map may be used by one or more autonomous or semi-autonomous vehicles for navigating the junction. FIG. 43 is a flowchart showing an example process 4300 for navigating a host vehicle, consistent with the disclosed embodiments. Process 4300 may be performed by at least one processing device of a host vehicle, such as processing unit 110. In some embodiments, at least a portion of process 4300 may be performed by a server, such as server 4110. A non-transitory computer readable medium may contain instructions that when executed by a processor cause the processor to perform process 4300. Further, process 4300 is not necessarily limited to the steps shown in FIG. 43, and any steps or processes of the various embodiments described throughout the present disclosure may also be included in process 4300, including those described above with respect to FIGS. 37A, 37B, 37C, 38A, and 38B.

In step 4310, process 4300 includes receiving an image acquired by at least one camera onboard the host vehicle as the host vehicle traverses a road segment. For example, this may include receiving image 4000, which may be acquired by image capture devices 122, 124, and 126 described above.

In step 4320, process 4300 includes detecting a representation of at least one traffic sign in the acquired image. For example, this may include detecting a representation of traffic signs 4010 and 4012, as shown in FIG. 40. The traffic signs may be detected based on a computer vision algorithm, or other image analysis algorithm as described throughout the present disclosure.

In step 4330, process 4300 includes accessing a crowd-sourced map generated based on drive information collected from a plurality of vehicles that previously traversed the road segment. For example, the crowd-sourced map be generated according to process 4200, as described above. Accordingly, the crowd-sourced map may store indicators of relevancy of mapped traffic signs to certain drivable paths stored in the crowd-sourced map. The drivable paths may be acquired in various ways. In some embodiments, the one more drivable paths stored in the crowd-sourced map may be determined by aggregating driving paths followed by the plurality of vehicles that previously traversed the road segment. For example, the drivable paths may correspond to drivable paths 4120, 4122, and 4124 described above. Accordingly, the one more drivable paths may be stored in the crowd-sourced map as three-dimensional splines.

In step 4340, process 4300 includes determining, based on the accessed crowd-sourced map, whether the at least one traffic sign detected in the acquired image is relevant to a drivable path along which the host vehicle is traveling. For example, the host vehicle may navigate along a drivable path based on landmarks detected in one or more images captured from the environment of the host vehicle, as described above. The traffic signs may be determined to be relevant based on an indication that the traffic sign is relevant to the drivable path, as described above.

In step 4350, process 4300 includes, in response to a determination that the at least one traffic sign detected in the acquired image is relevant to a drivable path along which the host vehicle is traveling, causing the host vehicle to take at least one navigational action relative to the at least one traffic sign. The navigational action may include any of the various navigational actions described throughout the present disclosure. For example, the at least one traffic sign may be a stop sign, and the at least one navigational action may include braking the host vehicle. As another example, the at least one traffic sign may be a yield sign, and the at least one navigational action may include braking the host vehicle and changing a heading direction of the host vehicle. In response to a determination that the at least one traffic sign detected in the acquired image is not relevant to a drivable path along which the host vehicle is traveling, process 4300 may include causing the host vehicle to forego a navigational response relative to the at least one traffic sign. The particular navigational action performed by the host vehicle may depend on a type of the traffic sign, a jurisdiction in which the traffic sign is located, or other factors.

Machine Learning-Based Traffic Light Relevancy Mapping

As described above, the disclosed embodiments may include functionality for mapping traffic lights and for determining traffic light relevancy for use in autonomous vehicle navigation. Some of the various techniques described above generally determine traffic light relevancy information related to traffic lights as well as information related to navigation of vehicles. For example, when an autonomous vehicle approaches a traffic light that has a green light, and proceeds to travel along a roadway, the system may be configured to determine a relevancy of the traffic light to a lane traveled by the autonomous vehicle. In some embodiments, the system may use stop line locations or other information to improve or supplement the traffic light relevancy determinations. For example, the system may assign logical groupings of traffic lights that have a synchronized signal pattern based on crowd-sourced stop line data, as described above.

In some embodiments, a trained machine learning model may be used to improve or enhance mapping of relevant traffic lights to drivable paths. For example, the disclosed embodiments may determine possible drivable path and traffic light combinations based on drive information collected from a plurality of vehicles. These drivable paths and locations of traffic lights may be input into a trained model to generate a traffic light relevancy mapping, which may indicate a relevancy of a traffic light for of each combination of traffic light and drivable path pairs. In some embodiments, the traffic light relevancy mapping may then be refined based on additional observed behaviors of vehicles navigating an associated junction. Accordingly, the disclosed embodiments provide a holistic approach to determine traffic light relevancy, thereby improving accuracy over existing techniques.

Figure 44:
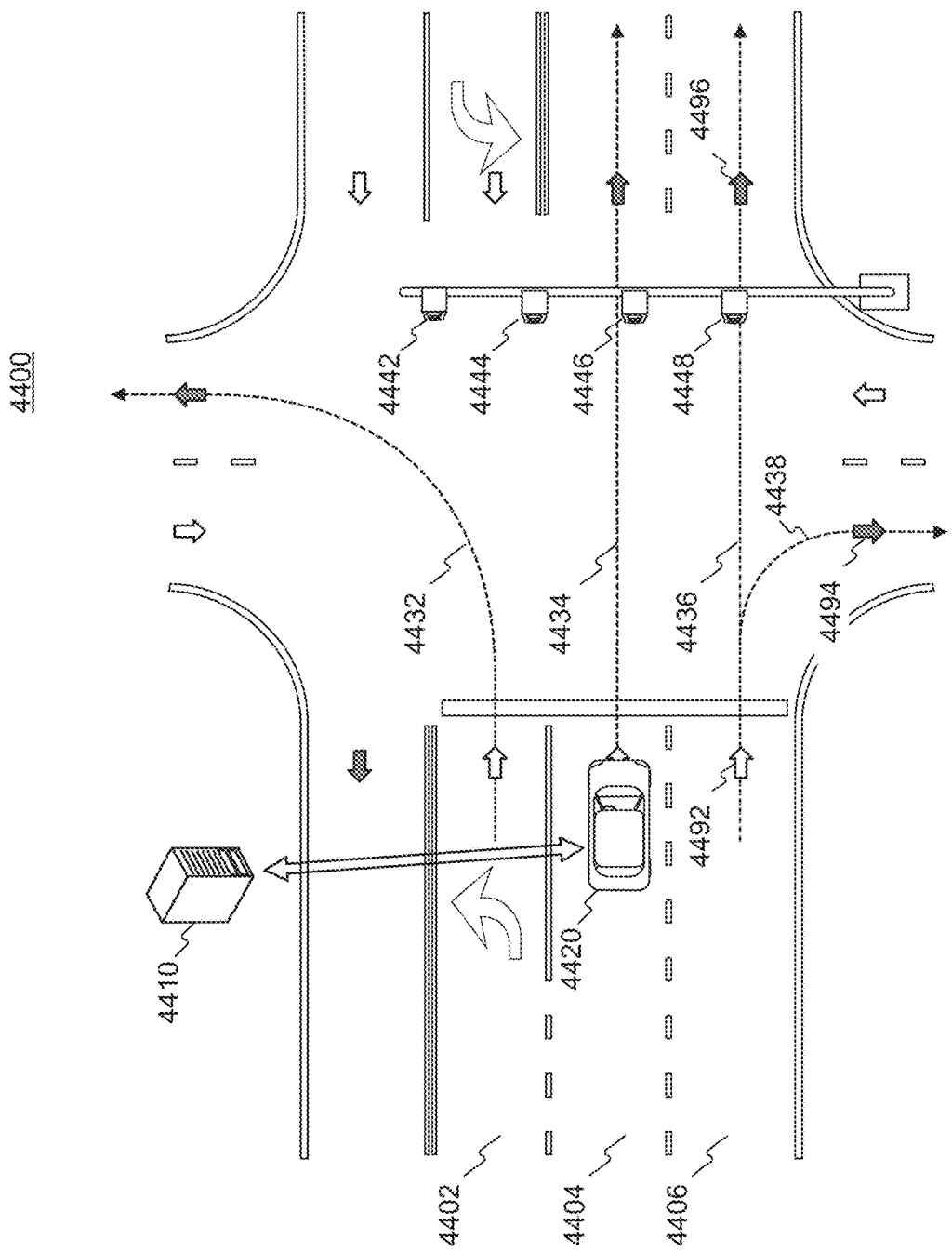
FIG. 44 illustrates an example junction for which traffic light relevancy may be determined, consistent with the disclosed embodiments.

FIG. 44 illustrates an example junction 4400 for which traffic light relevancy may be determined, consistent with the disclosed embodiments. Junction 4400 may include three lanes of travel 4402, 4404, and 4406 entering the junction from a particular direction, as shown in FIG. 44. In particular, lane 4402 may be a left-turn only lane while lanes 4404 and 4406 may be through lanes along which vehicles may proceed straight through the junction. Lane 4406 may also allow for right turns onto an intersecting roadway. Junction 4400 may include a plurality of traffic lights, such as traffic lights 4442, 4444, 4446, and 4448. For example, traffic light 4442 may be associated with lane 4402, while traffic lights 4446 and 4448 may both be associated with each of lanes 4404 and 4406. While this association may be apparent to a driver of a vehicle, it may be difficult for autonomous or semi-autonomous vehicle navigation systems to reliably determine these associations. Using the techniques disclosed herein, traffic lights 4442, 4444, 4446, and 4448 may be mapped to one or more drivable paths associated with the intersection, as described further below.

In order to determine the relevancy of traffic lights, a server may be configured to receive drive information collected from a plurality of vehicles that traversed a road segment associated with a junction. For example, a server 4410 may receive drive information from a host vehicle 4420 as it navigates through junction 4400, as shown in FIG. 44. In some embodiments, server 4410 may correspond to one of the various servers described above, including sever 1230, server 3710, or server 4110. Accordingly, any of the descriptions or disclosures made herein in reference to servers 1230, 3710, or 4110 may also apply to server 4410, and vice versa. Server 4410 may be configured to receive drive information from multiple vehicles as they traverse junction 4400, as described above with respect to FIG. 37A.

Server 4410 may be configured to determine one or more drivable paths associated with junction 4400, such as drivable paths 4432, 4434, 4436, and 4438. As described above with respect to FIG. 37C, the drivable paths 4432, 4434, 4436, and 4438 may be determined based on aggregated motion characteristics of a plurality of vehicles as they traverse junction 4400. For example, drive information 3732, 3734, and 3736 (as shown in FIG. 37A) may be aggregated to generate drivable path 4432. Drive information may similarly be aggregated to determine drivable paths 4434, 4436, and 4438. The drivable paths may correspond to target trajectories included in the navigational map, as described throughout the present disclosure.

In some embodiments, various advanced techniques for aligning drive information may be used to generate one or more of drivable paths 4432, 4434, 4436, and 4438. For example, drive information collected along a road segment may be segregated into a plurality of sections, and each section may be aligned individually. For example, a particular road segment may be divided into a plurality of sections, including at least a first section and a second section. When aggregating drive information from multiple vehicles, drive information associated with the first section may be aligned together. For example, drive information associated with the first segment collected by a first vehicle and drive information associated with the first segment collected by a second vehicle may be aligned. Once the first section has been aligned, drive information for the second section may be aligned together, and so on. For example, the points may be aligned in a "chain" of multiple sections, where the points in each section are translated and/or rotated together. As a result, the effect of ego motion drift or other errors associated with the navigational data may be minimized. This segmented approach for alignment of drive information is described in greater detail in U.S. Pat. No. 11,499,834, which is assigned to the same applicant as the present application. The contents of this patent are hereby incorporated by reference in its entirety.

While junction 4400 is provided as an illustrative example, it is to be understood that the same or similar techniques may be applied in a variety of junction types or arrangements. Further, for purposes of illustration, junction 4400 shows example drivable paths and traffic lights associated with entering junction 4400 from a single direction of travel. However, it is to be understood that the same or similar techniques may be applied to map traffic light relevancy for multiple or all traffic lights and drivable paths within an intersection. For example, while drivable paths are shown with respect to lanes 4402, 4404, and 4406 for purposes of illustration, drivable paths may be defined for other directions of travel through junction 4400. In some embodiments, drivable paths may be defined for each possible entrance and exit combination for a junction. For example, junction 4400 may include a plurality of entrance points shown as white arrows and a plurality of exit points shown as grey arrows. Based on the aggregated motion characteristics, drivable junction paths may be generated between each entrance of junction 4400 and each exit associated with the entrance. For example, entrance 4492 may be associated with each of exits 4494 and 4496, as illustrated by drivable paths 4438 and 4436, respectively. Accordingly, the possible drivable paths for a junction may be defined in a crowd-sourced map. Similarly, junction 4400 may include traffic lights associated with one or more other entrances to junction 4400 (not shown in FIG. 44).

Consistent with the embodiments disclosed herein, a traffic light relevancy mapping may be generated for junction 4400, which may indicate the traffic light relevancy for one or more traffic light to drivable path pairs. As used herein, a traffic light to drivable path pair may refer to a pairing of a particular traffic light with a particular drivable path. For example, drivable path 4432 and traffic light 4442 may form a traffic light to drivable path pair. Similarly, drivable path 4432 and traffic light 4448 may form another traffic light to drivable path pair. Traffic light to drivable path pairs may be established for all possible combinations of drivable paths 4432, 4434, 4436, and 4438 and traffic lights 4442, 4444, 4446, and 4448. A traffic light relevancy for a traffic light to drivable path pair may refer to a degree to which a traffic light of the traffic light to drivable path pair is relevant to the corresponding drivable path of the traffic light to drivable path pair. In this context, relevancy may be defined in terms of whether the current state of the traffic light is applicable a vehicle navigating along the drivable path (i.e., whether a driver of the vehicle must comply with to the signal). For example, if traffic light 4446 corresponds to lane 4404, it would be considered relevant to drivable path 4434 since vehicles traveling along drivable path 4434 must observe and comply with traffic light 4446. Accordingly, an indication of "relevant" may be designated for a traffic light to drivable path pair formed by traffic light 4446 and drivable path 4434. Accordingly, an indication of "not relevant" may be designated for a traffic light to drivable path pair formed by traffic light 4442 and drivable path 4438 may be "not relevant." In some embodiments, a traffic light relevancy mapping may include indicators of traffic light relevancy for all possible combinations of traffic light to drivable path pairs for an intersection. Accordingly, for each drivable path, the traffic light relevancy mapping may indicate whether each traffic light is relevant to the drivable path, which may be beneficial to an autonomous or semi-autonomous vehicle when navigating a junction. For example, the traffic light relevancy mapping may indicate which traffic light signals the vehicle must observe when navigating the intersection and which traffic light signals can be ignored.

Figure 45:
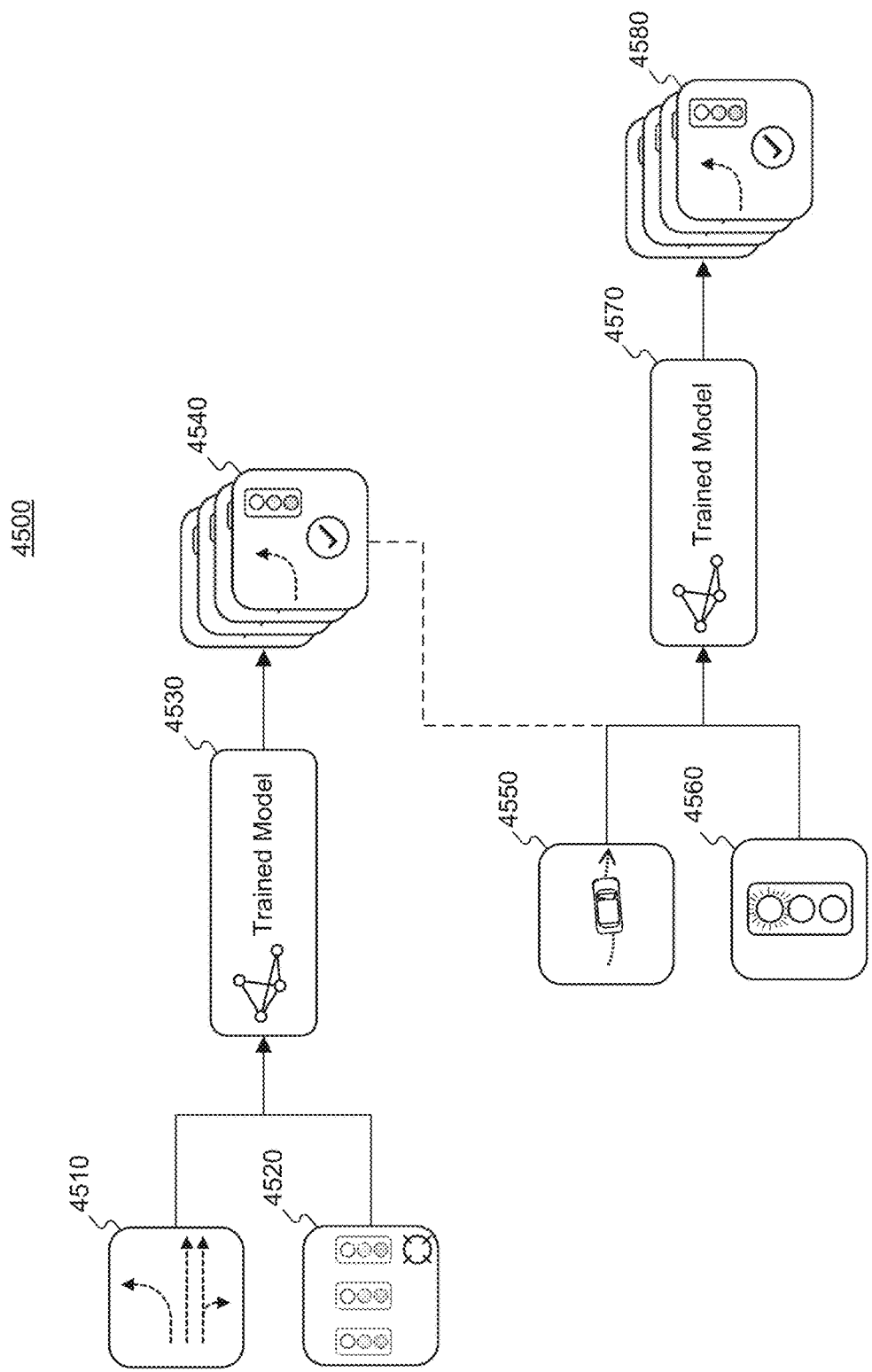
FIG. 45 illustrates an example process for determining a traffic light relevancy mapping, consistent with the disclosed embodiments.

As indicated above, the traffic light relevancy mapping for a junction may be determined using one or more trained machine learning models. FIG. 45 illustrates an example process 4500 for determining a traffic light relevancy mapping, consistent with the disclosed embodiments. As indicated in FIG. 45, a trained model 4530 may be used to generate a traffic light relevancy mapping 4540. This may include inputting to trained model 4530 spline representation information 4510 for one or more drivable paths and position information 4520 for one or more traffic lights. Spline representation information 4510 may include a plurality of spline representations of drivable paths through a junction. For example, this may include spline representations for drivable paths 4432, 4434, 4436, and 4438, as described above. Accordingly, the spline representations may be an aggregation of two or more reconstructed trajectories of prior traversals of vehicles along the same road segment, as described herein. The spline representations may include polynomials extending in 2D space or may include 3D spline curves extending in three dimensions (e.g., including a height component) to represent elevation changes in a road segment in addition to X-Y curvature, as described above with respect to FIGS. 9A and 9B.

Position information 4520 may include detected locations of traffic lights in one or more junctions. For example, this may include positions of traffic lights 4442, 4444, 4446, and 4448. Traffic light positions may be determined using the various techniques described herein. For example, when navigating junction 4400, vehicle 4420 may detect point locations associated with traffic lights based on features identified within one or more of the captured images. These point locations may be converted from image coordinates to real world coordinates and reported to server 4410. Server 4410 may aggregate reported locations for the traffic lights from multiple vehicles to determine a location of the traffic light within a map database. Similar to spline representation information 4510, position information 4520 may include 2D coordinate locations for traffic lights or may include 3D coordinate locations. In some embodiments, position information 4520 may further include characteristics or properties of the associated traffic lights. For example, this may include the size of a traffic light, the type of a traffic light (e.g., turn arrow, hand symbol, etc.), or various other information that may indicate a relevancy of the traffic light.

In some embodiments, both spline representation information 4510 and position information 4520 may be extracted from drive information collected from a plurality of vehicles. For example, when traversing junction 4400, host vehicle 4420 may record a trajectory traversed by the vehicle and locations of various detected landmarks, including traffic lights 4442, 4444, 4446, and 4448. The drive information from multiple traversals of junction 4400 may be aggregated to determine spline representation information 4510 and position information 4520.

Trained model 4530 may be configured to generate traffic light relevancy mapping 4540 based on spline representation information 4510 and position information 4520. For example, based on the relative spatial positions of drivable paths 4432, 4434, 4436, and 4438 and traffic lights 4442, 4444, 4446, and 4448, the number of drivable paths and traffic lights, and other information, trained model 4530 may predict the traffic light relevancy for one or more traffic light to drivable path pairs. Trained model 4530 may include any form of machine learning model trained to generate predicted traffic light relevancies for one or more traffic light to drivable path pairs. For example, trained model 4530 may include a convolutional neural network comprising a series of convolutional layers. Various other training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm.

Trained model 4530 may be trained to generate traffic light relevancy mapping 4540 using various forms of training data. In some embodiments, the training data may include data representing locations of traffic lights associated with a junction and drivable paths through the junction. The training data may be annotated or labeled to indicate which traffic lights are relevant to which of the drivable paths. In some embodiments, the training data may be traffic light locations and spline representations for drivable paths determined based on collected drive information, similar to spline representation information 4510 and position information 4520, for junctions in which the traffic light relevancy is known. Alternatively or additionally, training data may include other forms of data, such as images of junctions harvested from vehicles, images from a public or third-party database (e.g., labeled Google™ Street View images, etc.), or any other forms of data from which the relative positions of traffic lights and drivable paths are obtainable. In some embodiments, the images used as trained data may include labels indicating a correspondence between traffic lights and relevant lanes represented in the images. The training data may be input into trained model 4530 and the output from trained model 4530 may be compared to the labeled relevancy in the training data to determine a loss. Through the training process, weights, bias, and/or other variables of trained model 4530 may be adjusted to minimize this loss. As a result, trained model 4530 may be configured to generate traffic light relevancy mapping 4540 based on spline representation information 4510 and position information 4520.

In some embodiments, process 4500 may include further refining traffic light relevancy mapping 4540. For example, traffic light relevancy mapping 4540 may be input to trained model 4570 to generate an updated traffic light relevancy mapping 4580. Accordingly, traffic light relevancy mapping 4540 may represent an initial prediction of traffic light relevancies of traffic light to drivable path pairs in junction 4400, which may be refined based on additional information. In some embodiments, the additional information may include observed behavior information 4550 and traffic light state information 4560. Observed behavior information 4550 may include any information indicating the movement or conduct of one or more objects relative to junction 4400. For example, this may include behavior of vehicles relative to junction 4400 and/or the behavior of other objects or entities, such as pedestrians, cyclists, traffic guards, emergency vehicles, or the like. Observed behavior information 4550 may include trajectories traveled by one or more objects (e.g., vehicles, pedestrians, etc.), motion characteristics (e.g., acceleration, deceleration, stop locations, etc.), the timings thereof, or any other information indicating how the objects behave within junction 4400. In some embodiments, observed behavior information 4550 may be represented in drive information, similar to spline representation information 4510 and position information 4520. For example, host vehicle 4420 may report its trajectory (including timing, speed, acceleration, deceleration, etc.) to server 4410. Host vehicle 4420 may also detect and report the location of pedestrians or other objects as it traverses junction 4400. Accordingly, the behavior of these additional objects may be ascertained from the reported drive information.

Traffic light state information 4560 may include any information indicating the states of traffic lights at various times. As described above, a state for a traffic light may refer to the signal being conveyed by the traffic light for purposes of controlling traffic at a road junction or crosswalk. For example, the state of the traffic light can be represented by a color of the traffic light (e.g., red, green, yellow, white, etc.) by an image displayed by the traffic light (e.g., an arrow, an image of a palm or hand, an image of a person, etc.), an illumination pattern of a particular lamp (e.g., whether a lamp is blinking, a blinking pattern), or any other signal conveyed by a traffic light. In some embodiments, traffic light state information 4560 may be represented in drive information collected by one or more vehicles. For example, as host vehicle 4420 traverses junction 4400, it may detect and record the current state of one or more of traffic lights 4442, 4444, 4446, and 4448 at various times (e.g., through analyzing image data). These states may be represented in the drive information reported to server 4410. In some embodiments, observed behavior information 4550 and traffic light state information 4560 may be collected at overlapping time periods, such that the behavior of vehicles and other objects relative to current states of traffic lights may be analyzed.

Accordingly, any or all of spline representation information 4510, position information 4520, observed behavior information 4550, and traffic light state information 4560 may be determined from drive information collected by one or more vehicles. In some embodiments, spline representation information 4510, position information 4520, observed behavior information 4550, and traffic light state information 4560 may be determined from the same set of drive information. Alternatively or additionally, spline representation information 4510, position information 4520, observed behavior information 4550, and traffic light state information 4560 may be determined from different sets of drive information, which may be collected at different times.

Trained model 4570 may be configured to generate updated traffic light relevancy mapping 4580 based on traffic light relevancy 4540, observed behavior information 4550, and traffic light state information 4560. For example, trained model 4570 may be configured to refine or modify indicators of traffic light relevancy for one or more traffic light to drivable path pairs. For example, if a vehicle slows down along a drivable path when approaching a red or yellow light, this may indicate the traffic light is relevant to the drivable path. Conversely, if the state of the traffic light is green during the deceleration, this may indicate the traffic light is not relevant to the drivable path. For example, the vehicle may have slowed down along the drivable path when approaching the red or yellow light for another reason (e.g., due to a curve in the road). Trained model 4570 may therefore confirm or negate traffic light relevancies established in traffic light relevancy mapping 4540 accordingly. As another example, if a vehicle traverses an intersection without slowing or stopping, or accelerates through the intersection while a traffic light is green, this may indicate the traffic light is relevant to the drivable path. Conversely, if the traffic light is red, this may indicate the traffic light is not relevant. Additional examples of relationships between observed behavior and traffic light states that may be analyzed using trained model 4570 are described below with respect to FIG. 47.

As with trained model 4530, trained model 4570 may include any form of machine learning model trained to generate predicted traffic light relevancies for one or more traffic light to drivable path pairs. For example, trained model 4570 may include a convolutional neural network comprising a series of convolutional layers. Various other training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm. Trained model 4570 may be trained using various forms of training data. In some embodiments, the training data may include data representing behaviors of vehicles or other objects relative to one or more traffic light states. The training data may be annotated or labeled to indicate whether the observed behavior reflects a relevancy between the object and the current state of the traffic light. The training data may be input into trained model 4570 and the output from trained model 4570 may be compared to the labeled relevancy in the training data to determine a loss. Through the training process, weights, bias, and/or other variables of trained model 4570 may be adjusted to minimize this loss. As a result, trained model 4570 may be configured to generate updated traffic light relevancy mapping 4580.

In some embodiments, trained model 4530 and trained model 4570 may be implemented as separate models, as shown in FIG. 45. Accordingly, spline representation information 4510, position information 4520, observed behavior information 4550, and traffic light state information 4560 may be input into trained model 4530 and trained model 4570 at different times. For example, some of the inputs may be provided at a first time, and some of the inputs may be provided at a different time. In some embodiments, some of the inputs may be provided after a predetermined time period later (e.g., hours, days, weeks, years, etc.). However, in some embodiments, trained model 4530 and trained model 4570 may be implemented concurrently or close in time (e.g., during the same minute, during the same hour, or during the same day). In some embodiments, trained model 4530 and trained model 4570 may be the same model. For example, spline representation information 4510, position information 4520, observed behavior information 4550, and traffic light state information 4560 may be input to the same model, which may be configured to determine traffic light relevancy mapping 4580 based on a holistic analysis of the input information. Accordingly, the training data for the combined model may include spline representations of drivable paths, traffic light locations and state information, and observed behaviors of vehicles and other objects, which may be labeled to indicate known or desired traffic light relevancy outputs. In some embodiments, trained model 4530 and trained model 4570 may be separate models (e.g., separate stages of convolutional layers), but may be trained concurrently using a common set of training data. For example, trained model 4530 may output traffic light relevancy mapping 4540, which may be refined by trained model 4570 to generate traffic light relevancy mapping 4580, as indicated in FIG. 45. The output from trained model 4570 may be compared to the labeled indicators of relevancy the training data to determine a loss. Through the training process, weights, bias, and/or other variables of trained models 4530 and 4570 may be adjusted to minimize this loss. Accordingly, training of trained models 4530 and 4570 may occur at the same time, substantially the same time, or at different times.

In some embodiments, traffic light relevancy mapping 4540 may be refined based on observed behavior information 4550 and traffic light state information 4560 without the use of an additional trained model. For example, observed behavior information 4550 and traffic light state information 4560 may be determined to be inconsistent with traffic light relevancy mapping 4540 at some point after traffic light relevancy mapping 4540 has been generated. Accordingly, indicators of traffic light relevancy for individual traffic light to drivable path pairs may be modified to match the observed behavior to generate updated traffic light relevancy mapping 4580.

Figure 46:
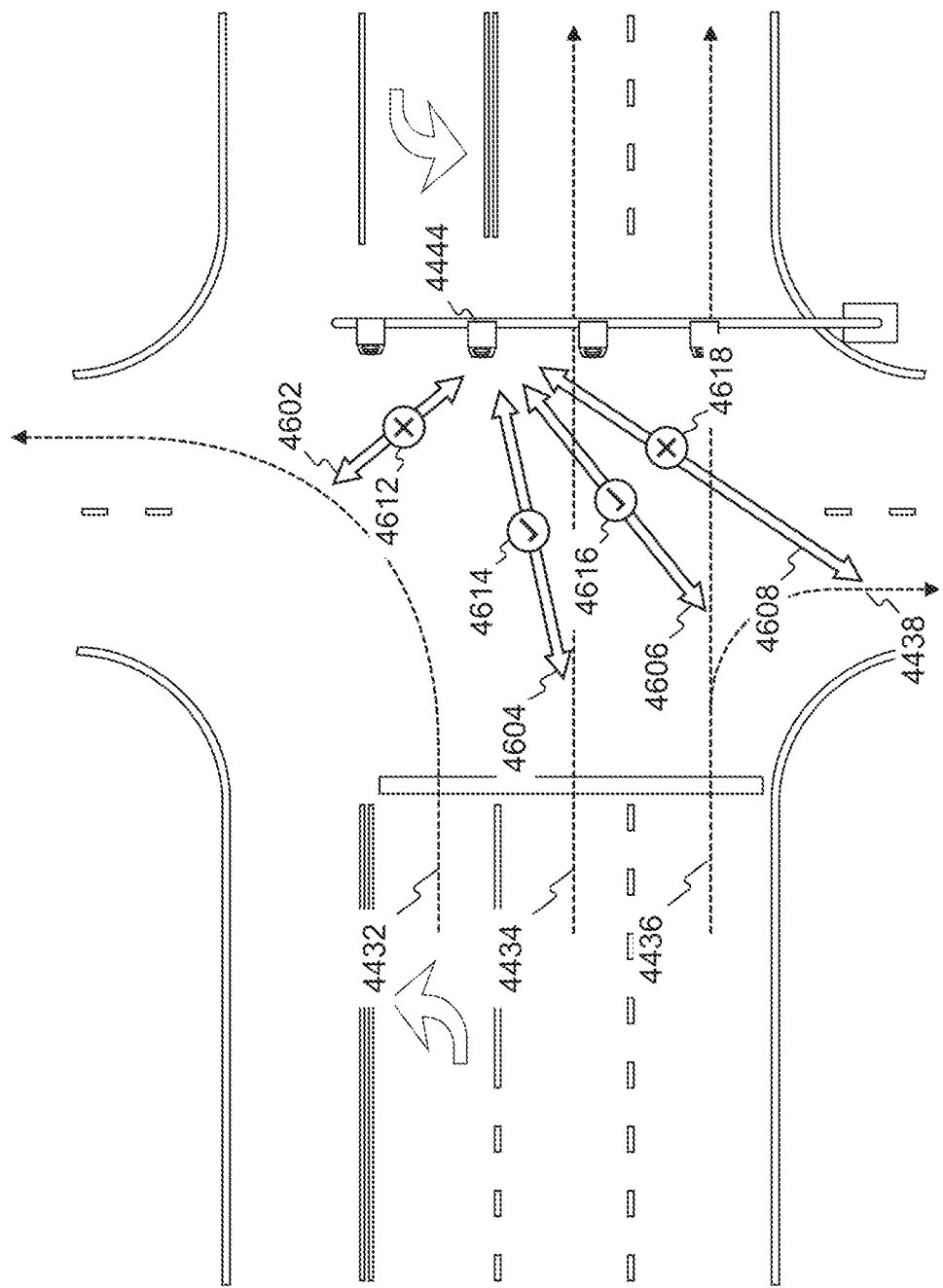
FIG. 46 illustrates an example traffic light relevancy mapping that may be generated using a trained model, consistent with the disclosed embodiments.

FIG. 46 illustrates an example traffic light relevancy mapping that may be generated using a trained model, consistent with the disclosed embodiments. For example, FIG. 46 may represent traffic light relevancy mapping 4540 output by trained model 4530 (or a portion thereof). For purposes of illustration, FIG. 46 shows example traffic light to drivable path pairs 4602, 4604, 4606, and 4608, all of which include traffic light 4444. In this example, traffic light to drivable path pair 4602 represents traffic light to drivable path pair including drivable path 4432 and traffic light 4444, traffic light to drivable path pair 4604 represents traffic light to drivable path pair including drivable path 4434 and traffic light 4444, traffic light to drivable path pair 4606 represents traffic light to drivable path pair including drivable path 4436 and traffic light 4444, and traffic light to drivable path pair 4608 represents traffic light to drivable path pair including drivable path 4438 and traffic light 4444.

Traffic light relevancy mapping 4540 may further include indicators of traffic light relevancy 4612, 4614, 4616, and 4618, corresponding to traffic light to drivable path pairs 4602, 4604, 4606, and 4608, respectively. In this example, indicator of traffic light relevancy 4612 may indicate that traffic light 4444 is not associated with drivable path 4432. Similarly, indicator of traffic light relevancy 4618 may indicate that traffic light 4444 is not associated with drivable path 4438. Indicators of traffic light relevancy 4614 and 4616, however, may indicate that traffic light 4444 is associated with drivable paths 4434 and 4436, respectively. While indicators of traffic light relevancy are shown in FIG. 46 for traffic light 4444 for purposes of simplicity, it is to be understood that traffic light relevancy mapping 4540 may include indicators of traffic light relevancy for all possible combinations of traffic light to drivable path pairs. For example, traffic light relevancy mapping 4540 may include indicators of traffic light relevancy for all possible combinations of drivable paths 4432, 4434, 4436, and 4438 and traffic lights 4442, 4444, 4446, and 4448.

As shown in FIG. 46, indicators of traffic light relevancy 4612, 4614, 4616, and 4618 may be binary indicators of relevancy. For example, an "X" may indicate no relevancy exists within a traffic light to drivable path pair, whereas a "check" may indicate that relevancy does exist. In some embodiments, various other forms of indicators may be used. For example, an indicator may be represented as a value representing a degree of relevance. For example, indicators of traffic light relevancy 4612, 4614, 4616, and 4618 may be represented as a percentage (e.g., from 0-100%), a value within a range (e.g., from 0-50, etc.), a score (e.g., with 0 indicating no relevance and increasing values representing increasing degrees of relevance), or the like. Accordingly, trained model 4530 may be configured to generate a degree of relevance (i.e., a degree of confidence, etc.) for each traffic light to drivable path pair. In some embodiments, the output of trained model 4530 may be processed or analyzed to generate indicators of traffic light relevancy 4612, 4614, 4616, and 4618. For example, trained model 4530 may output a degree of relevance which may be compared to a threshold degree of relevance to determine indicators of traffic light relevancy 4612, 4614, 4616, and 4618. Alternatively or additionally, trained model 4530 may output binary indicators or any other form of indicators directly.

Figure 47:
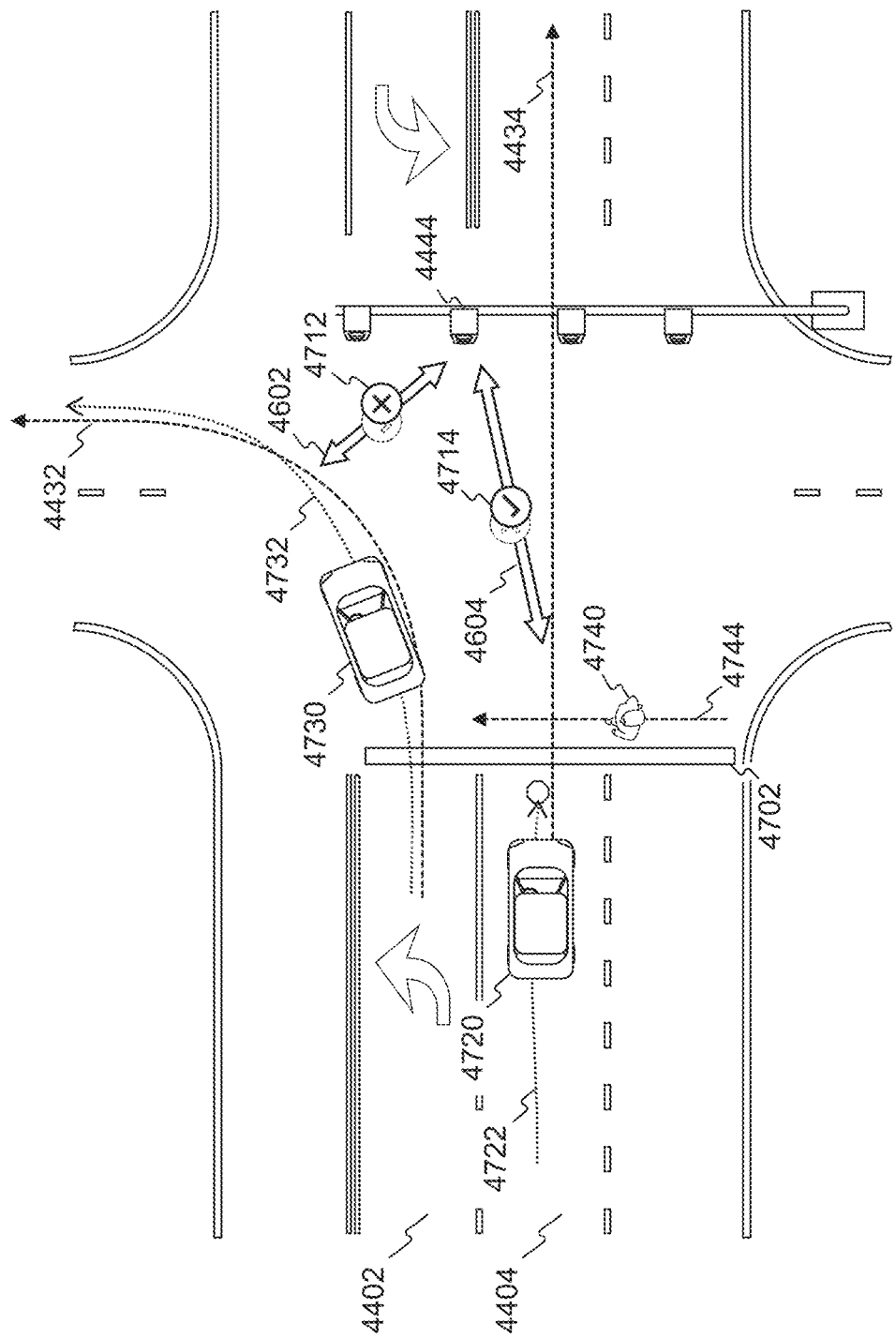
FIG. 47 illustrates example modifications to traffic light relevancy mapping based on observed behaviors and traffic light states, consistent with the disclosed embodiments.

FIG. 47 illustrates example modifications to traffic light relevancy mapping based on observed behaviors and traffic light states, consistent with the disclosed embodiments. As described above, process 4500 may include modifying various indicators of traffic light relevancy within traffic light relevancy mapping 4540 to generate an updated traffic light relevancy mapping 4580. In this example, traffic light relevancy mapping 4540 may have initially indicated traffic light 4444 is not relevant to drivable path 4434 and is relevant to drivable path 4432. For example, traffic light 4444 may be positioned closer to lane 4402 than lane 4404 and thus trained model 4540 may incorrectly determine a positive relevancy for traffic light to drivable path pair 4602. However, these initial indicators may be determined to be inconsistent with observed behavior information 4550 and traffic light state information 4560 (e.g., using trained model 4570). Accordingly, process 4500 may include generating modified indicators of traffic light relevancy 4712 and 4714, as shown in FIG. 47.

Various types of observed behavior, traffic light states, or combinations thereof may indicate a relevancy of a given traffic light to drivable path pair. As described above, the relevancy may be determined, at least in part, based on motion characteristics of a vehicle, such as vehicles 4720 or 4730. Motion characteristics consistent with a state of a traffic light recorded at the time of the motion of the vehicle may confirm a traffic light relevancy for a traffic light to drivable path pair, while inconsistent motion characteristics may be used to negate or refute a determined traffic light relevancy.

As one example, drive information for vehicle 4720 may indicate that vehicle 4720 decelerates and comes to a stop at stop line 4702, as indicated by trajectory 4722. If the state of traffic light 4444 is consistent with these motion characteristics (e.g., in a "RED" or "YELLOW" state), this may indicate a relevance for traffic light to drivable path pair 4604. If the initial relevancy determination is inconsistent with this determined relevancy, it may be modified to generate modified indicator of traffic light relevancy 4714, as shown. Conversely, if the state of traffic light 4444 is not consistent with these motion characteristics (e.g., in a "GREEN" state), the initial determination of no relevancy may be confirmed and/or maintained. As another example, if vehicle 4730 continues through junction 4400 along drivable path 4432 (as indicated by trajectory 4732) while traffic light 4444 is in a "RED" state, this may indicate traffic light 4444 is not relevant to drivable path 4432. Accordingly, the initial relevancy determination may be modified to generate modified indicator of traffic light relevancy 4712, as shown. In some embodiments, the observed behavior of a vehicle traveling along one drivable path may be used to determine traffic light relevancies for traffic light to drivable path pairs that do not include the drivable path along which the behavior is observed. For example, if vehicle 4720 stops at stop line 4702 while traffic light 4444 is in a "GREEN" state, this may confirm (or at least increase a likelihood or confidence) that traffic light 4444 is relevant to drivable path 4432. While various examples of motion characteristics are described above, any motion or behavior of a vehicle may be used to modify a relevancy for a traffic light to drivable path pair. This may include accelerating, decelerating, stopping, swerving, or the like.

As indicated above, observed behaviors of objects other than vehicles may be used to refine traffic light relevancy determinations. For example, a pedestrian 4740 may be observed to be crossing junction 4400 along a trajectory 4744. The timing of the crossing by pedestrian 4740 may indicate whether a traffic light is relevant to one or more drivable paths. For example, if pedestrian 4740 crosses while traffic light 4444 is in a "RED" state, this may indicate traffic light 4444 is relevant drivable path 4434. Conversely, if traffic light 4444 is in a "GREEN" state, this may indicate traffic light 4444 is not relevant drivable path 4434. Similar determinations may be made based on pedestrian 4740 stopping before crossing junction 4400 at various times. For example, if pedestrian 4740 stops and does not cross junction 4400 while traffic light 4444 is in a "GREEN" state, this may indicate a positive relevance for traffic light to drivable path pair 4604.

In some embodiments, a limited portion of behavior data may be considered for determining traffic light relevance. For example, vehicle behavior may only be considered within a predetermined zone or range from a junction. This predetermined range may be defined based on a distance to a traffic light (e.g., traffic light 4444), a distance to a stop line (e.g., stop line 4702), or distances to any other portions of junction 4400. For example, if vehicle 4720 accelerates, decelerates, or stops beyond a predetermined distance from junction 4400 (e.g., 8 meters, 10 meters, 15 meters, etc.) this behavior may be attributable to other conditions and thus may not be considered in determining stop light relevancy. As another example, observed behaviors may be limited temporally. For example, observed behaviors within a predetermined time period of a change in state of traffic light 4444 may be ignored. Accordingly, if vehicle 4720 decelerates along trajectory 4722 while traffic light 4444 is in a "GREEN" state, this may be ignored for purposes of modifying traffic light relevancy. The predetermined time period may thus account for delays in reaction times. In some embodiments, the timing may affect the determination in other ways. For example, if a vehicle accelerates within a predetermined time period after a traffic light changes to a "YELLOW" state, this may indicate the vehicle is speeding up to make it through the junction. However, after the predetermined time period, the acceleration by the vehicle may be more indicative of a lack of relevance between the traffic light and the drivable path.

In some embodiments, a combination of observed behaviors may be considered in determining whether to modify traffic light relevancy. For example, vehicle 4720 may slow and come to a stop as indicated by trajectory 4722. If traffic light 4444 is in a "GREEN" state, this may indicate non-relevance for traffic light to drivable path pair 4604. However, if this occurs while pedestrian 4740 is crossing junction 4400 (or if the presence of another obstacle is detected), the observed behavior may be attributed to other factors and thus may be ignored. As another example, the shape of a drivable path may be considered when determining traffic light relevancy. For example, because drivable path 4432 is curved, if host vehicle 4730 slows down, this may be attributable to the shape of drivable path 4432, rather than the state of a traffic light.

According to some embodiments, various types of observed behaviors may be assigned different weights. For example, coming to a complete stop may be more indicative of traffic light relevancy than a relatively small decrease in speed. Accordingly, a complete stop may be associated with a greater weight than a deceleration. In some embodiments, server 4410 may store various explicit algorithms defining how observed behaviors are used to modify indicators of traffic light relevance. However, in some embodiments, a trained machine learning model may be used to modify indicators of traffic light relevance, as described above. Accordingly, these relationships between observed behaviors and traffic light states may be implicitly reflected in the trained model as part of a training process. Accordingly, server 4410 may not necessarily store explicit algorithms defining how the observed behaviors described above are used to modify indicators of traffic light relevance.

Figure 48:
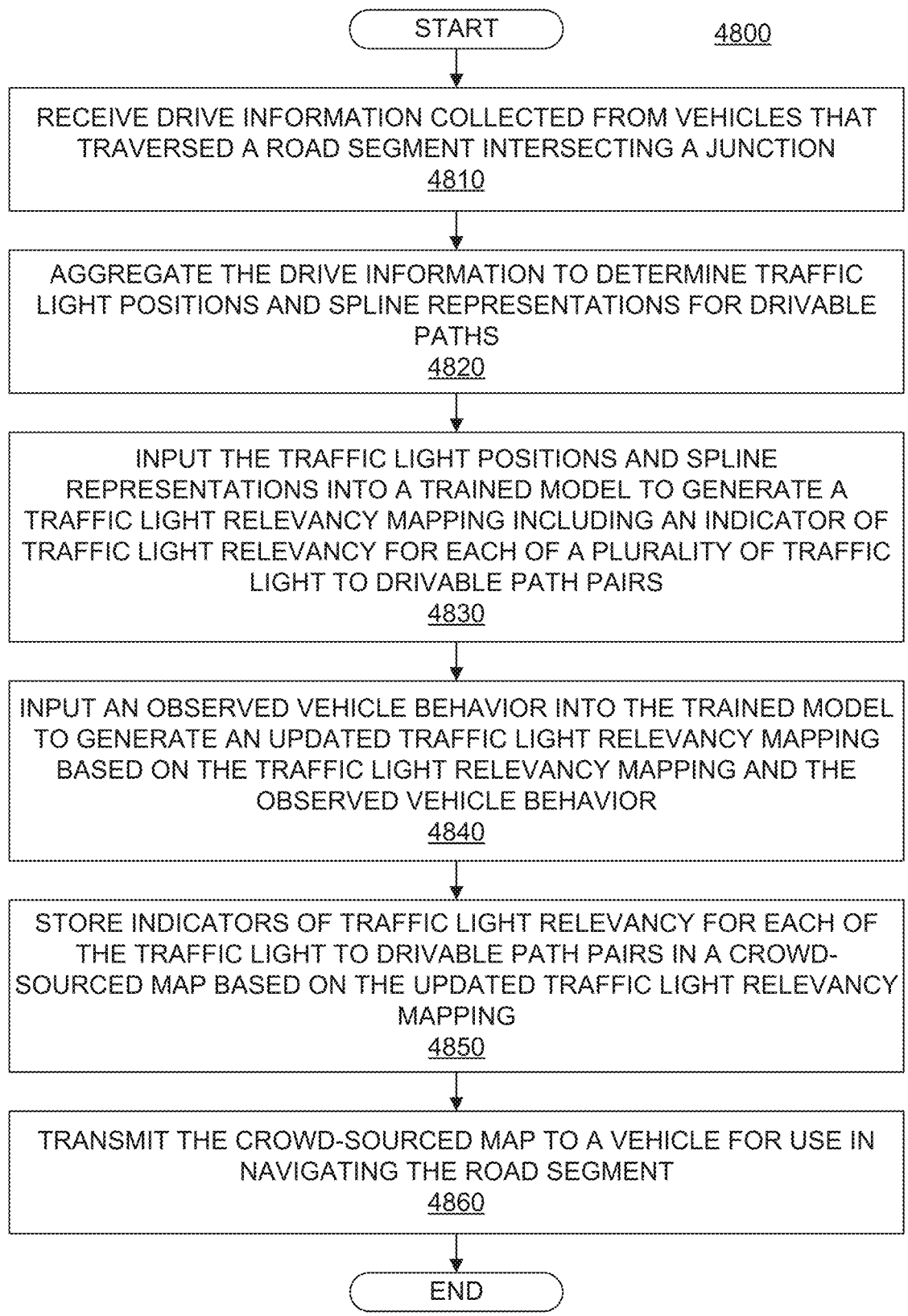
FIG. 48 is a flowchart showing an example process for generating a crowd-sourced map for use in vehicle navigation, consistent with the disclosed embodiments.

FIG. 48 is a flowchart showing an example process 4800 for generating a crowd-sourced map for use in vehicle navigation, consistent with the disclosed embodiments. Process 4800 may be performed by at least one processing device of a remotely located entity, such as server 4410, as described above. In some embodiments, a non-transitory computer readable medium may contain instructions that when executed by a processor cause the processor to perform process 4800. Process 4800 is not necessarily limited to the steps shown in FIG. 48, and any steps or processes of the various embodiments described throughout the present disclosure may also be included in process 4800, including those described above with respect to FIGS. 44, 45, 46, and 47. Further, any of the various techniques or details described above with respect to FIG. 30A, 30B, 31A, 31B, 32, 33, 34A-C, 35, 36, 37A-C, 38A, 38B, 39, 40, 41, 42, or 43 may equally pertain to and may be included in process 4800.

In step 4810, process 4800 includes receiving drive information collected from a plurality of vehicles that traversed a road segment. For example, step 4810 may include receiving drive information from vehicle 4420 and various other vehicles, as described above. Consistent with the disclosed embodiments, the road segment may intersect a junction associated with a plurality of traffic lights. For example, the road segment may intersect junction 4400 described above. While junction 4400 is described by way of example, process 4800 may apply to other forms of junctions including traffic lights.

In some embodiments, process 4800 may further include determining a plurality of traffic light to drivable path pairs based on the positions for each of the plurality of traffic lights and the spline representation for the one or more drivable paths. For example, this may include determining traffic light to drivable path pairs 4602, 4604, 4606, and 4608, as described above. In some embodiments, the plurality of traffic light to drivable path pairs may be inclusive of all pairing combinations between the plurality of traffic lights and the one or more drivable paths. For example, a traffic light to drivable path pair may be identified for every possible combination among drivable paths 4432, 4434, 4436, and 4438 and traffic lights 4442, 4444, 4446, and 4448. Similar traffic light to drivable path pairs may be identified for drivable paths and traffic lights associated with other directions of travel through junction 4400 not shown in FIG. 44.

In step 4820, process 4800 includes aggregating the received drive information to determine a position for each of the plurality of traffic lights. For example, this may include determining the positions of traffic lights 4442, 4444, 4446, and 4448, as described above. Step 4820 may further include aggregating the received drive information to determine a spline representation for each of one or more drivable paths associated with road segment. For example, this may include determining spline representations of drivable paths 4432, 4434, 4436, and 4438, as described above. In some embodiments, aggregating the received drive information includes aligning the drive information. For example, as the plurality of vehicles traverse the road segment, they may detect various landmarks and determine a position of the landmarks relative to the vehicle. The same landmarks represented in drive information from different vehicles may be aligned such that the collected drive information can be localized within a common coordinate system.

In some embodiments, the received drive information may include at least first drive information collected by a first vehicle and second drive information collected by a second vehicle. As described above, aligning the drive information may include dividing the first drive information into at least a first portion and a second portion and dividing the second navigational information into at least a first portion and a second portion. The drive information for each of the portions may then be aligned individually (or sequentially, etc.). For example, aligning the drive information may further include aligning the first portion of the first drive information with the first portion of the second drive information, and aligning the second portion of the first drive information with the second portion of the second drive information.

In step 4830, process 4800 includes providing as input to at least one trained model the determined positions for each of the plurality of traffic lights and the spline representation for each of the one or more drivable paths. For example, step 4830 may include inputting spline representation information 4510 and position information 4520 into trained model 4530, as described above. The at least one trained model is configured to generate, based on the determined positions for each of the plurality of traffic lights and the spline representation for each of the one or more drivable paths, a traffic light relevancy mapping, such as traffic light relevancy mapping 4540 described above. The traffic light relevancy mapping may include an indicator of traffic light relevancy for each of a plurality of traffic light to drivable path pairs selected from among the plurality of traffic lights and the one or more drivable paths. For example, the traffic light relevancy mapping may include indicators of traffic light relevancy 4612, 4614, 4616, and 4618 described above. In some embodiments, the at least one trained model may include a convolutional neural network, as described above.

In step 4840, process 4800 includes providing as input to the at least one trained model an observed vehicle behavior represented by the received drive information. For example, this may include inputting observed behavior information 4550 into trained model 4570, as described above. The at least one trained model may be configured to generate an updated traffic light relevancy mapping based on the traffic light relevancy mapping and the observed vehicle behavior. For example, this may include generating updated traffic light relevancy mapping 4580, as described above. Generating the updated traffic light relevancy mapping may include modifying at least one indicator of traffic light relevancy for at least one traffic light to drivable path pair of the plurality of traffic light to drivable path pairs. For example, this may include generating modified indicators of traffic light relevancy 4712 and 4714, as described above. In some embodiments, step 4840 may further include providing as input to the at least one trained model state information for the plurality of traffic lights represented by the received drive information. For example, this may include inputting traffic light state information 4560 into trained model 4570, as described above. The at least one trained model may further be configured to generate the updated traffic light relevancy mapping based on the state information for the plurality of traffic lights. In some embodiments, the indicator of traffic light relevancy for the at least one traffic light to drivable path pair may include a confidence level. Accordingly, modifying the indicator of traffic light relevancy for the at least one traffic light to drivable path pair may include modifying the confidence level based on the observed vehicle behavior.

In some embodiments, the at least one trained model may include at least a first trained model and a second trained model. For example, this may include trained models 4530 and 4570, as described above. The determined positions for each of the plurality of traffic lights and the spline representation for each of one or more drivable paths may be provided as input to the first trained model and the observed vehicle behavior is provided as input to the second trained model. Accordingly, the determined positions for each of the plurality of traffic lights and the spline representation for each of the one or more drivable paths may be provided as a first input to the at least one trained model and the observed vehicle behavior may be provided as a second input to the at least one trained model. For example, the second input may be provided after a predetermined period of time. In some embodiments, the same trained model may be configured to generate a traffic light relevancy mapping and generate the updated traffic light relevancy mapping. For example, a single model may be trained to generate a traffic light relevancy mapping (which in this case may refer to the updated traffic light relevancy mapping) based on the determined positions for each of the plurality of traffic lights, the spline representation for each of the one or more drivable paths, the observed vehicle behavior, and/or state information for the plurality of traffic lights. Accordingly, the determined positions for each of the plurality of traffic lights, the spline representation for each of the one or more drivable paths, and the observed vehicle behavior may be provided as a single input to the at least one trained model (or at least at the same time or substantially the same time).

The observed vehicle behavior may be used to modify the at least one indicator of traffic light relevancy for the at least one traffic light to drivable path pair in various ways. In some embodiments, the observed vehicle behavior may include traversing the junction by at least one vehicle of the plurality of vehicles along a drivable path associated with the at least one traffic light to drivable path pair during a detected state of a traffic light associated with the at least one traffic light to drivable path pair. For example, this may include traversing junction 4400 by vehicle 4730 along trajectory 4732, as described above. When the detected state is green, modifying the indicator of traffic light relevancy may include confirming a relevancy for the at least one traffic light to drivable path pair. Conversely, when the detected state is red, modifying the indicator of traffic light relevancy may include negating a relevancy for the at least one traffic light to drivable path pair.

As another example, the observed vehicle behavior may include a deceleration by at least one vehicle of the plurality of vehicles during a detected state of a traffic light associated with the at least one traffic light to drivable path pair. For example, this may include a deceleration by vehicle 4720, as indicated by trajectory 4722. In some embodiments, the observed vehicle behavior may be based on the deceleration occurring within a predetermined distance of the traffic light. The deceleration may include coming to a stop. When the detected state is red or yellow, modifying the indicator of traffic light relevancy may include confirming a relevancy for the at least one traffic light to drivable path pair. Conversely, when the detected state is green, modifying the indicator of traffic light relevancy may include negating a relevancy for the at least one traffic light to drivable path pair.

In yet another example, the observed vehicle behavior may include an acceleration by at least one vehicle of the plurality of vehicles during a detected state of a traffic light associated with the at least one traffic light to drivable path pair. For example, this may include an acceleration by vehicle 4730 along trajectory 4732. In some embodiments, the observed vehicle behavior may be based on the acceleration occurring within a predetermined distance of the traffic light. When the detected state is red, modifying the indicator of traffic light relevancy may include negating a relevancy for the at least one traffic light to drivable path pair. Conversely, when the detected state is green, modifying the indicator of traffic light relevancy may include confirming a relevancy for the at least one traffic light to drivable path pair. In some embodiments, when the detected state is yellow, modifying the indicator of traffic light relevancy may depend on a timing of the acceleration. For example, if the acceleration occurs or begins within a predetermined time period form the detected state changing from green to yellow, modifying the indicator of traffic light relevancy may include confirming a relevancy for the at least one traffic light to drivable path pair. However, if the acceleration occurs or begins outside of the predetermined time period from the detected state changing from green to yellow, modifying the indicator of traffic light relevancy may include negating a relevancy for the at least one traffic light to drivable path pair.

In some embodiments, the indicator of traffic light relevancy may be modified based further on an observed behavior of at least one additional object represented in the received drive information. For example, the at least one additional object may include a pedestrian crossing a drivable path associated with the at least one traffic light to drivable path pair during a detected state of a traffic light associated with the at least one traffic light to drivable path pair. Referring to FIG. 47 above, this may include pedestrian 4740 traversing trajectory 4744. When the detected state is red, modifying the indicator of traffic light relevancy may include confirming a relevancy for the at least one traffic light to drivable path pair. Conversely, when the detected state is green, modifying the indicator of traffic light relevancy may include negating a relevancy for the at least one traffic light to drivable path pair.

According to some embodiments, the at least one trained model may be trained to ignore various factors based on the presence of other factors. Accordingly, modifying the indicator of traffic light relevancy may include foregoing confirming or negating a relevancy for the at least one traffic light to drivable path pair based on a characteristic of a drivable path associated with the at least one traffic light to drivable path pair. For example, the characteristic of the drivable path may include a curvature of the drivable path and the observed vehicle behavior may include a deceleration by at least one vehicle of the plurality of vehicles determined to be attributable to the curvature. As another example, modifying the indicator of traffic light relevancy may include foregoing confirming or negating a relevancy for the at least one traffic light to drivable path pair based on a presence of at least one object. For example, the observed vehicle behavior may include a deceleration by at least one vehicle of the plurality of vehicles determined to be attributable to the at least one object.

In step 4850, process 4800 includes storing in the crowd-sourced map, based on the updated traffic light relevancy mapping, indicators of traffic light relevancy for each of the plurality of traffic light to drivable path pairs. For example, this may include storing indicators of traffic light relevancy 4612, 4614, 4616, and 4618 (and/or various other indicators of traffic light relevancy associated with junction 4400).

In step 4860, process 4800 includes transmitting the crowd-sourced map to at least one vehicle predicted to traverse the road segment for use in navigating the road segment relative to the stored indicators of traffic light relevancy for each of the plurality of traffic light to drivable path pairs. For example, the vehicle may detect the traffic light and determine if a navigational action is required based on a state identifier for a traffic light. If the navigational action is required, one or more actuator systems associated with the vehicle may implement the determined one or more navigational actions. The one or more actuator systems may include regular controls for the vehicle such as a gas pedal, a braking pedal, a transmission shifter, a steering wheel, a hand brake and the like. For example, a navigation system of the vehicle may be configured to accelerate the vehicle via a gas pedal of the vehicle.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for generating a crowd-sourced map for use in vehicle navigation, the system comprising:

at least one processor comprising circuitry and a memory, wherein the memory includes instructions that when executed by the circuitry cause the at least one processor to:

receive, at a server via one or more networks, drive information collected from a plurality of vehicles that traversed a road segment, wherein the road segment intersects a junction associated with a plurality of traffic lights;

aggregate, by the server, the received drive information to determine a position for each of the plurality of traffic lights and to determine a spline representation for each of one or more drivable paths associated with road segment;

generate, by the server based on the determined positions for each of the plurality of traffic lights and the spline representation for each of the one or more drivable paths, a traffic light relevancy mapping including an indicator of traffic light relevancy for each of a plurality of traffic light to drivable path pairs selected from among the plurality of traffic lights and the one or more drivable paths, wherein generating the traffic light relevancy mapping includes inputting the determined positions for each of the plurality of traffic lights and the spline representation for each of the one or more drivable paths into at least one trained model;

generate, by the server, an updated traffic light relevancy mapping based on the traffic light relevancy mapping and an observed vehicle behavior represented by the received drive information, wherein generating the updated traffic light relevancy mapping includes inputting the observed vehicle behavior into the at least one trained model to modify at least one indicator of traffic light relevancy for at least one traffic light to drivable path pair of the plurality of traffic light to drivable path pairs;

store in the crowd-sourced map, based on the updated traffic light relevancy mapping, indicators of traffic light relevancy for each of the plurality of traffic light to drivable path pairs; and transmit the crowd-sourced map from the server via the one or more networks to at least one vehicle predicted to traverse the road segment, the at least one vehicle being configured to determine at least one navigational action for navigating the road segment based on the stored indicators of traffic light relevancy for each of the plurality of traffic light to drivable path pairs.

2. The system of claim 1, wherein generating the updated traffic light relevancy mapping further includes inputting to the at least one trained model state information for the plurality of traffic lights represented by the received drive information, and wherein the at least one trained model is configured to generate the updated traffic light relevancy mapping based on the state information for the plurality of traffic lights.

3. The system of claim 1, wherein the at least one trained model includes at least a first trained model and a second trained model, and wherein:

the determined positions for each of the plurality of traffic lights and the spline representation for each of one or more drivable paths are provided as input to the first trained model; and the observed vehicle behavior is provided as input to the second trained model.

4. The system of claim 1, wherein the determined positions for each of the plurality of traffic lights, the spline representation for each of the one or more drivable paths, and the observed vehicle behavior are provided as a single input to the at least one trained model.

5. The system of claim 1, wherein aggregating the received drive information includes aligning the drive information.

6. The system of claim 5, wherein the received drive information includes at least first drive information collected by a first vehicle and second drive information collected by a second vehicle and wherein aligning the drive information includes:

dividing the first drive information into at least a first portion and a second portion and dividing the second navigational information into at least a first portion and a second portion; and aligning the first portion of the first drive information with the first portion of the second drive information, and aligning the second portion of the first drive information with the second portion of the second drive information.

7. The system of claim 1, wherein the at least one trained model includes a convolutional neural network.

8. The system of claim 1, wherein the observed vehicle behavior includes traversing the junction by at least one vehicle of the plurality of vehicles along a drivable path associated with the at least one traffic light to drivable path pair during a detected state of a traffic light associated with the at least one traffic light to drivable path pair.

9. The system of claim 8, wherein the detected state is green and modifying the indicator of traffic light relevancy includes confirming a relevancy for the at least one traffic light to drivable path pair.

10. The system of claim 8, wherein the detected state is red and modifying the indicator of traffic light relevancy includes negating a relevancy for the at least one traffic light to drivable path pair.

11. The system of claim 1, wherein the observed vehicle behavior includes a deceleration by at least one vehicle of the plurality of vehicles during a detected state of a traffic light associated with the at least one traffic light to drivable path pair.

12. The system of claim 11, wherein the detected state is red and modifying the indicator of traffic light relevancy includes confirming a relevancy for the at least one traffic light to drivable path pair.

13. The system of claim 11, wherein the detected state is green and modifying the indicator of traffic light relevancy includes negating a relevancy for the at least one traffic light to drivable path pair.

14. The system of claim 11, wherein the observed vehicle behavior is based on the deceleration occurring within a predetermined distance of the traffic light.

15. The system of claim 1, wherein the observed vehicle behavior includes an acceleration by at least one vehicle of the plurality of vehicles during a detected state of a traffic light associated with the at least one traffic light to drivable path pair.

16. The system of claim 15, wherein the detected state is red and modifying the indicator of traffic light relevancy includes negating a relevancy for the at least one traffic light to drivable path pair.

17. The system of claim 15, wherein the detected state is green and modifying the indicator of traffic light relevancy includes confirming a relevancy for the at least one traffic light to drivable path pair.

18. The system of claim 15, wherein observed vehicle behavior is based on the acceleration occurring within a predetermined distance of the traffic light.

19. The system of claim 1, wherein the indicator of traffic light relevancy is modified based further on an observed behavior of at least one additional object represented in the received drive information.

20. The system of claim 19, wherein the at least one additional object includes a pedestrian crossing a drivable path associated with the at least one traffic light to drivable path pair during a detected state of a traffic light associated with the at least one traffic light to drivable path pair.

21. The system of claim 20, wherein the detected state is red and modifying the indicator of traffic light relevancy includes confirming a relevancy for the at least one traffic light to drivable path pair.

22. The system of claim 20, wherein the detected state is green and modifying the indicator of traffic light relevancy includes negating a relevancy for the at least one traffic light to drivable path pair.

23. The system of claim 1, wherein modifying the indicator of traffic light relevancy includes foregoing confirming or negating a relevancy for the at least one traffic light to drivable path pair based on a characteristic of a drivable path associated with the at least one traffic light to drivable path pair.

24. The system of claim 23, wherein the characteristic of the drivable path includes a curvature of the drivable path and the observed vehicle behavior includes a deceleration by at least one vehicle of the plurality of vehicles determined to be attributable to the curvature.

25. The system of claim 1, wherein modifying the indicator of traffic light relevancy includes foregoing confirming or negating a relevancy for the at least one traffic light to drivable path pair based on a presence of at least one object.

26. The system of claim 25, wherein the observed vehicle behavior includes a deceleration by at least one vehicle of the plurality of vehicles determined to be attributable to the at least one object.

27. The system of claim 1, wherein the plurality of traffic light to drivable path pairs are inclusive of all pairing combinations between the plurality of traffic lights and the one or more drivable paths.

28. The system of claim 1, wherein the memory further includes instructions that when executed by the circuitry cause the at least one processor to determine the plurality of traffic light to drivable path pairs based on the positions for each of the plurality of traffic lights and the spline representation for the one or more drivable paths.

29. The system of claim 1, wherein the indicator of traffic light relevancy for the at least one traffic light to drivable path pair includes a confidence level.

30. The system of claim 29, wherein modifying the indicator of traffic light relevancy for the at least one traffic light to drivable path pair includes modifying the confidence level based on the observed vehicle behavior.

31. A method for generating a crowd-sourced map for use in vehicle navigation, the method comprising:
  receiving, at a server via one or more networks, drive information collected from a plurality of vehicles that traversed a road segment, wherein the road segment intersects a junction associated with a plurality of traffic lights;
  aggregating, by the server, the received drive information to determine a position for each of the plurality of traffic lights and to determine a spline representation for each of one or more drivable paths associated with road segment;
  generate, by the server based on the determined positions for each of the plurality of traffic lights and the spline representation for each of the one or more drivable paths, a traffic light relevancy mapping including an indicator of traffic light relevancy for each of a plurality of traffic light to drivable path pairs selected from among the plurality of traffic lights and the one or more drivable paths, wherein generating the traffic light relevancy mapping includes inputting the determined positions for each of the plurality of traffic lights and the spline representation for each of the one or more drivable paths into at least one trained model;
  generate, by the server, an updated traffic light relevancy mapping based on the traffic light relevancy mapping and an observed vehicle behavior represented by the received drive information, wherein generating the updated traffic light relevancy mapping includes inputting the observed vehicle behavior into the at least one trained model to modify at least one indicator of traffic light relevancy for at least one traffic light to drivable path pair of the plurality of traffic light to drivable path pairs;
  storing in a crowd-sourced map, based on the updated traffic light relevancy mapping, indicators of traffic light relevancy for each of the plurality of traffic light to drivable path pairs; and
  transmitting the crowd-sourced map from the server via the one or more networks to at least one vehicle predicted to traverse the road segment, the at least one vehicle being configured to determine at least one navigational action for navigating the road segment based on the stored indicators of traffic light relevancy for each of the plurality of traffic light to drivable path pairs.

32. A non-transitory computer readable medium containing instructions that when executed by at least one processor, cause the at least one processor to perform operations comprising:
  receiving, at a server via one or more networks, drive information collected from a plurality of vehicles that traversed a road segment, wherein the road segment intersects a junction associated with a plurality of traffic lights;
  aggregating, by the server, the received drive information to determine a position for each of the plurality of traffic lights and to determine a spline representation for each of one or more drivable paths associated with road segment;
  generate, by the server based on the determined positions for each of the plurality of traffic lights and the spline representation for each of the one or more drivable paths, a traffic light relevancy mapping including an indicator of traffic light relevancy for each of a plurality of traffic light to drivable path pairs selected from among the plurality of traffic lights and the one or more drivable paths, wherein generating the traffic light relevancy mapping includes inputting the determined positions for each of the plurality of traffic lights and the spline representation for each of the one or more drivable paths into at least one trained model;
  generate, by the server, an updated traffic light relevancy mapping based on the traffic light relevancy mapping and an observed vehicle behavior represented by the received drive information, wherein generating the updated traffic light relevancy mapping includes inputting the observed vehicle behavior into the at least one trained model to modify at least one indicator of traffic light relevancy for at least one traffic light to drivable path pair of the plurality of traffic light to drivable path pairs;
  storing in a crowd-sourced map, based on the updated traffic light relevancy mapping, indicators of traffic light relevancy for each of the plurality of traffic light to drivable path pairs; and
  transmitting the crowd-sourced map from the server via the one or more networks to at least one vehicle predicted to traverse the road segment, the at least one vehicle being configured to determine at least one navigational action for use in navigating the road segment based on the stored indicators of traffic light relevancy for each of the plurality of traffic light to drivable path pairs.

33. The method of claim 31, wherein the at least one trained model includes at least a first trained model and a second trained model, and wherein:
  the determined positions for each of the plurality of traffic lights and the spline representation for each of one or more drivable paths are provided as input to the first trained model; and the observed vehicle behavior is provided as input to the second trained model.

34. The method of claim 31, wherein the determined positions for each of the plurality of traffic lights, the spline representation for each of the one or more drivable paths, and the observed vehicle behavior are provided as a single input to the at least one trained model.

35. The non-transitory computer readable medium of claim 32, wherein aggregating the received drive information includes aligning the drive information.

36. The non-transitory computer readable medium of claim 35, wherein the received drive information includes at least first drive information collected by a first vehicle and second drive information collected by a second vehicle and wherein aligning the drive information includes:
  dividing the first drive information into at least a first portion and a second portion and dividing the second navigational information into at least a first portion and a second portion; and
  aligning the first portion of the first drive information with the first portion of the second drive information, and aligning the second portion of the first drive information with the second portion of the second drive information.

* * * * *